(12) United States Patent
Yamada

(10) Patent No.: US 6,754,398 B1
(45) Date of Patent: Jun. 22, 2004

(54) METHOD OF AND SYSTEM FOR IMAGE PROCESSING AND RECORDING MEDIUM FOR CARRYING OUT THE METHOD

(75) Inventor: Masahiko Yamada, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 779 days.

(21) Appl. No.: 09/592,602

(22) Filed: Jun. 12, 2000

(30) Foreign Application Priority Data

| Jun. 10, 1999 | (JP) | 11/163670 |
| Jun. 10, 1999 | (JP) | 11/163671 |
| Sep. 27, 1999 | (JP) | 11/271674 |
| Sep. 30, 1999 | (JP) | 11/279172 |
| Dec. 22, 1999 | (JP) | 11/363766 |

(51) Int. Cl.⁷ ............................................. G06K 9/40
(52) U.S. Cl. .................... 382/260; 382/300; 358/447; 358/463; 358/3.26; 358/3.27
(58) Field of Search ............................. 382/108, 112, 382/128, 149, 199, 201, 206, 207, 217, 218, 219, 254, 255, 260, 263, 266, 269, 273, 274, 275, 278, 309, 310, 240, 300, 302; 348/606, 607, 618, 622, 625; 358/447, 461, 452, 463, 3.27, 3.26

(56) References Cited

U.S. PATENT DOCUMENTS

| 4,272,477 A | | 6/1981 | Hagedorn | 422/50 |
| 4,315,318 A | | 2/1982 | Kato et al. | 364/515 |
| 4,317,179 A | | 2/1982 | Kato et al. | 364/515 |
| 4,399,461 A | * | 8/1983 | Powell | 348/625 |
| 4,463,381 A | * | 7/1984 | Powell et al. | 348/625 |
| 4,987,496 A | * | 1/1991 | Greivenkamp, Jr. | 358/448 |
| 5,005,082 A | * | 4/1991 | Zdepski et al. | 348/613 |
| 5,313,301 A | * | 5/1994 | Lee | 348/607 |
| 5,402,338 A | | 3/1995 | Ito | 364/413.23 |
| 5,454,044 A | | 9/1995 | Nakajima | 382/132 |
| 5,461,655 A | | 10/1995 | Vuylsteke et al. | 378/62 |
| 5,467,404 A | | 11/1995 | Vuylsteke et al. | 382/274 |
| 5,534,924 A | * | 7/1996 | Florant | 348/364 |
| 5,608,813 A | | 3/1997 | Nakajima | 382/132 |
| 5,644,662 A | | 7/1997 | Vuylsteke | 382/302 |
| 5,805,721 A | | 9/1998 | Vuylsteke et al. | 382/128 |
| 5,901,249 A | | 5/1999 | Ito | 382/239 |
| 5,905,579 A | * | 5/1999 | Katayama et al. | 358/296 |
| 5,991,457 A | | 11/1999 | Ito et al. | 382/254 |
| 6,072,913 A | | 6/2000 | Yamada | 382/275 |
| 6,501,503 B2 | * | 12/2002 | Kudo | 348/208.99 |

FOREIGN PATENT DOCUMENTS

| JP | 56-11395 | 2/1981 | G21K/4/00 |
| JP | 6-274615 | 9/1994 | G06F/15/68 |
| JP | 10-171983 | 6/1998 | G06T/5/20 |

OTHER PUBLICATIONS

Patent Abstract of Japan 06–274615 Sep. 30, 1994.
Patent Abstract of Japan 10–171983 May 26, 1998.
Patent Abstract of Japan 56011395 Feb. 4, 1981.

* cited by examiner

Primary Examiner—Timothy M. Johnson
Assistant Examiner—Yosef Kassa
(74) Attorney, Agent, or Firm—Sughrue Mion, PLLC

(57) ABSTRACT

A processed image signal is obtained from an original image signal representing an original image by carrying out on the original image signal an image processing based on a signal representing information on a high frequency component of the original image signal. Band-limited image signals are made from the original image signal, and a signal representing information on a high frequency component of the original image signal is obtained from the band-limited image signals on the basis of a predetermined transformation function. The image processing is carried out on the original image signal on the basis of the signal representing information on a high frequency component of the original image signal.

141 Claims, 68 Drawing Sheets

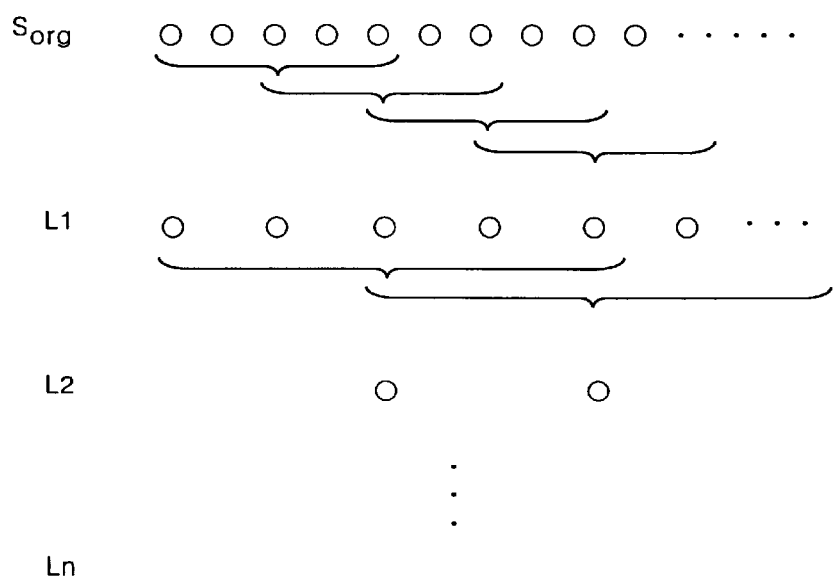

PRIOR ART

FIG.14
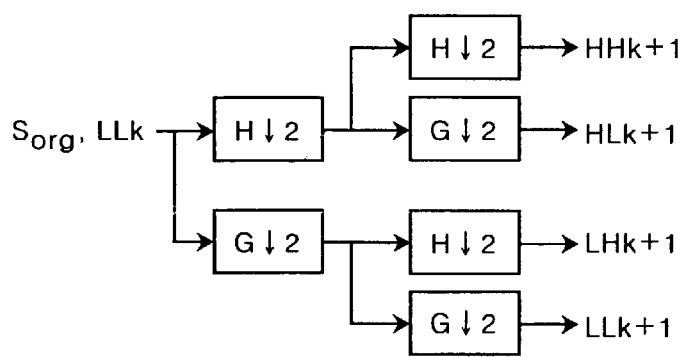
FIG.15A    FIG.15B
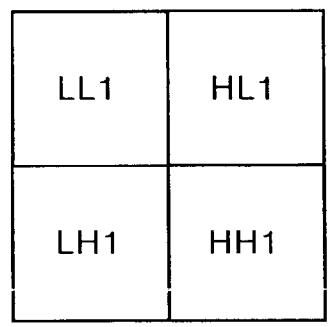 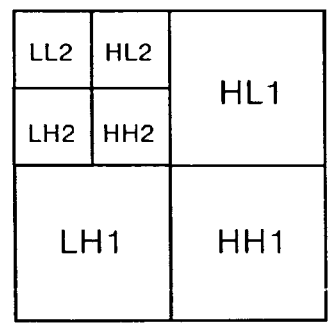

OBJECT PIXEL (k, ℓ)

| $f_7$ | $f_6$ | $f_5$ | $f_4$ | $f_3$ |
|---|---|---|---|---|
| $f_8$ | | | | $f_2$ |
| $f_9$ | | PIXEL j | | $f_1$ |
| $f_{10}$ | | | | $f_{16}$ |
| $f_{11}$ | $f_{12}$ | $f_{13}$ | $f_{14}$ | $f_{15}$ |

FIG.29A

| 1 | 2 | 1 |
|---|---|---|
| 2 | 4 | 2 |
| 1 | 2 | 1 |

FIG.29B

| 0 | 0 | 1 |
|---|---|---|
| 0 | 1 | 0 |
| 1 | 0 | 0 |

FIG.29C

| 0 | 0 | 1 |
|---|---|---|
| 0 | 4 | 0 |
| 1 | 0 | 0 |

FIG.29D

| 0 | 0 | 0 |
|---|---|---|
| 0 | 0 | 0 |
| 0 | 0 | 0 |

FIG.29E

| 0 | 0 | 0 |
|---|---|---|
| 0 | 0 | 0 |
| 0 | 0 | 0 |

FIG.82A

| 1/3 | 0 | 0 |
|---|---|---|
| 0 | 1/3 | 0 |
| 0 | 0 | 1/3 |

FIG.82B

| 1/4 | 1/16 | 0 |
|---|---|---|
| 1/16 | 1/4 | 1/16 |
| 0 | 1/16 | 1/4 |

FIG.83A

| 101 | 0 | 0 |
|---|---|---|
| 0 | 101 | 0 |
| 0 | 0 | 101 |

FIG.83B

| 141 | 35 | 0 |
|---|---|---|
| 35 | 141 | 35 |
| 0 | 35 | 141 |

FIG.85
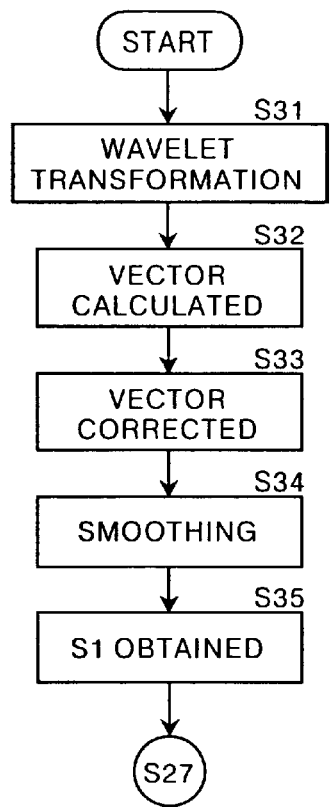
FIG.86A  FIG.86B
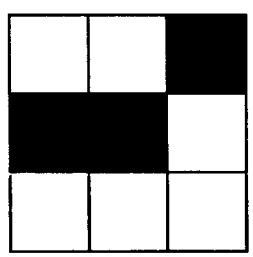
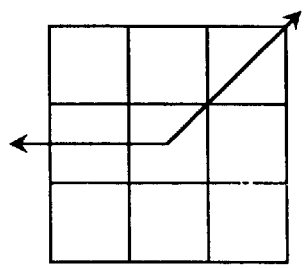

METHOD OF AND SYSTEM FOR IMAGE PROCESSING AND RECORDING MEDIUM FOR CARRYING OUT THE METHOD

BACKGROUND OF THE INVENTION

1. Field of the Invention

This invention relates to a method of and system for carrying out an image processing such as a processing for enhancing a predetermined frequency component of an image signal. This invention further relates to a computer-readable recording medium loaded with program for causing a computer to perform the image processing in accordance with the method.

2. Description of the Related Art

In the field of image processing, a wavelet transformation or a Laplacian pyramid is employed as a method of dividing an image signal into a plurality of frequency components, for instance, when different processings are to be carried out by frequency bands of the image signal. The image processing may be, for instance, separation of a high frequency component for removing noise, or an image compression processing by deleting data in a frequency band where lots of noise exists. We have proposed various image processing methods such as for enhancing only edge components of an image by wavelet transformation. See, for instance, Japanese Unexamined Patent Publication Nos. 6(1994)-274615 and 6(1994)-350989.

The method called "Laplacian pyramid" is disclosed, for instance, in Japanese Unexamined Patent Publication Nos. 5(1993)-244508, 6(1994)-96200 and 6(1994)-301766. In the Laplacian pyramid, a mask processing is carried out on an original image by use of a mask approximated by a Gaussian function, and picture elements are thinned by sampling the processed image signal, whereby a quarter-size unsharp image which is ¼ of the original image in size is obtained. Then the quarter-size unsharp image is interpolated with picture elements whose values are 0 in positions corresponding to the thinned picture elements, whereby the unsharp image is enlarged to the original size, and a mask processing is carried out on the original-size unsharp image by use of the aforesaid mask, whereby another unsharp image is obtained. The unsharp image is subtracted from the original image and a band-limited signal representing a component of the original image signal in a certain limited frequency band, i.e., representing a frequency response characteristic in a certain limited frequency band, is obtained. By repeating these steps with successively obtained unsharp images employed as the original image in sequence, N band-limited signals which are $\frac{1}{2}^{2N}$ of the original image in size are made. The unsharp image in the lowest frequency band represents a low frequency component of the original image.

In Japanese Unexamined Patent Publication No. 5(1993)-244508, there is proposed a method in which a processed image signal enhanced with contrast by frequency band is obtained by decomposing a radiation image into a plurality of images in different frequency bands by Laplacian pyramid, thereby obtaining a plurality of band-limited image signals, transforming the band-limited image signals by use of non-linear functions, and reconstructing an image signal from the transformed band-limited image signals together with the unsharp image signal representing the unsharp image in the lowest frequency band.

We have proposed various image processing methods and systems for improving diagnostic performance of a radiation image by carrying out on a radiation image signal representing the radiation image, for instance, a frequency enhancement processing or a dynamic range compression processing by use of an unsharp mask image signal (will be referred to as "unsharp image signal", hereinbelow). See, for instance, Japanese Unexamined Patent Publication Nos. 55(1980)-163472, 55(1980)-87953, 3(1991)-222577, 10(1998)-75395, and 10(1998)-171983. For example, in the frequency enhancement processing, a predetermined spatial frequency component of an original image signal is enhanced by subtracting an unsharp image signal $S_{us}$ from the original image signal $S_{org}$, and adding the remainder multiplied by a coefficient of enhancement $\beta$ to the original image signal $S_{org}$. This is represented by the following formula (1).

$$S_{proc}=S_{org}+\beta \times (S_{org}-S_{us}) \tag{1}$$

wherein $S_{proc}$ is a frequency-enhanced image signal, $S_{org}$ is an original image signal, $S_{us}$ is an unsharp image signal and $\beta$ is a coefficient of enhancement.

Further, in Japanese Unexamined Patent Publication No. 10(1998)-75395, there is disclosed a method of preventing generation of an artifact in the frequency-enhanced image signal by adjusting the frequency response characteristic of the add signal to be added to the original image signal. In this method, a plurality of unsharp image signals, which are different from each other in frequency response characteristic, that is, in sharpness, are prepared, differences between two of the original image signal and the unsharp image signals are taken, thereby making a plurality of band-limited signals respectively representing frequency components in limited frequency bands of the original image signal, the band-limited signals thus obtained are transformed into signals of desired values by use of different transformation functions, and the add signal is made by adding up the suppressed band-limited signals. This is represented, for instance, by the following formulae (2).

$$S_{proc} = S_{org} + \beta(S_{org}) \times F_{usm}(S_{org}, S_{us}1, S_{us}2, \ldots S_{us}n) \tag{2}$$

$$F_{usm}(S_{org}, S_{us}1, S_{us}2, \ldots S_{us}n) = f_1(S_{org}-S_{us}1)+f_2(S_{us}1-S_{us}2)+\ldots$$

$$+f_k(S_{us}k-1-S_{us}k)+\ldots+f_n(S_{us}n-1-S_{us}n)$$

wherein $S_{proc}$ is a processed image signal, $S_{org}$ is an original image signal, $S_{us}k$ (k=1 to n) is an unsharp image signal, $f_k$(k=1 to n) is a transformation function, and $\beta(S_{org})$ is a coefficient of enhancement determined on the basis of the original image signal.

Further, in Japanese Unexamined Patent Publication No. 10(1998)-75364, there is disclosed a method of preventing generation of an artifact in the processed signal when the dynamic range compression processing is to be carried out. In this method, as disclosed in Japanese Unexamined Patent Publication No. 10(1998)-75395, a plurality of band-limited signals are made, a low frequency component signal representing a low frequency component of the original image signal is obtained on the basis of the band-limited signals, and the dynamic range compression processing is carried out by the low frequency component signal to the original image signal. This is represented, for instance, by the following formula (3).

$$S_{proc} = S_{org} + D\{S_{org} - F_{drc}(S_{org}, S_{us}1, S_{us}2, \ldots S_{us}n)\} \quad (3)$$

$$F_{drc}(S_{org}, S_{us}1, S_{us}2, \ldots S_{us}n) = \{f_{d1}(S_{org} - S_{us}1) + f_{d2}(S_{us}1 - S_{us}2) + \ldots$$

$$+ f_{dk}(S_{us}k - 1 - S_{us}k) + \ldots + f_{dn}(S_{us}n - 1 - S_{us}n)$$

wherein $S_{proc}$ is a processed image signal, $S_{org}$ is an original image signal, $S_{us}k$ (k=1 to n) is an unsharp image signal, $f_{dk}$(k=1 to n) is a transformation function for obtaining the low frequency component signal, and $D\{S_{org}-F_{drc}(S_{org}, S_{us}1, S_{us}2, \ldots S_{us}n)\}$ is a coefficient of dynamic range compression determined on the basis of the low frequency component signal, D being a function for transforming $D\{S_{org}-F_{drc}(S_{org}, S_{us}1, S_{us}2, \ldots S_{us}n)\}$.

Further, in Japanese Unexamined Patent Publication No. 10(1998)-171983, there is disclosed a method of preventing generation of an artifact in the processed signal when both the frequency enhancement processing and the dynamic range compression processing are to be carried out. In this method, as disclosed in Japanese Unexamined Patent Publication No. 10(1998)-75395, a plurality of band-limited signals are made in the manner described above, a high frequency component signal representing a high frequency component of the original image signal and a low frequency component signal representing a low frequency component of the original image signal are obtained on the basis of the band-limited signals, and the frequency enhancement processing and the dynamic range compression processing are carried out by adding the high frequency component signal and the low frequency component signal to the original image signal. This is represented, for instance, by the following formula (4).

adjusted by changing the definition of the transformation functions and the like for transforming the band-limited signals. Accordingly, a processed image signal having a desired frequency response characteristic, e.g., suitable for preventing generation of an artifact, can be obtained by properly defining the transformation functions.

The unsharp image signals used in the aforesaid transformation processing are made by filtering the original image signal to obtain an image signal with less picture elements, further filtering the image signal with less picture elements, repeating these steps a desired times and interpolating picture elements into the image signal with less picture elements obtained at each filtering stage so that the number of the picture elements in the image signal becomes equal to that in the original image signal. Accordingly, each of the unsharp image signals is an image signal which is the same as the original image signal in the number of picture elements but lower than the original image signal in sharpness.

The band-limited image signals are made, for instance, by taking differences between unsharp image signals in adjacent frequency bands, or differences between the original image signal and the respective unsharp image signals. Accordingly, the band-limited image signals are the same as the original image signal in number of the picture elements and represent the frequency response characteristics of the original image signal for the corresponding frequency bands.

In a radiation image, quantum noise is more conspicuous at a portion which is exposed to less radiation and is low in $$S_{proc} = S_{org} + \beta(S_{org}) \cdot F_{usm}(S_{org}, S_{us}1, S_{us}2, \ldots S_{us}n) + \quad (4)$$

$$D\{S_{org} - F_{drc}(S_{org}, S_{us}1, S_{us}2, \ldots S_{us}n)\}$$

$$F_{usm}(S_{org}, S_{us}1, S_{us}2, \ldots S_{us}n) = \{f_{u1}(S_{org} - S_{us}1) + f_{u2}(S_{us}1 - S_{us}2) + \ldots$$

$$+ f_{uk}(S_{us}k - 1 - S_{us}k) + \ldots + f_{un}(S_{us}N - 1 - S_{us}N)$$

$$F_{drc}(S_{org}, S_{us}1, S_{us}2, \ldots S_{us}n) = \{f_{d1}(S_{org} - S_{us}1) + f_{d2}(S_{us}1 - S_{us}2) + \ldots$$

$$+ f_{dk}(S_{us}k - 1 - S_{us}k) + \ldots + f_{dn}(S_{us}n - 1 - S_{us}n)$$

wherein $S_{proc}$ is a processed image signal, $S_{org}$ is an original image signal, $S_{us}k$ (k=1 to n) is an unsharp image signal, $f_{uk}$(k=1 to n) is a transformation function for obtaining the high frequency component signal, $f_{dk}$(k=1 to n) is a transformation function for obtaining the low frequency component signal, $\beta(S_{org})$ is a coefficient of enhancement determined on the basis of the original image signal, and $D\{S_{org}-F_{drc}(S_{org}, S_{us}1, S_{us}2, \ldots S_{us}n)\}$ is a coefficient of dynamic range compression determined on the basis of the low frequency component signal, D being a function for transforming $D\{S_{org}-F_{drc}(S_{org}, S_{us}1, S_{us}2, \ldots S_{us}n)\}$.

In the frequency enhancement processing and the dynamic range compression processing (will be representatively referred to "as the transformation processing", hereinbelow), the frequency response characteristic of the add signal to be added to the original image signal can be density. In the aforesaid Japanese Unexamined Patent Publication No. 6(1994)-96200, there is disclosed a method in which band-limited image signals in a plurality of frequency bands are obtained by decomposing a radiation image into images in a plurality of frequency bands by Laplacian pyramid, the local dispersions of the band-limited image signals are calculated, a noise removing processing is carried out on each of the band-limited image signals according to its value of the local dispersion, and a processed image signal suppressed with noise according to the frequency band is obtained by reconstructing an image from the noise-removed band-limited image signals and an unsharp image signal representing an unsharp image in the lowest frequency band.

In the method disclosed in the aforesaid Japanese Unexamined Patent Publication No. 5(1993)-244508, since a processed image signal is obtained by transforming the band-limited image signals by use of non-linear functions and reconstructing an image signal from the transformed band-limited image signals, the band-limited image signals must be retransformed and an image signal must be reconstructed from the retransformed band-limited image signals when the degree of transformation is to be corrected. Accordingly, it takes a long time to correct the degree of transformation. When an optimal image processing is set by variously changing the contents of the image processing while monitoring the result of change of the contents on a CRT, the operator is put under a heavy stress.

In the method disclosed in the aforesaid Japanese Unexamined Patent Publication No. 6(1994)-96200, since the processing of removing noise components is carried out on the band-limited image signals in the respective frequency bands, when removal of noise is excessive or insufficient, it is necessary to carry out the processing of removing noise components on the respective band-limited image signals with the changed degree of removing noise and then to reconstruct an image, and accordingly, it takes a long time to correct the degree of removing noise. When an optimal degree of removing noise is set by variously changing the degree of removing noise while monitoring the result of change on a CRT, the operator is put under a heavy stress.

SUMMARY OF THE INVENTION

In view of the foregoing observations and description, the primary object of the present invention is to provide a method of and a system for image processing which can carry out a desired image processing such as a processing for enhancing a particular frequency component using the aforesaid band-limited image signals at a high speed.

Another object of the present invention is to provide a method of and a system for image processing which can properly remove noise from an original image.

Still another object of the present invention is to provide a computer-readable recording medium loaded with program for causing a computer to perform the image processing method in accordance with the method of the present invention.

In accordance with a first aspect of the present invention, there is provided an image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining a signal representing information on a high frequency component of the original image signal from the band-limited image signals on the basis of a predetermined transformation function, and carrying out said image processing on the original image signal on the basis of the signal representing information on a high frequency component of the original image signal.

The "image processing" includes, for instance, a frequency enhancement processing for enhancing a particular frequency component of the original image signal and a dynamic range compression processing for reducing the contrast of the high density range and/or the low density range, thereby narrowing the dynamic range which is the difference between the maximum density and the minimum density of the original image. Further the image processing may comprise both a frequency enhancement processing and a dynamic range compression processing. It is preferred that the "predetermined transformation function" be a function selected according to the contents of the image processing.

It is preferred that each of the images represented by the band-limited image signals has picture elements in a number according to the corresponding frequency band.

It is preferred that the signal representing information on a high frequency component of the original image signal has the same number of picture elements as the original image signal. In other words, it is preferred that the image represented by the signal representing information on a high frequency component of the original image signal be the same as the original image in size.

For example, the band-limited image signals may be obtained by carrying out multi-resolution transformation on the original image signal (transforming the original image signal to multiple resolution image signals), and the signal representing information on a high frequency component of the original image signal may be obtained by obtaining transformed band-limited image signals by transforming the band-limited image signals by use of a predetermined transformation function and carrying out inverse multi-resolution transformation on the transformed band-limited image signals. The inverse multi-resolution transformation is a transformation which corresponds to the multi-resolution transformation and is for reconstructing (reversibly or irreversibly) the original signal from the transformed band-limited image signals.

When the band-limited image signals are obtained by carrying out multi-resolution transformation on the original image signal, Laplacian pyramid decomposition may be employed or a method in which the original image signal is transformed to a plurality of image signals representing the frequency response characteristics of the respective frequency bands by wavelet transformation may be employed. When the band-limited image signals are obtained by the Laplacian pyramid decomposition, Laplacian pyramid reconstruction may be employed as the inverse multi-resolution transformation, and when the band-limited image signals are obtained by the wavelet transformation, inverse wavelet transformation may be employed as the inverse multi-resolution transformation.

When the original image signal is transformed to multiple resolution image signals by the Laplacian pyramid decomposition or the wavelet transformation, the image signal in the lowest frequency band represents low frequency information obtained by contracting the original image and is not a band-limited image signal representing the frequency response characteristic. Accordingly, it is preferred that the image signal in the lowest frequency band be not used in the processing or used as 0.

It is preferred that the predetermined transformation function be a nonlinear function.

In accordance with a second aspect of the present invention, there is provided an image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a high frequency component obtaining means which obtains a signal representing information on a high frequency component of the original image signal from the band-limited image signals on the basis of a predetermined transformation function, and an image processing means which carries out said image processing on the original image signal on the basis of the signal representing information on a high frequency component of the original image signal.

The signal representing information on a high frequency component of the original image signal will be referred to as "the high frequency component signal", hereinbelow.

It is preferred that the band-limited image signal making means makes the band-limited image signals so that each of the images represented by the band-limited image signals has picture elements in a number according to the corresponding frequency band.

It is preferred that the high frequency component obtaining means obtains a high frequency component signal which has the same number of picture elements as the original image signal.

Further, it is preferred that the band-limited image signal making means makes band-limited image signals by carrying out multi-resolution transformation on the original image signal, and the high frequency component obtaining means obtains a high frequency component signal by obtaining transformed band-limited image signals by transforming the band-limited image signals by use of a predetermined transformation function and carrying out inverse multi-resolution transformation on the transformed band-limited image signals.

In this case, the multi-resolution transformation may comprise Laplacian pyramid decomposition or a wavelet transformation.

It is preferred that the high frequency component obtaining means obtains the high frequency component signal from the band-limited image signals other than that in the lowest frequency band.

It is preferred that the predetermined transformation function be a nonlinear function.

It is preferred that the image processing comprises a frequency enhancement processing and/or a dynamic range compression processing.

In accordance with a third aspect of the present invention, there is provided a computer-readable recording medium loaded with program for causing a computer to perform the image processing method in accordance with the first aspect of the present invention.

In accordance with the first to third aspects of the present invention, the degree of image processing on the original image signal can be freely changed by only changing the level of the high frequency component signal, and accordingly, the degree of image processing can be easily changed in a shorter time as compared with the method disclosed in Japanese Unexamined Patent Publication No. 5(1993)-244508 where the degree of image processing is changed by correcting the nonlinear functions, whereby the time required to obtain a processed image signal changed with the degree of image processing is shortened and stress on the operator can be lightened.

When each of the images represented by the band-limited image signals has picture elements in a number according to the corresponding frequency band, the amount of operation for transformation processing can be reduced and the time required to obtain a processed image signal is further shortened.

Further, when the high frequency component signal (the signal representing information on a high frequency component of the original image signal) has the same number of picture elements as the original image signal, the image processing can be carried out on the original image signal without changing the size of the high frequency component signal, and accordingly the image processing can be carried out more efficiently.

In accordance with a fourth aspect of the present invention, there is provided an image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining noiseless band-limited image signals by removing a noise component from the band-limited image signals, obtaining a signal representing information on a high frequency component of the original image signal from the noiseless band-limited image signals on the basis of a predetermined transformation function, and carrying out said image processing on the original image signal on the basis of the signal representing information on a high frequency component of the original image signal.

The "image processing" includes, for instance, a frequency enhancement processing for enhancing a particular frequency component of the original image signal and a dynamic range compression processing for reducing the contrast of the high density range and/or the low density range, thereby narrowing the dynamic range which is the difference between the maximum density and the minimum density of the original image. Further the image processing may comprise both a frequency enhancement processing and a dynamic range compression processing. It is preferred that the "predetermined transformation function" be a function selected according to the contents of the image processing.

The expression "removing a noise component from the band-limited image signals" means to reduce the noise component included in the band-limited image signals, and "removing a noise component from the band-limited image signals" may be performed by, for instance, subtracting from each of the band-limited image signals its noise component or its noise component multiplied by a coefficient representing a desired noise suppression level. The coefficient may be changed depending on the value of the band-limited image signal.

It is preferred that each of the images represented by the band-limited image signals has picture elements in a number according to the corresponding frequency band.

It is preferred that the signal representing information on a high frequency component of the original image signal has the same number of picture elements as the original image signal.

That the signal representing information on a high frequency component of the original image signal has the same number of picture elements as the original image signal means that the image represented by the signal representing information on a high frequency component of the original image signal is the same as the original image in size.

For example, the band-limited image signals may be obtained by carrying out multi-resolution transformation on the original image signal (transforming the original image signal to multiple resolution image signals), and the signal representing information on a high frequency component of the original image signal may be obtained by obtaining transformed noiseless band-limited image signals by transforming the noiseless band-limited image signals by use of a predetermined transformation function and carrying out inverse multi-resolution transformation on the transformed noiseless band-limited image signals. The inverse multi-resolution transformation is a transformation which corresponds to the multi-resolution transformation and is for reconstructing (reversibly or irreversibly) the original signal from the transformed noiseless band-limited image signals.

When the band-limited image signals are obtained by carrying out multi-resolution transformation on the original image signal, Laplacian pyramid decomposition may be employed or a method in which the original image signal is transformed to a plurality of image signals representing the frequency response characteristics of the respective frequency bands by wavelet transformation may be employed. When the band-limited image signals are obtained by the Laplacian pyramid decomposition, Laplacian pyramid reconstruction may be employed as the inverse multi-resolution transformation, and when the band-limited image signals are obtained by the wavelet transformation, inverse wavelet transformation may be employed as the inverse multi-resolution transformation.

When the original image signal is transformed to multiple resolution image signals by the Laplacian pyramid decomposition or the wavelet transformation, the image signal in the lowest frequency band represents low frequency information obtained by contracting the original image and is not a band-limited image signal representing the frequency response characteristic. Accordingly, it is preferred that the image signal in the lowest frequency band be not used in the processing or used as 0.

It is preferred that the predetermined transformation function be a nonlinear function.

Further it is preferred that the noise component be removed from the band-limited image signals by filtering processing by an iris filter.

In accordance with a fifth aspect of the present invention, there is provided an image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a noiseless band-limited image signal obtaining means which obtains noiseless band-limited image signals by removing a noise component from the band-limited image signals, a high frequency component obtaining means which obtains a signal representing information on a high frequency component of the original image signal from the noiseless band-limited image signals on the basis of a predetermined transformation function, and an image processing means which carries out said image processing on the original image signal on the basis of the signal representing information on a high frequency component of the original image signal.

The signal representing information on a high frequency component of the original image signal will be referred to as "the high frequency component signal", hereinbelow.

It is preferred that the band-limited image signal making means makes the band-limited image signals so that each of the images represented by the band-limited image signals has picture elements in a number according to the corresponding frequency band.

It is preferred that the high frequency component obtaining means obtains a high frequency component signal which has the same number of picture elements as the original image signal.

Further, it is preferred that the band-limited image signal making means makes band-limited image signals by carrying out multi-resolution transformation on the original image signal, and the high frequency component obtaining means obtains a high frequency component signal by obtaining transformed noiseless band-limited image signals by transforming the noiseless band-limited image signals by use of a predetermined transformation function and carrying out inverse multi-resolution transformation on the transformed noiseless band-limited image signals.

In this case, the multi-resolution transformation may comprise Laplacian pyramid decomposition or a wavelet transformation.

It is preferred that the high frequency component obtaining means obtains the high frequency component signal from the noiseless band-limited image signals obtained from the band-limited image signals other than that in the lowest frequency band.

It is preferred that the predetermined transformation function be a nonlinear function.

It is preferred that the image processing comprises a frequency enhancement processing and/or a dynamic range compression processing.

Further it is preferred that the noiseless band-limited image signal obtaining means removes the noise component from the band-limited image signals by filtering processing by an iris filter.

In accordance with a sixth aspect of the present invention, there is provided a computer-readable recording medium loaded with program for causing a computer to perform the image processing method in accordance with the fourth aspect of the present invention.

In accordance with the fourth to sixth aspects of the present invention, the degree of image processing on the original image signal can be freely changed by only changing the level of the high frequency component signal, and accordingly, the degree of image processing can be easily changed in a shorter time as compared with the method disclosed in Japanese Unexamined Patent Publication No. 5(1993)-244508 where the degree of image processing is changed by correcting the nonlinear functions, whereby the time required to obtain a processed image signal changed with the degree of image processing is shortened and stress on the operator can be lightened. Further since the noise component of the band-limited image signals is removed, the processed image signal is free from noise.

When each of the images represented by the band-limited image signals has picture elements in a number according to the corresponding frequency band, the amount of operation for transformation processing can be reduced and the time required to obtain a processed image signal is further shortened.

Further, when the high frequency component signal (the signal representing information on a high frequency component of the original image signal) has the same number of picture elements as the original image signal, the image processing can be carried out on the original image signal without changing the size of the high frequency component signal, and accordingly the image processing can be carried out more efficiently.

In accordance with a seventh aspect of the present invention, there is provided an image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining a noise signal having the same number of picture element as the original image on the basis of the band-limited image signals, obtaining a signal representing information on a high frequency component of the original image signal from the band-limited image signals on the basis of a predetermined transformation function, and removing a noise component from and carrying out the image processing on the original image signal on the basis of the noise signal and the signal representing information on a high frequency component of the original image signal.

That the noise signal has the same number of picture elements as the original image signal means that the image represented by the noise signal is the same in size as the image represented by the original image signal.

The expression "removing a noise component from the original image signal on the basis of the noise signal" means to reduce the noise component included in a reproduced image, and "removing a noise component from the original image signal on the basis of the noise signal" may be performed by, for instance, subtracting from the original image signal its noise component or its noise component multiplied by a coefficient representing a desired noise suppression level. The coefficient may be changed depending on the value of the original image signal.

The "image processing" includes, for instance, a frequency enhancement processing for enhancing a particular frequency component of the original image signal and a dynamic range compression processing for reducing the contrast of the high density range and/or the low density range, thereby narrowing the dynamic range which is the difference between the maximum density and the minimum density of the original image. Further the image processing may comprise both a frequency enhancement processing and a dynamic range compression processing. It is preferred that the "predetermined transformation function" be a function selected according to the contents of the image processing.

It is preferred that each of the images represented by the band-limited image signals has picture elements in a number according to the corresponding frequency band.

It is preferred that the signal representing information on a high frequency component of the original image signal has the same number of picture elements as the original image signal.

That the signal representing information on a high frequency component of the original image signal has the same number of picture elements as the original image signal means that the image represented by the signal representing information on a high frequency component of the original image signal is the same as the original image in size.

For example, the band-limited image signals may be obtained by carrying out multi-resolution transformation on the original image signal, and the noise signal may be obtained by separating noise components from the band-limited image signals to obtain noise band-limited image signals and carrying out inverse multi-resolution transformation on the noise band-limited image signals.

In this case, the signal representing information on a high frequency component of the original image signal may be obtained by obtaining transformed band-limited image signals by transforming the band-limited image signals by use of said predetermined transformation function and carrying out inverse multi-resolution transformation on the transformed band-limited image signals.

Otherwise the signal representing information on a high frequency component of the original image signal may be obtained by obtaining transformed noise band-limited image signals by transforming the noise band-limited image signals by use of the predetermined transformation function, obtaining a transformed noise signal by carrying out inverse multi-resolution transformation on the transformed noise band-limited image signals, obtaining transformed band-limited image signals by transforming the band-limited image signals by use of the predetermined transformation function, obtaining a transformed image signal by carrying out inverse multi-resolution transformation on the transformed band-limited image signals, and subtracting the transformed noise signal from the transformed image signal.

Further, the signal representing information on a high frequency component of the original image signal may be obtained by obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signals.

The inverse multi-resolution transformation is a transformation which corresponds to the multi-resolution transformation and is for reconstructing (reversibly or irreversibly) the original signal from the transformed noiseless band-limited image signals.

When the band-limited image signals are obtained by carrying out multi-resolution transformation on the original image signal, Laplacian pyramid decomposition may be employed or a method in which the original image signal is transformed to a plurality of image signals representing the frequency response characteristics of the respective frequency bands by wavelet transformation may be employed. When the band-limited image signals are obtained by the Laplacian pyramid decomposition, Laplacian pyramid reconstruction may be employed as the inverse multi-resolution transformation, and when the band-limited image signals are obtained by the wavelet transformation, inverse wavelet transformation may be employed as the inverse multi-resolution transformation.

The "noise band-limited image signals" are signals representing only the noise components included in the band-limited image signals.

When the original image signal is transformed to multiple resolution image signals by the Laplacian pyramid decomposition or the wavelet transformation, the image signal in the lowest frequency band represents low frequency information obtained by contracting the original image and is not a band-limited image signal representing the frequency response characteristic. Accordingly, it is preferred that the image signal in the lowest frequency band be not used in the processing or used as 0.

It is preferred that the predetermined transformation function be a nonlinear function.

Further it is preferred that the noise signal be obtained by a filtering processing by an iris filter.

In accordance with an eighth aspect of the present invention, there is provided an image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a noise signal obtaining means which obtains a noise signal having the same number of picture element as the original image on the basis of the band-limited image signals, a high frequency component obtaining means which obtains a signal representing information on a high frequency component of the original image signal from the band-limited image signals on the basis of a predetermined transformation function, and an image processing means which removes a noise component from and carries out said image processing on the original image signal on the basis of the noise signal and the signal representing information on a high frequency component of the original image signal.

The signal representing information on a high frequency component of the original image signal will be referred to as "the high frequency component signal", hereinbelow.

It is preferred that the band-limited image signal making aro means makes the band-limited image signals so that each of the images represented by the band-limited image signals has picture elements in a number according to the corresponding frequency band.

It is preferred that the high frequency component obtaining means obtains a high frequency component signal which has the same number of picture elements as the original image signal.

Further, it is preferred that the band-limited image signal making means makes band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, and the high frequency component obtaining means obtains the signal representing information on a high frequency component of the original image signal by obtaining transformed band-limited image signals by transforming the band-limited image signals by use of said predetermined transformation function and carrying out inverse multi-resolution transformation on the transformed band-limited image signals.

Further, it is preferred that the band-limited image signal making means makes band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, and the high frequency component obtaining means obtains the signal representing information on a high frequency component of the original image signal by obtaining transformed noise band-limited image signals by transforming the noise band-limited image signals by use of the predetermined transformation function, obtaining a transformed noise signal by carrying out inverse multi-resolution transformation on the transformed noise band-limited image signals, obtaining transformed band-limited image signals by transforming the band-limited image signals by use of the predetermined transformation function, obtaining a transformed image signal by carrying out inverse multi-resolution transformation on the transformed band-limited image signals, and subtracting the transformed noise signal from the transformed image signal.

Further, it is preferred that the band-limited image signal making means makes band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, and the high frequency component obtaining means obtains the signal representing information on a high frequency component of the original image signal by obtaining noiseless band-limited image signals by removing noise components from the band-limited image signals, obtaining transformed noiseless band-limited image signals by transforming the noiseless band-limited image signals by use of the predetermined transformation function, and carrying out inverse multi-resolution transformation on the transformed noiseless band-limited image signal.

It is preferred that the noise signal obtaining means and the high frequency component obtaining means obtain the noise signal and the high frequency component signal from the band-limited image signals other than that in the lowest frequency band.

It is preferred that the predetermined transformation function be a nonlinear function.

It is preferred that the image processing comprises a frequency enhancement processing and/or a dynamic range compression processing.

Further it is preferred that the noise signal obtaining means obtains the noise signal on the basis of a filtering processing by an iris filter.

In accordance with a ninth aspect of the present invention, there is provided a computer-readable recording medium loaded with program for causing a computer to perform the image processing method in accordance with the seventh aspect of the present invention.

In accordance also with the seventh to ninth aspects of the present invention, the degree of image processing on the original image signal can be freely changed by only changing the level of the high frequency component signal, and accordingly, the degree of image processing can be easily changed in a shorter time as compared with the method disclosed in Japanese Unexamined Patent Publication No. 5(1993)-244508 where the degree of image processing is changed by correcting the nonlinear functions. Further the noise components of the band-limited image signals according to their frequency bands can be removed. By storing the original image signal and the noise signal and removing the noise component of the original image signal, when the set value of a parameter representing the degree of removing the noise component is changed, on the basis of the stored original signal and noise signal and the changed value of the parameter, the degree of removing the noise signal from the original image signal can be freely changed by only changing the parameter and the level of the noise signal. Accordingly, the degree of image processing and the degree of removing the noise component can be easily changed in a shorter time as compared with the method disclosed in Japanese Unexamined Patent Publication No. 6(1994)-96200, whereby the time required to obtain a processed image signal changed with the degree of image processing and the degree of removing the noise component is shortened and stress on the operator can be lightened.

When each of the images represented by the band-limited image signals has picture elements in a number according to the corresponding frequency band, the amount of operation for the processing can be reduced and the time required to obtain a processed image signal is further shortened.

Further, when the high frequency component signal has the same number of picture elements as the original image signal, the image processing can be carried out on the original image signal without changing the size of the high frequency component signal, and accordingly the image processing can be carried out more efficiently.

In accordance with a tenth aspect of the present invention, there is provided an image processing method for obtaining a processed image signal from an original image signal representing an original image by carrying out a noise removing processing on the original image signal, the method comprising the steps of making at least one band-limited image signal from the original image signal, obtaining a noise signal having the same number of picture element as the original image on the basis of the band-limited image signal, and removing a noise component from the original image signal on the basis of the noise signal.

That the noise signal has the same number of picture elements as the original image signal means that the image represented by the noise signal is the same in size as the image represented by the original image signal.

The expression "removing a noise component from the original image signal on the basis of the noise signal" means to reduce the noise component included in a reproduced image and "removing a noise component from the original image signal on the basis of the noise signal" may be performed by, for instance, subtracting from the original image signal its noise component or its noise component multiplied by a coefficient representing a desired noise suppression level. The coefficient may be changed depending on the value of the original image signal.

For example, the band-limited image signals may be obtained by carrying out multi-resolution transformation on the original image signal, and the noise signal may be obtained by separating noise components from the band-limited image signals to obtain noise band-limited image signals and carrying out inverse multi-resolution transformation on the noise band-limited image signals. The inverse multi-resolution transformation is a transformation which corresponds to the multi-resolution transformation and is for reconstructing (reversibly or irreversibly) the original signal from the transformed band-limited image signals.

When the band-limited image signals are obtained by carrying out multi-resolution transformation on the original image signal, Laplacian pyramid decomposition may be employed or a method in which the original image signal is transformed to a plurality of image signals representing the frequency response characteristics of the respective frequency bands by wavelet transformation may be employed. When the band-limited image signals are obtained by the Laplacian pyramid decomposition, Laplacian pyramid reconstruction may be employed as the inverse multi-resolution transformation, and when the band-limited image signals are obtained by the wavelet transformation, inverse wavelet transformation may be employed as the inverse multi-resolution transformation.

The "noise band-limited image signals" are signals representing only the noise components included in the band-limited image signals.

It is preferred that the noise signal be obtained by a filtering processing by an iris filter.

Further the noise signal may be obtained on the basis of picture element vectors calculated for picture elements of the image represented by the band-limited image signal.

The picture element vector represents the inclination and the direction of inclination of the value of an object picture element (a picture element of the image represented by a band-limited image signal). For example, the differences between the value of the object picture element and picture elements near the object picture element in a plurality of directions (when a plurality of picture elements are taken in one direction, the difference between the value of the object picture element and the average of the values of the picture elements near the object picture element) are calculated and the direction in which the difference is maximized or minimized is determined. Then the picture element vector is calculated on the basis of the direction in which the difference is maximized or minimized and the value of the difference.

When the picture element vector is calculated on the basis of the direction in which the difference is maximized, the picture element vector represents the direction of signal gradient, and when the picture element vector is calculated on the basis of the direction in which the difference is minimized, the picture element vector represents the direction of equi-signal line. When the picture element vector is obtained in the direction of signal gradient and the length of the vector represents the difference in value between the object picture element and a picture element near the object picture element, the probability that the picture element is on an edge portion is higher as the length of the vector increases and the probability that the picture element is on a flat portion is higher as the length of the vector decreases. When the picture element vector is obtained in the direction of signal gradient and the length of the vector represents the reciprocal of the difference in value between the object picture element and a picture element near the object picture element, the probability that the picture element is on an edge portion is higher as the length of the vector decreases and the probability that the picture element is on a flat portion is higher as the length of the vector increases.

When the picture element vector is obtained in the direction of equi-signal line and the length of the vector represents the difference in value between the object picture element and a picture element near the object picture element, the probability that the picture element is on an edge portion is higher as the length of the vector decreases and the probability that the picture element is on a flat portion is higher as the length of the vector increases. When the picture element vector is obtained in the direction of equi-signal line and the length of the vector represents the reciprocal of the difference in value between the object picture element and a picture element near the object picture element, the probability that the picture element is on an edge portion is higher as the length of the vector increases and the probability that the picture element is on a flat portion is higher as the length of the vector decreases.

As the direction of the picture element vector, the direction in which the difference is maximum and the direction in which the difference is second maximum may be both obtained. In this case, the picture element vector comprises the two vectors.

When the picture element vector is obtained in the direction of the equi-signal line for a certain object picture element and the length of the vector represents the reciprocal of the difference, the probability that the picture element is on an edge portion is higher as the length of the vector increases and the probability that the picture element is on a flat (in density) portion is higher as the length of the vector decreases as described. In this case, the picture element may be considered to be noise on the flat portion.

By determining whether the picture element is on a flat portion or on an edge portion on the basis of the direction and/or the length of the picture element vector, the noise signal may be obtained from the band-limited image signals (the noise component of the band-limited image signals may be separated from the band-limited image signals) on the basis of the result of the determination.

For example, by separating the noise component and the edge component of the band-limited image signal from each other on the basis of the lengths of the picture element vectors, carrying out a noise smoothing processing and/or an edge enhancing processing on the band-limited image signal, a processed band-limited image signal may be obtained and the noise signal included in the band-limited image signal before the noise smoothing processing may be obtained by the use of the processed band-limited image signal. The noise smoothing processing is a processing in which the values of the picture elements of the noise component are reduced and the edge enhancing processing is a processing in which the values of the picture elements of the edge component are increased.

When the noise signal is obtained on the basis of the picture element vector, it is preferred that the picture element vectors of picture elements near each object picture element (surrounding picture element vectors) be calculated and the noise signal be obtained on the basis of also the surrounding picture element vectors.

It is preferred that a picture element vector calculated for a given picture element of an image represented by a band-limited image signal in a given frequency band be corrected on the basis of the picture element vector of the corresponding picture element (the picture element corresponding to the given picture element) of an image represented by a band-limited image signal in a frequency band lower than the given frequency band, and said noise signal be obtained on the basis of the corrected picture element vector.

For example, the picture element vector calculated for the given picture element may be corrected so that the direction of the picture element vector of the given picture element conforms to that of the corresponding picture element of the image represented by the lower frequency band-limited image signal.

It is further preferred that whether a picture element vector calculated for a given picture element of an image represented by a band-limited image signal in a given frequency band is to be corrected be determined on the basis of dispersion of the band-limited image signal in a predetermined region including the given picture element, and when it is determined that the picture element vector calculated for the given picture element is to be corrected, the picture element vector be corrected on the basis of the picture element vector of the corresponding picture element (the picture element corresponding to the given picture element) of an image represented by a band-limited image signal in a frequency band lower than the given frequency band, and said noise signal be obtained on the basis of the corrected picture element vector.

In place of the dispersion, the difference between the value of the given picture element and picture elements near the given picture element which is used in calculating the picture element vector for the given picture element may be employed. The difference may be the sum of the differences between the given picture element and a plurality of picture elements near the given picture element or the average of the differences.

For example, when the dispersion of the band-limited image signal in the predetermined region is smaller than the dispersion in other regions, the predetermined region may be considered to be a flat portion and accordingly the picture element vector for the given picture element need not be corrected and otherwise the picture element vector should be corrected.

When the picture element vector for a given picture element is determined to be corrected, the picture element vectors for a plurality of picture elements around the given picture element may be corrected.

Further, it is possible to obtain the noise signal on the basis of a smoothed band-limited image signal obtained by smoothing the band-limited image signal on the basis of the picture element vectors.

In this case, it is preferred that the smoothed band-limited image signal be obtained by smoothing the band-limited image signal on the basis of the picture element vectors corrected in the manner described above.

The expression "smoothing the band-limited image signal on the basis of the picture element vectors" means to smooth the band-limited image signal on the basis of the picture element vectors (especially on the basis of the directions of the picture element vectors) so that the noise contained in the edge component is suppressed with the edge component reserved. For example, when the picture element vector is in the direction of the equi-signal line, the band-limited image signal may be smoothed by the use of picture elements which are in the direction of the picture element vector from the object picture element for the picture element vector and picture elements which are in the direction opposite to the direction of the picture element vector from the object picture element. The smoothing may be effected by obtaining the average of the values of picture elements which are in the direction of the picture element vector from the object picture element for the picture element vector, or by smoothing the band-limited image signal by the use of a smoothing filter.

The noise signal may be obtained on the basis of the smoothed band-limited image signal in any manner provided that the noise component of the band-limited image signal can be separated from the band-limited image signal and the noise signal can be obtained. For example, a noise signal (a noise band-limited image signal) may be obtained by subtracting smoothed band-limited image signal from the band-limited image signal. Further a noise signal may be obtained by separating the noise component and the edge component of the smoothed band-limited image signal from each other on the basis of the lengths of the picture element vectors, carrying out a noise smoothing processing and/or an edge enhancing processing on the smoothed band-limited image signal to obtain a processed band-limited image signal, and obtaining the noise signal contained in the band-limited image signal before the noise smoothing processing by the use of the processed band-limited image signal. The noise smoothing processing is a processing in which the values of the picture elements of the noise component are reduced and the edge enhancing processing is a processing in which the values of the picture elements of the edge component are increased.

It is preferred that the original image signal and the noise signal be stored and the noise component of the original image signal be removed, when the set value of a parameter representing the degree of removing the noise component is changed, on the basis of the stored original signal and noise signal and the changed value of the parameter.

In accordance with an eleventh aspect of the present invention, there is provided an image processing system for obtaining a processed image signal from an original image signal representing an original image by carrying out a noise removing processing on the original image signal, the system comprising, a band-limited image signal making means which makes at least one band-limited image signal from the original image signal, a noise signal obtaining means which obtains a noise signal having the same number of picture element as the original image on the basis of the band-limited image signal, and a noise removing means which removes a noise component from the original image signal on the basis of the noise signal.

For example, the band-limited image signal making means may make the band-limited image signal by carrying out multi-resolution transformation on the original image signal, and the noise signal obtaining means may obtain the noise signal by separating the noise component from the band-limited image signal to obtain noise band-limited image signal and carrying out inverse multi-resolution transformation on the noise band-limited image.

The multi-resolution transformation may comprise, for instance, Laplacian pyramid decomposition or a wavelet transformation.

It is preferred that the noise signal obtaining means obtains the noise signal by a filtering processing by an iris filter.

Further it is preferred that the noise signal making means comprises a picture element vector obtaining means which calculates picture element vectors for picture elements of the image represented by the band-limited image signal and obtains the noise signal on the basis of the picture element vectors.

When the noise signal is obtained on the basis of the picture element vector, it is preferred that the noise signal obtaining means calculates the picture element vectors of picture elements near each picture element and obtains the noise signal on the basis of also the picture element vectors of picture elements near the object picture element.

Further, when the noise signal is obtained on the basis of the picture element vector, it is preferred that the noise signal obtaining means be provided with a correcting means which corrects a picture element vector calculated for a given picture element of an image represented by a band-limited image signal in a given frequency band on the basis of the picture element vector of the corresponding picture element of an image represented by a band-limited image signal in a frequency band lower than the given frequency band, and obtains the noise signal on the basis of the corrected picture element vector.

Further, when the noise signal is obtained on the basis of the picture element vector, it is preferred that the noise signal obtaining means be further provided with a dispersion calculating means which calculates dispersion of the band-limited image signal in a predetermined region including a given picture element of an image represented by a band-limited image signal in a given frequency band, a determining means which determines whether a picture element vector calculated for the given picture element is to be corrected on the basis of the dispersion, and a correcting means which, when it is determined that the picture element vector calculated for the given picture element is to be corrected, corrects the picture element vector on the basis of the picture element vector of the corresponding picture element of an image represented by a band-limited image signal in a frequency band lower than the given frequency band, and obtains the noise signal on the basis of the corrected picture element vector.

Further, when the noise signal is obtained on the basis of the picture element vector, the noise signal obtaining means may further comprise a smoothing means which smoothes the band-limited image signal on the basis of the picture element vectors to obtain a smoothed band-limited image signal and may obtain the noise signal on the basis of the smoothed band-limited image signal.

In this case, it is preferred that the smoothing means obtains the smoothed band-limited image signal on the basis of the picture element vectors corrected in the manner described above.

It is preferred that the image processing system further comprises a first memory means which stores the original image signal, a second memory means which stores the noise signal obtained by the noise signal obtaining means, and a parameter setting means which sets the value of a parameter representing the degree of removing the noise component to the noise removing means, and the noise removing means reads out the original image signal and the noise signal from the first and second memory means and removes the noise component of the original image signal, when the set value of the parameter representing the degree of removing the noise component is changed, on the basis of the stored original signal and noise signal and the changed value of the parameter.

In accordance with a twelfth aspect of the present invention, there is provided a computer-readable recording medium loaded with program for causing a computer to perform the image processing method in accordance with the tenth aspect of the present invention.

In accordance with the tenth to twelfth aspects of the present invention, the noise components of the band-limited image signals can be removed according to their frequency bands.

By storing the original image signal and the noise signal and removing the noise component of the original image signal, when the set value of a parameter representing the degree of removing the noise component is changed,on the basis of the stored original signal and noise signal and the changed value of the parameter, the degree of removing the noise signal from the original image signal can be freely changed by only changing the parameter and the level of the noise signal. Accordingly, the degree of removing the noise component can be easily changed in a shorter time as compared with the method disclosed in Japanese Unexamined Patent Publication No. 6(1994)-96200, whereby the time required to obtain a processed image signal changed with the degree of removing the noise component is shortened and stress on the operator can be lightened.

The band-limited image signal may be made in various ways. For example, the band-limited image signal may be of the same size as the original image signal. In this case, the noise signal may be obtained by smoothing the original image with different sizes of masks to obtain a plurality of band-limited image signals of the same size as the original image signal and adding up noise band-limited image signals separated from the respective band-limited image signals. Of course, the band-limited image signal may be obtained by said multi-resolution transformation as described above.

Further, the noise signal may be obtained in various ways. For example, the noise signal may be obtained by calculating the picture element vector for each picture element of band-limited image represented by a band-limited image signal and separating the noise component (noise signal) from the band-limited image signal on the basis of the picture element vectors. Though depending on whether the picture element vectors are obtained in the direction of the equi-signal line or the direction of signal gradient and whether the lengths of the vector represent the differences or the reciprocals of the differences, the picture element vectors are long in the edge portion and short in the flat portion (noise portion) when the picture element vectors are obtained in the direction of equi-signal line and the lengths of the vectors represent the reciprocals of the differences. In this case, the noise component of the band-limited image signal can be separated according to the length of the picture element vector. For example, the noise signal can be obtained by carrying out a smoothing processing for reducing the values of the picture elements of the noise component on the band-limited image signal, and separating the noise component from the band-limited image signal on the basis of the smoothed band-limited image signal.

When the picture element vectors are obtained in the direction of equi-signal line and the lengths of the vectors represent the reciprocals of the differences, a picture element whose picture element vector is relatively short may be generally considered to be in a flat portion, i.e., to be noise, however there still remains a possibility that the picture element is in a small edge portion in the image. When the picture element is in an edge portion, the picture element vectors of picture elements near the picture element are directed in the same direction as the picture element vector of the picture element. On the other hand, when the picture element is noise, the picture element vectors of picture elements near the picture element are directed in random directions. Accordingly, by taking into account the picture element vectors of picture elements near a given picture element when determining whether the given picture element is in an edge portion or noise, the determination can be more precise.

Though a relatively large edge in an original image is held in an image represented by a band-limited image signal in a relatively low frequency band, noise becomes smaller as frequency band becomes lower. Accordingly, when a picture element vector calculated for a given picture element of an image represented by a band-limited image signal in a given frequency band is corrected on the basis of the picture element vector of the corresponding picture element of an image represented by a band-limited image signal in a frequency band lower than the given frequency band, the corrected picture element vector more precisely reflects whether the picture element is in the edge portion or the flat portion, whereby the noise component and the edge component can be separated more precisely.

When the original image signal is transformed into multiple resolution image signals, band-limited image signals in higher frequency bands hold detailed edge information, those in intermediate frequency bands hold intermediate edge to information and those in lower frequency bands hold rough edge information. Generally energy of an image is reduced as the frequency band becomes higher whereas energy of noise does not depend upon the frequency band. Accordingly, the S/N ratio becomes higher as the frequency band becomes lower. In a part of the original image free from noise (e.g., as indicated at (a) in FIG. 59), the band-limited image signal in any frequency band has a value only at an edge portion as indicated at (b) to (d) in FIG. 59. Accordingly, when the dispersion of picture elements in the predetermined region including a given object picture element in an image represented by a relatively high frequency band-limited image signal is small, the given object picture element may be considered to be in a flat portion without referring to the picture element vector of the corresponding picture element in an image represented by a lower frequency band-limited image signal.

To the contrast, in a part of the original image including noise (e.g., as indicated at (a) in FIG. 60), directions of the picture element vectors are disturbed by the noise and the dispersion becomes larger in images represented by high frequency band-limited image signals as indicated at (b) in FIG. 60, whereas influence of the noise becomes weaker and the dispersion becomes smaller as the frequency band becomes lower as indicated at (c) and (d) in FIG. 60. Accordingly, when the dispersion of picture elements in the predetermined region including a given object picture element in an image represented by a relatively high frequency band-limited image signal is large, it is difficult to accurately determine where the given object picture element is in a flat portion or an edge portion without referring to the picture element vector of the corresponding picture element in an image represented by a lower frequency band-limited image signal. Accordingly, when the dispersion of picture elements in the predetermined region including a given object picture element in an image represented by a relatively high frequency band-limited image signal is large, by correcting the picture element vector calculated for the given picture element to conform to the picture element vector calculated for the corresponding picture element in an image represented by a lower frequency band-limited image signal, whether the given picture element is in an edge portion or in a flat portion can be more precisely determined according to the corrected picture element vector.

When noise is included in an image, the edge component in the image also includes noise. When the band-limited image signal is smoothed on the basis of (the directions) of the (corrected) picture element vectors and the noise signal is obtained on the basis of the smoothed band-limited image signal in place of the picture element vectors, the noise component in the edge can be extracted without losing the edge component and the noise in the flat portion can be also extracted. Accordingly, the noise on the edge can be made less conspicuous and also the noise on the flat portion can be made less conspicuous.

Further when a noise signal is obtained by separating the noise component and the edge component of the smoothed band-limited image signal from each other on the basis of the lengths of the picture element vectors, carrying out a noise smoothing processing and/or an edge enhancing processing on the smoothed band-limited image signal to obtain a processed band-limited image signal, and obtaining the noise signal contained in the band-limited image signal before the noise smoothing processing by the use of the processed band-limited image signal, the edge can be enhanced without making the noise on the edge more conspicuous and the noise in the flat portion can be more suppressed, whereby the image can be reproduced in a higher quality.

BRIEF DESCRIPTION OF THE DRAWINGS

FIG. 4 is a view showing an example of the filter to be used in the filtering processing, FIG. 5 is a view showing in detail the low-resolution image signal making processing, to FIG. 6 is a view showing an example of the filter employed in the interpolation processing, FIG. 14 is a block diagram for illustrating the processing executed by the wavelet transformation section, FIGS. 15A and 15B showing the wavelet transformation coefficient signals for a plurality of frequency bands, FIGS. 29A to 29E are views for calculating the spatial filter, FIGS. 82A and 82B are views showing examples of the smoothing filter, FIGS. 83A and 83B are views showing examples of the smoothed picture element values, FIG. 85 is a flow chart for illustrating operation of the image processing system of the tenth embodiment, and FIGS. 86A and 86B are views for illustrating another example of the smoothing processing carried out in the tenth embodiment.

DESCRIPTION OF THE PREFERRED EMBODIMENTS

An image processing system in accordance with a first embodiment of the present invention will be described, hereinbelow. The image processing system is for carrying out a frequency enhancement processing by use of unsharp image signals on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 1:
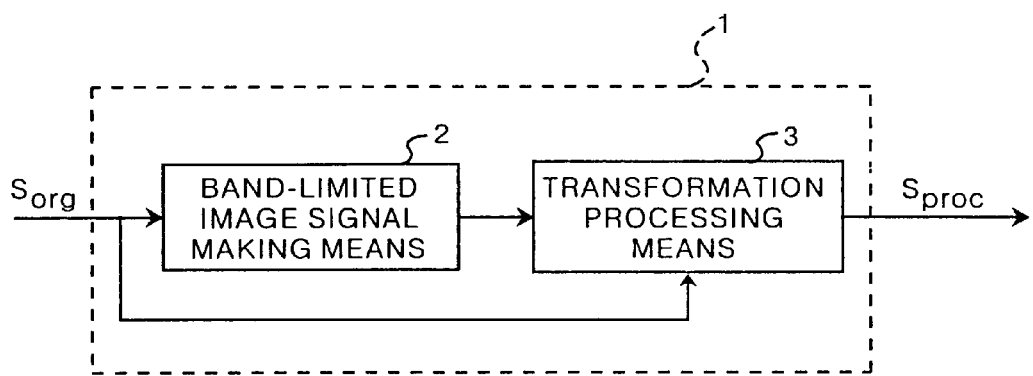
FIG. 1 is a schematic block diagram showing the arrangement of an image processing system in accordance with a first embodiment of the present invention.

In FIG. 1, an image processing system 1 in accordance with the first embodiment of the present invention comprises a band-limited image signal making means 2 which makes a plurality of band-limited image signals representing the frequency response characteristics for the respective frequency bands from an original image signal $S_{org}$ which is input from an image read-out apparatus or the like and has a predetermined resolution, and a transformation processing means 3 which carries out a frequency enhancement processing for enhancing a particular frequency on the original image signal $S_{org}$ on the basis of the band-limited image signals and obtains a processed image signal $S_{proc}$.

Figure 2:
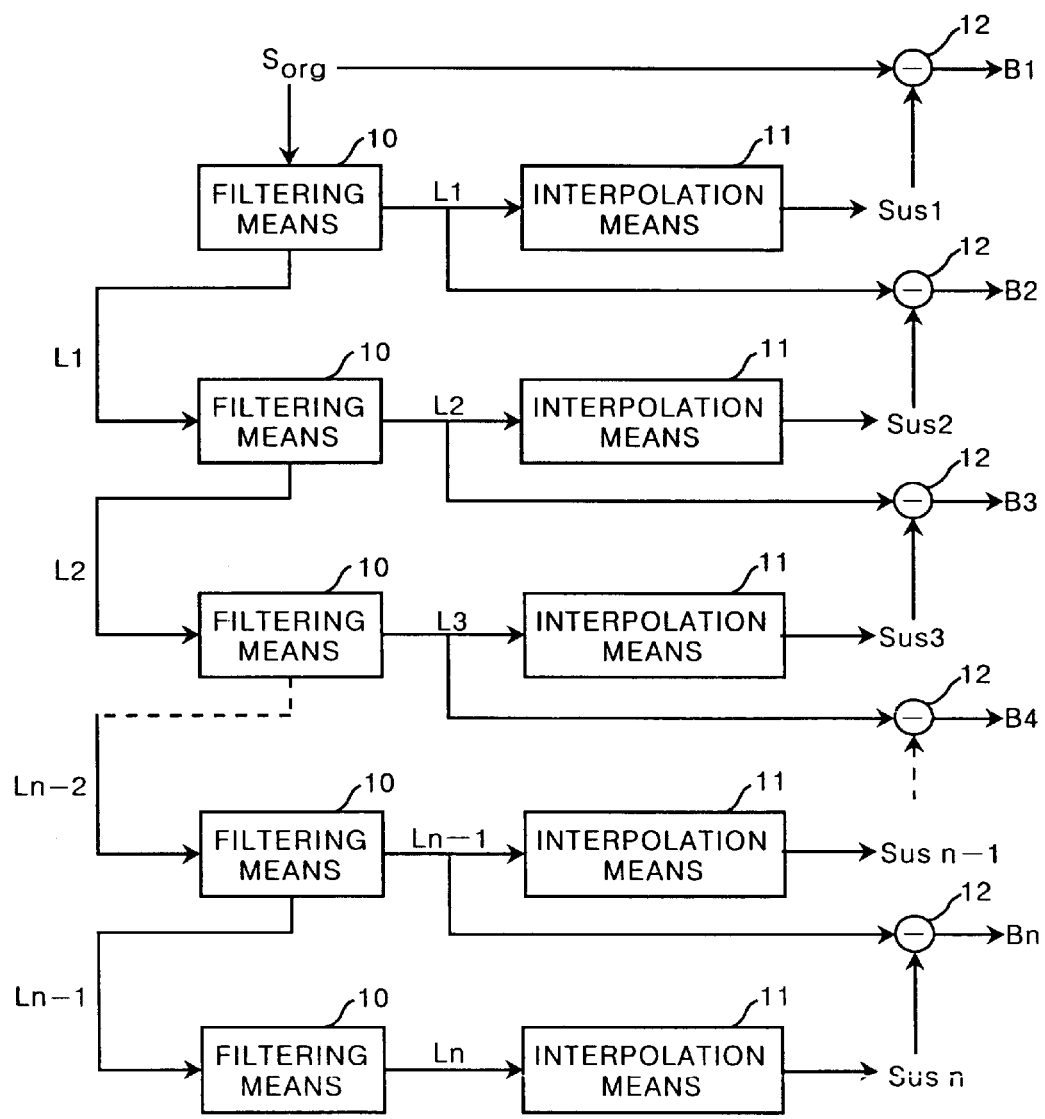
FIG. 2 is a schematic block diagram showing in brief the band-limited image signal making processing employed in the image processing system shown in FIG. 1.
Figure 3:
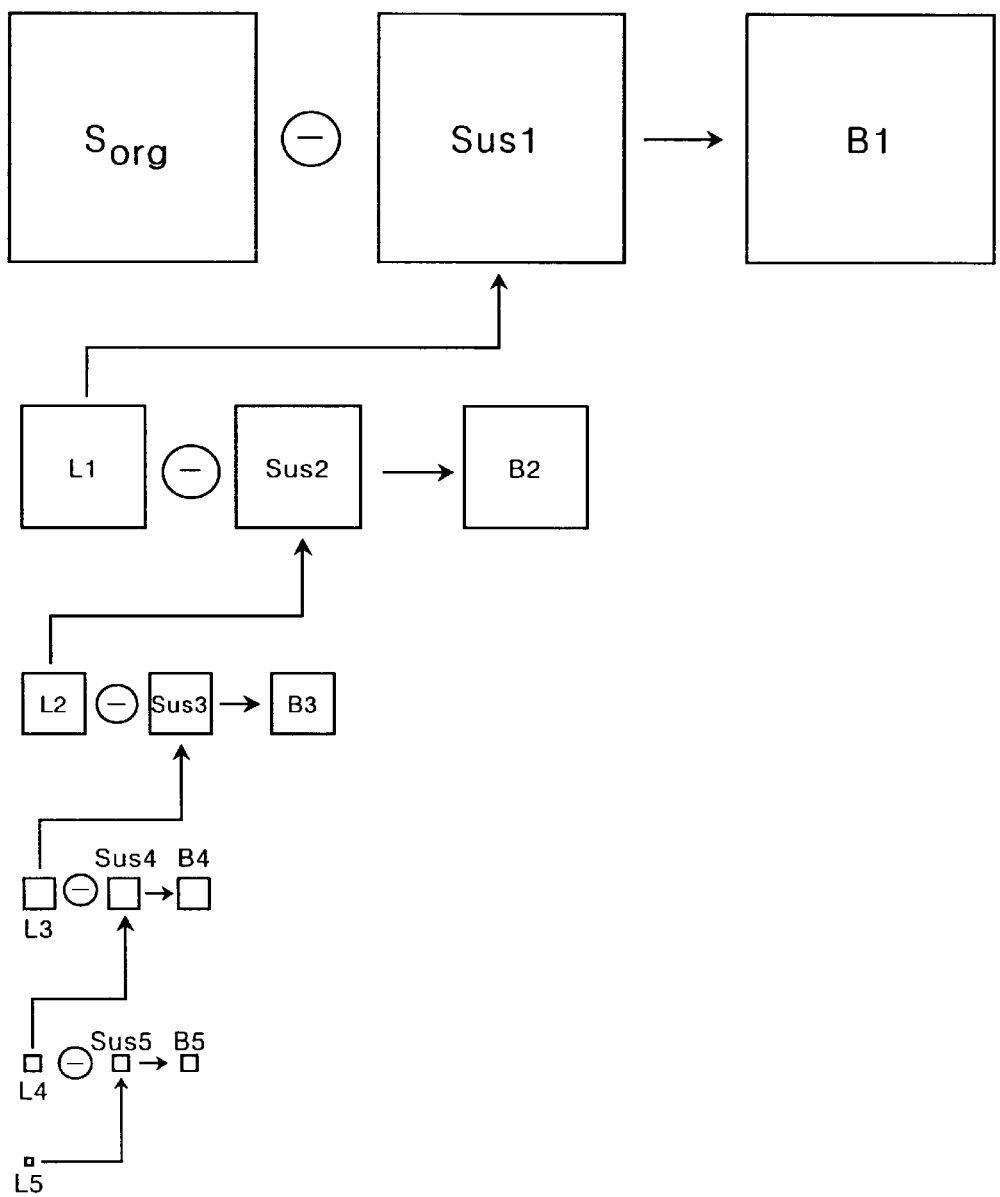
FIG. 3 is a view graphically showing the band-limited image signal making processing.

Making the band-limited image signals will be first described, hereinbelow. FIG. 2 is a schematic block diagram showing in brief the band-limited image signal making processing employed in the image processing system shown in FIG. 1, and FIG. 3 is a view graphically showing the band-limited image signal making processing. In this particular embodiment, the band-limited image signals are made by the method of Laplacian pyramid disclosed in Japanese Unexamined Patent Publication No. 5(1993)-244508. As shown in FIG. 2, the band-limited image signal making means 2 comprises first to n-th filtering means 10. The first filtering means 10 carries out a filtering processing on the original image signal $S_{org}$ in x- and y-directions (main scanning direction and sub-scanning direction, see FIG. 22) and makes a low resolution image signal L, which is lower than the original image signal $S_{org}$ in resolution. The second filtering means 10 carries out a similar filtering processing on the low resolution image signal $L_1$ thus obtained and makes a low resolution image signal $L_2$ which is lower than the low resolution image signal $L_1$ in resolution, and the third filtering means 10 carries out a similar filtering processing on the low resolution image signal $L_2$ thus obtained and makes a low resolution image signal $L_3$ which is lower than the low resolution image signal $L_2$ in resolution. In this manner, the n-th filtering means 10 carries out a similar filtering processing on the low resolution image signal $L_{n-1}$ and makes a low resolution image signal $L_n$ which is lower than the low resolution image signal $L_{n-1}$ in resolution. Thus low resolution image signals $L_k$ (k stands for 1 to n) are obtained. The band-limited image signal making means 2 further comprises first to n-th interpolation means 11. The interpolation means 11 carries out an interpolation processing on the low resolution image signals $L_1$ to $L_n$ obtained at the respective stages of filtering to double the number of the picture elements thereof, and makes a plurality of unsharp image signals $S_{us}k$ ($S_{us}1$ to $S_{us}n$) which are different in sharpness. Then the differences between the k-th low resolution image signal $L_k$ and the (k−1)-th unsharp image signal $s_{us}k$ and between the first unsharp image signal $S_{us}1$ and the original image signal $S_{org}$ are calculated by respective subtracters 12. The differences are taken as band-limited image signals $B_k$ (k stands for 1 to n).

In this particular embodiment, filters which substantially correspond to one-dimensional Gaussian distribution are used in the filtering processing. That is, coefficients of the filters are determined according the following formula (5) which relates to a Gaussian signal.

$$f(t) = e^{-\frac{t^2}{2\sigma^2}} \tag{5}$$

This is because the Gaussian signal is good in localization in both a real space and a frequency space. For example, the 5×1 one-dimensional filter is as shown in FIG. 4 when σ=1 in formula (5).

The filtering is carried out on the original image signal $S_{org}$ the low resolution image signal $L_k$ every second picture element as shown in FIG. 5. When such filtering is carried out in both x- and y-directions, the number of picture elements in obtained low resolution image signal $L_k$ is reduced to ¼ of the preceding image signal (e.g., the original image signal $S_{org}$ in the case of the low resolution image signal $L_1$, and the low resolution image signal $L_1$ in the case of the low resolution image signal $L_2$). That is, the number of picture elements in each of the low resolution image signals $L_k$ (k stands for 1 to n) is $½^{2k}$ of the original image signal $S_{org}$.

The interpolation processing to be carried out on the low resolution image signals $L_k$ thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma=2^{k-1}$, is employed in the following formula (6).

$$I(t) = 2 \cdot \sigma \cdot e^{-\frac{t^2}{2\sigma^2}} \tag{6}$$

For example, when interpolating the low resolution image signal $L_1$, σ=1 since k=1. In this case, a one-dimensional filter of 5×1 such as shown in FIG. 6 is employed in the interpolation. In this interpolation, a picture element of 0 in value is interpolated every second picture element in the low resolution image signal $L_1$, whereby the low resolution image signal $L_1$ is enlarged to have the same number of picture elements as the original image, and the interpolated low resolution image signal $L_1$ is subjected to a filtering processing using the one-dimensional filter shown in FIG. 6.

This interpolation/enlargement processing is carried out on all the low resolution image signals $L_k$. When interpolating a low resolution image signal $L_k$, a filter which is $3×2^k−1$ in length is prepared according to formula (6) and picture elements of 0 in value are interpolated between each pair of adjacent picture elements, whereby the low resolution image signal $L_k$ is enlarged to have the same number of picture elements as the one-class higher low resolution image signal $L_{k-1}$. Then the interpolated low resolution image signal $L_k$ is subjected to a filtering processing using the filter which is $3×2^k−1$ in length. Thus unsharp image signals $S_{us}k$ are obtained.

Then band-limited image signals $B_k$ (k=1 to n) are obtained by subtracting each of the unsharp image signals $S_{us}k$ is subtracted from the low resolution image signal $L_{k-1}$ having the same number of picture elements as shown by the following formula (7).

$$B_1 = S_{org} - S_{us}1 \tag{7}$$
$$B_2 = L_1 - S_{us}2$$
$$B_2 = L_2 - S_{us}3$$
$$\vdots$$
$$B_k = L_{k-1} - S_{us}k$$

Specifically, as shown in FIG. 3, when five low resolution image signals $L_1$ to $L_5$ are obtained, interpolation processing is carried out on the lowest resolution image signal $L_5$ and an unsharp image signal $S_{us}5$ having the same number of picture elements as the low resolution image signal $L_4$ is made. Then a band-limited image signal $B_5$ is obtained by subtracting the unsharp image signal $S_{us}5$ from the low resolution image signal $L_4$. Similarly, band-limited image signals $B_4$ to $B_1$ are obtained by operations $L_3-S_{us}4$, $L_2-S_{us}3$, $L_1-S_{us}2$ and $S_{org}-S_{us}1$. The lowest resolution image signal $L_5$ represents low frequency information obtained by contracting the original image, and is not used in the following operation.

Figure 7:
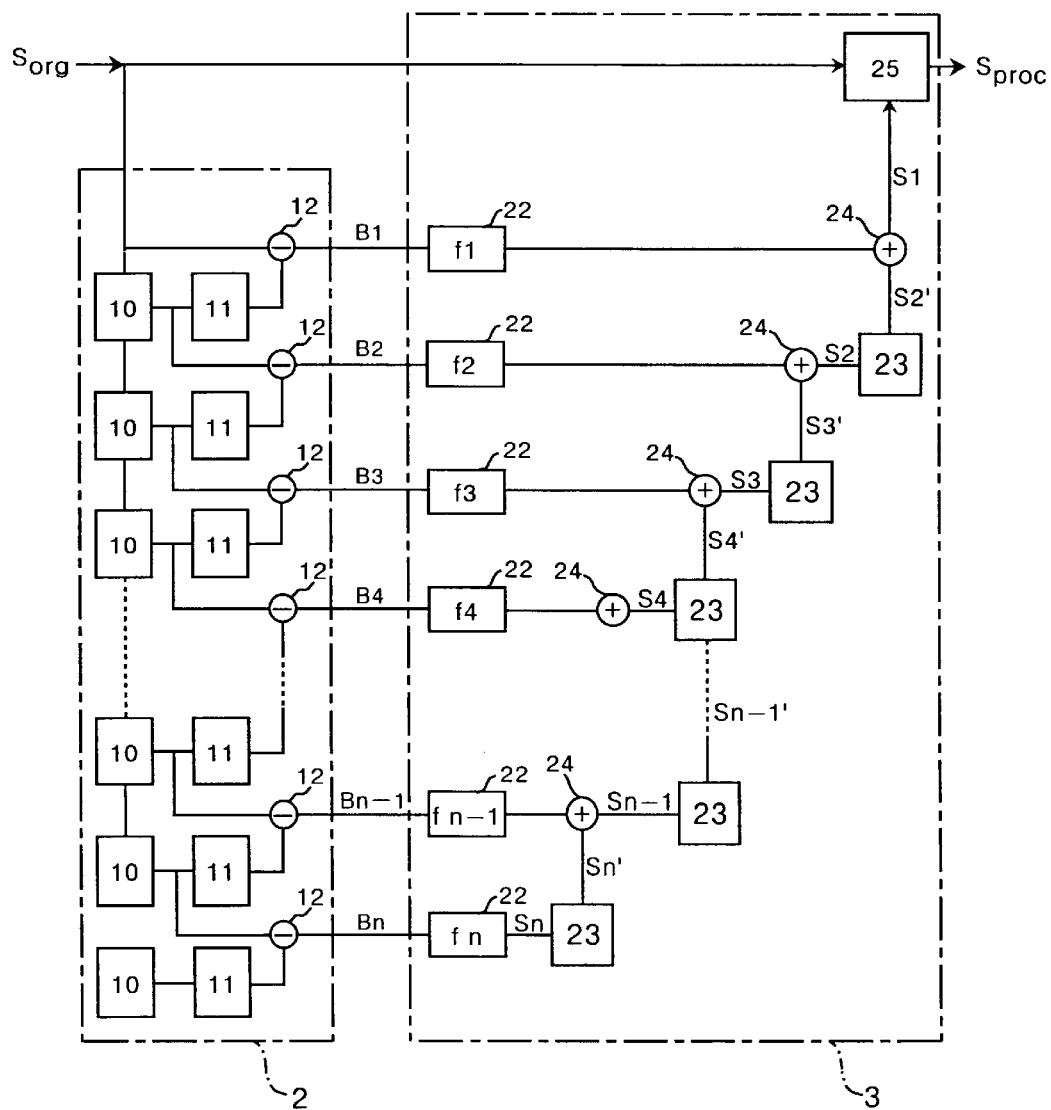
FIG. 7 is a schematic block diagram showing the arrangement of the transformation processing means and the band-limited image signal making means of the first embodiment.
Figure 8:
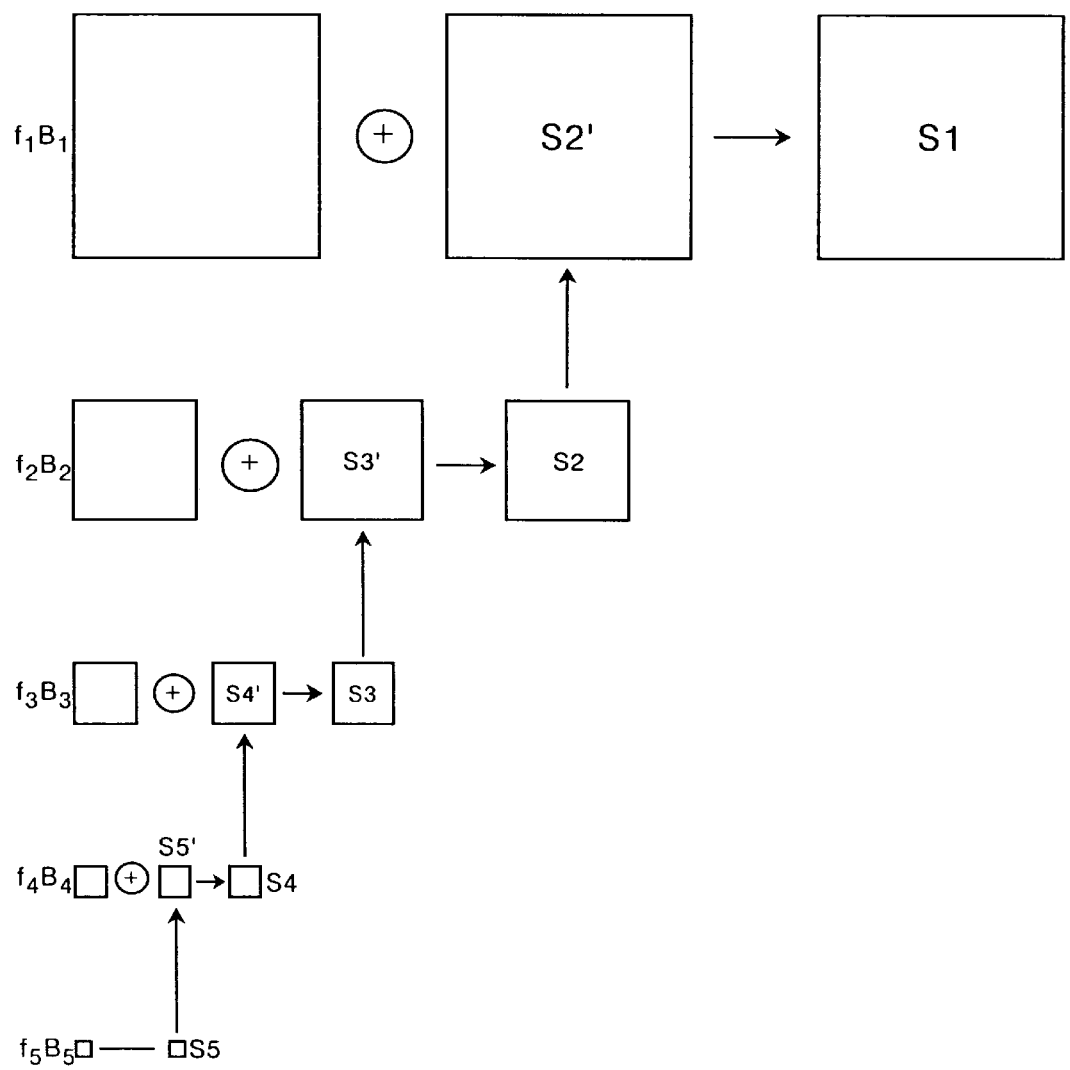
FIG. 8 is a view graphically showing the transformation processing.
Figure 9:
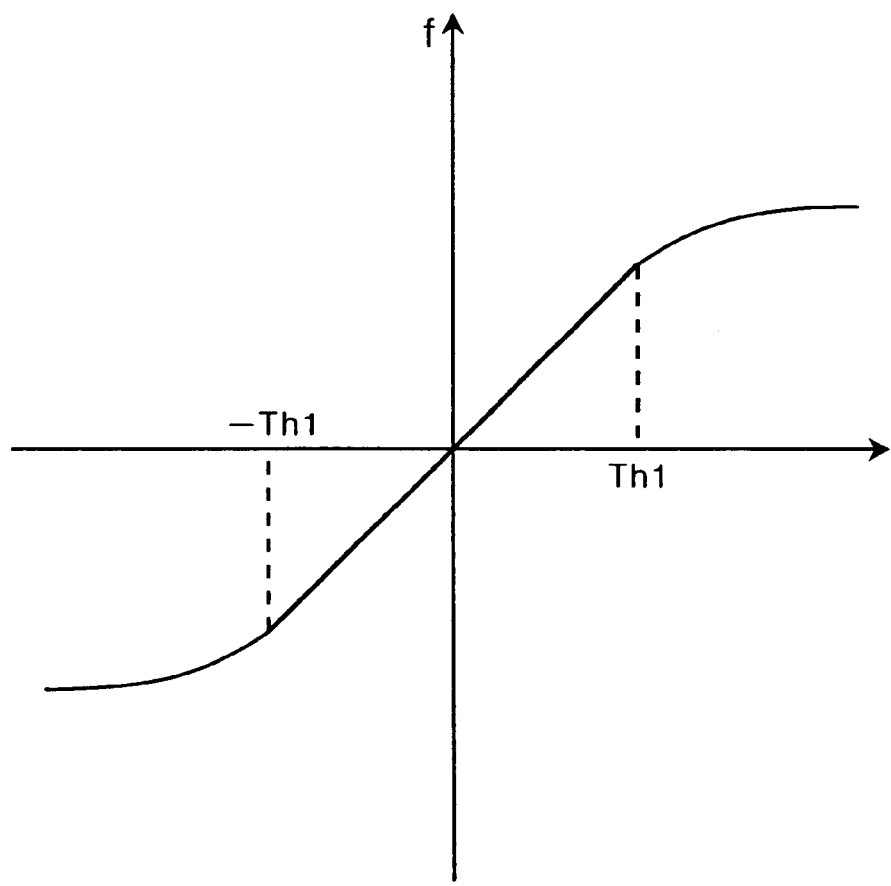
FIG. 9 is a view showing an example of the nonlinear function

The transformation processing to be carried out by the use of the band-limited image signals $B_k$ thus obtained will be described, hereinbelow. In this particular embodiment, the transformation processing is a frequency enhancement processing. FIG. 7 shows the transformation processing means 3 together with the band-limited image signal making means 2. FIG. 8 graphically shows the transformation processing. As shown in FIG. 7, the band-limited image signals $B_k$ made by the band-limited image signal making means 2 are suppressed to predetermined sizes with different transformation functions $f_1$ to $f_n$ in respective transformation circuits 22 and transformed band-limited signals $f_k B_k$ (k=1 to n) are obtained. An example of the transformation function is shown in FIG. 9. The function shown in FIG. 9 is a nonlinear function whose inclination is 1 in the range where the absolute value of the band-limited image signals $B_k$ is not larger than a threshold value Th1 and is smaller than 1 in the range where the absolute value of the band-limited image signals $B_k$ is larger than the threshold value Th1. The transformation functions for the respective band-limited image signals $B_k$ may be equal to or different from each other.

The transformed band-limited image signal $f_n B_n$ which is the lowest in the resolution in the transformed band-limited image signals $f_k B_k$ is taken as a high frequency component signal $S_n$ and the high frequency component signal $S_n$ is subjected to an interpolation processing to have the same number of picture elements as the one-class higher transformed band-limited image signal $f_{n-1} B_{n-1}$ by the interpolation means 23 in the same manner as by the aforesaid interpolation means 11, whereby an enlarged high frequency component signal $S_n'$ is obtained. Thereafter the enlarged high frequency component signal $S_n'$ is added to the transformed band-limited image signal $f_{n-1} B_{n-1}$ by an adder 24 and another high frequency component signal $S_{n-1}$ is obtained. Then the high frequency component signal $S_{n-1}$ is interpolated and enlarged and another enlarged high frequency component signal $S_{n-1}'$ is obtained and the enlarged high frequency component signal $S_{n-1}'$ is added to the transformed band-limited image signal $f_{n-2} B_{n-2}$, whereby a high frequency component signal $S_{n-2}$ is obtained. By repeating these steps, a highest resolution high frequency component signal Sl is obtained.

Specifically, as shown in FIG. 8, when five classes of band-limited image signals $B_1$ to $B_5$ are obtained, transformed band-limited image signals $f_1 B_1$ to $f_5 B_5$ are obtained next. The transformed band-limited image signal $f_5 B_5$ which is the lowest in the resolution is taken as a high frequency component signal $S_5$ and the high frequency component signal $S_5$ is subjected to an interpolation processing to have the same number of picture elements as the one-class higher transformed band-limited image signal $f_4 B_4$, whereby an enlarged high frequency component signal $S_5'$ is obtained. Thereafter the enlarged high frequency component signal $S_5'$ is added to the transformed band-limited image signal $f_4 B_4$ and another high frequency component signal $S_4$ is obtained. In this manner, high frequency component signals $S_3$ and $S_2$ are obtained and a highest resolution high frequency component signal $S_1$ is finally obtained.

The transformation circuits 22, the interpolation means 23 and the adders 24 form a high frequency component obtaining means in this particular embodiment.

When the highest resolution high frequency component signal $S_1$ is obtained, an operator 25 (an image processing means) multiplies the high frequency component signal $S_1$ by a coefficient of enhancement $\beta$ which is a parameter representing the degree of frequency enhancement and is determined according to the original image signal $S_{org}$ and the product is added to the original image signal $S_{org}$, whereby a processed image signal $S_{proc}$ is obtained as represented by the following formula (8).

$$S_{proc} = S_{org} + \beta(S_{org}) \cdot S_1 \quad (8)$$

wherein $s_{proc}$ is a processed image signal in which the high-frequency components are enhanced, $S_{org}$ is an original image signal, and $\beta(S_{org})$ is a coefficient of enhancement determined on the basis of the original image signal.

By changing the value of the coefficient of enhancement $\beta$, the degree of image processing of the processed image signal $S_{proc}$ can be freely changed.

Figure 10:
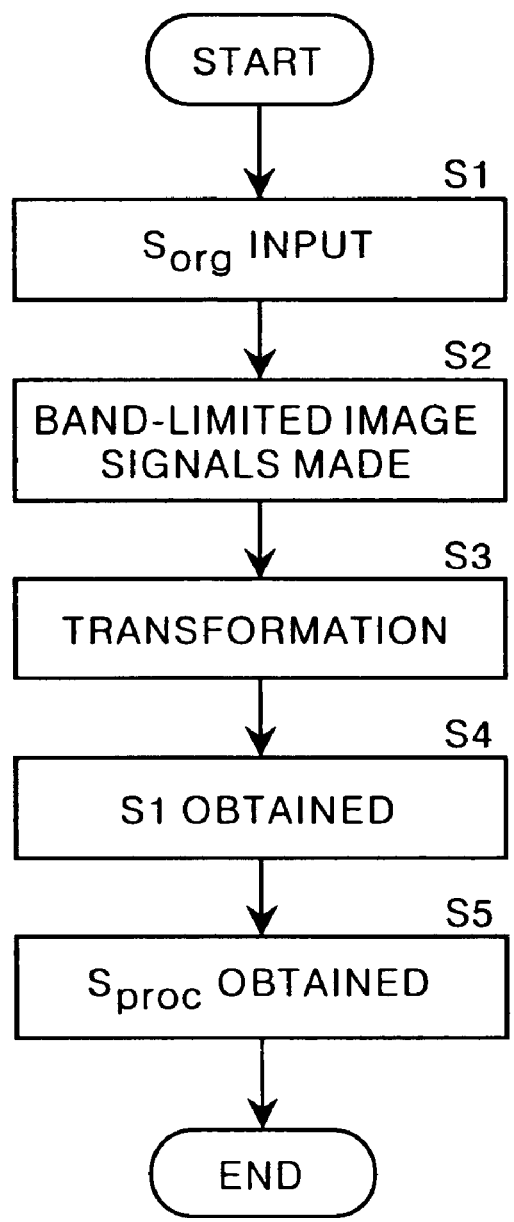
FIG. 10 is a flow chart for illustrating operation of the image processing system of the first embodiment.

Operation of the image processing system 1 of this embodiment will be described with reference to the flow chart shown in FIG. 10. An original image signal $S_{org}$ is first input into the image processing system 1, for instance, from an image read-out apparatus. (step S1) The original image signal $S_{org}$ is input into the band-limited image signal making means 2 and band-limited image signals $B_k$ representing the frequency response characteristics for the respective frequency bands are made. (step S2) The band-limited image signals $B_k$ are transformed into transformed band-limited image signals $f_k B_k$ by transformation functions such as shown in FIG. 9. (step S3) Then obtaining a high frequency component signal $S_k$ by interpolation of transformed band-limited image signals $f_k B_k$ and obtaining a high frequency component signal $S_{k-1}$ by addition of the high frequency component signal to the transformed band-limited image signals $f_k B_k$ in the same frequency band are repeated until the highest resolution high frequency component signal $S_1$ is obtained. (step S4) Finally, a processed image signal $S_{proc}$ is obtained by use of the high frequency component signal $S_1$ according to the aforesaid formula (8). (step S5)

As can be understood from the description above, in the image processing of this embodiment, the degree of image processing on the original image signal $S_{org}$ can be freely changed by only changing the value of the coefficient of enhancement $\beta$, and accordingly, the degree of image processing can be easily changed in a shorter time as compared with the method disclosed in Japanese Unexamined Patent Publication No. 5(1993)-244508 where the degree of image processing is changed by correcting the nonlinear functions and reconstructing an image, whereby the time required to obtain a processed image is shortened. When different image signals are to be displayed on a CRT or the like on the basis of different processed image signals $S_{proc}$ obtained by variously changing the contents of the image processing, stress on the operator can be lightened.

The amount of operation for obtaining the high frequency component signal $S_1$ in the processing in the first embodiment will be compared with that in a conventional system, hereinbelow.

Figure 11:
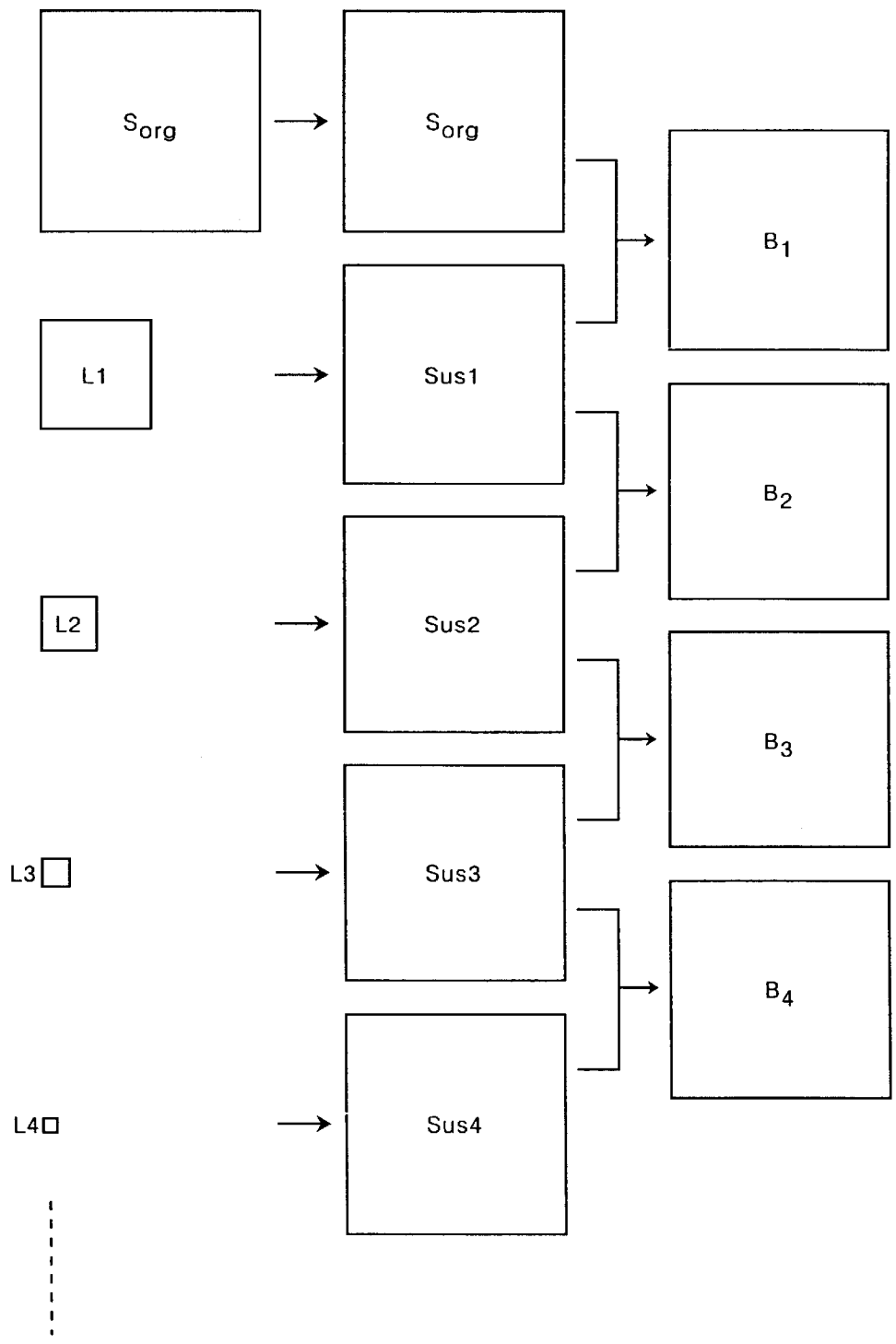
FIG. 11 is a view graphically showing a conventional transformation processing.

FIG. 11 graphically shows a conventional processing disclosed in the aforesaid Japanese Unexamined Patent Publication No. 10(1998)-75395. As shown in FIG. 11, in the conventional processing, low resolution image signals $L_k$ are obtained as in the first embodiment and an interpolation processing is carried out on the low resolution image signals $L_k$, thereby obtaining unsharp image signals $S_{us}k$ having the same number of picture elements as the original image signal $S_{org}$. Then subtraction is carried out between the unsharp image signals $S_{us}k$ and between the original image signal $S_{org}$ and the unsharp image signals $S_{us}1$, whereby band-limited image signals $B_k$ having the same number of picture elements as the original image signal $S_{org}$. Then the band-limited image signals $B_k$ are transformed by use of transformation functions and a processed image signal $S_{proc}$ is obtained by adding to the original image signal $S_{org}$ products of the transformed band-limited image signals $B_k$. This processing is represented by the following formula (9).

$$S_{proc} = S_{org} + \beta(S_{org}) \times F_{usm}(S_{org}, S_{us}1, S_{us}2, \ldots S_{us}n) \quad (9)$$

$$F_{usm}(S_{org}, S_{us}1, S_{us}2, \ldots S_{us}n) = f_1(S_{org} - S_{us}1) + f_2(S_{us}1 - S_{us}2) + \ldots$$
$$+ f_k(S_{us}k-1 - S_{us}k) + \ldots + f_n(S_{us}n-1 - S_{us}n)$$

wherein $S_{proc}$ is a processed image signal, $S_{org}$ is an original image signal, $S_{us}k$ (k=1 to n) is an unsharp image signal, $f_k$(k=1 to n) is a transformation function for transforming each band-limited image signals, and $\beta(S_{org})$ is a coefficient of enhancement determined on the basis of the original image signal.

In the conventional processing described above, an interpolation processing for increasing the picture elements of the low resolution image signals $L_k$ to the number equal to that of the picture elements of the original image signal $S_{org}$. Accordingly, assuming that the number of picture elements of the original image is 1024×1024 and six low resolution image signals $L_1$ to $L_6$ are obtained from the original image signal $S_{org}$, and the interpolation processing is such that one picture element is obtained by the use of sixteen picture elements in a range of 4×4, operation must be performed 100663296 (1024×1024×16×6) times. To the contrast, in the case of this embodiment, the unsharp image signals $S_{us}k$ have a number of picture elements corresponding to the respective frequency bands and an interpolation processing is performed when the high frequency component signals $S_k$ are enlarged. The number of times by which the operation should be performed may be only 22364160=[(1024×1024+ 512×512+256×256+128×128+64×64+32×32)×16]. Actually, since the interpolation processing is also performed when obtaining the unsharp image signals $S_{us}k$, the number of times by which the operation should be performed amounts 44728320. Accordingly the total amount of operation in the processing of this embodiment is about ½.25 of that in the conventional processing. Accordingly, the operating time can be shortened to about ½.25 of that in the conventional processing.

The method of making the band-limited image signals need not be limited to that described above. For example, the band-limited image signals may be made by a method disclosed in the aforesaid Japanese Unexamined Patent Publication No. 10(1998)-75395.

Though, in the first embodiment described above, the band-limited image signals representing the characteristics of the respective frequency bands are obtained from the original image signal $S_{org}$ by a method of Laplacian pyramid, the band-limited image signals may be obtained by a wavelet transformation as disclosed in Japanese Unexamined Patent Publication No. 6(1994)-274615. An image processing system in accordance with a second embodiment of the present invention where a wavelet transformation is used will be described, hereinbelow.

Figure 12:
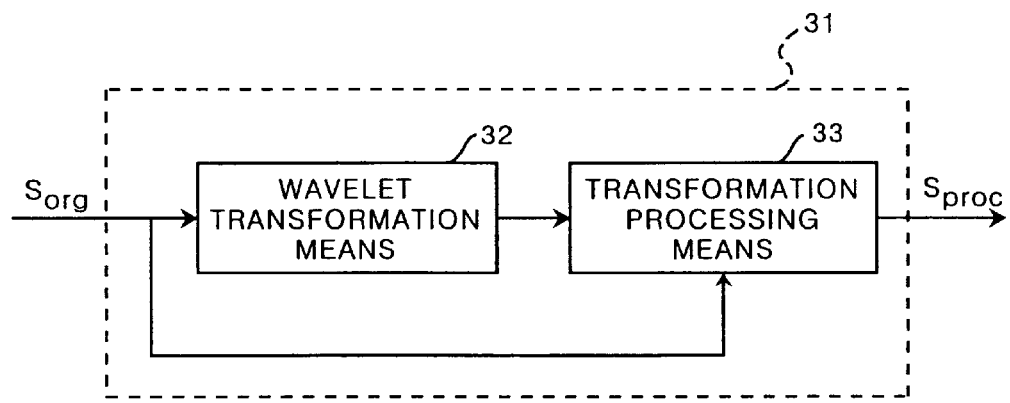
FIG. 12 is a schematic block diagram showing the arrangement of an image processing system in accordance with a second embodiment of the present invention, FIG. 13 a schematic block diagram showing the wavelet transformation means.
Figure 22:
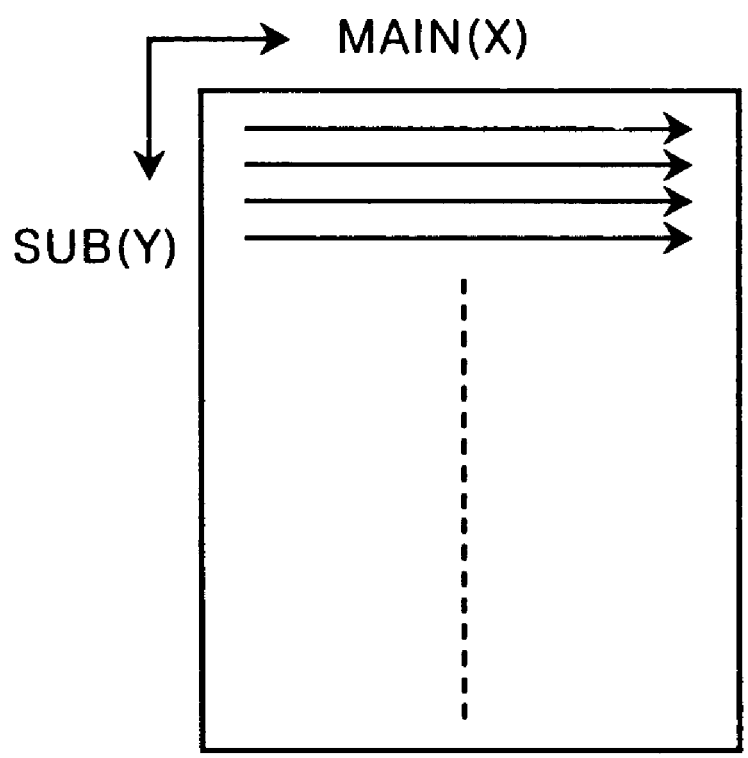
FIG. 22 is a view for illustrating the main scanning direction and the sub-scanning direction of the original image.

FIG. 12 is a block diagram showing the image processing system of the second embodiment. In FIG. 12, the image processing system 31 in accordance with the second embodiment of the present invention comprises a wavelet transformation means 32 which carries out a wavelet transformation on an original image signal $S_{org}$ which is input from an image read-out apparatus or the like and has a predetermined resolution, and a transformation processing means 33 which carries out a frequency enhancement processing for enhancing a particular frequency on the original image signal $S_{org}$ on the basis of the signals obtained by the wavelet transformation and obtains a processed image signal $S_{proc}$. The main scanning direction and the sub-scanning direction as used in the following description are as shown in FIG. 22.

Figure 13:
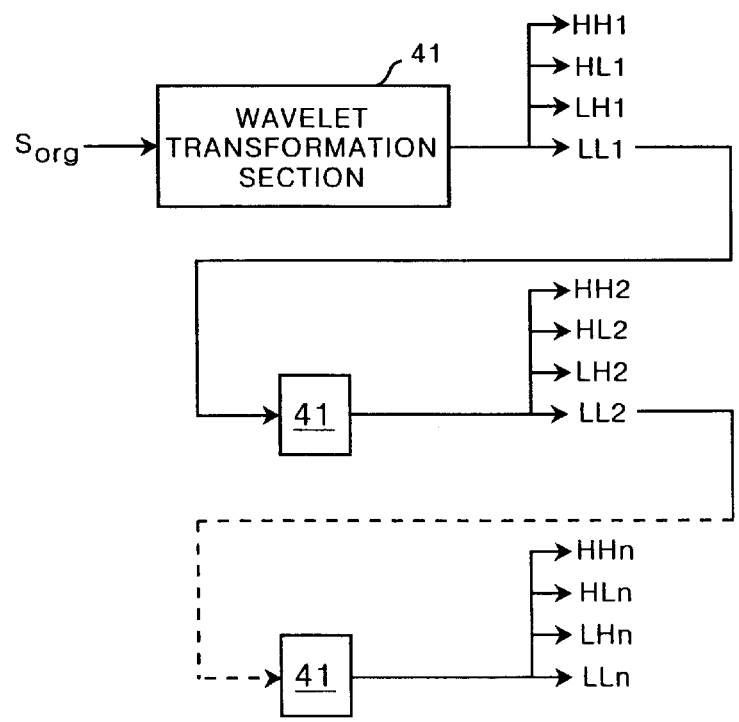

FIG. 13 shows the structure of the wavelet transformation means 32. In this particular embodiment, the wavelet transformation means 32 carries out an orthogonal wavelet transformation where the coefficients of wavelet transformation are orthogonal to each other. As shown in FIG. 13, the original image signal $S_{org}$ is subjected to a wavelet transformation by a wavelet transformation section 41. FIG. 14 is a block diagram showing the wavelet transformation to be carried out by the wavelet transformation section 41. As shown in FIG. 14, a filtering processing is carried out on the original image signal $S_{org}$ (signal LLK) in the main scanning direction by the use of fundamental wavelet functions H and G, and every second picture element is thinned in the main scanning direction (indicated at ↓2 in FIG. 14), thereby reducing the number of picture elements in the main scanning direction by half. The function H is a high-pass filter and the function G is a low-pass filter. Then a filtering processing is carried out on each of the thinned signals in the sub-scanning direction by the use of the fundamental wavelet functions H and G, and every second picture element is thinned in the sub-scanning direction, thereby reducing the number of picture elements in the sub-scanning direction by half. Thus wavelet transformation coefficient signals $HH_1$, $HL_1$, $LH_1$ and $LL_1$ ($HH_{k+1}$, $HL_{k+1}$, $LH_{k+1}$ and $LL_{k+1}$) are obtained as shown in FIG. 15A. The signal $LL_1$ represents an image obtained by reducing the original image to ½ in both longitudinal and lateral directions. The signals $HL_1$, $LH_1$ and $HH_1$ respectively represent a longitudinal edge, a lateral edge and an oblique edge in the image reduced to half of the original image in both the longitudinal and lateral directions.

Then the signal $LL_1$ is further subjected to the wavelet transformation by the wavelet transformation section 41 and signals $HH_2$, $HL_2$, $LH_2$ and $LL_2$ are obtained as shown in FIG. 15B. The signal $LL_2$ represents an image obtained by reducing the original image to ¼ in both longitudinal and lateral directions. The signals $HL_2$, $LH_2$ and $HH_2$ respectively represent a longitudinal edge, a lateral edge and an oblique edge in the image reduced to quarter of the original image in both the longitudinal and lateral directions.

Then by carrying out the wavelet transformation n times on each of the wavelet transformation coefficient signal $LL_k$ in the respective frequency bands, wavelet transformation coefficient signals $HH_1$ to $HH_n$, $HL_1$ to $HL_n$, $LH_1$ to $LH_n$ and $LL_1$ to $LL_n$ are obtained. The wavelet transformation coefficient signals $HH_n$, $HL_n$, $LH_n$ and $LL_n$ obtained by the n-th wavelet transformation are $(½)^n$ of the original image signal $S_{org}$ in the number of picture elements in each of the main scanning direction and the sub-scanning direction. Accordingly, as the value of n increases, the frequency band of the wavelet transformation coefficient signal becomes lower and the wavelet transformation coefficient signal represents a lower frequency component of the original image signal. That is, the wavelet transformation coefficient signal $HH_k$ (k=0 to n) represents change in frequency of the original image signal $S_{org}$ in both the main scanning direction and the sub-scanning direction and the frequency represented by the wavelet transformation coefficient signal $HH_k$ becomes lower as the value of k increases. The wavelet transformation coefficient signal $HL_k$ (k=0 to n) represents change in frequency of the original image signal $S_{org}$ in the main scanning direction and the frequency represented by the wavelet transformation coefficient signal $HL_k$ becomes lower as the value of k increases. Further, the wavelet transformation coefficient signal $LH_k$ (k=0 to n) represents change in frequency of the original image signal $S_{org}$ in the sub-scanning direction and the frequency represented by the wavelet transformation coefficient signal $LH_k$ becomes lower as the value of k increases.

The wavelet transformation coefficient signals for a plurality of frequency bands are shown in FIGS. 15A and 15B. For the purpose of simplicity, only the wavelet transformation coefficient signals obtained by first and second wavelet transformations are shown in FIGS. 5A and 15B. In FIG. 15B, the signal $LL_2$ represents an image obtained by reducing the original image to ¼ in both the main scanning direction and the sub-scanning direction.

In the wavelet transformation coefficient signals $HH_k$, $HL_k$, $LH_k$ and $LL_k$, the signals $HH_k$, $HL_k$ and $LL_k$ represent the edge components in the corresponding frequency band. In other words, these signals represent images having particular frequency bands of the original image (band-limited image characteristics) and mainly represent the contrast of the image in the respective frequency bands. As described above, the wavelet transformation coefficient signal $LL_k$ represents a contraction of the original image. In this particular embodiment, the wavelet transformation coefficient signals $HH_k$, $HL_k$ and $LH_k$ are referred to as "the band-limited image signals" and the wavelet transformation coefficient signal $LL_k$ are referred to as "the resolution signal". Then "the band-limited image signals" together with "the resolution signal" are referred to as "the wavelet transformation coefficient signals". The lowest resolution signal $LL_n$ is not necessary to obtain the band-limited image signals and accordingly is taken as 0.

Figure 16:
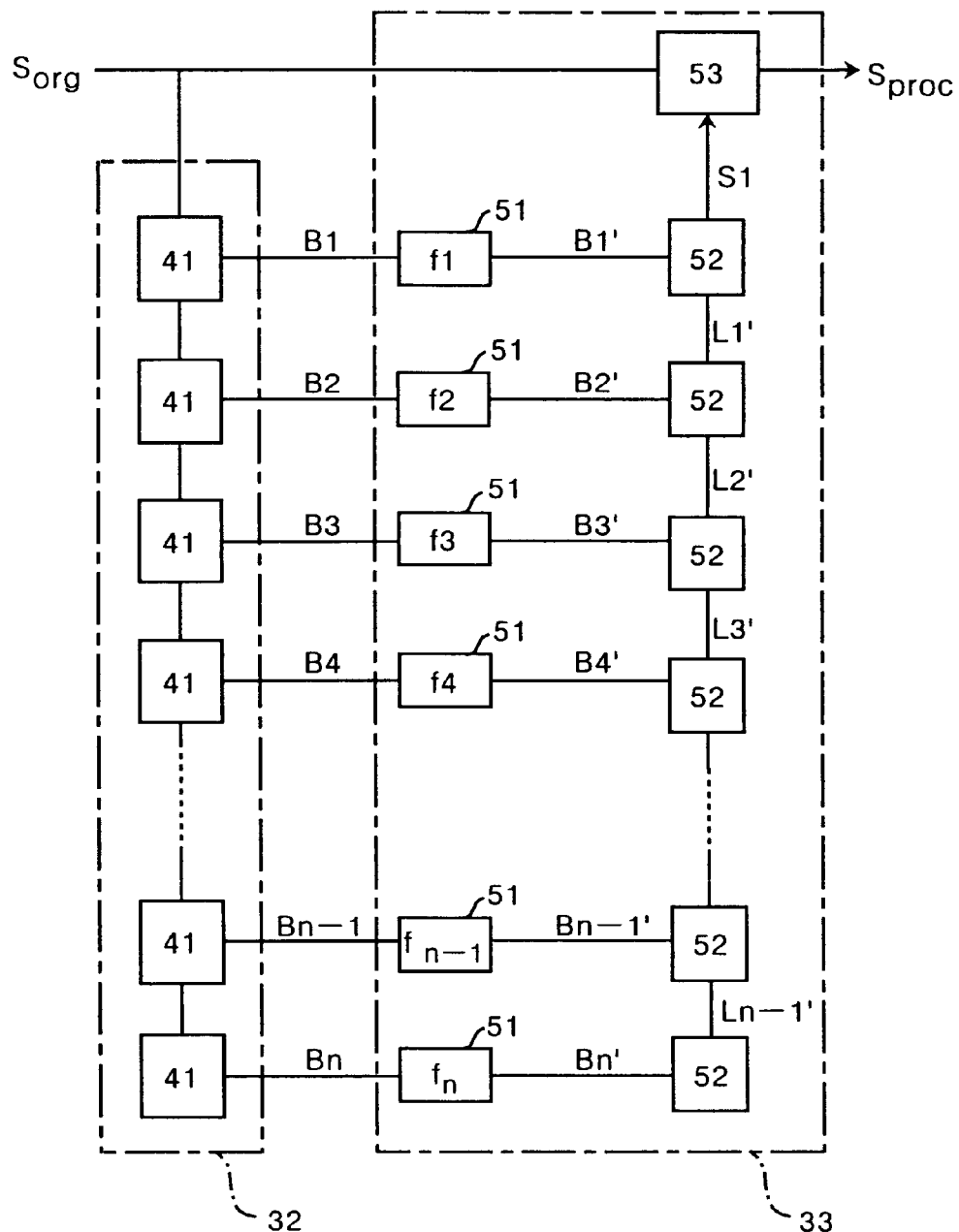
FIG. 16 is a schematic block diagram showing the arrangement of the transformation processing means and the band-limited image signal making means of the second embodiment.
Figure 17:
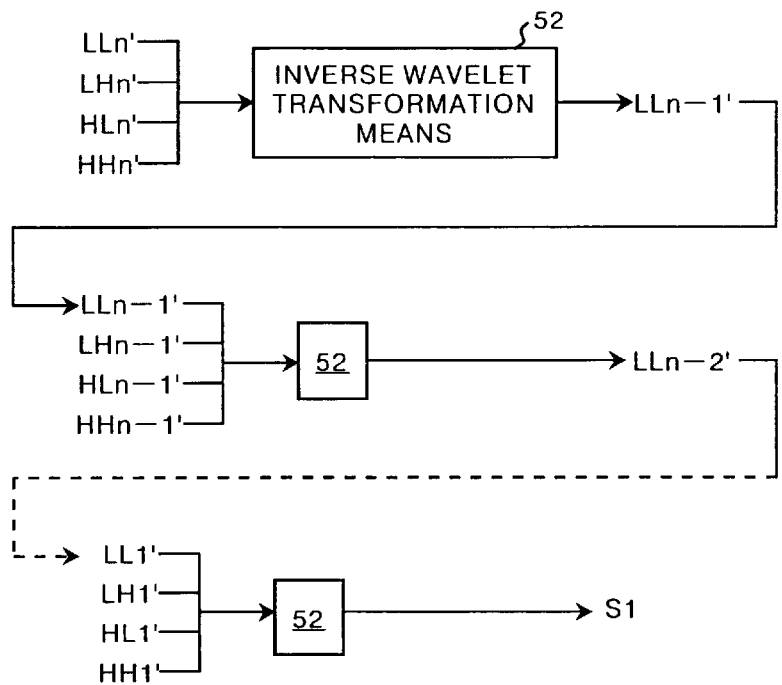
FIG. 17 is a view for illustrating the inverse wavelet transformation.

The transformation processing means 33 carries out a frequency enhancement processing as the transformation processing means 3 in the first embodiment. FIG. 16 shows the structure of the transformation processing means 33 together with the wavelet transformation means 32. As shown in FIG. 16, the band-limited image signals $B_k$ ($HH_k$, $HL_k$ and $LH_k$) obtained by the wavelet transformation means 32 are suppressed to desired sizes with different transformation functions $f_1$ to $f_n$ in respective transformation circuits 51 and transformed band-limited signals $B_k'$ ($HH_k'$, $HL_k'$ and $LH_k'$, k=1 to n) are obtained. An inverse wavelet transformation is carried out on the transformed band-limited signals $HH_k'$, $HL_k'$ and $LH_k'$ in an inverse wavelet transformation means 52. As shown in FIG. 17, the inverse wavelet transformation means 52 carries out an inverse wavelet transformation on the transformed band-limited signals $HH_n'$, $HL_n'$ and $LH_n'$ in the lowest frequency band ($LL_n$=0) and a processed signal $LL_{n-1}'$ is obtained.

Figure 18:
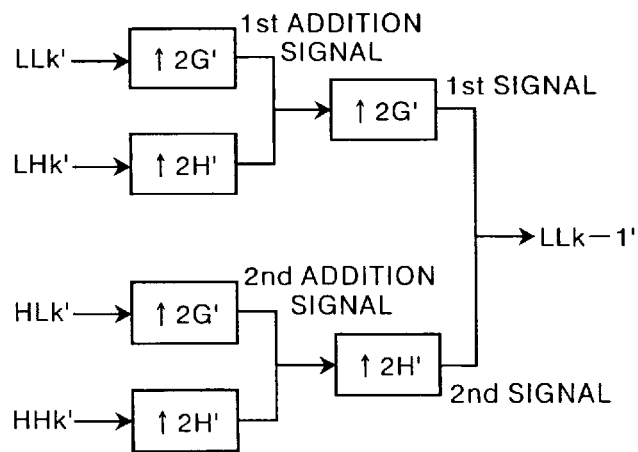
FIG. 18 is a block diagram showing the processing executed by the inverse wavelet transformation means.

FIG. 18 shows the processing executed by the inverse wavelet transformation means 52. As shown in FIG. 18, the transformed band-limited image signal $LL_n'$ ($LL_k'$, $LL_n$=0 when k=n) and the transformed band-limited image signal $LH_n'$ ($LH_k'$) are subjected to a processing for enlarging each space between picture elements by one picture element (indicated at ↑2 in FIG. 18) in the sub-scanning direction and the processed signals are further subjected to a filtering processing by the use of inverse wavelet transformation functions G' and H', which are inverse to the aforesaid functions G and H, and the signals obtained are added up to obtain a first addition signal. Then the first addition signal is subjected to a processing for enlarging each space between picture elements by one picture element in the main scanning direction and the processed signal is further subjected to a filtering processing by the use of inverse wavelet transformation functions G', whereby a first signal is obtained. On the other hand, the transformed band-limited image signal $HL_n'$ ($HL_k'$) and the transformed band-limited image signal $HH_n'$ ($HH_k'$) are subjected to a processing for enlarging each space between picture elements by one picture element in the sub-scanning direction and the processed signals are further subjected to a filtering processing by the use of the inverse wavelet transformation functions G' and H' and the signals obtained are added up to obtain a second addition signal. Then the second addition signal is subjected to a processing for enlarging each space between picture elements by one picture element in the main scanning direction and the processed signal is further subjected to a filtering processing by the use of inverse wavelet transformation functions H', whereby a second signal is obtained. Then the processed signal $LL_{n-1}'$ is obtained by adding the first signal to the second signal. Since the wavelet transformation coefficient signal $LL_n$ at the lowest resolution is 0, the processed signal $LL_{n-1}'$ represents the band-pass characteristic of the original image signal $S_{org}$.

Thereafter the inverse wavelet transformation is carried out by the inverse wavelet transformation means 52 on the transformed band-limited image signals $HH_{n-1}'$, $HL_{n-1}'$, $LH_{n-1}'$ and $LL_{n-1}'$ in the same manner and a processed signal $LL_{n-2}'$ is obtained. By repeating these steps, processed signals in the highest frequency band $HH_1'$, $HL_1'$ and $LL_1'$ are obtained. Further by carrying out the inverse wavelet transformation on the processed signals $HH_1'$, $HL_1'$ and $LL_1'$, a high frequency component signal $S_1$ is obtained.

As in the first embodiment, operation represented by the aforesaid formula (8) is carried out by an operator 53 on the basis of the high frequency component signal $S_1$ and a processed image signal $S_{proc}$ is obtained.

Figure 19:
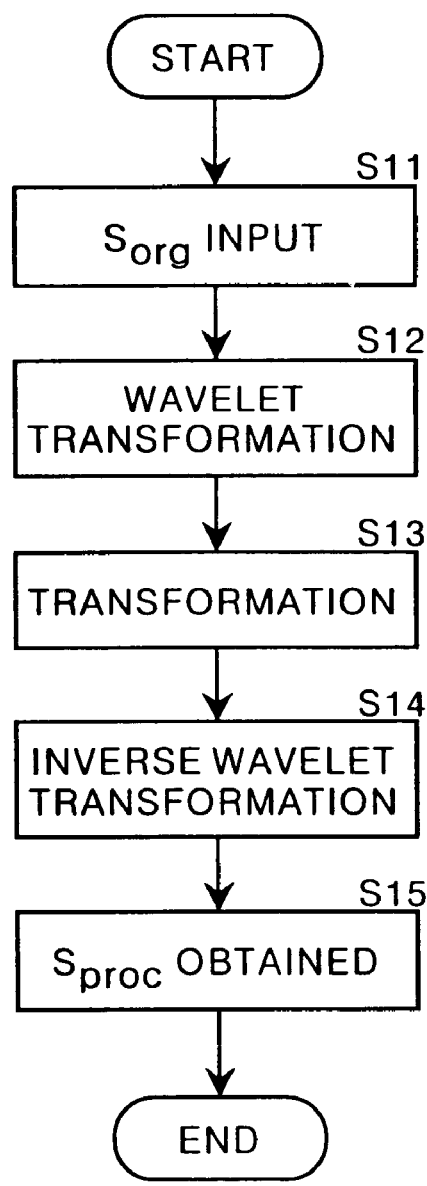
FIG. 19 is a flow chart for illustrating operation of the image processing system of the second embodiment.

Operation of the image processing system 31 of the second embodiment will be described with reference to the flow chart shown in FIG. 19. An original image signal $S_{org}$ is first input into the image processing system 1, for instance, from an image read-out apparatus. (step S11) The original image signal $S_{org}$ is input into the wavelet transformation means 32 and wavelet transformation coefficient signals for the respective frequency bands are made. (step S12) The wavelet transformation coefficient signals $B_k$ are transformed into transformed signals $B_k'$ by the transformation functions described above. (step S13) Then the transformed signals $B_k'$ are subjected to the inverse wavelet transformation by the inverse wavelet transformation means 52 and the highest resolution high frequency component signal $S_1$ is obtained. (step S14) Finally, a processed image signal $S_{proc}$ is obtained by use of the high frequency component signal $S_1$ according to the aforesaid formula (8). (step S15)

As can be understood from the description above, also in the image processing of the second embodiment, it is unnecessary to carry out the interpolation operation for increasing the numbers of the unsharp image signals to be equal to the number of picture elements of the original image signal $S_{org}$, which is necessary in the conventional frequency enhancement processing where band-limited image signals $B_k$ having the same number of picture elements as the original image signal $S_{org}$ are made by the use of unsharp image signals having the same number of picture elements as the original image signal $S_{org}$. Accordingly the amount of operation can be reduced, whereby the image processing can be carried out at a high speed and stress on the operator can be lightened.

Further since the degree of image processing on the original image signal $S_{org}$ can be freely changed by only changing the value of the coefficient of enhancement β, the degree of image processing can be easily changed in a shorter time as compared with the method disclosed in Japanese Unexamined Patent Publication No. 5(1993)-244508 where the degree of image processing is changed by correcting the nonlinear functions and reconstructing an image, whereby the time required to obtain a processed image is shortened and stress on the operator can be lightened.

Though, in the first and second embodiments described above, the inverse multi-resolution transformation is effected up to the highest frequency band and a high frequency component signal $S_1$ representing an image at the same resolution as that represented by the original image signal $S_{org}$, the inverse multi-resolution transformation may be effected only up to an intermediate frequency band. In this case, by carrying out the image processing on the original image signal $S_{org}$ on the basis of the high frequency component signal obtained by effecting the inverse multi-resolution transformation up to an intermediate frequency band, the components of the original image signal $S_{org}$ up to the intermediate frequency band can be enhanced.

Though, in the embodiments described above, the frequency enhancement processing is employed as the image processing to be carried out by the operator 25 or 53, a dynamic range compression processing may be employed. In this case, the operation represented by the following formula (10) is carried out on the high frequency component signal $S_1$ obtained in the manner described above and the dynamic range of the original image signal $S_{org}$ is compressed. In accordance with the following formula (10), the degree of dynamic range compression of the processed image signal $S_{proc}$ can be changed by changing the value of $D(S_{org}-S_1)$.

$$S_{proc}=S_{org}+D(S_{org}-S_1) \tag{10}$$

wherein $S_{proc}$ represents the processed image signal, $S_{org}$ represents the original image signal, and $D(S_{org}-S_1)$ represents a coefficient of dynamic range compression determined on the basis of the low frequency component signal, D being a function for transforming $(S_{org}-S_1)$.

Figure 20:
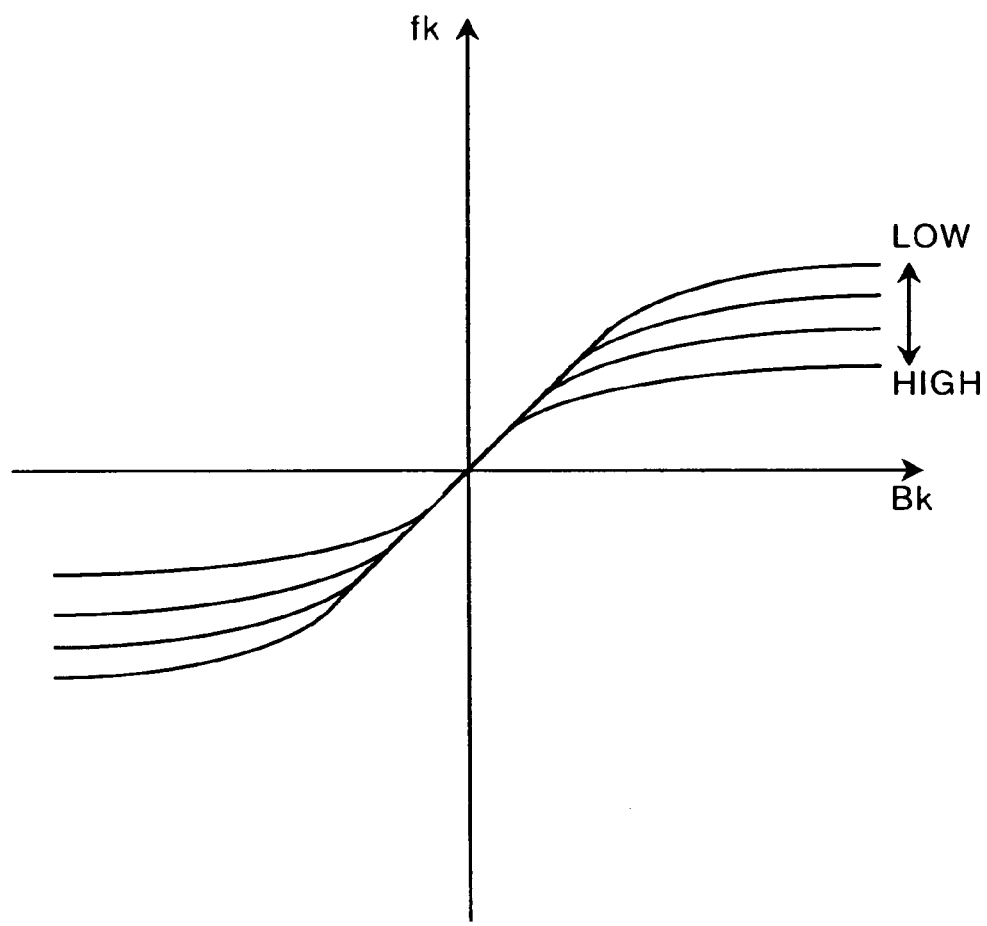
FIGS. 20 and 21 are views showing examples of the nonlinear function employed in the dynamic range compression processing.
Figure 21:
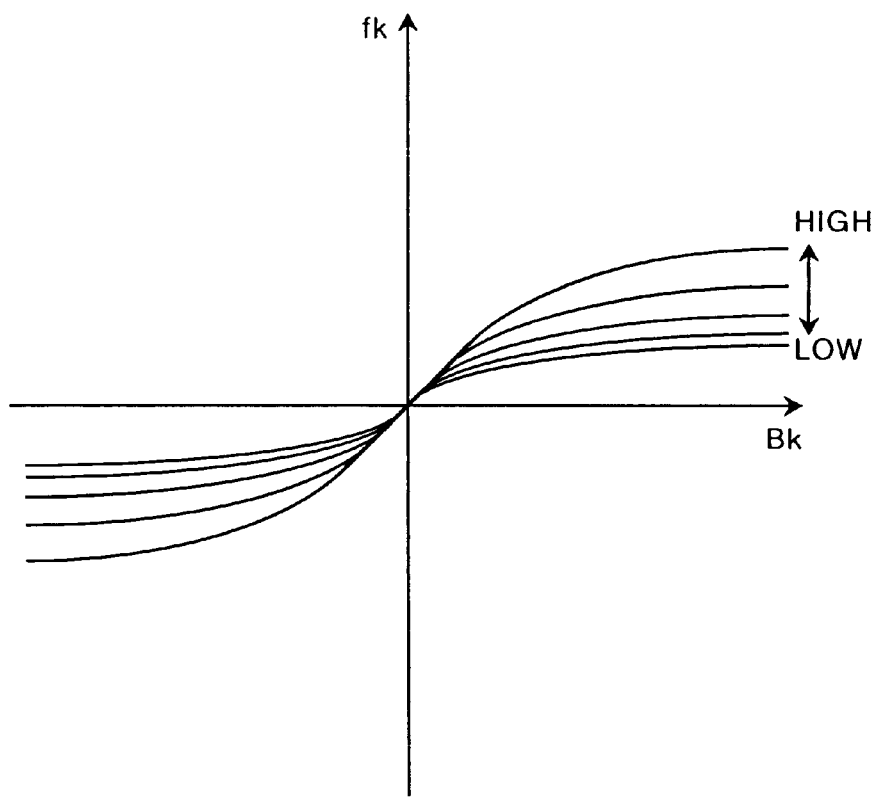

It is preferred that, when the dynamic range compression processing is to be carried out, for instance, transformation functions shown in FIG. 20 or 21 or combinations of these functions be employed as the functions $f_k$ for transforming the band-limited image signals.

In accordance with the transformation functions shown in FIG. 20, the band-limited signals are transformed so that those which are large in amplitude are suppressed and the degree of suppression is increased as the frequency band of the band-limited signal becomes higher. This is for taking into account the fact that higher frequency components contained in edges of an actual radiation image is smaller in amplitude than low frequency components. In actual radiation images, even a substantially sharp edge is not in the form of a correct step and the amplitude often becomes smaller as the frequency becomes higher. Accordingly, it is preferred that suppression be made from a smaller amplitude as the frequency of the band-limited signals becomes higher. The functions shown in FIG. 20 serve for this purpose.

The transformation functions shown in FIG. 21 are for transforming the band-limited signals to those having values not larger than absolute values of the band-limited signals, which values are determined on the basis of the absolute values of the band-limited signals. As the frequency of the frequency band to be processed by the function becomes lower, the absolute value of a transformed image signal obtained by transforming a band-limited signal whose absolute value is in a predetermined range near 0 becomes smaller. That is, the functions all pass through the origin and all have inclinations smaller than 1. Further, the inclination near 0 is smaller as the frequency of the frequency band to be processed by the function becomes lower. When an add signal obtained by adding up the transformed image signals is added to the original image signal $S_{org}$, these functions contribute to smoothen the joint between the original image signal $S_{org}$ and the add signal, that is, rise of the signal.

The operator 25 or 53 may simultaneously execute a frequency enhancement processing and a dynamic range compression processing as shown in the following formula (11). In accordance with the following formula (11), the degree of frequency enhancement processing and the degree of dynamic range compression of the processed image signal $S_{proc}$ can be changed respectively by changing the values of $\beta(S_{org})$ and $D(S_{org}-S_1)$.

$$S_{proc}=S_{org}+\beta(S_{org}) \cdot S_1+D(S_{org}-S_1') \tag{11}$$

wherein $S_{proc}$ is a processed image signal, $S_{org}$ is an original image signal, $\beta(S_{org})$ is a coefficient of enhancement determined on the basis of the original image signal, and $D(S_{org}-S_1)$ is a coefficient of dynamic range compression determined on the basis of the low frequency component signal.

In this case, the high frequency component signal $S_1$ for carrying out the frequency enhancement processing may be obtained by carrying out the transformation processing on the band-limited image signals by the use of the transformation functions shown in FIG. 9, and the high frequency component signal $S_1'$ for carrying out the dynamic range compression processing may be obtained by carrying out the transformation processing on the band-limited image signals by the use of the transformation functions shown in FIG. 20 or 21.

When both the frequency enhancement processing and the dynamic range compression processing are to be carried out, the number of times by which the operation should be performed for the interpolation processing amounts 22364160×3=67092480. This is about ⅟₁.₅ of that in the conventional processing. Accordingly, the operating time can be shortened to about ⅟₁.₅ of that in the conventional processing.

Though, in the embodiments described above, a nonlinear processing is carried out on the band-limited image signals using nonlinear transformation functions, the transformation functions need not be limited to nonlinear functions but may be linear functions or constants.

An image processing system in accordance with a third embodiment of the present invention will be described, hereinbelow. The image processing system of the third embodiment is also for carrying out a frequency enhancement processing on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 23:
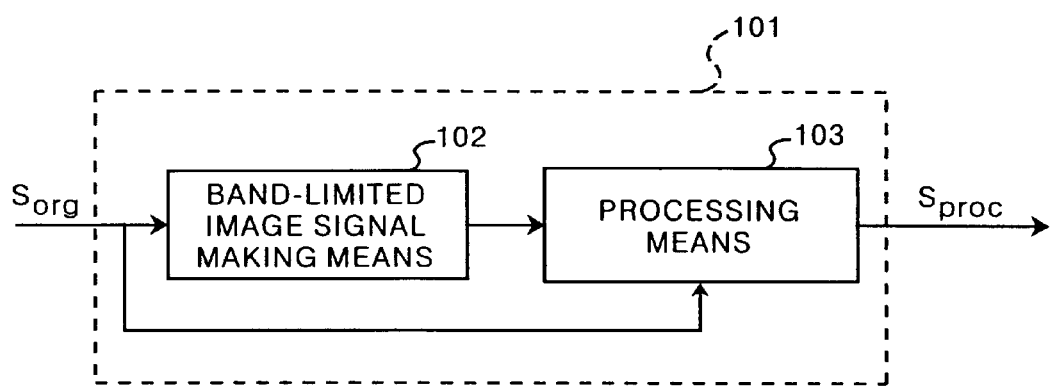
FIG. 23 is a schematic block diagram showing the arrangement of an image processing system in accordance with a third embodiment of the present invention.

In FIG. 23, an image processing system 101 in accordance with the third embodiment of the present invention comprises a band-limited image signal making means 102 which makes a plurality of band-limited image signals representing the frequency response characteristics for the respective frequency bands from an original image signal $S_{org}$ which is input from an image read-out apparatus or the like and has a predetermined resolution, and a processing means 103 which carries out a frequency enhancement processing for enhancing a particular frequency on the original image signal $S_{org}$ on the basis of the band-limited image signals and obtains a processed image signal $S_{proc}$.

Figure 24:
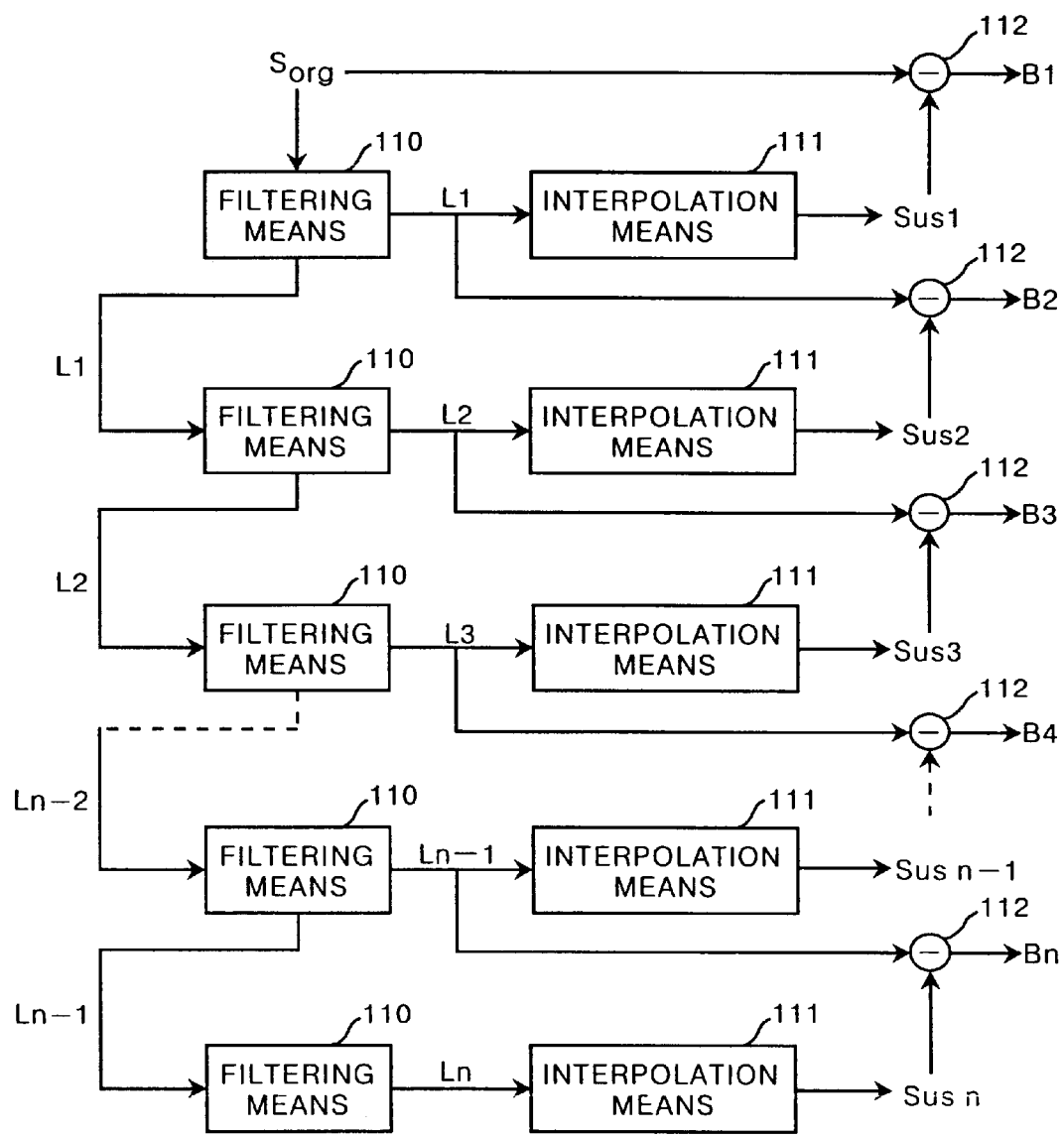
FIG. 24 is a schematic block diagram showing in brief the band-limited image signal making processing employed in the image processing system shown in FIG. 23.

Making the band-limited image signals will be first described, hereinbelow. FIG. 24 is a schematic block diagram showing in brief the band-limited image signal making processing employed in the image processing system shown in FIG. 23. In this particular embodiment, the band-limited image signals are made by the method of Laplacian pyramid disclosed, for instance, in Japanese Unexamined Patent Publication Nos. 5(1993)-244508 and 6(1994)-96200. As shown in FIG. 24, the band-limited image signal making means 102 comprises first to n-th filtering means 110. The first filtering means 110 carries out a filtering processing on the original image signal $S_{org}$ in x- and y-directions (main scanning direction and sub-scanning direction, see FIG. 22) and makes a low resolution image signal $L_1$ which is lower than the original image signal $S_{org}$ in resolution. The second filtering means 110 carries out a similar filtering processing on the low resolution image signal $L_1$ thus obtained and makes a low resolution image signal $L_2$ which is lower than the low resolution image signal $L_1$ in resolution, and the third filtering means 110 carries out a similar filtering processing on the low resolution image signal $L_2$ thus obtained and makes a low resolution image signal $L_3$ which is lower than the low resolution image signal $L_2$ in resolution. In this manner, the n-th filtering means 110 carries out a similar filtering processing on the low resolution image signal $L_{n-1}$ and makes a low resolution image signal $L_n$ which is lower than the low resolution image signal $L_{n-1}$ in resolution. Thus low resolution image signals $L_k$ ($\underline{k}$ stands for 1 to $\underline{n}$) are obtained. The band-limited image signal making means 102 further comprises first to n-th interpolation means 111. The interpolation means 111 carries out an interpolation processing on the low resolution image signals $L_1$ to $L_n$ obtained at the respective stages of filtering to double the number of the picture elements thereof, and makes a plurality of unsharp image signals $S_{us}k$ ($S_{us}1$ to $S_{us}n$) which are different in sharpness. Then the differences between the k-th low resolution image signal $L_k$ and the (k−1)-th unsharp image signal $S_{us}k$ and between the first unsharp image signal $S_{us}1$ and the original image signal $S_{org}$ are calculated by respective subtracters 112. The differences are taken as band-limited image signals $B_k$ ($\underline{k}$ stands for 1 to $\underline{n}$).

In this particular embodiment, filters which substantially correspond to one-dimensional Gaussian distribution are used in the filtering processing. That is, coefficients of the filters are determined according the following formula (5) which relates to a Gaussian signal.

$$f(t) = e^{-\frac{t^2}{2\sigma^2}} \quad (5)$$

This is because the Gaussian signal is good in localization in both a real space and a frequency space. For example, the 5×1 one-dimensional filter is as shown in FIG. 4 when σ=1 in formula (5).

The filtering is carried out on the original image signal $S_{org}$ or the low resolution image signal $L_k$ every second picture element as shown in FIG. 5. When such filtering is carried out in both x- and y-directions, the number of picture elements in obtained low resolution image signal $L_k$ is reduced to ¼ of the preceding image signal (e.g., the original image signal $S_{org}$ in the case of the low resolution image signal $L_1$, and the low resolution image signal $L_1$ in the case of the low resolution image signal $L_2$). That is, the number of picture elements in each of the low resolution image signals $L_k$ (k stands for 1 to n) is $½^{2k}$ of the original image signal $S_{org}$.

The interpolation processing to be carried out on the low resolution image signals $L_k$ thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma=2^{k-1}$, is employed in the following formula (6).

$$I(t) = 2 \cdot \sigma \cdot e^{-\frac{t^2}{2\sigma^2}} \quad (6)$$

For example, when interpolating the low resolution image signal $L_1$, σ=1 since k=1. In this case, a one-dimensional filter of 5×1 such as shown in FIG. 6 is employed in the interpolation. In this interpolation, a picture element of 0 in value is interpolated every second picture element in the low resolution image signal $L_1$, whereby the low resolution image signal $L_1$ is enlarged to have the same number of picture elements as the original image, and the interpolated low resolution image signal $L_1$ is subjected to a filtering processing using the one-dimensional filter shown in FIG. 6.

This interpolation/enlargement processing is carried out on all the low resolution image signals $L_k$. When interpolating a low resolution image signal $L_k$, a filter which is $3 \times 2^k - 1$ in length is prepared according to formula (6) and picture elements of 0 in value are interpolated between each pair of adjacent picture elements, whereby the low resolution image signal $L_k$ is enlarged to have the same number of picture elements as the one-class higher low resolution image signal $L_{k-1}$. Then the interpolated low resolution image signal $L_k$ is subjected to a filtering processing using the filter which is $3 \times 2^k - 1$ in length. Thus unsharp image signals $S_{us}k$ are obtained.

Then band-limited image signals $B_k$ (k=1 to n) are obtained by subtracting each of the unsharp image signals $S_{us}k$ is subtracted from the low resolution image signal $L_{k-1}$ having the same number of picture elements as shown by the following formula (7).

$$B_1 = S_{org} - S_{us}1 \quad (7)$$
$$B_2 = L_1 - S_{us}2$$
$$B_2 = L_2 - S_{us}3$$
$$\vdots$$
$$B_k = L_{k-1} - S_{us}k$$

Specifically, as shown in FIG. 3, when five low resolution image signals $L_1$ to $L_5$ are obtained, interpolation processing is carried out on the lowest resolution image signal $L_5$ and an unsharp image signal $S_{us}5$ having the same number of picture elements as the low resolution image signal $L_4$ is made. Then a band-limited image signal $B_5$ is obtained by subtracting the unsharp image signal $S_{us}5$ from the low resolution image signal $L_4$. Similarly, band-limited image signals $B_4$ to $B_1$ are obtained by operations $L_3-S_{us}4$, $L_2-S_{us}3$, $L_1-S_{us}2$ and $S_{org}-S_{us}1$. The lowest resolution image signal $L_5$ represents low frequency information obtained by contracting the original image, and is not used in the following operation.

Figure 25:
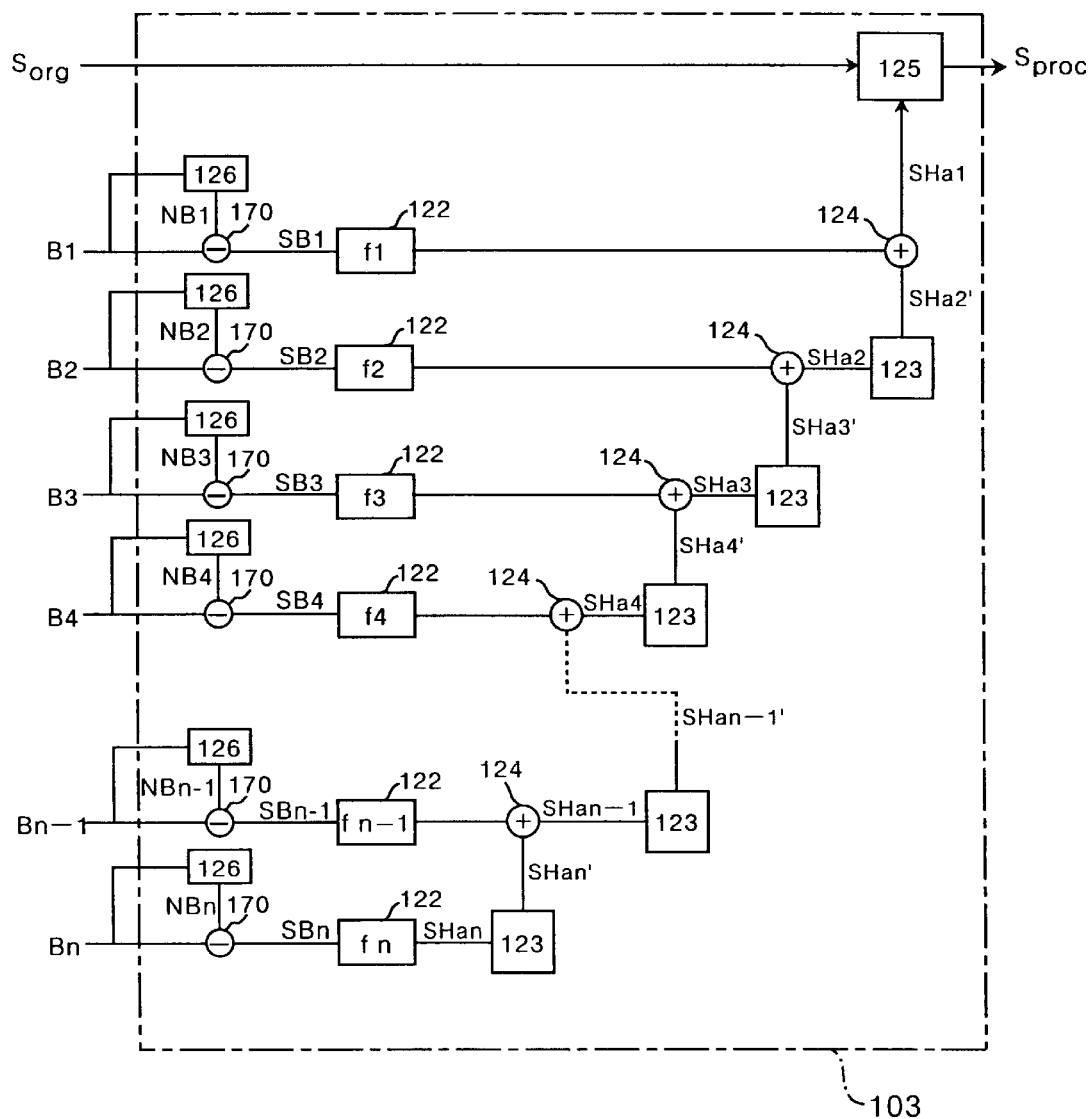
FIG. 25 is a schematic block diagram showing the arrangement of the processing means of the third embodiment.

The transformation processing to be carried out by the use of the band-limited image signals $B_k$ thus obtained will be described, hereinbelow. FIG. 25 shows the structure of the processing means 103. As shown in FIG. 25, noise components are separated from the band-limited image signals $B_k$ (k=1 to n) by noise separation means 126, and noise band-limited image signals $NB_k$ are obtained. The noise separation processing by the noise separation means 126 will be described, hereinbelow.

Figure 26:
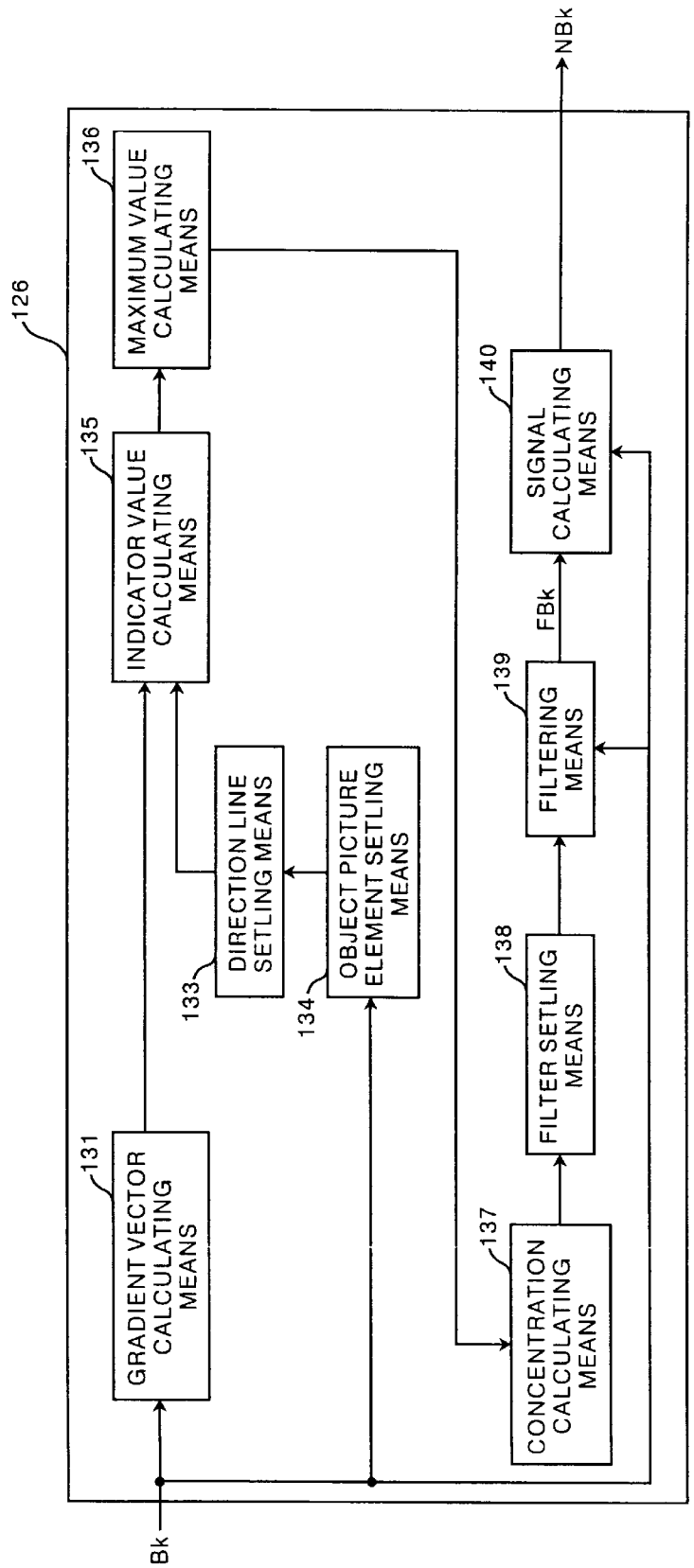
FIG. 26 is schematic diagram showing the arrangement of the noise separation means.

FIG. 26 shows the structure of the noise separation means 126. The noise separation means 126 separates the noise component from the band-limited image signals $B_k$ by a processing using an iris filter, and comprises a gradient vector calculating means 131 which calculates a density gradient vector for each of the picture elements of the band-limited image signals $B_k$ on the basis of the band-limited image signals $B_k$, an object picture element setting means 134 which sets each of the picture elements of the band-limited image signals $B_k$ as an object picture element in sequence, a direction line setting means 133 which sets a plurality of (e.g., 32) radial lines at predetermined angular intervals (e.g., at intervals of 11.25°) about each object picture element set by the object picture element setting means 134 (see FIG. 27), an indicator value calculating means 135 which calculates, for each of the picture elements which are in a predetermined range from the object picture element and on each of the direction lines, an indicator value $\cos\theta_{il}$ based on an angle $\theta_{il}$ between the direction line and the gradient vector of the picture element ($\theta_{il}$ representing the angle between the i-th direction line and the gradient vector of the picture element which is the l-th picture element on the i-th direction line as numbered from the object picture element), a maximum value calculating means 136 which calculates, according to the following formula (12), averages Ci(n) of the indicator values $\cos\theta_{il}$ for the picture elements on each direction line in the range between a start point (the object picture element) and a terminal point which is changed in said predetermined range, and extracts the maximum $Ci_{max}$ (the following formula (13)) of the averages Ci(n), and a concentration calculating means 137 which takes the average of the maximums $Ci_{max}$ for the 32 direction lines ($\Sigma Ci_{max}/32$) and calculates the concentration C of the gradient vectors (the following formula (14)) for each object picture element.

$$Ci(n) = \sum^{n} \{(\cos\theta_{il})/n\} \qquad (12)$$

$$Ci_{max} = \max Ci(n) \qquad (13)$$

$$C = (1/32)\sum^{32} Ci_{max} \qquad (14)$$

The noise separation means 126 further comprises a filter setting means 138 which sets coefficients of a spatial filter so that weight on an object picture element is increased as the concentration C increases (the probability that the object picture element is on an edge of the image is increased) and is reduced as the concentration C reduces (the probability that the object picture element is on an edge of the image is reduced), a filtering means 139 which carries out a filtering processing on the band-limited image signals $B_k$ by use of the spatial filter whose coefficients of filter is set by the filter setting means 138 and obtains filtered band-limited image signals $FB_k$, and a signal calculating means 140 which calculates the noise band-limited image signals $NB_k$ by subtracting the filtered band-limited image signals $FB_k$ from the band-limited image signals $B_k$.

The iris filter is described in detail, for instance, in "Detection of shadow of mass in DR image (Iris filter)", Obata et al., Journal of Academy of Electronic Information and Communication, D-II, Vol.J75-D-II, No.3, pp663 to 670, March 1992) and"Iris filter and analysis of properties thereof", Obata et al., Papers of Academy of Measurement and Automatic Control, 1998 Vol. 34, No. 4, pp326 to 332. The iris filtering processing has been studied as an effective technique for detecting the shadow of mass which is a particular form of breast cancer, and the iris filter employed in the filtering processing calculates gradients of an image signal as gradient vectors and outputs the concentration of the gradient vectors. In the iris filtering processing, the shadow of mass is detected on the basis of the concentration of the gradient vectors. In this particular embodiment, the degree at which each picture element is positioned on a segment such as an edge is obtained on the basis of the concentration of the gradient vectors for each of the band-limited image signals $B_k$ calculated by the iris filtering processing.

Figures 27, 28:
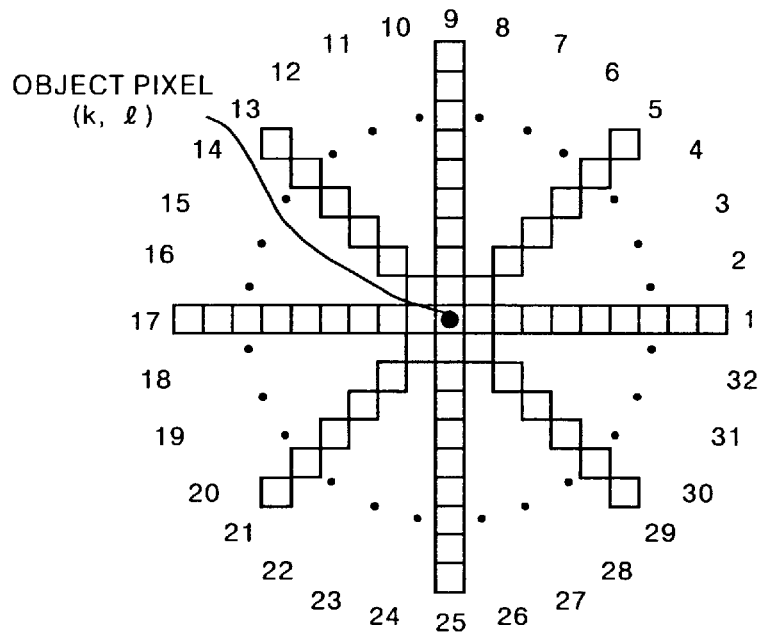
FIG. 27 is a view for illustrating the iris filter.
FIG. 28 is a view for illustrating the mask for calculating the gradient vectors in the iris filter.

The gradient vector calculating means 131 obtains the orientation of the density gradient vector according to the following formula (15) by the use of values of the picture elements positioned along the outer periphery of a mask shown in FIG. 28. Though the mask shown in FIG. 28 is 5 pixels×5 pixels in size, a mask of any size may be employed.

$$\theta = \tan^{-1}\frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \qquad (15)$$

The number of the direction lines to be set by the direction line setting means 133 need not be limited to 32. However, when it is excessively large, load on operation becomes too heavy and when it is too small, the edge components cannot be accurately detected. From the viewpoint of convenience of operation, it is preferred that the direction lines be at regular angular intervals.

The value of the concentration C calculated by the concentration calculating means 137 becomes large when the orientations of the gradient vectors are focused on the object picture element.

In the filter setting means 138, the coefficients of filter of the spatial filter for carrying out a smoothing processing according to the value of the concentration C are set. That is, the probability that the object picture element is on an edge of the image is increased as the concentration C increases, and the probability that the object picture element is on a portion other an edge of the image is increased as the concentration C reduces. Accordingly, the coefficients of the spatial filter are set so that weight on an object picture element is increased as the concentration C increases.

Specifically, edge components and other components are separated by carrying out binary-coding in which picture elements having a concentration C higher than a predetermined threshold value is given a value of 1 and picture elements having a concentration C not higher than the predetermined threshold value is given a value of 0. When a base spatial filter FO is a smoothing filter of 3×3 and the coefficients of filter of the base spatial filter F0 are as shown in FIG. 29A, the coefficients of filter of the spatial filter F1 for filtering the band-limited image signals $B_k$ are set by weighting the coefficients of the base spatial filter F0 according to the binary-coded concentrations C. For example, when a given object picture element is on an edge component and the binary-coded concentrations C of the picture elements in the 3×3 range about the object picture element are as shown in FIG. 29B, the coefficients of filter of the spatial filter F1 are set as shown in FIG. 29C. To the contrast, when a given object picture element is on a portion other than an edge component and the binary-coded concentrations C of the picture elements in the 3×3 range about the object picture element are as shown in FIG. 29D, the coefficients of filter of the spatial filter F1 are set as shown in FIG. 29E. Accordingly, when the band-limited image signals $B_k$ are smoothened by the spatial filter F1, the edge components are smoothened in directions where the edge components exist and the edge components are not made unsharp. The components other than the edge components are given a value of 0.

The filtering means 139 carries out a filtering processing on the band-limited image signals $B_k$ by use of the spatial filter F1 set by the filter setting means 138 and obtains filtered band-limited image signals $FB_k$. Though the band-limited image signals $B_k$ are smoothened by the filtering processing, the edge components are smoothened in directions where the edge components exist. Accordingly, only the smoothened edge components remain in the filtered band-limited image signals $FB_k$.

The signal calculating means 140 calculates the noise band-limited image signals $NB_k$ by subtracting the filtered band-limited image signals $FB_k$ from the band-limited image signals $B_k$. Since the filtered band-limited image signals $FB_k$ have been smoothened, the noise band-limited image signals $NB_k$ represent the noise component in the band-limited image signals $B_k$. Since the filtered band-limited image signals $FB_k$ have been smoothened in the direction in which the edge components exist, the noise component includes also noise on the edges.

The band-limited image signals $B_k$ input into the noise separation means 126 are first input into the gradient vector calculating means 131, the object picture element setting means 134 the filtering means 139 and the signal calculating means 140. The gradient vector calculating means 131 obtains the orientations θ of the density gradient vector for all the picture elements by the use of values of the picture elements positioned along the outer periphery of a 5×5 mask. The orientations θ of the density gradient vector obtained are input into the indicator value calculating means 135.

The object picture element setting means 134 sets each of all the picture elements of the band-limited image signals $B_k$ as an object picture element in sequence and inputs the object picture element set into the direction line setting means 133. The direction line setting means 133 sets a plurality of (e.g., 32) radial lines at predetermined angular intervals (e.g., at intervals of 11.25°) about the object picture element. The direction lines set are input into the indicator value calculating means 135.

The indicator value setting means 135 superposes the 32 directions lines input from the direction line setting means 133 on the picture elements input from the gradient vector calculating means 131 which are defined with their orientations θ of the density gradient vector and are two-dimensionally arranged as in the band-limited image signals $B_k$, and extracts the picture elements on each of the direction lines.

The indicator value setting means 135 calculates an indicator value $\cos \theta_{il}$ based on an angle $\theta_{il}$ between the direction line and the gradient vector of the picture element ($\theta_{il}$ representing the angle between the i-th direction line and the gradient vector of the picture element which is the l-th picture element on the i-th direction line as numbered from the object picture element) for each picture element on each direction line. The indicator values $\cos \theta_{il}$ for the picture elements on each of the direction lines are input into the maximum value calculating means 136. The maximum value calculating means 136 calculates averages Ci(n) of the indicator values $\cos \theta_{il}$ for the picture elements on each direction line in the range between a start point (the object picture element) and a terminal point which is changed in said predetermined range, and extracts the maximum $Ci_{max}$ of the averages Ci(n).

The maximums $Ci_{max}$ of the averages Ci(n) thus obtained for the respective direction lines are input into the concentration calculating means 137. The concentration calculating means 137 takes the average of the maximums $Ci_{max}$ for the 32 direction lines and calculates the concentration C of the gradient vectors for each object picture element. The concentration C of the gradient vectors are input into the filter setting means 138.

Repeating these steps while changing the object picture element in sequence and the concentrations C of the gradient vectors for all the picture elements are input into the filter setting means 138.

The filter setting means 138 sets a spatial filter F1 in which weight on an object picture element is increased as the concentration C increases, and the filtering means 139 carries out a filtering processing on the band-limited image signals $B_k$ by use of the spatial filter set by the filter setting means 138 and obtains filtered band-limited image signals $FB_k$. The filtering means 139 inputs the filtered band-limited image signals $FB_k$ into the signal calculating means 140.

The signal calculating means 140 calculates the noise band-limited image signals $NB_k$ by subtracting the filtered band-limited image signals $FB_k$ from the band-limited image signals $B_k$.

The noise band-limited image signals $NB_k$ are subtracted from the band-limited image signals $B_k$ by subtracters 170 (the noiseless band-limited image signal obtaining means) and noiseless band-limited image signals $SB_k$ are obtained. The noiseless band-limited image signals $SB_k$ are substantially equal to the filtered band-limited image signals $FB_k$ obtained by the filtering means 139. The noiseless band-limited image signals $SB_k$ are suppressed to predetermined sizes with transformation functions $f_1$ to $f_n$ in respective transformation circuits 122 and transformed noiseless band-limited signals $f_k SB_k$ are obtained. The transformation function $f_1$ may be as shown in FIG. 9. The function shown in FIG. 9 is a nonlinear function whose inclination is 1 in the range where the absolute value of the band-limited image signal $B_k$ is not larger than a threshold value Th1 and is smaller than 1 in the range where the absolute value of the band-limited image signal $B_k$ is larger than the threshold value Th1. The transformation functions for the respective band-limited image signals $B_k$ may be equal to or different from each other.

The transformed noiseless band-limited signal $f_k SB_n$ which is the lowest in the resolution in the transformed noiseless band-limited signals $f_k SB_k$ is taken as a transformed noiseless signal $SH_{an}$ and the transformed noiseless signal $SH_{an}$ is subjected to an interpolation processing to have the same number of picture elements as the one-class higher transformed noiseless band-limited signal $f_{n-1} SB_{n-}$ by the interpolation means 123, whereby an enlarged noiseless signal $SH_{an}'$ is obtained. Thereafter the enlarged noiseless signal $SH_{an}'$ is added to the transformed noiseless band-limited signal $f_{n-1} SB_{n-1}$ by an adder 124 and another transformed noiseless signal $SH_{an-1}$ is obtained. Then the transformed noiseless signal $SH_{an-1}$ is interpolated and enlarged, and another enlarged noiseless signal $SH_{an-1}'$ is obtained and the enlarged noiseless signal $SH_{an-1}'$ is added to the transformed noiseless band-limited signal $f_{n-2} SB_{n-2}$, whereby a transformed noiseless signal $SH_{an-2}$ is obtained. By repeating these steps, a highest resolution transformed noiseless signal $SH_{a1}$ is obtained and is taken as the high frequency component signal.

Figure 30:
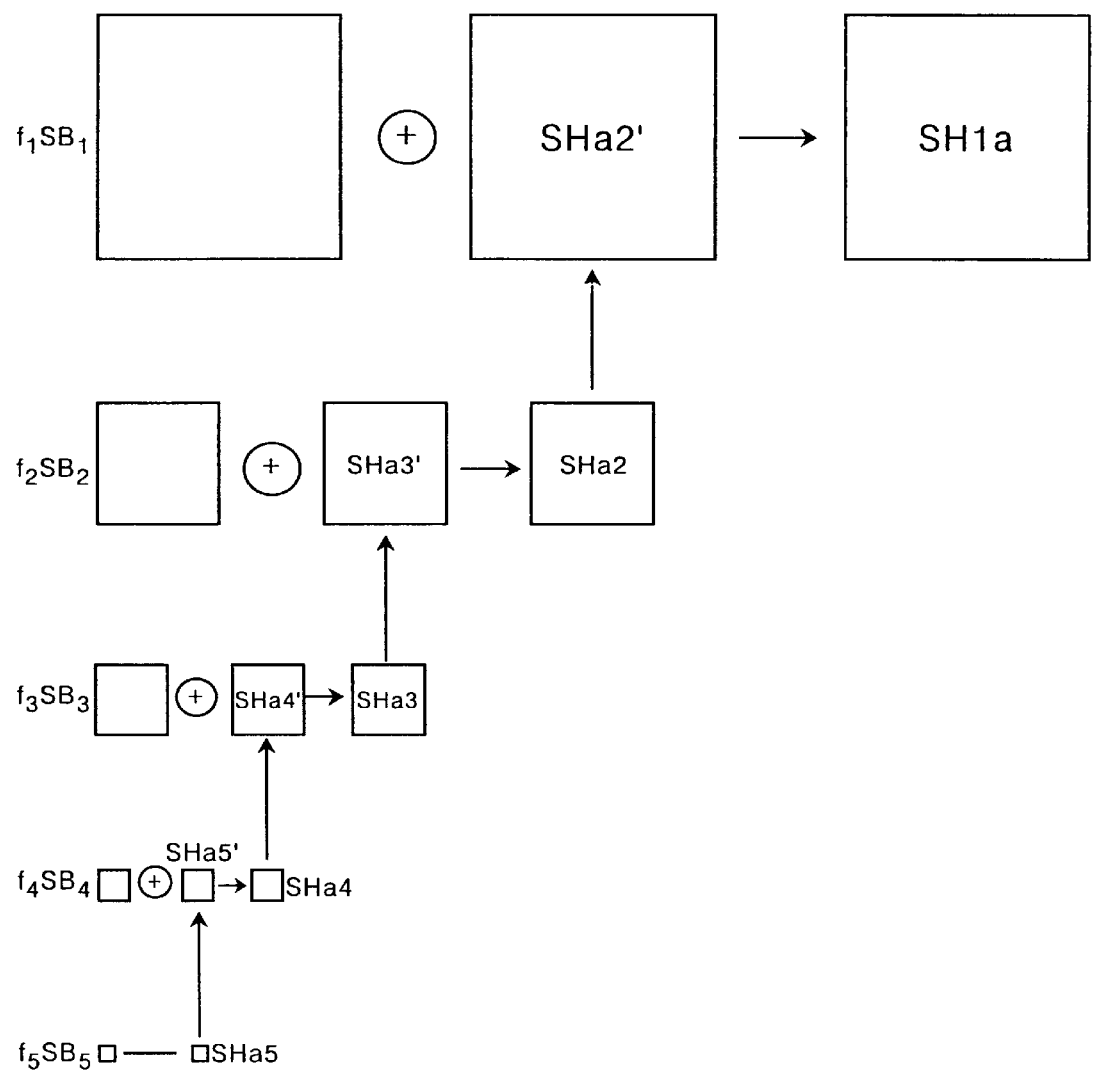
FIG. 30 is a view graphically showing the processing to be executed by the processing means.

Specifically, as shown in FIG. 30, when five classes of band-limited image signals $B_1$ to $B_5$ are obtained, transformed noiseless band-limited signals $f_1 SB_1$ to $f_5 SB_5$ are obtained next. The transformed noiseless band-limited signal $f_5 SB_5$ which is the lowest in the resolution is taken as a transformed noiseless signal $SH_{a5}$ and the transformed noiseless signal $SH_{a5}$ is subjected to an interpolation processing to have the same number of picture elements as the one-class higher transformed noiseless band-limited signal $f_4SB_4$, whereby an enlarged noiseless signal $SH_{a5}'$ is obtained. Thereafter the enlarged noiseless signal $SH_{a5}'$ is added to the transformed noiseless band-limited signal $f_4SB_4$ and another transformed noiseless signal $SH_{a4}$ is obtained. In this manner, transformed noiseless signals $SH_{a3}$ and $SH_{a2}$ are obtained and a highest resolution transformed noiseless signal $SH_{a1}$ is finally obtained as the high frequency component signal.

The transformation circuits 122, the interpolation means 123 and the adders 124 form a high frequency component obtaining means in this particular embodiment.

When the high frequency component signal $SH_{a1}$ is obtained, an operator 125 (an image processing means) multiplies the high frequency component signal $SH_{a1}$ by a coefficient of enhancement $\beta(S_{org})$ which is a parameter representing the degree of frequency enhancement and is determined according to the original image signal $S_{org}$ and the product is added to the original image signal $S_{org}$, whereby a processed image signal $S_{proc}$ is obtained as represented by the following formula (16).

$$S_{proc}=S_{org}+\beta(S_{org})\cdot SH_{a1} \quad (16).$$

wherein $S_{proc}$ is a processed image signal, $S_{org}$ is an original image signal, and $\beta(S_{org})$ is a coefficient of enhancement determined on the basis of the original image signal.

By changing the value of the coefficient of enhancement $\beta(S_{org})$, the degree of image processing of the processed image. signal $S_{proc}$ can be freely changed.

Figure 31:
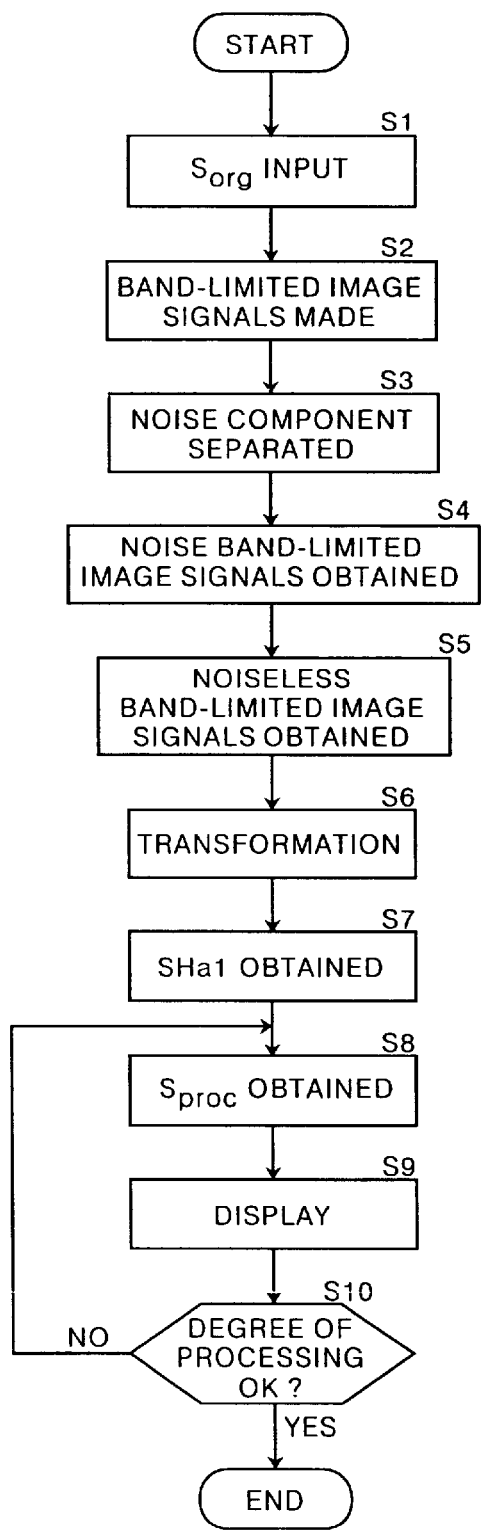
FIG. 31 is a flow chart for illustrating operation of the image processing system of the third embodiment.

Operation of the image processing system 101 of this embodiment will be described with reference to the flow chart shown in FIG. 31. An original image signal $S_{org}$ is first input into the image processing system 101, for instance, from an image read-out apparatus. (step S1) The original image signal $S_{org}$ is input into the band-limited image signal making means 102 and band-limited image signals $B_k$ representing the frequency response characteristics for the respective frequency bands are made. (step S2) The noise component of the band-limited image signals $B_k$ is separated and the noise band-limited image signals $NB_k$ are obtained. (steps S3 and S4) The noiseless band-limited image signals $SB_k$ are obtained by subtracting the noise band-limited image signals $NB_k$ from the band-limited image signals $B_k$. (step S5)

The noiseless band-limited image signals $SB_k$ are transformed into transformed noiseless band-limited signals $f_kSB_k$ by transformation functions such as shown in FIG. 9. (step S6) Then obtaining a transformed noiseless signal $SH_{ak}$ by interpolation of transformed noiseless band-limited signals $f_kSB_k$ to the one-class higher frequency band and obtaining a transformed noiseless signal $SH_{ak-1}$ by addition of the transformed noiseless signal $SH_{ak}$ to the transformed noiseless band-limited signals $f_kSB_k$ in the same frequency band are repeated until the transformed noiseless signal $SH_{a1}$ in the highest frequency band, i.e., the high frequency component signal $SH_{a1}$, is obtained. (step S7)

Then, a processed image signal $S_{proc}$ is obtained by use of the high frequency component signal $SH_{a1}$ according to the aforesaid formula (16). (step S8) A visible image is displayed on a monitor (not shown) on the basis of the processed image signal $S_{proc}$. (step S9) The operator observes the image, and if it is necessary to change the degree of frequency enhancement processing, the operator inputs information on the degree by which the degree of frequency enhancement processing is to be changed into the processing means 103. (step S10) Upon receipt of the information, the processing means redoes steps S8 to S10 after changing the coefficient of enhancement $\beta(S_{org})$ in the aforesaid formula (16). This is repeated until the degree of frequency enhancement processing becomes proper.

As can be understood from the description above, in the image processing of this embodiment, the degree of image processing on the original image signal $S_{org}$ can be freely changed by only changing the value of the coefficient of enhancement $\beta(S_{org})$, and accordingly, the degree of image processing can be easily changed in a shorter time as compared with the method disclosed in Japanese Unexamined Patent Publication No. 5(1993)-244508 where the degree of image processing is changed by correcting the nonlinear functions and reconstructing an image, whereby the time required to obtain a processed image signal is shortened. When different image signals are to be displayed on a CRT or the like on the basis of different processed image signals $S_{proc}$ obtained by variously changing the contents of the image processing, stress on the operator can be lightened. Further since the noise band-limited image signals $NB_k$ are subtracted from the band-limited image signals $B_k$, the processed image signal $S_{proc}$ is free from noise.

The amount of operation for obtaining the high frequency component signal $S_1$ in the processing in the third embodiment will be compared with that in a conventional system, hereinbelow.

FIG. 11 graphically shows a conventional processing disclosed in the aforesaid Japanese Unexamined Patent Publication No. 10(1998)-75395. As shown in FIG. 11, in the conventional processing, low resolution image signals $L_k$ are obtained as in the first embodiment and an interpolation processing is carried out on the low resolution image signals $L_k$, thereby obtaining unsharp image signals $S_{us}k$ having the same number of picture elements as the original image signal $S_{org}$. Then subtraction is carried out between the unsharp image signals $S_{us}k$ and between the original image signal $S_{org}$ and the unsharp image signals $S_{us}1$, whereby band-limited image signals $B_k$ having the same number of picture elements as the original image signal $S_{org}$. Then the band-limited image signals $B_k$ are transformed by use of transformation functions and a processed image signal $S_{proc}$ is obtained by adding to the original image signal $S_{org}$ products of the transformed band-limited image signals $B_k$. This processing is represented by the following formula (9).

$$S_{proc} = S_{org} + \beta(S_{org}) \times F_{usm}(S_{org}, S_{us}1, S_{us}2, \ldots S_{us}n) \quad (9)$$

$$F_{usm}(S_{org}, S_{us}1, S_{us}2, \ldots S_{us}n) =$$

$$f_1(S_{org} - S_{us}1) + f_2(S_{us}1 - S_{us}2) + \ldots +$$

$$f_k(S_{us}k - 1 - S_{us}k) + \ldots + f_n(S_{us}n - 1 - S_{us}n)$$

wherein $S_{proc}$ is a processed image signal, $S_{org}$ is an original image signal, $S_{us}k$ (k=1 to n) is an unsharp image signal, $f_k$(k=1 to n) is a transformation function for transforming each band-limited image signals, and $\beta(S_{org})$ is a coefficient of enhancement determined on the basis of the original image signal.

In the conventional processing described above, an interpolation processing for increasing the picture elements of the low resolution image signals $L_k$ to the number equal to that of the picture elements of the original image signal $S_{org}$. Accordingly, assuming that the number of picture elements of the original image is 1024×1024 and six low resolution image signals $L_1$ to $L_6$ are obtained from the original image signal $S_{org}$, and the en interpolation processing is such that one picture element is obtained by the use of sixteen picture elements in a range of 4×4, operation must be performed 100663296 (1024×1024×16×6) times. To the contrast, in the case of this embodiment, the unsharp image signals $S_{us}k$ have a number of picture elements corresponding to the respective frequency bands and an interpolation processing is performed when the transformed noiseless signals $SH_{ak}$ obtained from the transformed noiseless band-limited signals $f_k SB_k$ are enlarged. The number of times by which the operation should be performed may be only 22364160= [(1024×1024 +512×512+256×256+128×128+64×64+32× 32)×16]. Actually, since the interpolation processing is also performed when obtaining the unsharp image signals $S_{us}k$, the number of times by which the operation should be performed amounts 44728320. Accordingly the total amount of operation in the processing of this embodiment is about $\frac{1}{2.25}$ of that in the conventional processing. Accordingly, the operating time can be shortened to about $\frac{1}{2.25}$ of that in the conventional processing.

The method of making the band-limited image signals need not be limited to that described above. For example, the band-limited image signals may be made by a method disclosed in the aforesaid Japanese Unexamined Patent Publication No. 10(1998)-75395.

Though, in the third embodiment described above, the band-limited image signals representing the characteristics of the respective frequency bands are obtained from the original image signal $S_{org}$ by a method of Laplacian pyramid, the band-limited image signals may be obtained by a wavelet transformation as disclosed in Japanese Unexamined Patent Publication No. 6(1994)-274615. An image processing system in accordance with to a fourth embodiment of the present invention where a wavelet transformation is used will be described, hereinbelow.

Figure 32:
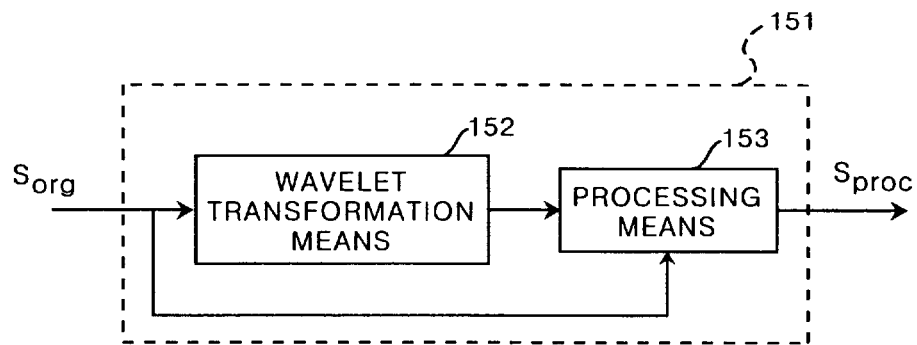
FIG. 32 is a schematic block diagram showing the arrangement of an image processing system in accordance with a fourth embodiment of the present invention.

FIG. 32 is a block diagram showing the image processing system of the fourth embodiment. In FIG. 32, the image processing system 151 in accordance with the fourth embodiment of the present invention comprises a wavelet transformation means 152 which carries out a wavelet transformation on an original image signal $S_{org}$ which is input from an image read-out apparatus or the like and has a predetermined resolution, and a processing means 153 which carries out a frequency enhancement processing for enhancing a particular frequency on the original image signal $S_{org}$ on the basis of the signals obtained by the wavelet transformation and obtains a processed image signal $S_{proc}$. The main scanning direction and the sub-scanning direction as used in the following description are as shown in FIG. 22.

Figure 33:
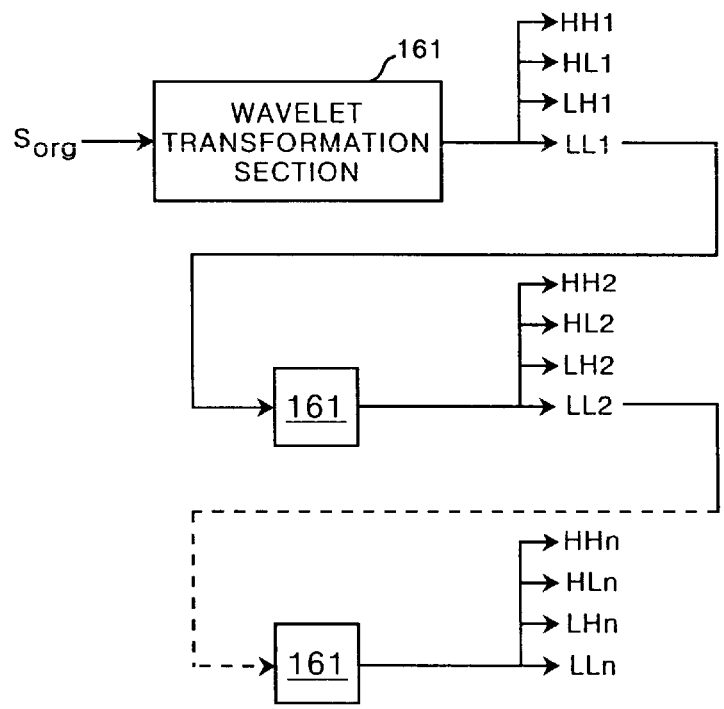
FIG. 33 is a schematic block diagram showing the wavelet transformation means.
Figure 34:
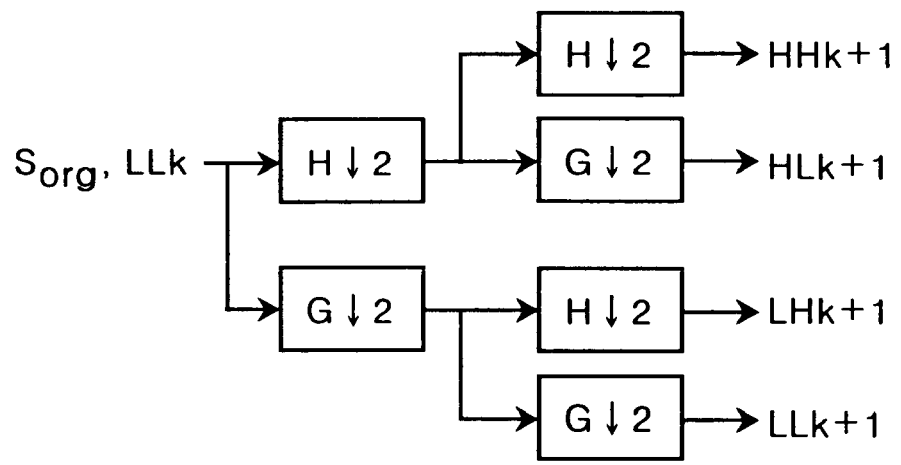
FIG. 34 is a block diagram for illustrating the processing executed by the wavelet transformation section.

FIG. 33 shows the structure of the wavelet transformation means 152. In this particular embodiment, the wavelet transformation means 152 carries out an orthogonal wavelet transformation where the coefficients of wavelet transformation are orthogonal to each other. As shown in FIG. 33, the original image signal $S_{org}$ is subjected to a wavelet transformation by a wavelet transformation section 161. FIG. 34 is a block diagram showing the wavelet transformation to be carried out by the wavelet transformation section 161. As shown in FIG. 34, a filtering processing is carried out on the original image signal $S_{org}$ (signal $LL_k$) in the main scanning direction by the use of fundamental wavelet functions H and G, and every second picture element is thinned in the main scanning direction (indicated at $\downarrow 2$ in FIG. 34), thereby reducing the number of picture elements in the main scanning direction by half. The function H is a high-pass filter and the function G is a low-pass filter. Then a filtering processing is carried out on each of the thinned signals in the sub-scanning direction by the use of the fundamental wavelet functions H and G, and every second picture element is thinned in the sub-scanning direction, thereby reducing the number of picture elements in the sub-scanning direction by half. Thus wavelet transformation coefficient signals $HH_1$, $HL_1$, $LH_1$ and $LL_1$ ($HH_{k+1}$, $HL_{k+1}$, $LH_{k+1}$ and $LL_{k+1}$) are obtained. The signal $LL_1$ represents an image obtained by reducing the original image to ½ in both longitudinal and lateral directions. The signals $HL_1$, $LH_1$ and $HH_1$ respectively represent a longitudinal edge, a lateral edge and an oblique edge in the image reduced to half of the original image in both the longitudinal and lateral directions.

Then the signal $LL_1$ is further subjected to the wavelet transformation by the wavelet transformation section 161 and signals $HH_2$, $HL_2$, $LH_2$ and $LL_2$ are obtained. The signal $LL_2$ represents an image obtained by reducing the original image to ¼ in both the longitudinal and lateral directions. The signals $HL_2$, $LH_2$ and $HH_2$ respectively represent a longitudinal edge, a lateral edge and an oblique edge in the image reduced to quarter tof the original image in both the longitudinal and lateral directions.

Then by carrying out the wavelet transformation n times on each of the wavelet transformation coefficient signal $LL_k$ in the respective frequency bands, wavelet transformation coefficient signals $HH_1$ to $HH_n$, $HL_1$ to $HL_n$, $LH_1$ to $LH_n$ and $LL_1$ to $LL_n$ are obtained. The wavelet transformation coefficient signals $HH_n$, $HL_n$, $LH_n$ and $LL_n$ obtained by the n-th wavelet transformation are $(½)^n$ of the original image signal $S_{org}$ in the number of picture elements in each of the main scanning direction and the sub-scanning direction. Accordingly, as the value of n increases, the frequency band of the wavelet transformation coefficient signal becomes lower and the wavelet transformation coefficient signal represents a lower frequency component of the original image signal. That is, the wavelet transformation coefficient signal $HH_k$ (k=0 to n) represents change in frequency of the original image signal $S_{org}$ in both the main scanning direction and the sub-scanning direction and the frequency represented by the wavelet transformation coefficient signal $HH_k$ becomes lower as the value of k increases. The wavelet transformation coefficient signal $HL_k$ (k=0 to n) represents change in frequency of the original image signal $S_{org}$ in the main scanning direction and the frequency represented by the wavelet transformation coefficient signal $HL_k$ becomes lower as the value of k increases. Further, the wavelet transformation coefficient signal $LH_4$ (k=0 to n) represents change in frequency of the original image signal $S_{org}$ in the sub-scanning direction and the frequency represented by the wavelet transformation coefficient signal $LH_4$ becomes lower as the value of k increases.

The wavelet transformation coefficient signals for a plurality of frequency bands are shown in FIGS. 15A and 15B. For the purpose of simplicity, only the wavelet transformation coefficient signals obtained by first and second wavelet transformations are shown in FIGS. 15A and 15B. In FIG. 15B, the signal $LL_2$ represents an image obtained by reducing the original image to ¼ in both the main scanning direction and the sub-scanning direction.

In the wavelet transformation coefficient signals $HH_k$, $HL_k$, $LH_k$ and $LL_k$, the signals $HH_k$, $HL_k$ and $LL_k$ represent the edge components in the corresponding frequency band. In other words, these signals represent images having particular frequency bands of the original image (band-pass characteristics) and mainly represent the contrast of the image in the respective frequency bands. As described above, the wavelet transformation coefficient signal $LL_k$ represents a contraction of the original image. In this particular embodiment, the wavelet transformation coefficient signals $HH_k$, $HL_k$ and $LH_k$ are referred to as "the band-limited image signals" and the wavelet transformation coefficient signal $LL_k$ are referred to as "the resolution signal". Then "the band-limited image signals" together with "the resolution signal" are referred to as "the wavelet transformation coefficient signals". The lowest resolution signal $LL_n$ is not necessary to obtain the band-limited image signals and accordingly is taken as 0.

Figure 35:
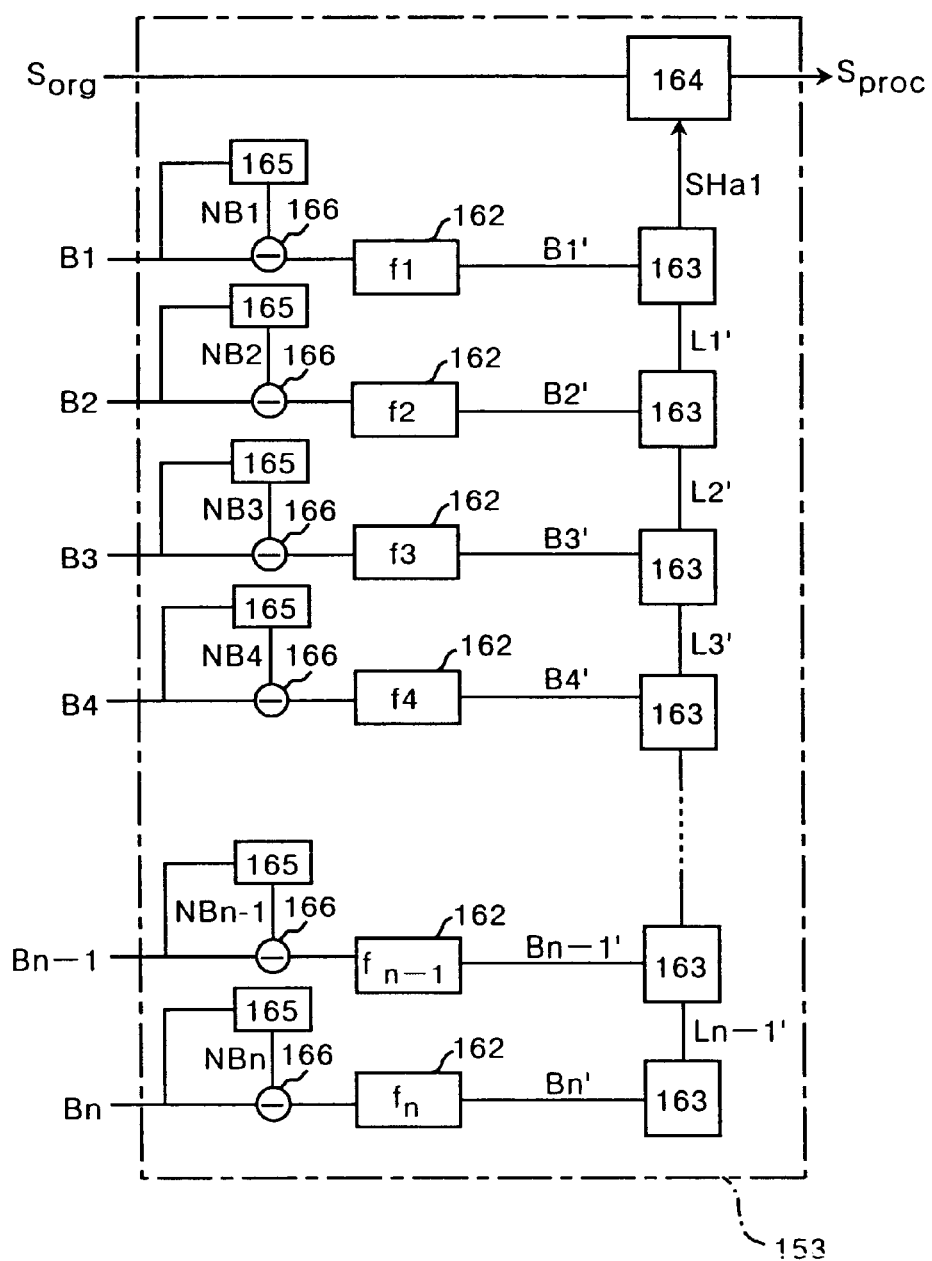
FIG. 35 is a schematic block diagram showing the arrangement of the processing means of the fourth embodiment.

The processing means 153 carries out a frequency enhancement processing as the processing means 103 in the third embodiment. FIG. 35 shows the structure of the processing means 153. As shown in FIG. 35, the band-limited image signals $B_k$ ($HH_k$, $HL_k$ and $LH_k$) obtained by the wavelet transformation means 152 are input into a noise separation means 165. The noise separation means 165 is of the same structure as the noise separation means 126 in the third embodiment, and noise band-limited image signals $NB_k$ ($NHH_k$, $NHL_k$, $NLH_k$) are obtained in the same manner as in the third embodiment. That is, by considering the band-limited image signals $HH_k$, $HL_k$ and $LH_k$ as the band-limited image signals $B_k$ in the third embodiment, and carrying out calculation of the concentrations by the iris filter, setting of the spatial filter, filtering processing by the spatial filter, and subtraction of the filtered signals from the band-limited image signals $HH_k$, $HL_k$ and $LH_k$ in the same manner as described above, the noise band-limited image signals $NHH_k$, $NHL_k$ and $NLH_k$ are obtained.

When the noise band-limited image signals $NB_k$ are thus obtained, noiseless band-limited image signals $SB_k$ are obtained by subtracting the noise band-limited image signals $NB_k$ from the band-limited image signals $B_k$ by subtracters 166.

Figure 36:
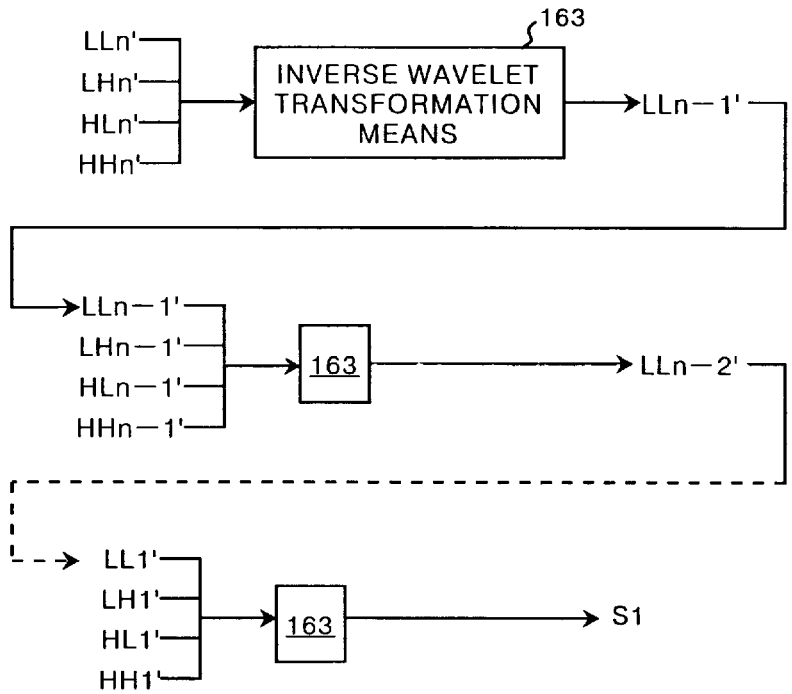
FIG. 36 is a view for illustrating the inverse wavelet transformation.

The noiseless band-limited image signals $SB_k$ are suppressed to desired sizes with transformation functions $f_1$ to $f_n$ in respective transformation circuits 162 and transformed band-limited signals $B_k'$ ($HH_k'$, $HL_k'$ and $LH_k'$, k=1 to $\underline{n}$) are obtained. An inverse wavelet transformation is carried out on the transformed band-limited signals $HH_k'$, $HL_k'$ and $LH_k'$ in an inverse wavelet transformation means 163. As shown in FIG. 36, the inverse wavelet transformation means 163 carries out an inverse wavelet transformation on the transformed band-limited signals $HH_n'$, $HL_n'$ and $LH_n'$ in the lowest frequency band ($LL_n$=0) and a processed signal $LL_{n-1}'$ is obtained.

Figure 37:
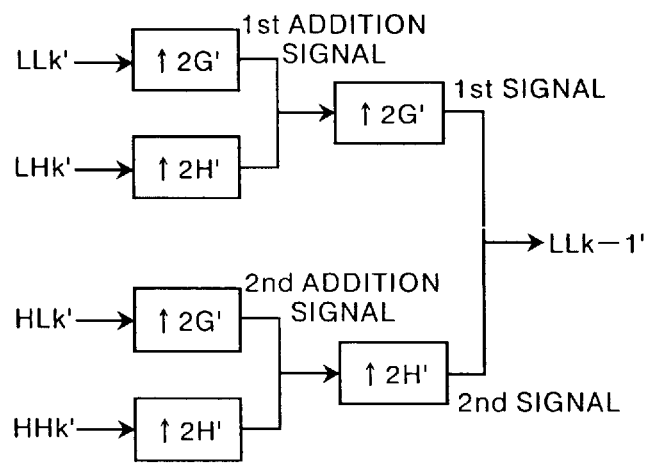
FIG. 37 is a block diagram showing the processing executed by the inverse wavelet transformation means.

FIG. 37 shows the processing executed by the inverse wavelet transformation means 163. As shown in FIG. 37, the transformed noiseless band-limited image signal $LL_n'$ ($LL_k'$, $LL_n$=0 when k=n) and the transformed noiseless band-limited image signal $LH_n'$ ($LH_k'$) are subjected to a processing for enlarging each space between picture elements by one picture element (indicated at ↑2 in FIG. 37) in the sub-scanning direction and the processed signals are further subjected to a filtering processing by the use of inverse wavelet transformation functions G' and H', which are inverse to the aforesaid functions G and H, and the signals obtained are added up to obtain a first addition signal. Then the first addition signal is subjected to a processing for enlarging each space between picture elements by one picture element in the main scanning direction and the processed signal is further subjected to a filtering processing by the use of inverse wavelet transformation functions G', where by a first signal is obtained. On the other hand, the signal $HL_n'$ ($HL_k'$) and the signal $HH_n'$ ($HH_k'$) are subjected to a processing for enlarging each space between picture elements by one picture element in the sub-scanning direction and the processed signals are further subjected to a filtering processing by the use of the inverse wavelet transformation functions G' and H' and the signals obtained are added up to obtain a second addition signal. Then the second addition signal is subjected to a processing for enlarging each space between picture elements by one picture element in the main scanning direction and the processed signal is further subjected to a filtering processing by the use of inverse wavelet transformation functions H', whereby a second signal is obtained. Then transformed noiseless band-limited signal $LL_{n-1}'$ ($LL_{k-}'$) is obtained by adding the first signal to the second signal. Since the wavelet transformation coefficient signal $LL_n$ at the lowest resolution is 0, the transformed noiseless band-limited signal $LL_{n-1}'$ represents the band-pass characteristic of the original image signal $S_{org}$.

Thereafter the inverse wavelet transformation is carried out by the inverse wavelet transformation means 163 on the transformed noiseless band-limited image signals $HH_{n-1}'$, $HL_{n-1}'$, $LH_{n-1}'$ and $LL_{n-1}'$ in the same manner and a transformed noiseless band-limited image signal $LL_{n-2}'$ is obtained. By repeating these steps, transformed noiseless band-limited signals in the highest frequency band $HH_1'$, $HL_1'$ and $LL_1'$ are obtained. Further by carrying out the inverse wavelet transformation on the transformed noiseless band-limited signals $HH_1'$, $HL_1'$ and $LL_1'$, a high frequency component signal $SH_{a1}$ is obtained.

As in the third embodiment, operation represented by the aforesaid formula (16) is carried out by an operator 164 on the basis of the high frequency component signal $SH_{a1}$ and a processed image signal $S_{proc}$ is obtained.

Figure 38:
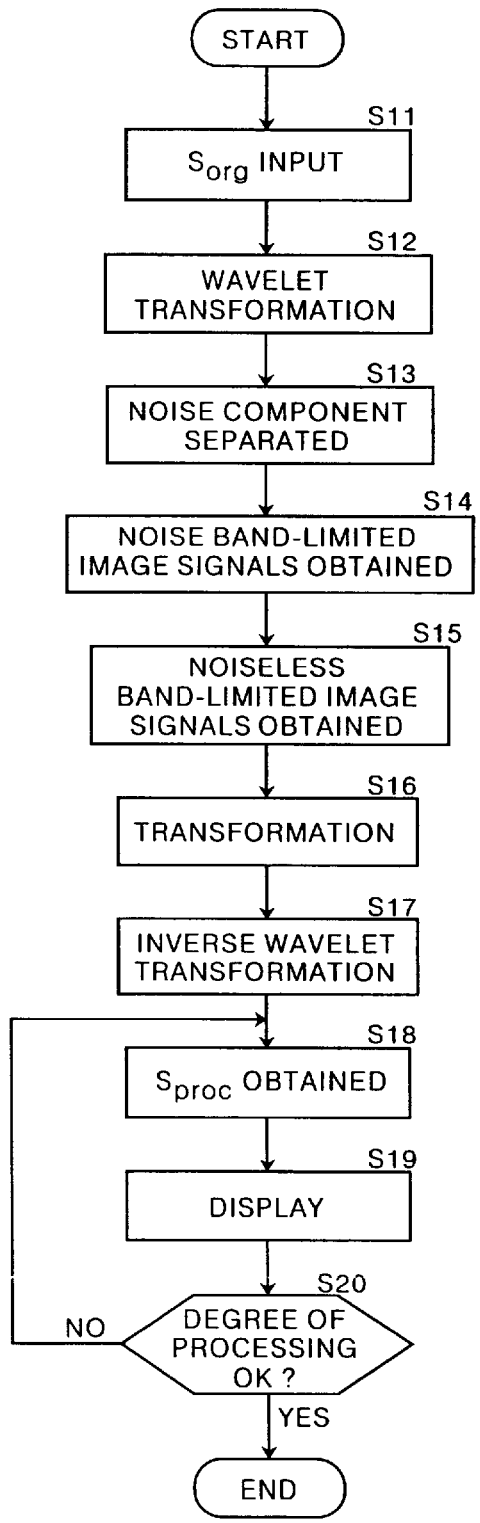
FIG. 38 is a flow chart for illustrating operation of the image processing system of the fourth embodiment.

Operation of the image processing system 151 of the fourth embodiment will be described with reference to the flow chart shown in FIG. 38. An original image signal $S_{org}$ is first input into the image processing system 1, for instance, from an image read-out apparatus. (step S11) The original image signal $S_{org}$ is input into the wavelet transformation means 152 and wavelet transformation coefficient signals for the respective frequency bands, i.e., the band-limited image signals $B_k$ are made. (step S12) The noise component of the band-limited image signals $B_k$ is separated and the noise band-limited image signals $NB_k$ are obtained as described above. (steps S13 and S14) The noiseless band-limited image signals $SB_k$ are obtained by subtracting the noise band-limited image signals $NB_k$ from the band-limited image signals $B_k$. (step S15)

The noiseless band-limited image signals $SB_k$ are transformed into transformed noiseless band-limited signals $f_k SB_k$ by transformation functions described above. (step S16) The transformed noiseless signal $SH_{a1}$ in the highest frequency band, i.e., the high frequency component signal $SH_{a1}$, is obtained by the inverse wavelet transformation of the transformed noiseless band-limited signals $f_k SB_k$. (step S17)

Then, a processed image signal $S_{proc}$ is obtained by use of the high frequency component signal $SH_{a1}$ according to the aforesaid formula (16). (step S18) A visible image is displayed on a monitor (not shown) on the basis of the processed image signal $S_{proc}$ (step S19) The operator observes the image, and if it is necessary to change the degree of frequency enhancement processing, the operator inputs information on the degree by which the degree of frequency enhancement processing is to be changed into the processing means 153. (step S20) Upon receipt of the information, the processing means 153 redoes steps S18 to S20 after changing the coefficient of enhancement $\beta(S_{org})$ in the aforesaid formula (16). This is repeated until the degree of frequency enhancement processing becomes proper.

As can be understood from the description above, also in the image processing of the fourth embodiment, since the degree of image processing on the original image signal $S_{org}$ can be freely changed by only changing the value of the coefficient of enhancement $\beta(S_{org})$, the degree of image processing can be easily changed in a shorter time as compared with the method disclosed in Japanese Unexamined Patent Publication No. 5(1993)-244508 where the degree of image processing is changed by correcting the nonlinear functions and reconstructing an image, whereby the time required to obtain a processed image is shortened and stress on the operator can be lightened.

Though, in the embodiments described above, the frequency enhancement processing is employed as the image processing to be carried out by the operator 125 or 164, a dynamic range compression processing may be employed. In this case, the operation represented by the following formula (17) is carried out on the high frequency component signal $SH_{a1}$ obtained in the manner described above and the dynamic range of the original image signal $S_{org}$ is compressed. In accordance with the following formula (17), the degree of dynamic range compression of the processed image signal $S_{proc}$ can be changed by changing the value of $D(S_{org}-SH_{a1})$.

$$S_{proc}=S_{org}+D(S_{org}-SH_{a1}) \quad (17)$$

wherein $S_{proc}$ represents the processed image signal, $S_{org}$ represents the original image signal, and $D(S_{org}-SH_{a1})$ represents a coefficient of dynamic range compression determined on the basis of the low frequency component signal, D being a function for transforming $(S_{org}-SH_{a1})$.

It is preferred that, when the dynamic range compression processing is to be carried out, for instance, transformation functions shown in FIG. 20 or 21 or combinations of these functions be employed as the functions $f_k$ for transforming the band-limited image signals.

In accordance with the transformation functions shown in FIG. 20, the band-limited signals are transformed so that those which are large in amplitude are suppressed and the degree of suppression is increased as the frequency band of the band-limited signal becomes higher. This is for taking into account the fact that higher frequency components contained in edges of an actual radiation image is smaller in amplitude than low frequency components. In actual radiation images, even a substantially sharp edge is not in the form of a correct step and the amplitude often becomes smaller as the frequency becomes higher. Accordingly, it is preferred that suppression be made from a smaller amplitude as the frequency of the band-limited signals becomes higher. The functions shown in FIG. 20 serve for this purpose.

The transformation functions shown in FIG. 21 are for transforming the band-limited signals to those having values not larger than absolute values of the band-limited signals, which values are determined on the basis of the absolute values of the band-limited signals. As the frequency of the frequency band to be processed by the function becomes lower, the absolute value of a transformed image signal obtained by transforming a band-limited signal whose absolute value is in a predetermined range near 0 becomes smaller. That is, the functions all pass through the origin and all have inclinations smaller than 1. Further, the inclination near 0 is smaller as the frequency of the frequency band to be processed by the function becomes lower. When an add signal obtained by adding up the transformed image signals is added to the original image signal $S_{org}$, these functions contribute to smoothen the joint between the original image signal $S_{org}$ and the add signal, that is, rise of the signal.

The operator 125 or 164 may simultaneously execute a frequency enhancement processing and a dynamic range compression processing as shown in the following formula (18).

$$S_{proc}=S_{org}+\beta(S_{org})\cdot SH_{af}+D(S_{org}-SH_{a1}') \quad (18)$$

In this case, the high frequency component signal $SH_{a1}$ for carrying out the frequency enhancement processing may be obtained by carrying out the transformation processing on the band-limited image signals by the use of the transformation functions shown in FIG. 9, and the high frequency component signal $S_1'$ for carrying out the dynamic range compression processing may be obtained by carrying out the transformation processing on the band-limited image signals by the use of the transformation functions shown in FIG. 20 or 21.

When both the frequency enhancement processing and the dynamic range compression processing are to be carried out, the number of times by which the operation should be performed for the interpolation processing amounts 22364160×3=67092480. This is about ⅟₁.₅ of that in the conventional processing. Accordingly, the operating time can be shortened to about ⅟₁.₅ of that in the conventional processing.

Though, in the embodiments described above, a nonlinear processing is carried out on the band-limited image signals using nonlinear transformation functions, the transformation to functions need not be limited to nonlinear functions but may be linear functions or constants.

Though, in the embodiments described above, the noise band-limited image signals are obtained from the band-limited image signals $B_k$ by the use of an iris filter, they may be obtained by other various methods. For example, local dispersion of the band-limited image signals $B_k$ in a mask of a predetermined size is obtained and picture elements which are small in the local dispersion are considered to be noise. Then the noise band-limited image signals $B_k$ may be obtained by separating the noise component from the band-limited image signals $B_k$.

Further the noise signal may be obtained on the basis of picture element vectors calculated for picture elements of the image represented by the band-limited image signal $B_k$.

The picture element vector represents the inclination and the direction of inclination of the value of an object picture element (a picture element of the image represented by a band-limited image signal $B_k$). For example, the differences between the value of the object picture element and picture elements near the object picture element in a plurality of directions (when a plurality of picture elements are taken in one direction, the difference between the value of the object picture element and the average of the values of the picture elements near the object picture element) are calculated and the direction in which the difference is maximized or minimized is determined. Then the picture element vector is calculated on the basis of the direction in which the difference is maximized or minimized and the value of the difference.

When the picture element vector is calculated on the basis of the direction in which the difference is maximized, the picture element vector represents the direction of signal gradient, and when the picture element vector is calculated on the basis of the direction in which the difference is minimized, the picture element vector represents the direction of equi-signal line. When the picture element vector is obtained in the direction of signal gradient and the length of the vector represents the difference in value between the object picture element and a picture element near the object picture element, the probability that the picture element is on an edge portion is higher as the length of the vector increases and the probability that the picture element is on a flat portion is higher as the length of the vector decreases. When the picture element vector is obtained in the direction of signal gradient and the length of the vector represents the reciprocal of the difference in value between the object picture element and a picture element near the object picture element, the probability that the picture element is on an edge portion is higher as the length of the vector decreases and the probability that the picture element is on a flat portion is higher as the length of the vector increases.

When the picture element vector is obtained in the direction of equi-signal line and the length of the vector represents the difference in value between the object picture element and a picture element near the object picture element, the probability that the picture element is on an edge portion is higher as the length of the vector decreases and the probability that the picture element is on a flat portion is higher as the length of the vector increases. When the picture element vector is obtained in the direction of equi-signal line and the length of the vector represents the reciprocal of the difference in value between the object picture element and a picture element near the object picture element, the probability that the picture element is on an edge portion is higher as the length of the vector increases and the probability that the picture element is on a flat portion is higher as the length of the vector decreases.

Thus whether the picture element is on a flat portion, that is, whether the picture element is a noise component, can be determined on the basis of the picture element vector, and the noise component of the band-limited image signals $B_k$ can be separated from the band-limited image signals $B_k$ on the basis of the picture element vector. For example, after carrying out a smoothing processing on the separated noise component, thereby reducing the values of the picture elements, a noise signal may be obtained by separating the noise component from the band-limited image signals $B_k$ on the basis of the smoothed signal.

Though, in the third and fourth embodiments, the coefficient of enhancement by which the high frequency component signal $SH_{a1}$ is multiplied is a function of the original image signal $S_{org}$, the coefficient of enhancement need not be a function of the original image signal $S_{org}$, but may be, for instance, a constant.

Further, in the third and fourth embodiments described above, the noise component is removed by subtracting the noise band-limited image signals $NB_k$ from the band-limited image signals $B_k$, the noise component may be removed in various ways. For example, the noise component may be removed from the band-limited image signals $B_k$ by determining a function $f(NB_k)$ $(B_k)$ whose value is reduced according to the value of the noise band-limited image signals $NB_k$ and processing the band-limited image signals $B_k$ with the function. Further, the noise component may be removed from the band-limited image signals $B_k$ by determining a coefficient $K(NB_k)$ whose value is reduced according to the value of the noise band-limited image signals $NB_k$ and multiplying the band-limited image signals $B_k$ by the coefficient.

An image processing system in accordance with a fifth embodiment of the present invention will be described, hereinbelow. The image processing system of the fifth embodiment is for carrying out a frequency enhancement processing and a noise removing processing on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 39:
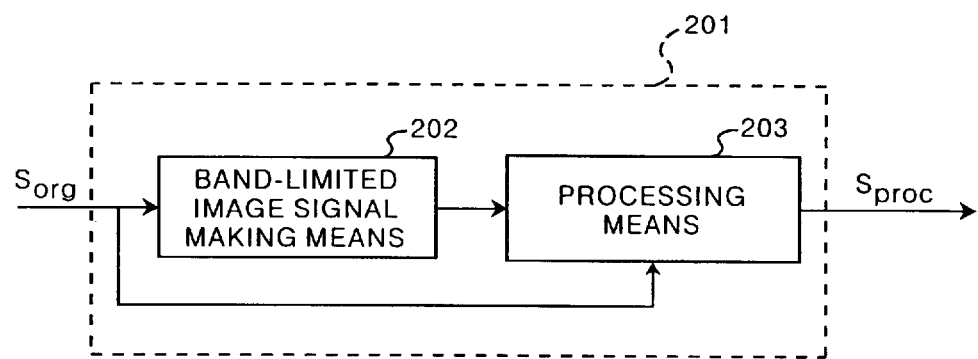
FIG. 39 is a schematic block diagram showing the arrangement of an image processing system in accordance with a fifth embodiment of the present invention.

In FIG. 39, an image processing system 201 in accordance with the fifth embodiment of the present invention comprises a band-limited image signal making means 202 which makes a plurality of band-limited image signals representing the frequency response characteristics for the respective frequency bands from an original image signal $S_{org}$ which is input from an image read-out apparatus or the like and has a predetermined resolution, and a processing means 203 which carries out a frequency enhancement processing for enhancing a particular frequency on the original image signal $S_{org}$ on the basis of the band-limited image signals and removes the noise component from the original image signal $S_{org}$, thereby obtaining a processed image signal $S_{proc}$.

Figure 40:
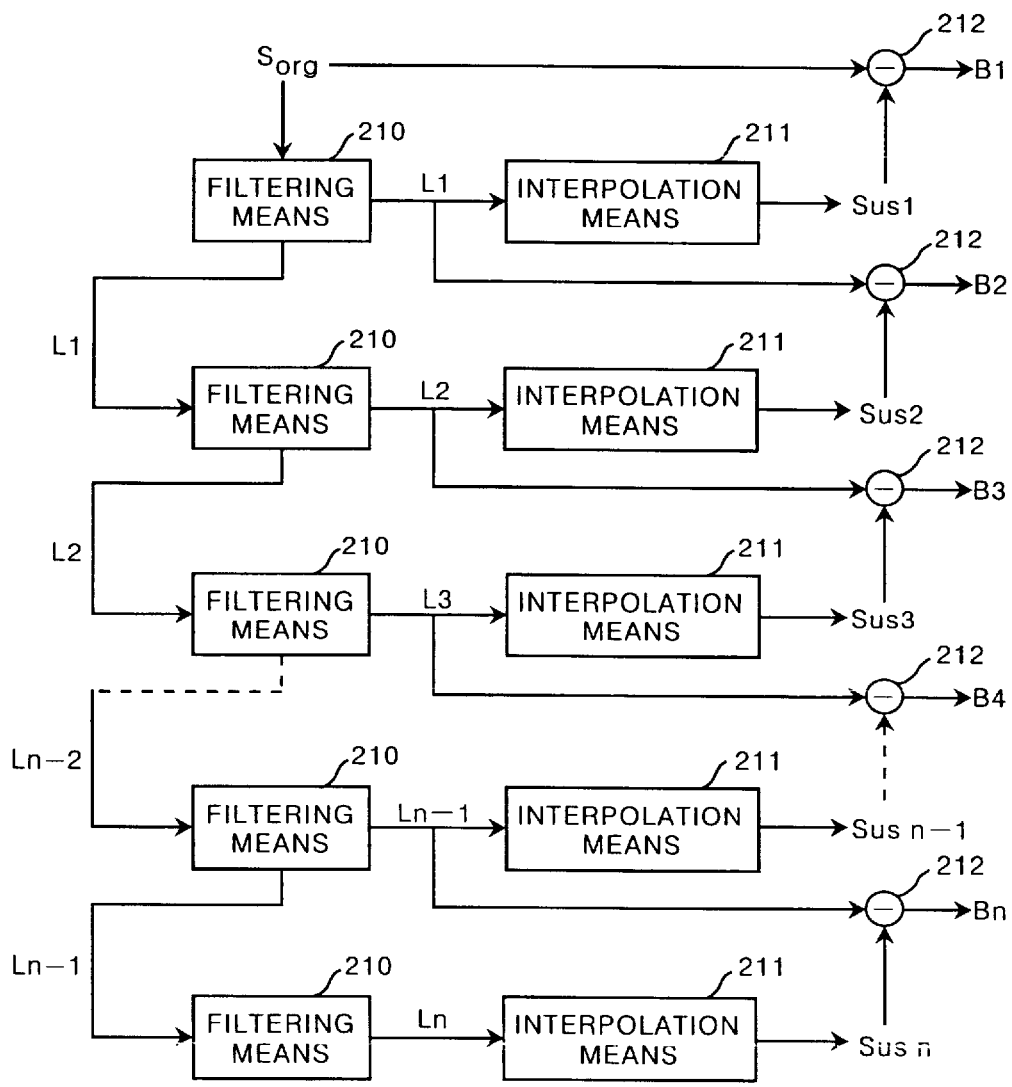
FIG. 40 is a schematic block diagram showing in brief the band-limited image signal making processing employed in the image processing system shown in FIG. 39.

Making the band-limited image signals will be first described, hereinbelow. FIG. 40 is a schematic block diagram showing in brief the band-limited image signal making processing employed in the image processing system shown in FIG. 39. In this particular embodiment, the band-limited image, signals are made by the method of Laplacian pyramid disclosed, for instance, in Japanese Unexamined Patent Publication Nos. 5(1993)-244508 and 6(1994)-96200. As shown in FIG. 40, the band-limited image signal making means 202 comprises first to n-th filtering means 210. The first filtering means 210 carries out a filtering processing on the original image signal $S_{org}$ in x- and y-directions (main scanning direction and sub-scanning direction, see FIG. 22) and makes a low resolution image signal $L_1$ which is lower than the original image signal $S_{org}$ in resolution. The second filtering means 210 carries out a similar filtering processing on the low resolution image signal $L_1$ thus obtained and makes a low resolution image signal $L_2$ which is lower than the low resolution image signal $L_1$ in resolution, and the third filtering means 210 carries out a similar filtering processing on the low resolution image signal $L_2$ thus obtained and makes a low resolution image signal $L_3$ which is lower than the low resolution image signal $L_2$ in resolution. In this manner, the n-th filtering means 210 carries out a similar filtering processing on the low resolution image signal $L_{n-1}$ and makes a low resolution image signal $L_n$ which is lower than the low resolution image signal $Ln_{n-1}$ in resolution. Thus low resolution image signals $L_k$ ($\underline{k}$ stands for 1 to $\underline{n}$) are obtained. The band-limited image signal making means 202 further comprises first to n-th interpolation means 211. The interpolation means 211 carries out an interpolation processing on the low resolution image signals $L_1$ to $L_n$ obtained at the respective stages of filtering to double the number of the picture elements thereof, and makes a plurality of unsharp image signals $S_{us}k$ ($S_{us}1$ to $S_{us}n$) which are different in sharpness. Then the differences between the k-th low resolution image signal $L_k$ and the (k−1)-th unsharp image signal $S_{us}k$ which are the same in the number of the picture elements and between the first unsharp image signal $S_{us}1$ and the original image signal $S_{org}$ which are the same in the number of the picture elements are calculated by respective subtracters 212. The differences are taken as band-limited image signals $B_k$ ($\underline{k}$ stands for 1 to $\underline{n}$).

In this particular embodiment, filters which substantially correspond to one-dimensional Gaussian distribution are used in the filtering processing. That is, coefficients of the filters are determined according the following formula (5) which relates to a Gaussian signal.

$$f(t) = e^{-\frac{t^2}{2\sigma^2}} \tag{5}$$

This is because the Gaussian signal is good in localization in both a real space and a frequency space. For example, the 5×1 one-dimensional filter is as shown in FIG. 4 when σ=1 in formula (5).

The filtering is carried out on the original image signal $S_{org}$ or the low resolution image signal $L_k$ every second picture element as shown in FIG. 5. When such filtering is carried out in both x- and y-directions, the number of picture elements in obtained low resolution image signal $L_k$ is reduced to ¼ of the preceding image signal (e.g., the original image signal $S_{org}$ in the case of the low resolution image signal $L_1$, and the low resolution image signal $L_1$ in the case of the low resolution image signal $L_2$). That is, the number of picture elements in each of the low resolution image signals $L_k$(k stands for 1 to n) is $\frac{1}{2}^{2k}$ of the original image signal $S_{org}$.

The interpolation processing to be carried out on the low resolution image signals $L_k$ thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma=2^{k-1}$, is employed in the following formula (6).

$$I(t) = 2 \cdot \sigma \cdot e^{-\frac{t^2}{2\sigma^2}} \quad (6)$$

For example, when interpolating the low resolution image signal $L_1$, $\sigma=1$ since k=1. In this case, a one-dimensional filter of 5×1 such as shown in FIG. 6 is employed in the interpolation. In this interpolation, a picture element of 0 in value is interpolated every second picture element in the low resolution image signal $L_1$, whereby the low resolution image signal $L_1$ is enlarged to have the same number of picture elements as the original image, and the interpolated low resolution image signal $L_1$ is subjected to a filtering processing using the one-dimensional filter shown in FIG. 6.

This interpolation/enlargement processing is carried out on all the low resolution image signals $L_k$. When interpolating a low resolution image signal $L_k$, a filter which is $3\times2^k-1$ in length is prepared according to formula (6) and picture elements of 0 in value are interpolated between each pair of adjacent picture elements, whereby the low resolution image signal $L_k$ is enlarged to have the same number of picture elements as the one-class higher low resolution image signal $L_{k-1}$. Then the interpolated low resolution image signal $L_k$ is subjected to a filtering processing using the filter which is $3\times2^k-1$ in length. Thus unsharp image signals $S_{us}k$ are obtained.

Then band-limited image signals $B_k$ (k=1 to n) are obtained by subtracting each of the unsharp image signals $S_{us}k$ is subtracted from the low resolution image signal $L_{k-1}$ having the same number of picture elements as shown by the following formula (7).

$$B_1 = S_{org} - S_{us}1 \quad (7)$$
$$B_2 = L_1 - S_{us}2$$
$$B_3 = L_2 - S_{us}3$$
$$\vdots$$
$$B_k = L_{k-1} - S_{us}k$$

Specifically, as shown in FIG. 3, when five low resolution image signals $L_1$ to $L_5$ are obtained, interpolation processing is carried out on the lowest resolution image signal $L_5$ and an unsharp image signal $S_{us}5$ having the same number of picture elements as the low resolution image signal $L_4$ is made. Then a band-limited image signal $B_5$ is obtained by subtracting the unsharp image signal $S_{us}5$ from the low resolution image signal $L_4$. Similarly, band-limited image signals $B_4$ to $B_1$ are obtained by operations $L_3-S_{us}4$, $L_2-S_{us}3$, $L_1-S_{us}2$ and $S_{org}-S_{us}1$. The lowest resolution image signal $L_5$ represents low frequency information obtained by contracting the original image, and is not used in the following operation.

Figure 41:
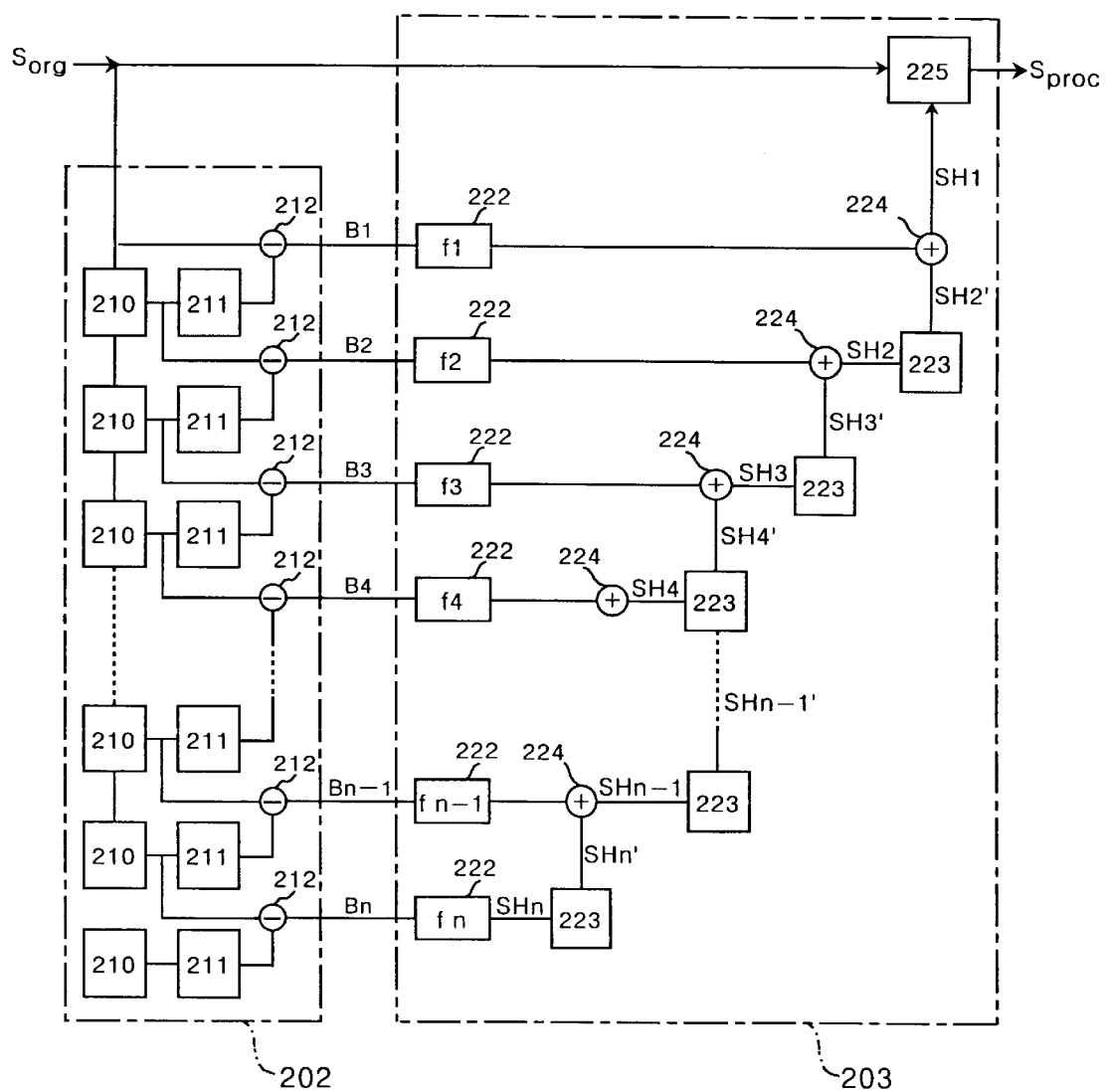
FIG. 41 is a schematic block diagram showing the arrangement of the part of the processing means which carries out the frequency processing and the band-limited image signal making means of the fifth embodiment.

The processing to be carried out by the use of the band-limited image signals $B_k$ thus obtained will be described, hereinbelow. FIG. 41 shows the structure of the part of the processing means 203 which carries out the frequency enhancement processing as well as the band-limited image signal making means 202. As shown in FIG. 41, the band-limited image signals $B_k$ made by the band-limited image signal making means 202 are suppressed to predetermined sizes with transformation functions $f_1$ to $f_n$ in respective transformation circuits 222 and transformed band-limited signals $f_k B_k$ (k=1 to n̲) are obtained. An example of the transformation function is shown in FIG. 9. The function shown in FIG. 9 is a nonlinear function whose inclination is 1 in the range where the absolute value of the band-limited image signals $B_k$ is not larger than a threshold value Th1 and is smaller than 1 in the range where the absolute value of the band-limited image signals $B_k$ is larger than the threshold value Th1. The transformation functions for the respective band-limited image signals $B_k$ may be equal to or different from each other.

The transformed band-limited image signal $f_n B_n$ which is the lowest in the resolution in the transformed band-limited image signals $f_k B_k$ is taken as a high frequency component signal $SH_n$ and the high frequency component signal $SH_n$ is subjected to an interpolation processing to have the same number of picture elements as the one-class higher transformed band-limited image signal $f_{n-1} B_{n-1}$ by the interpolation means 223 in the same manner as by the aforesaid interpolation means 211, whereby an enlarged high frequency component signal $SH_n{}'$ is obtained. Thereafter the enlarged high frequency component signal $SH_n{}'$ is added to the transformed band-limited image signal $f_{n-1} B_{n-1}$ by an adder 24 and another high frequency component signal $SH_{n-1}$ is obtained. Then the high frequency component signal $SH_{n-1}$ is interpolated and enlarged and another enlarged high frequency component signal $SH_{n-1}{}'$ is obtained and the enlarged high frequency component signal $SH_{n-1}{}'$ is added to the transformed band-limited image signal $f_{n-2} B_{n-2}$, whereby a high frequency component signal $SH_{n-2}$ is obtained. By repeating these steps, a highest resolution high frequency component signal $SH_1$ is obtained.

Figure 42:
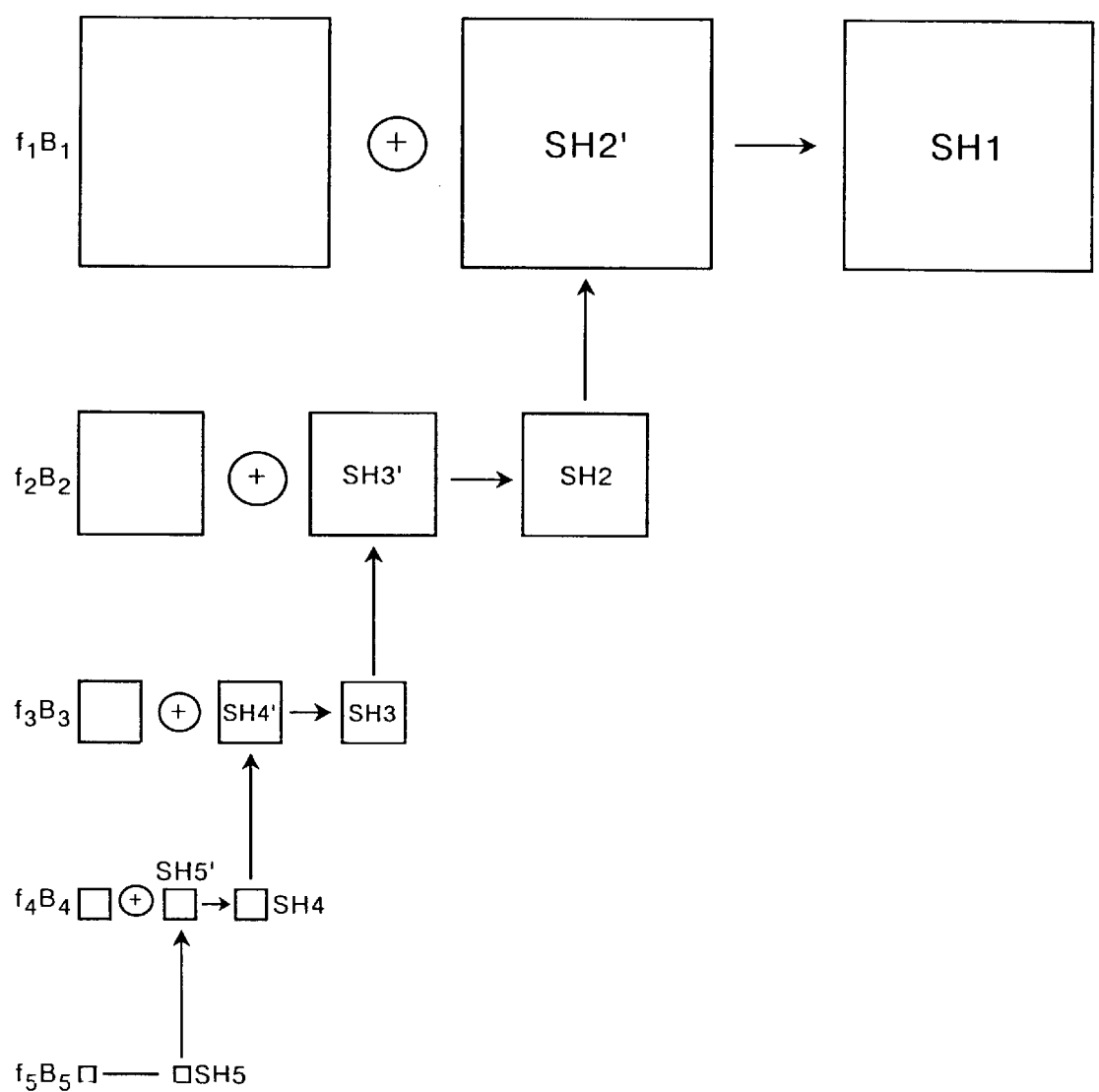
FIG. 42 is a view graphically showing the processing executed by the processing means.

Specifically, as shown in FIG. 42, when five classes of band-limited image signals $B_1$ to $B_5$ are obtained, transformed band-limited image signals $f_1 B_1$ to $f_5 B_5$ are obtained next. The transformed band-limited image signal $f_5 B_5$ which is the lowest in the resolution is taken as a high frequency component signal SH5 the high frequency component signal SH5 is subjected to an interpolation processing to have the same number of picture elements as the one-class higher transformed band-limited image signal $f_4 B_4$, whereby an enlarged high frequency component signal $SH_5{}'$ is obtained. Thereafter the enlarged high frequency component signal $SH_5{}'$ is added to the transformed band-limited image signal $f_4 B_4$ and another high frequency component signal $SH_4$ is obtained. In this manner, high frequency component signals $SH_3$ and $SH_2$ are obtained and a highest resolution high frequency component signal $SH_1$ is finally obtained.

The transformation circuits 222, the interpolation means 223 and the adders 224 form a high frequency component obtaining means in this particular embodiment.

Figure 43:
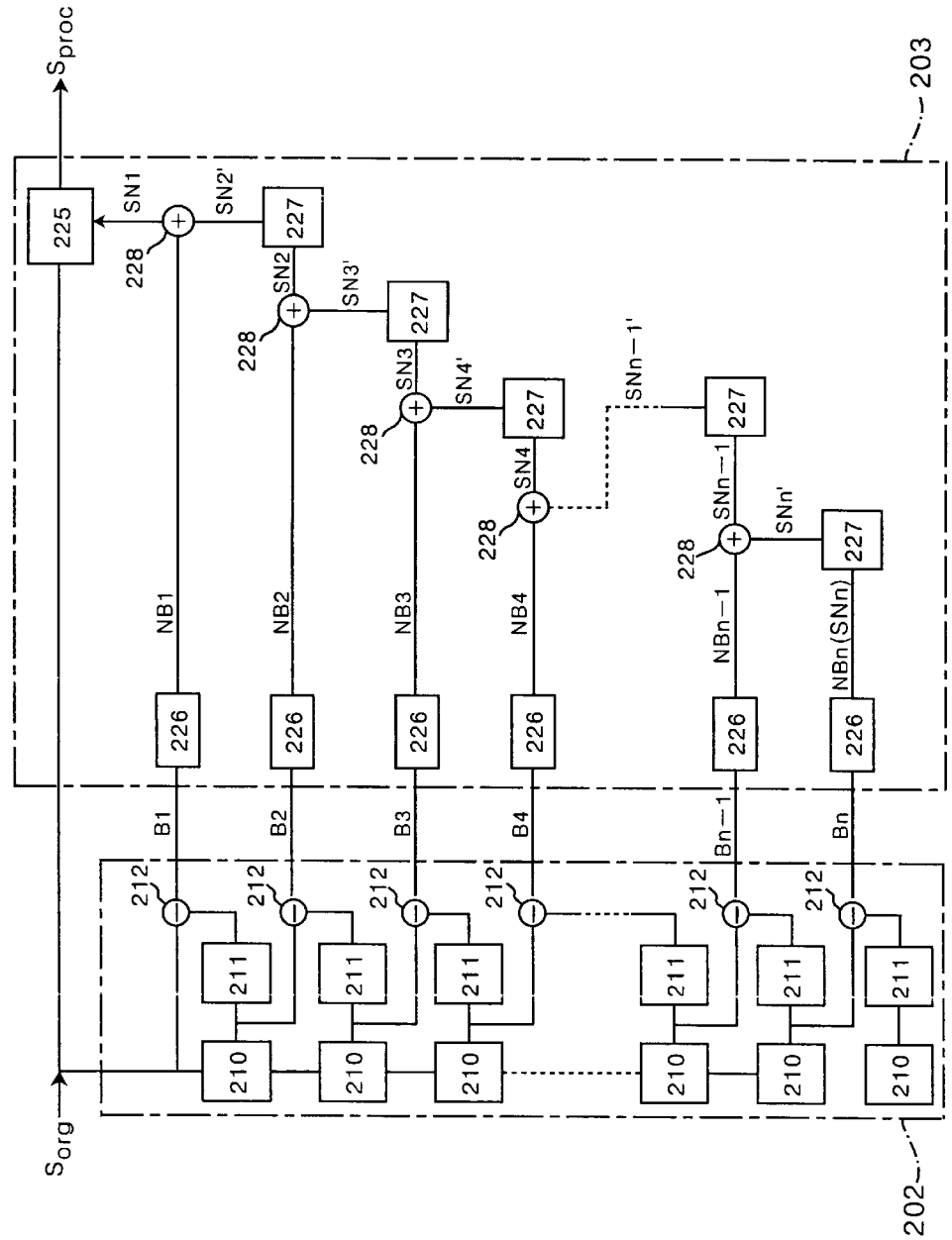
FIG. 43 is a schematic block diagram showing the arrangement of the part of the processing means which carries out the noise removing processing as well as the band-limited image signals making means.

The part of the processing means 203 which carries out the noise removing processing will be described, hereinbelow. FIG. 43 shows the arrangement of the part of the processing means 203 which carries out the noise removing processing as well as the band-limited image signals making means 202. As shown in FIG. 43, the part of the processing means 203 which carries out the noise removing processing comprises noise separation means 226, interpolation means 227 and adders 228. The noise components are separated from the band-limited image signals $B_k$ (k=1 to n) by noise separation means 226, and noise band-limited image signals $NB_k$ are obtained. The noise separation processing by the noise separation means 226 will be described, hereinbelow.

Figure 44:
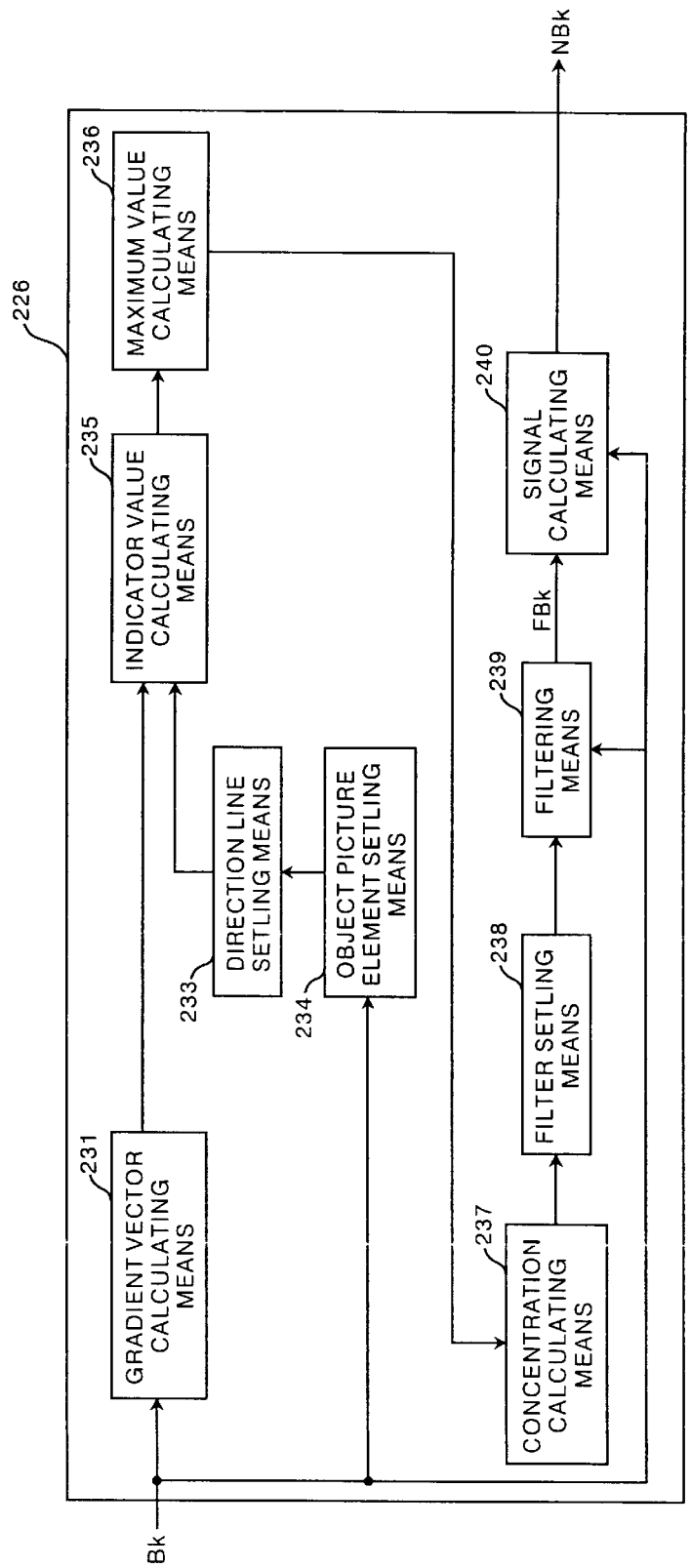
FIG. 44 is schematic diagram showing the arrangement of the noise separation means.

FIG. 44 shows the structure of the noise separation means 226. The noise separation means 226 separates the noise component from the band-limited image signals $B_k$ by a processing using an iris filter, and comprises a gradient vector calculating means 231 which calculates a density gradient vector for each of the picture elements of the band-limited image signals $B_k$ on the basis of the band-limited image signals $B_k$, an object picture element setting means 234 which sets each of the picture elements of the band-limited image signals $B_k$ as an object picture element in sequence, a direction line setting means 233 which sets a plurality of (e.g., 32) radial lines at predetermined angular intervals (e.g., at intervals of 11.25°) about each object picture element set by the object picture element setting means 234 (see FIG. 27), an indicator value calculating means 235 which calculates, for each of the picture elements which are in a predetermined range from the object picture element and on each of the direction lines, an indicator value $\cos \theta_{il}$ based on an angle $\theta_{il}$ between the direction line and the gradient vector of the picture element ($\theta_{il}$ representing the angle between the i-th direction line and the gradient vector of the picture element which is the l-th picture element on the i-th direction line as numbered from the object picture element), a maximum value calculating means 236 which calculates, according to the following formula (12), averages Ci(n) of the indicator values $\cos \theta_{il}$ for the picture elements on each direction line in the range between a start point (the object picture element) and a terminal point which is changed in said predetermined range, and extracts the maximum $Ci_{max}$ (the following formula (13)) of the averages Ci(n), and a concentration calculating means 237 which takes the average of the maximums $Ci_{max}$ for the 32 direction lines ($\Sigma Ci_{max}/32$) and calculates the concentration C of the gradient vectors (the following formula (14)) for each object picture element.

$$Ci(n) = \sum_{}^{n} \{(\cos\theta_{il})/n\} \quad (12)$$

$$Ci_{max} = \max Ci(n) \quad (13)$$

$$C = (1/32)\sum_{}^{32} Ci_{max} \quad (14)$$

The noise separation means 226 further comprises a filter setting means 238 which sets coefficients of a spatial filter so that weight on an object picture element is increased as the concentration C increases (the probability that the object picture element is on an edge of the image is increased) and is reduced as the concentration C reduces (the probability that the object picture element is on an edge of the image is reduced), a filtering means 239 which carries out a filtering processing on the band-limited image signals $B_k$ by use of the spatial filter whose coefficients of filter is set by the filter setting means 238 and obtains filtered band-limited image signals $FB_k$, and a signal calculating means 240 which calculates the noise band-limited image signals $NB_k$ by subtracting the filtered band-limited image signals $FB_k$ from the band-limited image signals $B_k$.

The iris filter is described in detail, for instance, in "Detection of shadow of mass in DR image (Iris filter)", Obata et al., Journal of Academy of Electronic Information and Communication, D-II, Vol.J75-D-II, No.3, pp663 to 670, March 1992) and "Iris filter and analysis of properties thereof", Obata et al., Papers of Academy of Measurement and Automatic Control, 1998 Vol. 34, No. 4, pp326 to 332. The iris filtering processing has been studied as an effective technique for detecting the shadow of mass which is a particular form of breast cancer, and the iris filter employed in the filtering processing calculates gradients of an image signal as gradient vectors and outputs the concentration of the gradient vectors. In the iris filtering processing, the shadow of mass is detected on the basis of the concentration of the gradient vectors. In this particular embodiment, the degree at which each picture element is positioned on a segment such as an edge is obtained on the basis of the concentration of the gradient vectors for each of the band-limited image signals $B_k$ calculated by the iris filtering processing.

The gradient vector calculating means 231 obtains the orientation of the density gradient vector according to the following formula (15) by the use of values of the picture elements positioned along the outer periphery of a mask shown in FIG. 28. Though the mask shown in FIG. 28 is 5 pixels×5 pixels in size, a mask of any size may be employed.

$$\theta = \tan^{-1}\frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (15)$$

The number of the direction lines to be set by the direction line setting means 233 need not be limited to 32. However, when it is excessively large, load on operation becomes too heavy and when it is too small, the edge components cannot be accurately detected. From the viewpoint of convenience of operation, it is preferred that the direction lines be at regular angular intervals.

The value of the concentration C calculated by the concentration calculating means 237 becomes large when the orientations of the gradient vectors are focused on the object picture element.

In the filter setting means 238, the coefficients of filter of the spatial filter for carrying out a smoothing processing according to the value of the concentration C are set. That is, the probability that the object picture element is on an edge of the image is increased as the concentration C increases, and the probability that the object picture element is on a portion other an edge of the image is increased as the concentration C reduces. Accordingly, the coefficients of the spatial filter are set so that weight on an object picture element is increased as the concentration C increases.

Specifically, edge components and other components are separated by carrying out binary-coding in which picture elements having a concentration C higher than a predetermined threshold value is given a value of 1 and picture elements having a concentration C not higher than the predetermined threshold value is given a value of 0. When a base spatial filter F0 is a smoothing filter of 3×3 and the coefficients of filter of the base spatial filter F0 are as shown in FIG. 29A, the coefficients of filter of the spatial filter F1 for filtering the band-limited image signals $B_k$ are set by weighting the coefficients of the base spatial filter F0 according to the binary-coded concentrations C. For example, when a given object picture element is on an edge component and the binary-coded concentrations C of the picture elements in the 3×3 range about the object picture element are as shown in FIG. 29B, the coefficients of filter of the spatial filter F1 are set as shown in FIG. 29C. To the contrast, when a given object picture element is on a portion other than an edge component and the binary-coded concentrations C of the picture elements in the 3×3 range about the object picture element are as shown in FIG. 29D, the coefficients of filter of the spatial filter F1 are set as shown in FIG.29E. Accordingly, when the band-limited image signals $B_k$ are smoothened by the spatial filter F1, the edge components are smoothened in directions where the edge components exist and the edge components are not made unsharp. The components other than the edge components are given a value of 0.

The filtering means 239 carries out a filtering processing on the band-limited image signals $B_k$ by use of the spatial filter F1 set by the filter setting means 238 and obtains filtered band-limited image signals $FB_k$. Though the band-limited image signals $B_k$ are smoothened by the filtering processing, the edge components are smoothened in directions where the edge components exist. Accordingly, only the smoothened edge components remain in the filtered band-limited image signals $FB_k$.

The signal calculating means 240 calculates the noise band-limited image signals $NB_k$ by subtracting the filtered band-limited image signals $FB_k$ from the band-limited image signals $B_k$. Since the filtered band-limited image signals $FB_k$ have been smoothened, the noise band-limited image signals $NB_k$ represent the noise component in the band-limited image signals $B_k$. Since the filtered band-limited image signals $FB_k$ have been smoothened in the direction in which the edge components exist, the noise component includes also noise on the edges.

The band-limited image signals $B_k$ input into the noise separation means 226 are first input into the gradient vector calculating means 231, the object picture element setting means 234 the filtering means 239 and the signal calculating means 240. The gradient vector calculating means 231 obtains the orientations θ of the density gradient vector for all the picture elements by the use of values of the picture elements positioned along the outer periphery of a 5×5 mask. The orientations θ of the density gradient vector obtained are input into the indicator value calculating means 235.

The object picture element setting means 234 sets each of all the picture elements of the band-limited image signals $B_k$ as an object picture element in sequence and inputs the object picture element set into the direction line setting means 233. The direction line setting means 233 sets a plurality of (e.g., 32) radial lines at predetermined angular intervals (e.g., at intervals of 11.25°) about the object picture element. The direction lines set are input into the indicator value calculating means 235.

The indicator value setting means 235 superposes the 32 directions lines input from the direction line setting means 233 on the picture elements input from the gradient vector calculating means 231 which are defined with their orientations θ of the density gradient vector and are two-dimensionally arranged as in the band-limited image signals $B_k$, and extracts the picture elements on each of the direction lines.

The indicator value setting means 235 calculates an indicator value cos $θ_{il}$ based on an angle $θ_{il}$ between the direction line and the gradient vector of the picture element ($θ_{il}$ representing the angle between the i-th direction line and the gradient vector of the picture element which is the l-th picture element on the i-th direction line as numbered from the object picture element) for each picture element on each direction line.

The indicator values cos $θ_{il}$ for the picture elements on each of the direction lines are input into the maximum value calculating means 236. The maximum value calculating means 236 calculates averages Ci(n) of the indicator values cos $θ_{il}$ for the picture elements on each direction line in the range between a start point (the object picture element) and a terminal point which is changed in said predetermined range, and extracts the maximum $Ci_{max}$ of the averages Ci(n).

The maximums $Ci_{max}$ of the averages Ci(n) thus obtained for the respective direction lines are input into the concentration calculating means 237. The concentration calculating means 237 takes the average of the maximums $Ci_{max}$ for the 32 direction lines and calculates the concentration C of the gradient vectors for each object picture element. The concentration C of the gradient vectors are input into the filter setting means 238.

Repeating these steps while changing the object picture element in sequence and the concentrations C of the gradient vectors for all the picture elements are input into the filter setting means 238.

The filter setting means 238 sets a spatial filter F1 in which weight on an object picture element is increased as the concentration C increases, and the filtering means 239 carries out a filtering processing on the band-limited image signals $B_k$ by use of the spatial filter set by the filter setting means 238 and obtains filtered band-limited image signals $FB_k$. The filtering means 239 inputs the filtered band-limited image signals $FB_k$ into the signal calculating means 240.

The signal calculating means 240 calculates the noise band-limited image signals $NB_k$ by subtracting the filtered band-limited image signals $FB_k$ from the band-limited image signals $B_k$.

The noise band-limited image signal $NB_n$ which is the lowest in the resolution in the noise band-limited image signals $NB_k$ is taken as a noise signal $SN_n$ and the noise signal $SN_n$ is subjected to an interpolation processing to have the same number of picture elements as the one-class higher noise band-limited image signal $NB_{n-1}$ by the interpolation means 227, whereby an enlarged noise signal $SN_n'$ is obtained. Thereafter the enlarged noise signal $SN_n'$ is added to the noise band-limited image signal $NB_{n-1}$ by an adder 228 and another noise signal $SN_{n-1}$ is obtained. Then the noise signal $SN_{n-1}$ is interpolated and enlarged, and another enlarged noise signal $SN_{n-1}'$ is obtained and the enlarged noise signal $SN_{n-1}'$ is added to the noise band-limited image signal $NB_{n-2}$, whereby a noise signal $SN_{n-2}$ is obtained. By repeating these steps, a highest resolution noise signal $SN_1$ is obtained.

Figure 45:
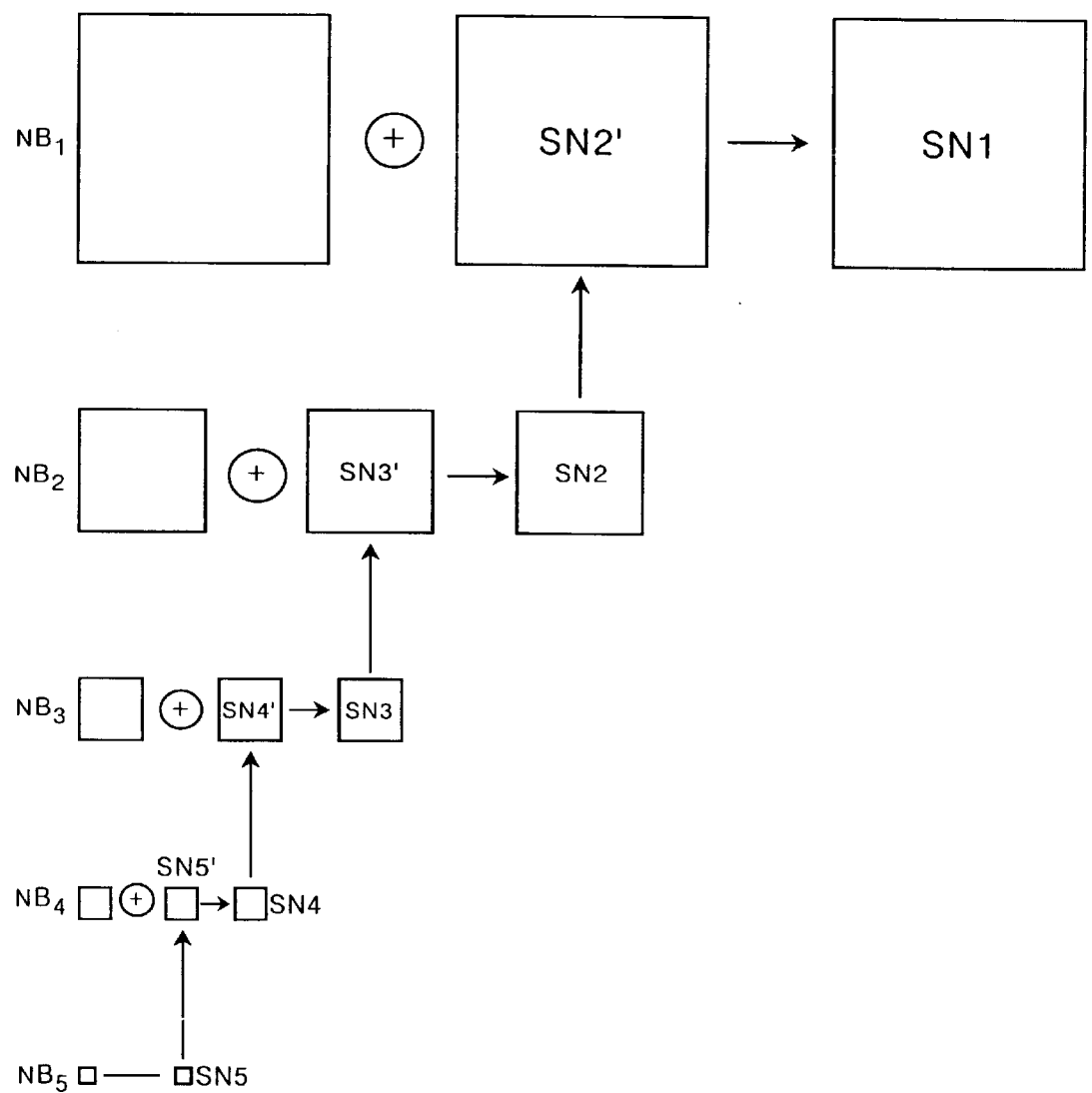
FIG. 45 is a view graphically showing the processing executed by the processing means.

Specifically, as shown in FIG. 45, when five classes of noise band-limited image signals $NB_1$ to $NB_5$ are obtained, the noise band-limited image signal $NB_5$ which is the lowest in the resolution is taken as a noise signal $SN_5$ and the noise signal $SN_5$ is subjected to an interpolation processing to have the same number of picture elements as the one-class higher noise band-limited image signals $NB_4$, whereby an enlarged noise signal $SN_5'$ is obtained. Thereafter the enlarged noise signal $SN_5'$ is added to the noise band-limited image signals $NB_4$ and another noise signal $SN_4$ is obtained. In this manner, noise signals $SN_3$ and $SN_2$ are obtained and a highest resolution noise signal $SN_1$ is finally obtained.

When the highest resolution high frequency component signal $SH_1$ and the highest resolution noise signal $SN_1$ are obtained, an operator 225 (an image processing means) multiplies the high frequency component signal $SH_1$ by a coefficient of enhancement $\beta(S_{org})$ which is a parameter representing the degree of frequency enhancement and is determined according to the original image signal $S_{org}$ and multiplies the noise signal $SN_1$ by a coefficient of enhancement $\alpha(S_{org})$ which is a parameter representing the degree of removing the noise component and is determined according to the original image signal $S_{org}$. Then the product of the high frequency component signal $SH_1$ and the coefficient of enhancement $\beta(S_{org})$ is added to the original image signal $S_{org}$, and the product of the noise signal $SN_1$ and the coefficient of enhancement $\alpha(S_{org})$ is subtracted, whereby a processed image signal $S_{proc}$ is obtained as represented by the following formula (18).

$$S_{proc}=S_{org}+\beta(S_{org})\cdot SH_1-\alpha(S_{org})\cdot SN_1 \tag{18}$$

wherein $S_{proc}$ is a processed image signal, $S_{org}$ is an original image signal, and $\alpha(S_{org})$ and $\beta(S_{org})$ are coefficients of enhancement determined on the basis of the original image signal.

By changing the value of the coefficient of enhancement $\beta(S_{org})$, the degree of image processing of the processed image signal $S_{proc}$ can be freely changed and by changing the value of the coefficient of enhancement $\alpha(S_{org})$, the degree of removing the noise from the processed image signal $S_{proc}$ can be freely changed.

By providing a memory means for storing the original image signal $S_{org}$ and the noise signal $SN_1$ and a parameter setting means for setting the coefficient of enhancement $\alpha(S_{org})$ to the operator 225, the noise component of the original image signal $S_{org}$ may be removed, when the set value of the coefficient $\alpha(S_{org})$ is changed, by multiplying the noise signal $SN_1$ read out from the memory means by the changed coefficient $\alpha(S_{org})$ and subtracting the product from the original image signal $S_{org}$ read out from the memory means.

Figure 46:
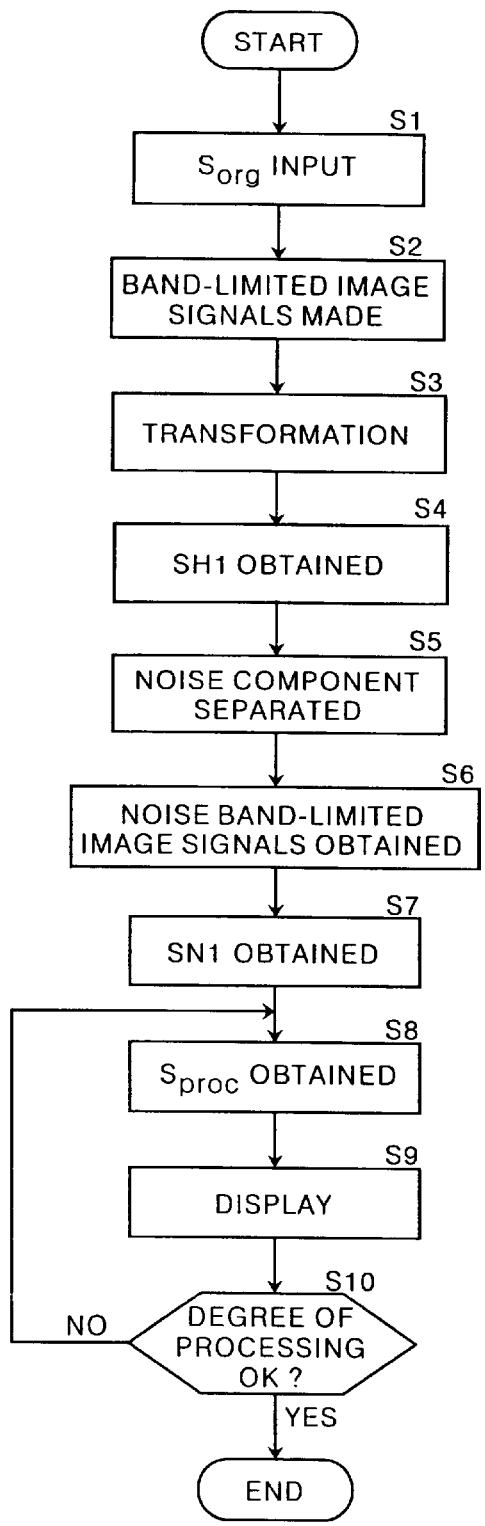
FIG. 46 is a flow chart for illustrating operation of the image processing system of the fifth embodiment.

Operation of the image processing system 201 of this embodiment will be described with reference to the flow chart shown in FIG. 46. An original image signal $S_{org}$ is first input into the image processing system 201, for instance, from an image read-out apparatus. (step S1) The original image signal $S_{org}$ is input into the band-limited image signal making means 202 and band-limited image signals $B_k$ representing the frequency response characteristics for the respective frequency bands are made. (step S2) The band-limited image signals $B_k$ are transformed into transformed band-limited signals $f_k B_k$ by transformation functions such as shown in FIG. 9. (step S3) Then obtaining a high frequency component signal $SH_k$ by interpolation of transformed band-limited signals $f_k B_k$ to the one-class higher frequency band and obtaining a high frequency component signal $SH_{k-1}$ by addition of the high frequency component signal $SH_k$ to the transformed band-limited signals $f_k B_k$ in the same frequency band are repeated until the high frequency component signal $SH_1$ in the highest frequency band is obtained. (step S4)

The noise component of the band-limited image signals $B_k$ is separated and the noise band-limited image signals $NB_k$ are obtained. (steps S5 and S6)

Then obtaining a noise signal $SN_k$ by interpolation of a noise band-limited signal $NB_k$ to the one-class higher frequency band and obtaining a noise signal $SN_{k-1}$ by addition of the noise signal $SN_k$ to the noise band-limited signals $NB_k$ in the same frequency band are repeated until the noise signal $SN_1$ in the highest frequency band is obtained. (step S7) Steps S5 to S7 may be executed prior to steps S3 and S4. However, when steps S5 to S7 and steps S3 and S4 are executed in parallel, the processing can be carried out at a higher speed.

Then, a processed image signal $S_{proc}$ is obtained by use of the high frequency component signal $SH_1$ and the noise signal $SN_1$ according to the aforesaid formula (18). (step S8) A visible image is displayed on a monitor (not shown) on the basis of the processed image signal $S_{proc}$. (step S9) The operator observes the image, and if it is necessary to change the degree of frequency enhancement processing and/or the degree of removing noise, the operator inputs information on the degree by which the degree of frequency enhancement processing and/or the degree of removing noise is to be changed into the processing means 203. (step S10) Upon receipt of the information, the processing means redoes steps S8 to S10 after changing the coefficient of enhancement $\beta(S_{org})$ and/or $\alpha(S_{org})$ in the aforesaid formula (18). This is repeated until the degree of frequency enhancement and/or the degree of removing noise processing becomes proper.

As can be understood from the description above, in the image processing of this embodiment, the degree of image processing on the original image signal $S_{org}$ and the level of the noise signal $SN_1$ to be subtracted from the original image signal $S_{org}$ can be freely changed by only changing the value of the coefficient of enhancement $\beta(S_{org})$ or $\alpha(S_{org})$, and accordingly, the degree of image processing and the degree of removing noise can be easily changed in a shorter time as compared with the method disclosed in Japanese Unexamined Patent Publication Nos. 5(1993)-244508 and 6(1994)-96200 where the degree of image processing is changed by correcting the nonlinear functions and reconstructing an image, whereby the time required to obtain a processed image signal is shortened. Accordingly, even in the case where different image signals are to be displayed on a CRT or the like on the basis of different processed image signals $S_{proc}$ obtained by variously changing the contents of the image processing and/or the degree of removing noise, stress on the operator can be lightened.

The amount of operation for obtaining the high frequency component signal $SH_1$ in the processing in the fifth embodiment will be compared with that in a conventional system, hereinbelow.

FIG. 11 graphically shows a conventional processing disclosed in the aforesaid Japanese Unexamined Patent Publication No. 10(1998)-75395. As shown in FIG. 11, in the conventional processing, low resolution image signals $L_k$ are obtained as in the first embodiment and an interpolation processing is carried out on the low resolution image signals $L_k$, thereby obtaining unsharp image signals $S_{us}k$ having the same number of picture elements as the original image signal $S_{org}$. Then subtraction is carried out between the unsharp image signals $S_{us}k$ and between the original image signal $S_{org}$ and the unsharp image signals $S_{us}1$, whereby band-limited image signals $B_k$ having the same number of picture elements as the original image signal $S_{org}$. Then the band-limited image signals $B_k$ are transformed by use of transformation functions and a processed image signal $S_{proc}$ is obtained by adding to the original image signal $S_{org}$ products of the transformed band-limited image signals $B_k$. This processing is represented by the following formula (9).

$$S_{proc} = S_{org} + \beta(S_{org}) \times F_{usm}(S_{org}, S_{us}1, S_{us}2, \ldots S_{us}n) \tag{9}$$

$$F_{usm}(S_{org}, S_{us}1, S_{us}2, \ldots S_{us}n) =$$

-continued $$f_1(S_{org} - S_{us}1) + f_2(S_{us}1 - S_{us}2) + \ldots +$$
$$f_k(S_{us}k - 1 - S_{us}k) + \ldots + f_n(S_{us}n - 1 - S_{us}n)$$

wherein $S_{proc}$ is a processed image signal, $S_{org}$ is an original image signal, $S_{us}k$ (k=1 to n) is an unsharp image signal, $f_k$(k=1 to n) is a transformation function for transforming each band-limited image signals, and $\beta(S_{org})$ is a coefficient of enhancement determined on the basis of the original image signal.

In the conventional processing described above, an interpolation processing for increasing the picture elements of the low resolution image signals $L_k$ to the number equal to that of the picture elements of the original image signal $S_{org}$. Accordingly, assuming that the number of picture elements of the original image is 1024×1024 and six low resolution image signals $L_1$ to $L_6$ are obtained from the original image signal $S_{org}$, and the interpolation processing is such that one picture element is obtained by the use of sixteen picture elements in a range of 4×4, operation must be performed 100663296 (1024×1024×16×6) times. To the contrast, in the case of this embodiment, the unsharp image signals $S_{us}k$ have a number of picture elements corresponding to the respective frequency bands and an interpolation processing is performed when the transformed noiseless signals $SH_{ak}$ obtained from the transformed noiseless band-limited signals $f_kSB_k$ are enlarged. The number of times by which the operation should be performed may be only 22364160= [(1024×1024+512×512+256×256+128×128+64×64+32×32)×16]. Actually, since the interpolation processing is also performed when obtaining the unsharp image signals $S_{us}k$, the number of times by which the operation should be performed amounts 44728320. Accordingly the total amount of operation in the processing of this embodiment is about ½.25 of that in the conventional processing. Accordingly, the operating time can be shortened to about ½.25 of that in the conventional processing.

The method of making the band-limited image signals need not be limited to that described above. For example, the band-limited image signals may be made by a method disclosed in the aforesaid Japanese Unexamined Patent Publication No. 10(1998)-75395.

Though, in the fifth embodiment described above, the band-limited image signals representing the characteristics of the respective frequency bands are obtained from the original image signal $S_{org}$ by a method of Laplacian pyramid, the band-limited image signals may be obtained by a wavelet transformation as disclosed in Japanese Unexamined Patent Publication No. 6(1994)-274615. An image processing system in accordance with a sixth embodiment of the present invention where a wavelet transformation is used will be described, hereinbelow.

Figure 47:
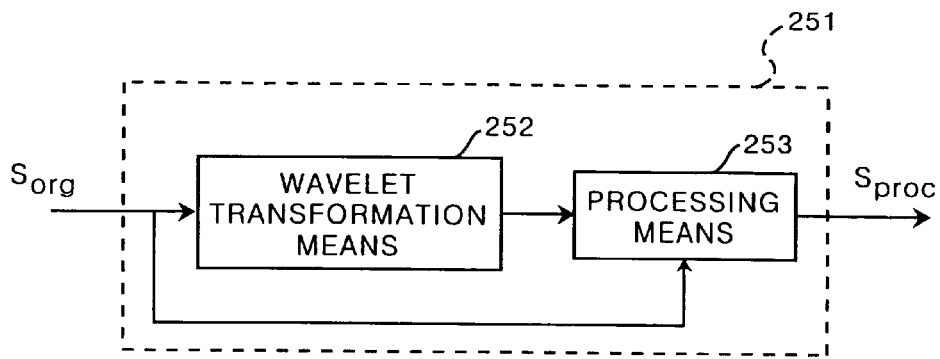
FIG. 47 is a schematic block diagram showing the arrangement of an image processing system in accordance with a sixth embodiment of the present invention.

FIG. 47 is a block diagram showing the image processing system of the sixth embodiment. In FIG. 47, the image processing system 251 in accordance with the sixth embodiment of the present invention comprises a wavelet transformation means 252 which carries out a wavelet transformation on an original image signal $S_{org}$ which is input from an image read-out apparatus or the like and has a predetermined resolution, and a processing means 253 which removes the noise component of the original image signal $S_{org}$ and carries out a frequency enhancement processing for enhancing a particular frequency on the original image signal $S_{org}$ on the basis of the signals obtained by the wavelet transformation and obtains a processed image signal $S_{proc}$. The main scanning direction and the sub-scanning direction as used in the following description are as shown in FIG. 22.

Figure 48:
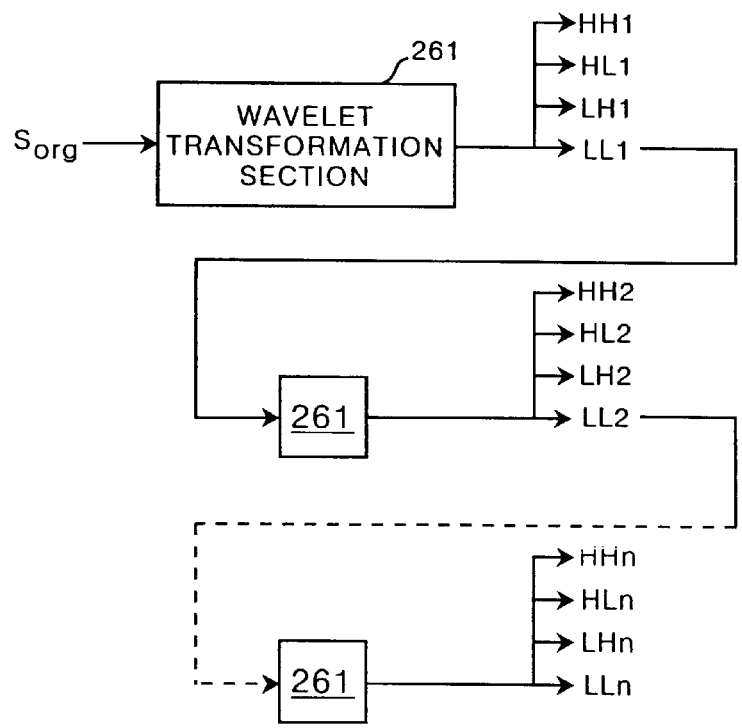
FIG. 48 is a schematic block diagram showing the wavelet transformation means.

FIG. 48 shows the structure of the wavelet transformation means 252. In this particular embodiment, the wavelet transformation means 252 carries out an orthogonal wavelet transformation where the coefficients of wavelet transformation are orthogonal to each other.

Figure 49:
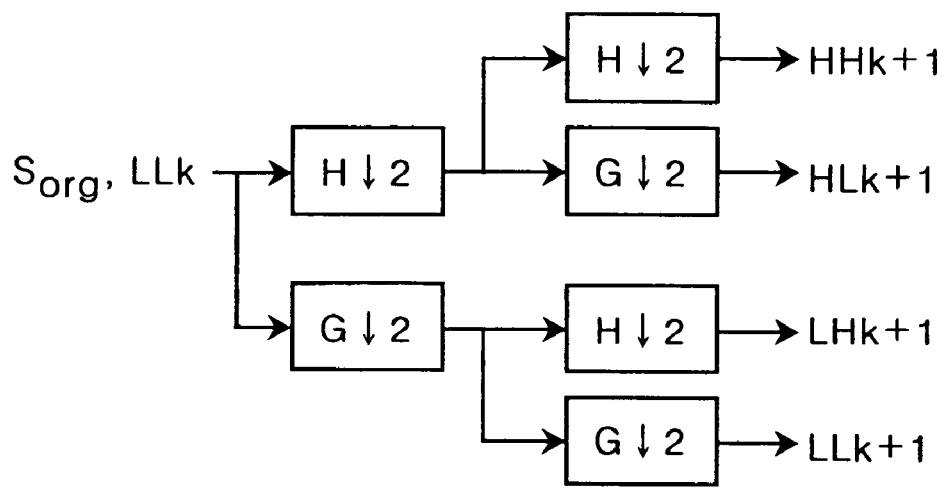
FIG. 49 is a block diagram for illustrating the processing executed by the wavelet transformation section.

As shown in FIG. 48, the original image signal $S_{org}$ is subjected to a wavelet transformation by a wavelet transformation section 261. FIG. 49 is a block diagram showing the wavelet transformation to be carried out by the wavelet transformation section 261. As shown in FIG. 49, a filtering processing is carried out on the original image signal $S_{org}$ (signal $LL_k$) in the main scanning direction by the use of fundamental wavelet functions H and G, and every second picture element is thinned in the main scanning direction (indicated at $\downarrow 2$ in FIG. 49), thereby reducing the number of picture elements in the main scanning direction by half. The function H is a high-pass filter and the function G is a low-pass filter. Then a filtering processing is carried out on each of the thinned signals in the sub-scanning direction by the use of the fundamental wavelet functions H and G, and every second picture element is thinned in the sub-scanning direction, thereby reducing the number of picture elements in the sub-scanning direction by half. Thus wavelet transformation coefficient signals $HH_1$, $HL_1$, $LH_1$ and $LL_1$ ($HH_{k+1}$, $HL_{k+1}$, $LH_{k+1}$ and $LL_{k+1}$) are obtained. The signal $LL_1$ represents an image obtained by reducing the original image to ½ in both longitudinal and lateral directions. The signals $HL_1$, $LH_1$ and $HH_1$ respectively represent a longitudinal edge, a lateral edge and an oblique edge in the image reduced to half of the original image in both the longitudinal and lateral directions.

Then the signal $LL_1$ is further subjected to the wavelet transformation by the wavelet transformation section 261 and signals $HH_2$, $HL_2$, $LH_2$ and $LL_2$ are obtained. The signal $LL_2$ represents an image obtained by reducing the original image to ¼ in both the longitudinal and lateral directions. The signals $HL_2$, $LH_2$ and $HH_2$ respectively represent a longitudinal edge, a lateral edge and an oblique edge in the image reduced to quarter of the original image in both the longitudinal and lateral directions.

Then by carrying out the wavelet transformation n times on each of the wavelet transformation coefficient signal $LL_k$ in the respective frequency bands, wavelet transformation coefficient signals $HH_1$ to $HH_n$, $HL_1$ to $HL_n$, $LH_1$ to $LH_n$ and $LL_1$ to $LL_n$ are obtained. The wavelet transformation coefficient signals $HH_n$, $HL_n$, $LH_n$ and $LL_n$ obtained by the n-th wavelet transformation are $(½)^n$ of the original image signal $S_{org}$ in the number of picture elements in each of the main scanning direction and the sub-scanning direction. Accordingly, as the value of n increases, the frequency band of the wavelet transformation coefficient signal becomes lower and the wavelet transformation coefficient signal represents a lower frequency component of the original image signal. That is, the wavelet transformation coefficient signal $HH_k$ (k=0 to n) represents change in frequency of the original image signal $S_{org}$ in both the main scanning direction and the sub-scanning direction and the frequency represented by the wavelet transformation coefficient signal $HH_k$ becomes lower as the value of k increases. The wavelet transformation coefficient signal $HL_k$ (k=0 to n) represents change in frequency of the original image signal $S_{org}$ in the main scanning direction and the frequency represented by the wavelet transformation coefficient signal $HL_k$ becomes lower as the value of k increases. Further, the wavelet transformation coefficient signal $LH_k$ (k=0 to n) represents change in frequency of the original image signal $S_{org}$ in the sub-scanning direction and the frequency represented by the wavelet transformation coefficient signal $LH_k$ becomes lower as the value of k increases.

The wavelet transformation coefficient signals for a plurality of frequency bands are shown in FIGS. 15A and 15B. For the purpose of simplicity, only the wavelet transformation coefficient signals obtained by first and second wavelet transformations are shown in FIGS. 5A and 15B. In FIG. 15B, the signal $LL_2$ represents an image obtained by reducing the original image to ¼ in both the main scanning direction and the sub-scanning direction.

In the wavelet transformation coefficient signals $HH_k$, $HL_k$, $LH_k$ and $LL_k$, the signals $HH_k$, $HL_k$ and $LL_k$ represent the edge components in the corresponding frequency band. In other words, these signals represent images having particular frequency bands of the original image (band-pass characteristics) and mainly represent the contrast of the image in the respective frequency bands. As described above, the wavelet transformation coefficient signal LLk represents a contraction of the original image. In this particular embodiment, the wavelet transformation coefficient signals $HH_k$, $HL_k$ and $LH_k$ are referred to as "the band-limited image signals" and the wavelet transformation coefficient signal LLk are referred to as "the resolution signal". Then "the band-limited image signals" together with "the resolution signal" are referred to as "the wavelet transformation coefficient signals". The lowest resolution signal $LL_n$ is not necessary to obtain the band-limited image signals and accordingly is taken as 0.

Figure 50:
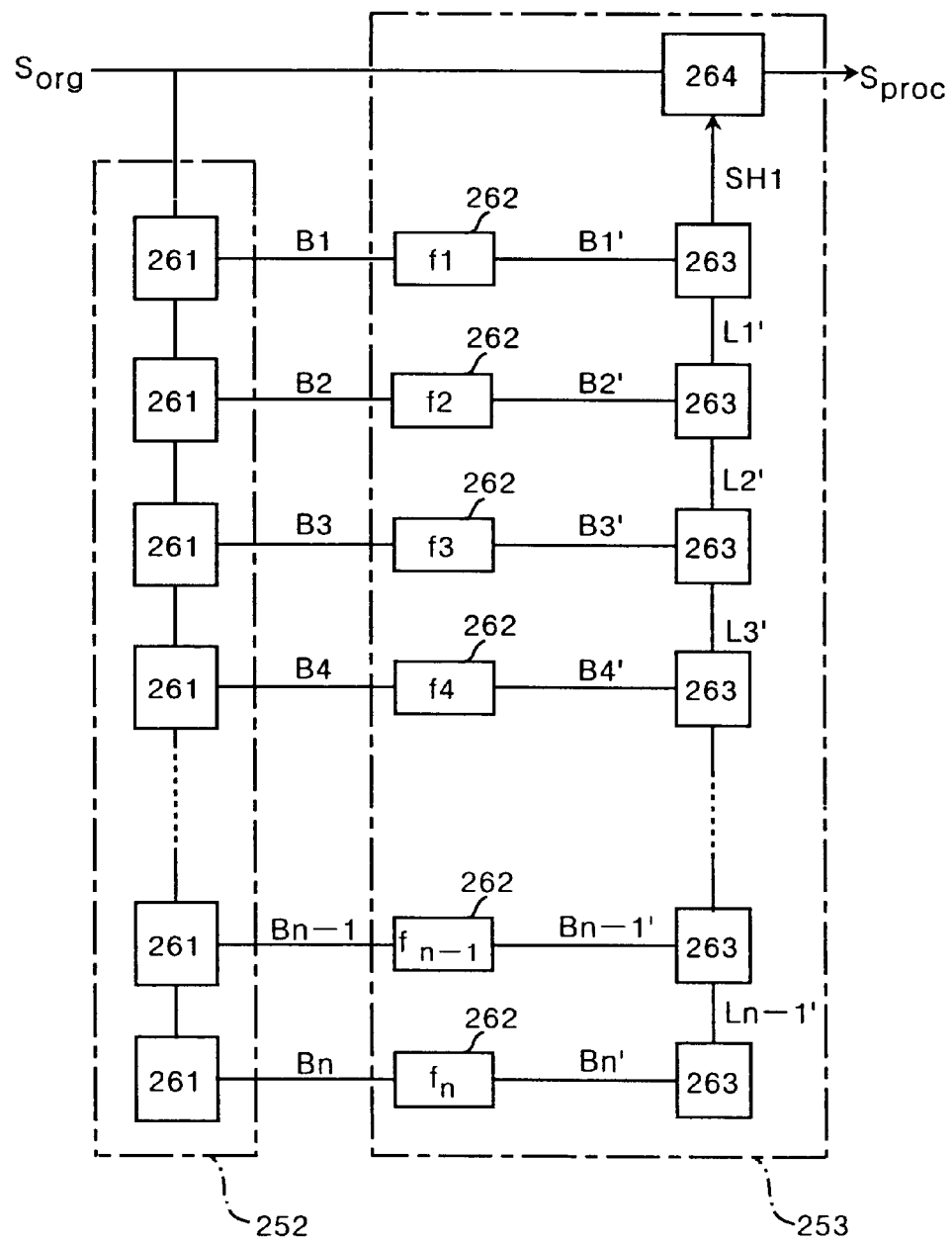
FIG. 50 is a schematic block diagram showing the arrangement of the part of the processing means which carries out the frequency enhancement processing and the band-limited image signal making means of the sixth embodiment.
Figure 51:
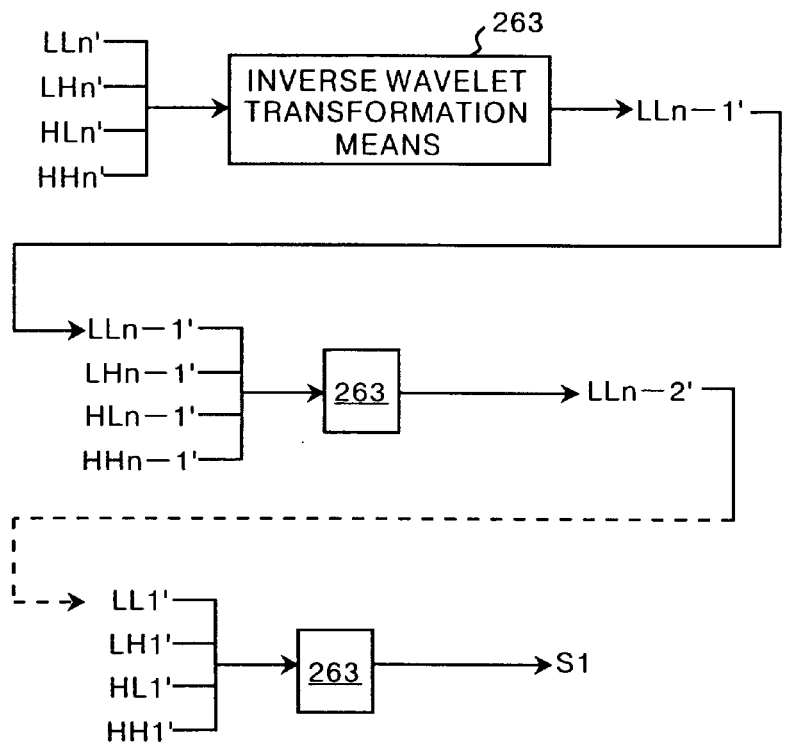
FIG. 51 is a view for illustrating the inverse wavelet transformation.

The processing means 253 carries out a noise removing processing and a frequency enhancement processing as the processing means 203 in the fourth embodiment. FIG. 50 shows the structure of the part of the processing means 253 for carrying out the frequency enhancement processing together with the wavelet transformation means 252. As shown in FIG. 50, the band-limited image signals $B_k$ ($HH_k$, $HL_k$ and $LH_k$) obtained by the wavelet transformation means 252 are suppressed to predetermined sizes with transformation functions $f_1$ to $f_n$ in respective transformation circuits 262 and transformed band-limited signals $B_k'$ ($HH_k'$, $HL_k'$, $LH_k'$, k=1 to n) are obtained. An inverse wavelet transformation is carried out on the transformed band-limited signals $HH_k'$, $HL_k'$ and $LH_k'$ by inverse wavelet transformation means 263. FIG. 51 is a view for illustrating the inverse wavelet transformation to be carried out by the inverse wavelet transformation means 263. As shown in FIG. 51, the inverse wavelet transformation means 263 carries out an inverse wavelet transformation on the transformed band-limited signals $HH_n'$, $HL_n'$ and $LH_n'$ in the lowest frequency band ($LL_1$=0) and a processed signal $LL_{n-1}'$ is obtained.

Figure 52:
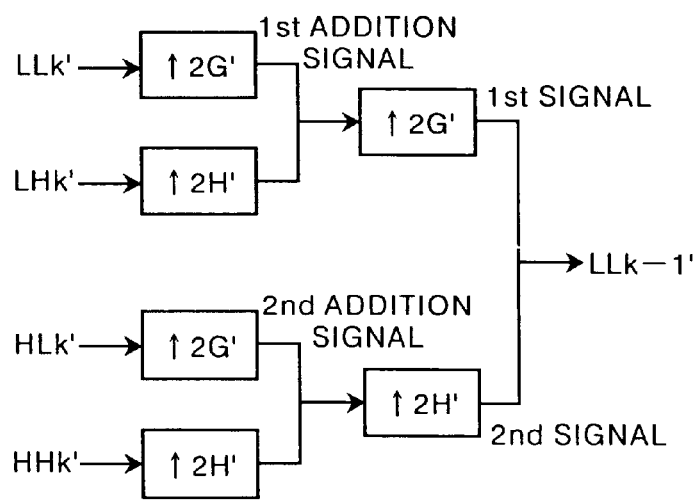
FIG. 52 is a block diagram showing the processing executed by the inverse wavelet transformation means.

FIG. 52 shows the processing executed by the inverse wavelet transformation means 263. As shown in FIG. 52, the transformed band-limited image signal $LL_n'$ ($LL_k'$, $LL_n$=0 when k=n) and the transformed band-limited image signal $LH_n'$ ($LH_k'$) are subjected to a processing for enlarging each space between picture elements by one picture element (indicated at ↑2 in FIG. 52) in the sub-scanning direction and the processed signals are further subjected to a filtering processing by the use of inverse wavelet transformation functions G' and H', which are inverse to the aforesaid functions G and H, and the signals obtained are added up to obtain a first addition signal. Then the first addition signal is subjected to a processing for enlarging each space between picture elements by one picture element in the main scanning direction and the processed signal is further subjected to a filtering processing by the use of inverse wavelet transformation functions G', whereby a first signal is obtained. On the other hand, the transformed band-limited image signal $HL_1'$ ($HL_k'$) and the transformed band-limited image signal $HH_n'$ ($HH_k'$) are subjected to a processing for enlarging each space between picture elements by one picture element in the sub-scanning direction and the processed signals are further subjected to a filtering processing by the use of the inverse wavelet transformation functions G' and H' and the signals obtained are added up to obtain a second addition signal. Then the second addition signal is subjected to a processing for enlarging each space between picture elements by one picture element in the main scanning direction and the processed signal is further subjected to a filtering processing by the use of inverse wavelet transformation functions H', whereby a second signal is obtained. Then the processed signal $LL_{n-1}'$ ($LL_k'$-1) is obtained by adding the first signal to the second signal. Since the wavelet transformation coefficient signal $LL_n$ at the lowest resolution is 0, the processed signal $LL_{n-1}'$ represents the band-pass characteristic of the original image signal $S_{org}$.

Thereafter the inverse wavelet transformation is carried out by the inverse wavelet transformation means 263 on the transformed band-limited image signals $HH_{n-1}'$, $HL_{n-1}'$, $LH_{n-1}'$ and $LL_{n-1}'$ in the same manner and a processed signal $LL_{n-2}'$ is obtained. By repeating these steps, processed signals in the highest frequency band $HH_1'$, $HL_1'$ and $LL_1'$ are obtained. Further by carrying out the inverse wavelet transformation on the processed signals $HH_1'$, $HL_1'$ and $LL_1'$, a high frequency component signal $SH_1$ is obtained.

Figure 53:
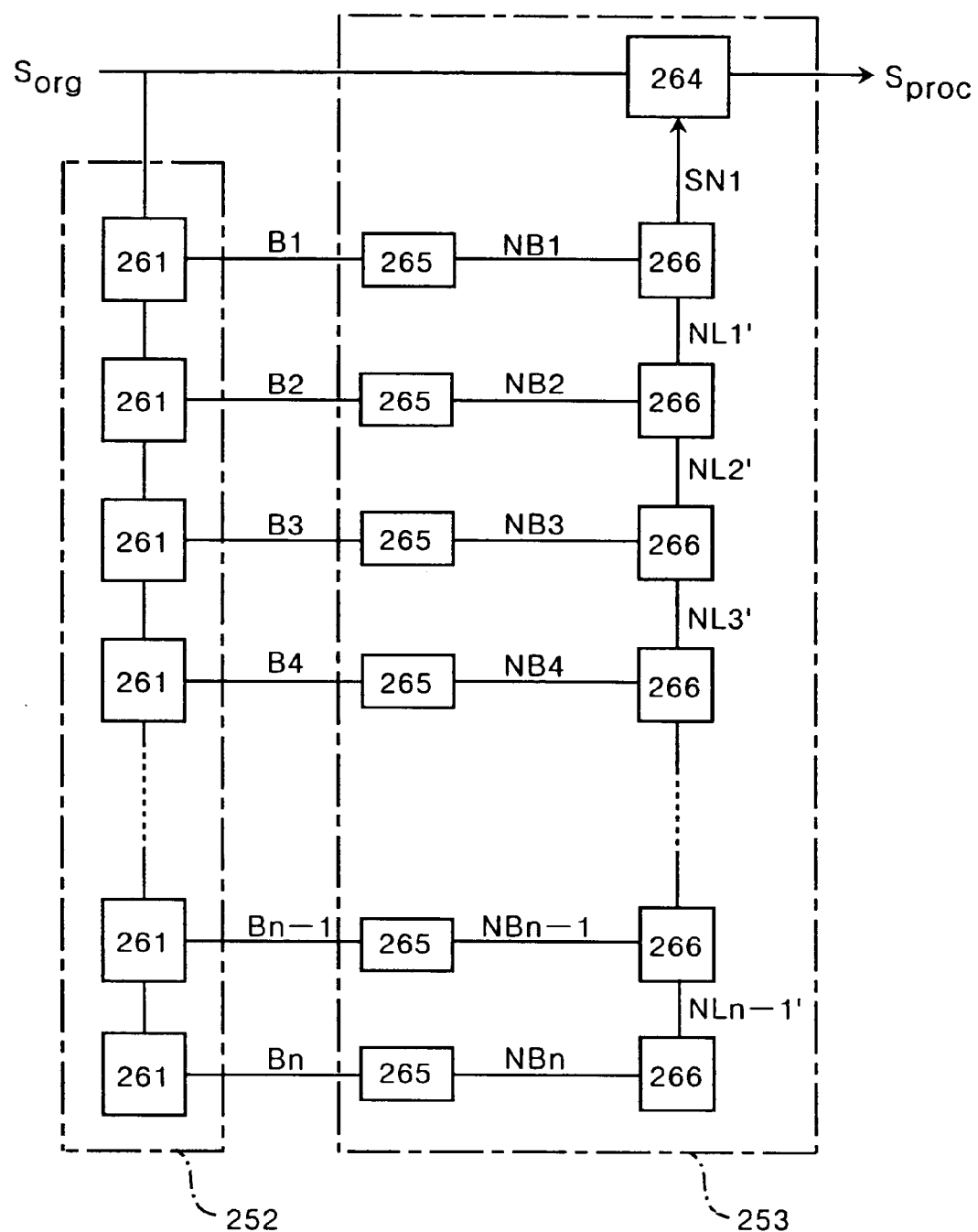
FIG. 53 is a view showing the part of the processing means for carrying out the noise removing processing, together with the band-limited image signals making means.

FIG. 53 shows the part of the processing means 253 for carrying out the noise removing processing, together with the inverse wavelet transformation means 252. As shown in FIG. 53, the band-limited image signals $B_k$ ($HH_k$, $HL_k$ and $LH_k$) obtained by the inverse wavelet transformation 252 are input into a noise separation means 265. The noise separation means 265 is of the same structure as the noise separation means 226 in the fourth embodiment, and noise band-limited image signals $NB_k$ ($NHH_k$, $NHL_k$, $NLH_k$) are obtained in the same manner as in the fourth embodiment. That is, by considering the band-limited image signals $HH_k$, $HL_k$ and $LH_k$ as the band-limited image signals $B_k$ in the fourth embodiment, and carrying out calculation of the concentrations by the iris filter, setting of the spatial filter, filtering processing by the spatial filter, and subtraction of the filtered signals from the band-limited image signals $HH_k$, $HL_k$ and $LH_k$ in the same manner as described above, the noise band-limited image signals $NHH_k$, $NHL_k$ and $NLH_k$ are obtained.

Figure 54:
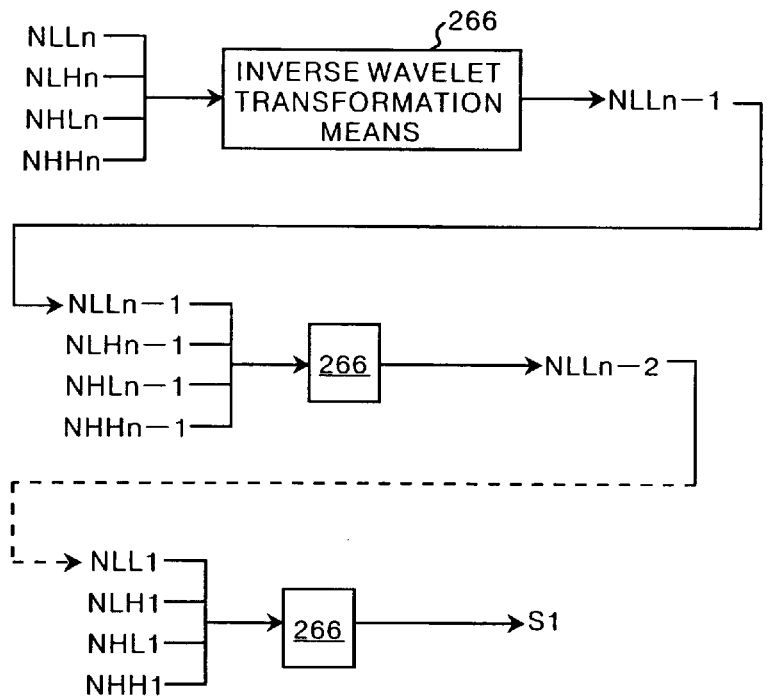
FIG. 54 is a view for illustrating the inverse wavelet transformation.

When the noise band-limited image signals $NB_k$ are thus obtained, an inverse wavelet transformation is carried out on the noise band-limited image signals $NB_k$ ($NHH_k$, $NHL_k$ and $NLH_k$, k=1 to n) in an inverse wavelet transformation means 266. As shown in FIG. 54, the inverse wavelet transformation means 266 carries out an inverse wavelet transformation on the noise band-limited image signals $NHH_n$, $NHL_n$ and $NLH_n$ in the lowest frequency band ($NLL_n$32 0) and a processed signal $NLL_{n-1}$ is obtained.

Figure 55:
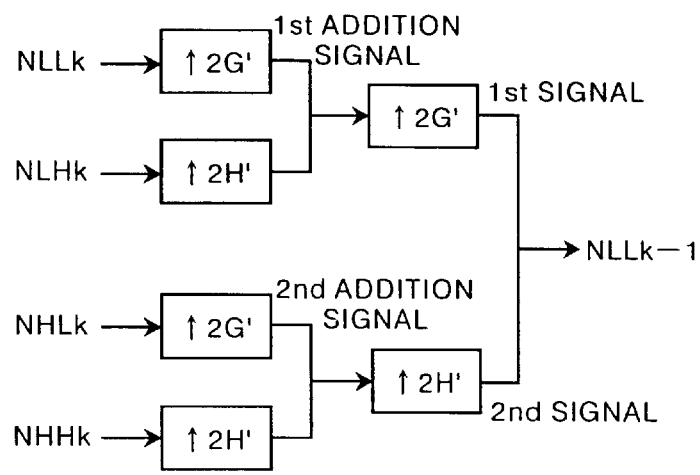
FIG. 55 is a block diagram showing the processing executed by the inverse wavelet transformation means.

FIG. 55 shows the processing executed by the inverse wavelet transformation means 266. As shown in FIG. 55, the noise band-limited image signals $NLL_n$ ($NLL_k$, $NLL_n$=0 when k=n) and $NLH_n$ ($NLH_k$) are subjected to a processing for enlarging each space between picture elements by one picture element (indicated at ↑2 in FIG. 55) in the sub-scanning direction and the processed signals are further subjected to a filtering processing by the use of inverse wavelet transformation functions G' and H', which are inverse to the aforesaid functions G and H, and the signals obtained are added up to obtain a first addition signal. Then the first addition signal is subjected to a processing for enlarging each space between picture elements by one picture element in the main scanning direction and the processed signal is further subjected to a filtering processing by the use of inverse wavelet transformation functions G', whereby a first signal is obtained. On the other hand, the signals $NHL_n$ ($NHL_k$) and $NHH_n$ ($NHH_k$) are subjected to a processing for enlarging each space between picture elements by one picture element in the sub-scanning direction and the processed signals are further subjected to a filtering processing by the use of the inverse wavelet transformation functions G' and H' and the signals obtained are added up to obtain a second addition signal. Then the second addition signal is subjected to a processing for enlarging each space between picture elements by one picture element in the main scanning direction and the processed signal is further subjected to a filtering processing by the use of inverse wavelet transformation functions H', whereby a second signal is obtained. Then a (NLLk−1) is obtained by adding the first signal to the second signal. Since the wavelet transformation coefficient signal $NLL_n$ at the lowest resolution is 0, the noise band-limited image signal $NLL_{n-1}$ represents the band-pass characteristic of the original image signal $S_{org}$.

Thereafter the inverse wavelet transformation is carried out by the inverse wavelet transformation means 266 on the noise band-limited image signals $NHH_{n-1}$, $NHL_{n-1}$, $NLH_{n-1}$ and $NLL_{n-1}$ in the same manner and a noise band-limited image signal $NLL_{n-2}$ is obtained. By repeating these steps, noise band-limited image signals in the highest frequency band $NHH_1$, $NHL_1$ and $NLL_1$ are obtained. Further by carrying out the inverse wavelet transformation on the noise band-limited image signals $NHH_1$, $NHL_1$ and $NLL_1$, a noise signal $SN_1$ is obtained.

As in the fourth embodiment, operation represented by the aforesaid formula (18) is carried out by an operator 264 on the basis of the high frequency component signal $SH_1$ and the noise signal $SN_1$ and a processed image signal $S_{proc}$ is obtained.

Figure 56:
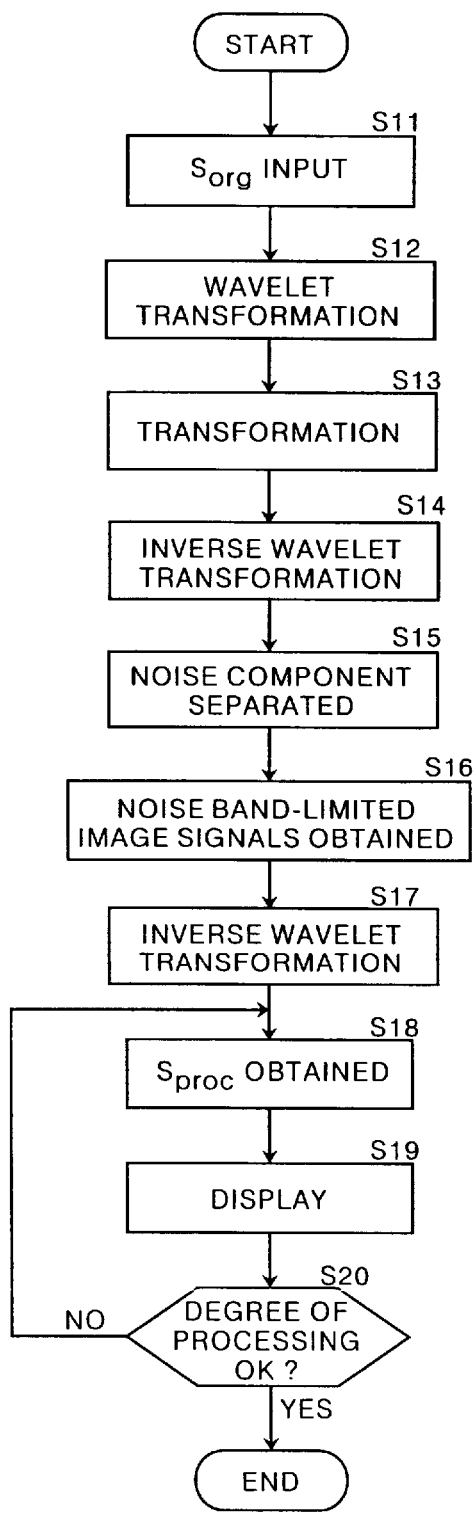
FIG. 56 is a flow chart for illustrating operation of the image processing system of the sixth embodiment.

Operation of the image processing system 251 of the fifth embodiment will be described with reference to the flow chart shown in FIG. 56. An original image signal $S_{org}$ is first input into the image processing system 251, for instance, from an image read-out apparatus. (step S11) The original image signal $S_{org}$ is input into the wavelet transformation means 252 and wavelet transformation coefficient signals $B_k$ for the respective frequency bands are made. (step S12) The wavelet transformation coefficient signals $B_k$ are transformed by the aforesaid transformation functions and transformed signals $B_k'$ are obtained. (step S13) The high frequency component signal $SH_1$ is obtained by carrying out the inverse wavelet transformation on the transformed signals $B_k'$ by the inverse wavelet transformation means 263. (step S14)

The noise component of the wavelet transformation coefficient signals $B_k$ is separated and the noise band-limited image signals $NB_k$ are obtained. (steps S15 and S16) The noise signal $SN_1$ is obtained by the inverse wavelet transformation of the noise band-limited image signals $NB_k$ (step S17)

Steps S15 to S17 may be executed prior to steps S13 and S14. However, when steps S15 to S17 and steps S13 and S14 are executed in parallel, the processing can be carried out at a higher speed.

Then, a processed image signal $S_{proc}$ is obtained by use of the high frequency component signal $SH_1$ and the noise signal $SN_1$ according to the aforesaid formula (18). (step S18) A visible image is displayed on a monitor (not shown) on the basis of the processed image signal $S_{proc}$. (step S19) The operator observes the image, and if it is necessary to change the degree of frequency enhancement processing and/or the degree of removing noise, the operator inputs information on the degree by which the degree of frequency enhancement processing and/or the degree of removing noise is to be changed into the processing means 203. (step S20) Upon receipt of the information, the processing means redoes steps S8 to S10 after changing the coefficient of enhancement $\beta(S_{org})$ and/or $\alpha(S_{org})$ in the aforesaid formula (18). This is repeated until the degree of frequency enhancement and/or the degree of removing noise processing becomes proper.

As can be understood from the description above, also in the image processing of the fifth embodiment, since the degree of image processing on the original image signal $S_{org}$ and the degree of removing noise can be freely changed by only changing the values of the coefficients of enhancement $\beta(S_{org})$ band $\alpha(S_{org})$, the degree of image processing and the degree of removing noise can be easily changed in a shorter time as compared with the method disclosed in Japanese Unexamined Patent Publication No. 5(1993)-244508 where the degree of image processing is changed by correcting the nonlinear functions and reconstructing an image, whereby the time required to obtain a processed image is shortened and stress on the operator can be lightened.

Though, in the embodiments described above, the frequency enhancement processing is employed as the image processing to be carried out by the operator 225 or 264, a dynamic range compression processing may be employed. In this case, the operation represented by the following formula (19) is carried out on the high frequency component signal $SH_1$ obtained in the manner described above and the dynamic range of the original image signal $S_{org}$ is compressed. In accordance with the following formula (19), the degree of dynamic range compression of the processed image signal $S_{proc}$ can be changed by changing the value of $D(S_{org}-SH_1)$.

$$S_{proc}=S_{org}+D(S_{org}-SH_1)-\alpha(S_{org})\cdot SN_1 \tag{19}$$

wherein $D(S_{org}-SH_1)$ represents a coefficient of dynamic range compression, D being a function for transforming $(S_{org}-SH_1)$.

It is preferred that, when the dynamic range compression processing is to be carried out, for instance, transformation functions shown in FIG. 20 or 21 or combinations of these functions be employed as the functions $f_k$ for transforming the band-limited image signals.

In accordance with the transformation functions shown in FIG. 20, the band-limited signals are transformed so that those which are large in amplitude are suppressed and the degree of suppression is increased as the frequency band of the band-limited signal becomes higher. This is for taking into account the fact that higher frequency components contained in edges of an actual radiation image is smaller in amplitude than low frequency components. In actual radiation images, even a substantially sharp edge is not in the form of a correct step and the amplitude often becomes smaller as the frequency becomes higher. Accordingly, it is preferred that suppression be made from a smaller amplitude as the frequency of the band-limited signals becomes higher. The functions shown in FIG. 20 serve for this purpose.

The transformation functions shown in FIG. 21 are for transforming the band-limited signals to those having values not larger than absolute values of the band-limited signals, which values are determined on the basis of the absolute values of the band-limited signals. As the frequency of the frequency band to be processed by the function becomes lower, the absolute value of a transformed image signal obtained by transforming a band-limited signal whose absolute value is in a predetermined range near 0 becomes smaller. That is, the functions all pass through the origin and all have inclinations smaller than 1. Further, the inclination near 0 is smaller as the frequency of the frequency band to be processed by the function becomes lower. When an add signal obtained by adding up the transformed image signals is added to the original image signal $S_{org}$, these functions contribute to smoothen the joint between the original image signal $S_{org}$ and the add signal, that is, rise of the signal.

The operator 225 or 264 may simultaneously execute a frequency enhancement processing and a dynamic range compression processing as shown in the following formula (20).

$$S_{proc}=S_{org}+\beta(S_{org}) \cdot SH_1+D(S_{org}SH_1')-\alpha(S_{org}) \cdot SN_1 \qquad (20)$$

In this case, the high frequency component signal $SH_1$ for carrying out the frequency enhancement processing may be obtained by carrying out the transformation processing on the band-limited image signals by the use of the transformation functions shown in FIG. 9, and the high frequency component signal $SH_1'$ for carrying out the dynamic range compression processing may be obtained by carrying out the transformation processing on the band-limited image signals by the use of the transformation functions shown in FIG. 20 or 21.

When both the frequency enhancement processing and the dynamic range compression processing are to be carried out, the number of times by which the operation should be performed for the interpolation processing amounts 22364160×3=67092480. This is about ⅟₁.₅ of that in the conventional processing. Accordingly, the operating time can be shortened to about ⅟₁.₅ of that in the conventional processing.

The processing represented by the following formula (21) may be carried out. That is, by obtaining transformed noise band-limited image signals $f_kNB_k$ by transforming the noise band-limited image signals $NB_k$ (k=1 to n) by transformation functions $f_k$ the same as those used in calculation of the high frequency component signal $SH_1$, and repeating carrying out the interpolation processing on the transformed noise band-limited image signals $f_kNB_k$ and adding to the one-class higher resolution transformed noise band-limited image signals $f_kNB_k$ up to the highest frequency band as in the transformed signal $f_kB_k$, a transformed noise signal $SN_{p1}$ for the highest resolution is obtained. Then, as the signal representing information on a high frequency component of the original image, the difference between the transformed noise signal $SN_{p1}$ and the high frequency component signal $SH_1$ is obtained.

$$S_{proc}=S_{org}+\beta(S_{org}) \cdot (SH_1-SN_{p1})-\alpha(S_{org}) \cdot SN_1 \qquad (21)$$

Figure 57:
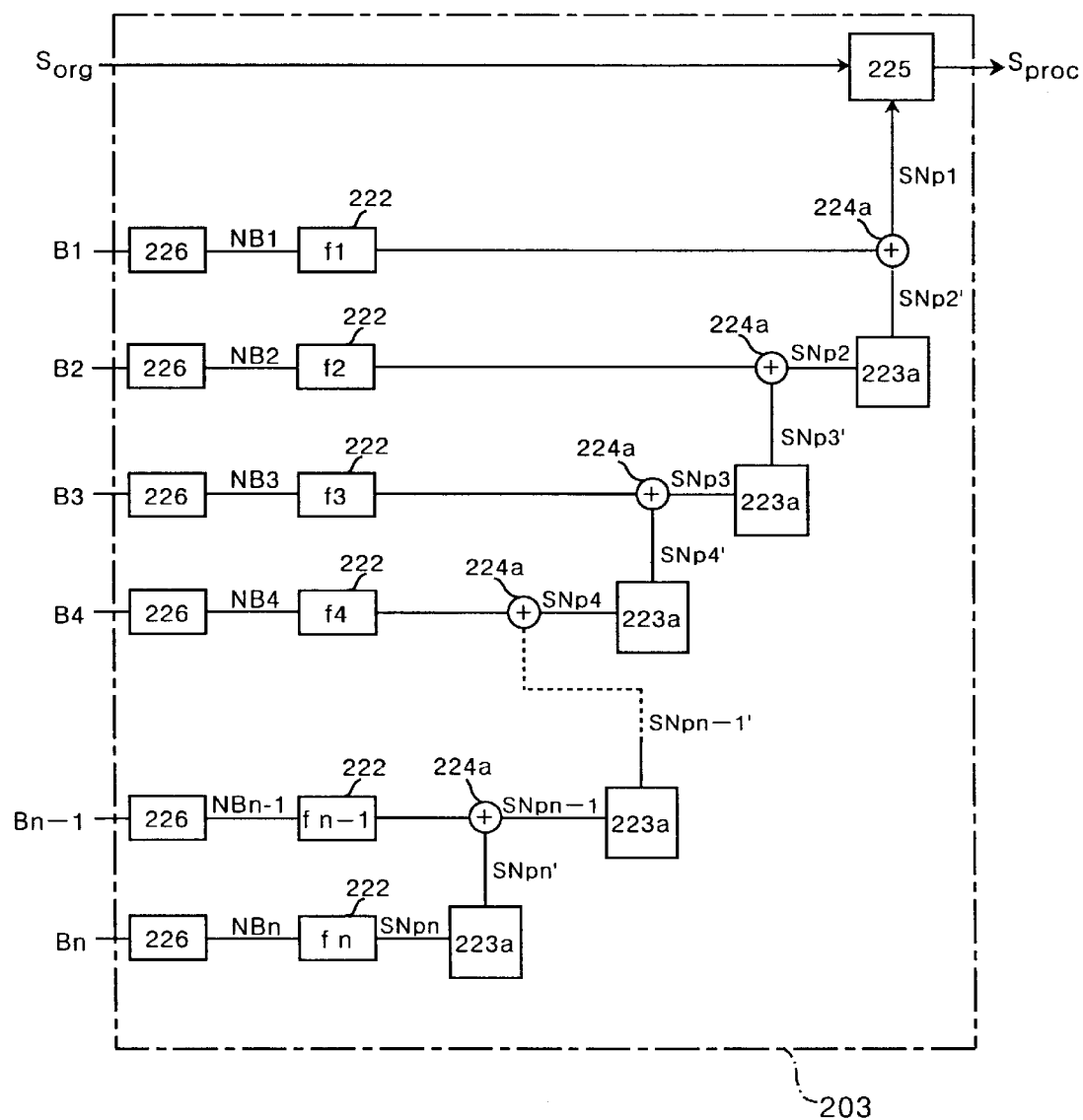
FIG. 57 is a view showing the part of the processing means where the transformation processing is carried out on the noiseless signal.

FIG. 57 shows the part of the processing means 203 where the transformed noise signal $SN_{p1}$ is calculated. As shown in FIG. 57, the noise component of the band-limited image signals $B_k$ made by the band-limited image signals making means 202 is removed by the noise separation means 226 and noise band-limited image signals $NB_k$ are obtained. The noise band-limited image signals $NB_k$ are suppressed to a desired size by transformation functions $f_1$ to $f_n$ in the transformation circuits 222, and transformed noise band-limited signals $f_kNB_k$ (k=1 to n) are obtained. The transformed noise band-limited signal $f_nNB_n$ which is the lowest in the resolution in the transformed noise band-limited signals $f_kNB_k$ is taken as a transformed noise signal $SN_{pn}$ and the transformed noise signal $SN_{pn}$ is subjected to an interpolation processing to have the same number of picture elements as the one-class higher transformed noise band-limited signals $f_{n-1}NB_{n-1}$ by the interpolation means 223a, whereby an enlarged noise signal $SN_{pn}'$ is obtained. Thereafter the enlarged noise signal $SN_{pn}'$ is added to the transformed noise band-limited signals $f_{n-1}NB_{n-1}$ by an adder 224a and another transformed noise signal $SN_{pn-1}$ is obtained. Then the transformed noise signal $SN_{pn-1}$ is interpolated and enlarged, and another enlarged noise signal $SN_{pn-1}'$ is obtained and the enlarged noise signal $SN_{pn-1}'$ is added to the transformed noise band-limited signals $f_{n-2}NB_{n-2}$, whereby a transformed noise signal $SN_{pn-2}$ is obtained. By repeating these steps, a highest resolution transformed noise signal $SN_{p1}$ is obtained. The transformation circuits 222, the interpolation processing means 223a and the adders 224a form the high frequency component obtaining means.

When the transformed noise signal $SN_{p1}$ is obtained, a dynamic range compression processing may be carried out in addition to the frequency enhancement processing as represented by the following formula (22).

$$S_{proc}32 S_{org}+\beta(S_{org}) \cdot (SH_1-SN_{p1})+D(S_{org}SH_1')-\alpha(S_{org}) \cdot SN_1 \qquad (22)$$

The processing represented by the following formula (23) maybe carried out. That is, by obtaining noiseless band-limited image signals $SB_k$ by subtracting the noise band-limited image signals $NB_k$ (k=1 to n) from the band-limited image signals $B_k$ (k=1 to n), obtaining transferred noiseless band-limited image signals $f_kSB_k$ by transforming the noiseless band-limited image signals $SB_k$ by transformation functions $f_k$ the same as those used in calculation of the high frequency component signal $SH_1$, and repeating carrying out the interpolation processing on the transferred noiseless band-limited image signals $f_kSB_k$ and adding to the one-class higher resolution transformed noiseless band-limited image signals $f_{k-1}SB_{k-1}$ up to the highest frequency band as in the transformed signal $f_kB_k$, a transformed noiseless high frequency component signal $SH_{a1}$ for the highest resolution is obtained as the signal representing information on a high frequency component of the original image.

$$S_{proc}32 S_{org}+\beta(S_{org}) \cdot SH_{a1}-\alpha(S_{org}) \cdot SN_1 \qquad (23)$$

Figure 58:
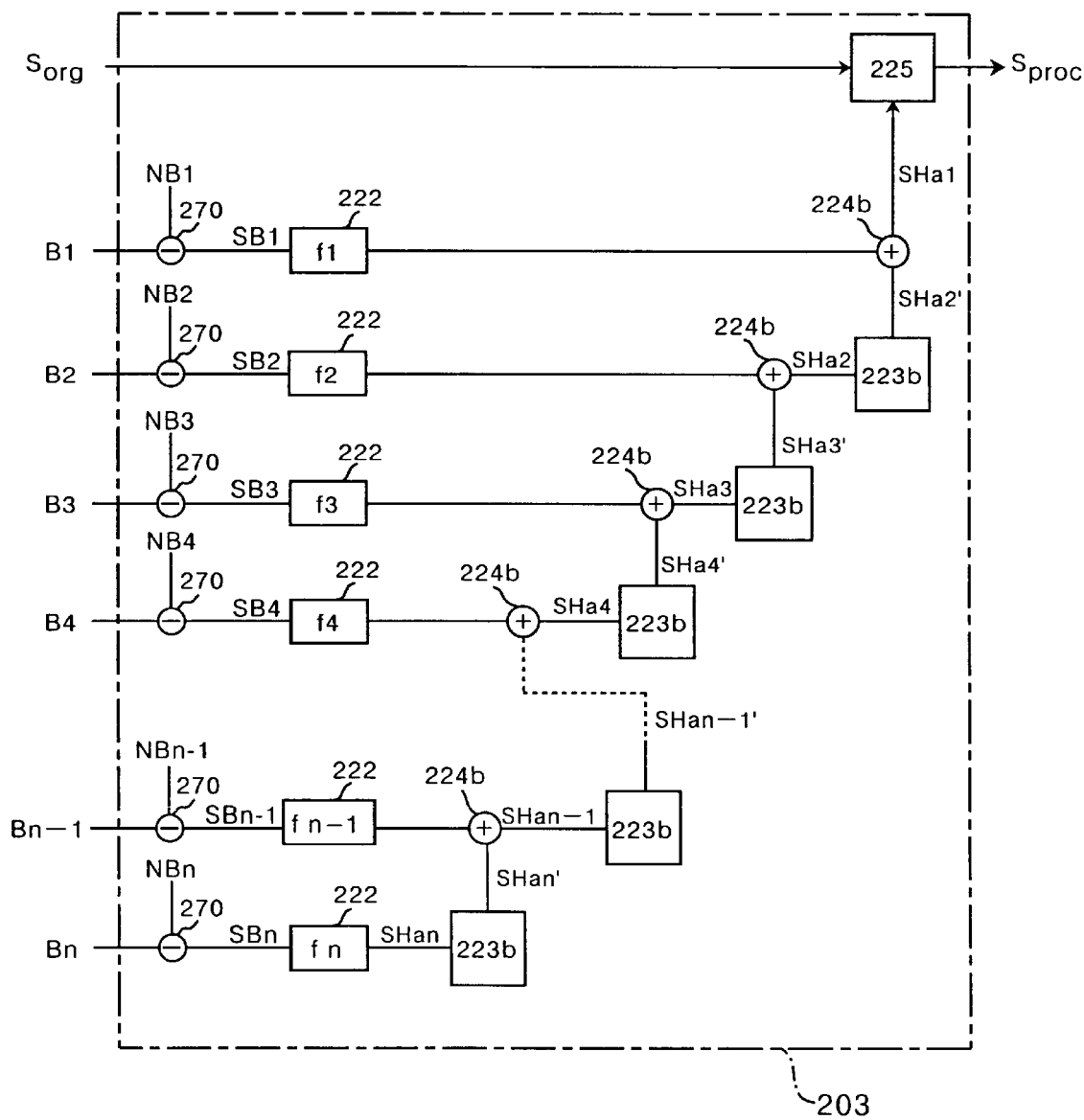
FIG. 58 is a view showing the part of the processing means where the noise is removed from the band-limited image signals and the transformation processing is carried out on the noiseless band-limited image signals.

FIG. 58 shows the part of the processing means 203 where transformed noiseless high frequency component signal $SH_{a1}$ is calculated. As shown in FIG. 58, the noise band-limited image signals $NB_k$ obtained by the noise separation means 226 are subtracted from the band-limited image signals $B_k$ by subtracters 270 and noiseless band-limited image signals $SB_k$ are obtained. The noiseless band-limited image signals $SB_k$ are suppressed to predetermined sizes with transformation functions $f_1$ to $f_n$ in respective transformation circuits 222 and transformed noiseless band-limited signals $f_kSB_k$ are obtained.

The transformed noiseless band-limited signal $f_nSB_n$ which is the lowest in the resolution in the transformed noiseless band-limited signals $f_kSB_k$ is taken as a transformed noiseless signal $SH_{an}$ and the transformed noiseless signal $SH_{an}$ is subjected to an interpolation processing to have the same number of picture elements as the one-class higher transformed noiseless band-limited signal $f_{n-1}SB_{n-1}$ by the interpolation means 223b, whereby an enlarged noiseless signal $SH_{an}'$ is obtained. Thereafter the enlarged noiseless signal $SH_{an}'$ is added to the transformed noiseless band-limited signal $f_{n-1}SB_{n-1}$ by an adder 224b and another transformed noiseless signal $SH_{an-1}$ is obtained. Then the transformed noiseless signal $SH_{an-1}$ is interpolated and enlarged, and another enlarged noiseless signal $SH_{an-1}'$ is obtained and the enlarged noiseless signal $SH_{an-1}'$ is added to the transformed noiseless band-limited signal $f_{n-2}SB_{n-2}$, whereby a transformed noiseless signal $SH_{an-2}$ is obtained. By repeating these steps, a highest resolution transformed noiseless signal $SH_{a1}$ is obtained and is taken as the high frequency component signal. The transformation circuits 222, the interpolation processing means 223b and the adders 224b form the high frequency component obtaining means.

When the transformed noiseless signal $SH_{a1}$ is obtained, a dynamic range compression processing may be carried out in addition to the frequency enhancement processing as represented by the following formula (24).

$$S_{proc}=S_{org}+\beta(S_{org})\cdot SH_{a1}+D(S_{org}-SH_1')-\alpha(S_{org})\cdot SN_1 \quad (24)$$

Though, in the embodiments described above, a nonlinear processing is carried out on the band-limited image signals using nonlinear transformation functions, the transformation functions need not be limited to nonlinear functions but may be linear functions or constants.

Further, though, in the embodiments described above, the noise signals are obtained from the band-limited image signals $B_k$ by the use of an iris filter, they may be obtained by other various methods. For example, local dispersion of the band-limited image signals $B_k$ in a mask of a predetermined size is obtained and picture elements which are small in the local dispersion are considered to be noise. Then the noise signals may be obtained by separating the noise component from the band-limited image signals $B_k$.

Further the noise signal may be obtained on the basis of picture element vectors calculated for picture elements of the image represented by the band-limited image signal $B_k$.

The picture element vector represents the inclination and the direction of inclination of the value of an object picture element (a picture element of the image represented by a band-limited image signal $B_k$). For example, the differences between the value of the object picture element and picture elements near the object picture element in a plurality of directions (when a plurality of picture elements are taken in one direction, the difference between the value of the object picture element and the average of the values of the picture elements near the object picture element) are calculated and the direction in which the difference is maximized or minimized is determined. Then the picture element vector is calculated on the basis of the direction in which the difference is maximized or minimized and the value of the difference.

When the picture element vector is calculated on the basis of the direction in which the difference is maximized, the picture element vector represents the direction of signal gradient, and when the picture element vector is calculated on the basis of the direction in which the difference is minimized, the picture element vector represents the direction of equi-signal line. When the picture element vector is obtained in the direction of signal gradient and the length of the vector represents the difference in value between the object picture element and a picture element near the object picture element, the probability that the picture element is on an edge portion is higher as the length of the vector increases and the probability that the picture element is on a flat portion is higher as the length of the vector decreases. When the picture element vector is obtained in the direction of signal gradient and the length of the vector represents the reciprocal of the difference in value between the object picture element and a picture element near the object picture element, the probability that the picture element is on an edge portion is higher as the length of the vector decreases and the probability that the picture element is on a flat portion is higher as the length of the vector increases.

When the picture element vector is obtained in the direction of equi-signal line and the length of the vector represents the difference in value between the object picture element and a picture element near the object picture element, the probability that the picture element is on an edge portion is higher as the length of the vector decreases and the probability that the picture element is on a flat portion is higher as the length of the vector increases. When the picture element vector is obtained in the direction of equi-signal line and the length of the vector represents the reciprocal of the difference in value between the object picture element and a picture element near the object picture element, the probability that the picture element is on an edge portion is higher as the length of the vector increases and the probability that the picture element is on a flat portion is higher as the length of the vector decreases.

Thus whether the picture element is on a flat portion, that is, whether the picture element is a noise component, can be determined on the basis of the picture element vector, and the noise component of the band-limited image signals $B_k$ can be separated from the band-limited image signals $B_k$ on the basis of the picture element vector. For example, after carrying out a smoothing processing on the separated noise component, thereby reducing the values of the picture elements, a noise signal may be obtained by separating the noise component from the band-limited image signals $B_k$ on the basis of the smoothed signal.

Though, in the fifth and sixth embodiments, the coefficients of enhancement by which the high frequency its component signal $SH_1$ and the noise signal $SN_1$ are multiplied in the aforesaid formula (16) or the like are a function of the original image signal $S_{org}$, the coefficients of enhancement need not be a function of the original image signal $S_{org}$, but may be, for instance, a constant such as $\beta$ or $\alpha$.

An image processing system in accordance with a seventh embodiment of the present invention will be described, hereinbelow. The image processing system of the seventh embodiment is for carrying out a noise removing processing on an original image signal obtained by reading out a radiation image of a human body recorded on a stimulable phosphor sheet so that an image suitable for diagnosis can be obtained. An image reproduced on the basis of the processed image signal is mainly recorded on photographic film and used in diagnosis.

Figure 61:
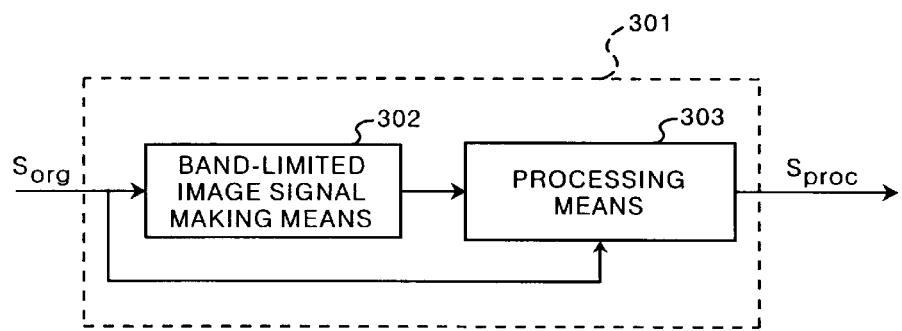
FIG. 61 is a schematic block diagram showing the arrangement of an image processing system in accordance with a seventh embodiment of the present invention.

In FIG. 61, an image processing system 301 in accordance with the seventh embodiment of the present invention comprises a band-limited image signal making means 302 which makes a plurality of band-limited image signals representing the frequency response characteristics for the respective frequency bands from an original image signal $S_{org}$ which is input from an image read-out apparatus or the like and has a predetermined resolution, and a processing means 303 which carries out a noise removing processing on the original image signal $S_{org}$, thereby obtaining a processed image signal $S_{proc}$.

In this particular embodiment, the original image signal $S_{org}$ is a digital image signal obtained by reading out a radiation image of a human body recorded on a stimulable phosphor sheet by scanning the stimulable phosphor sheet with a laser beam in a radiation image recording and reproducing system using a stimulable phosphor sheet disclosed, for instance, in Japanese Unexamined Patent Publication Nos. 55(1980)-12492 and 56(1981)-11395.

When reading out the radiation image, the laser beam is caused to scan the stimulable phosphor sheet in the main scanning shown in FIG. 22 while moving the stimulable phosphor sheet in a sub-scanning direction shown in FIG. 22.

Figure 62:
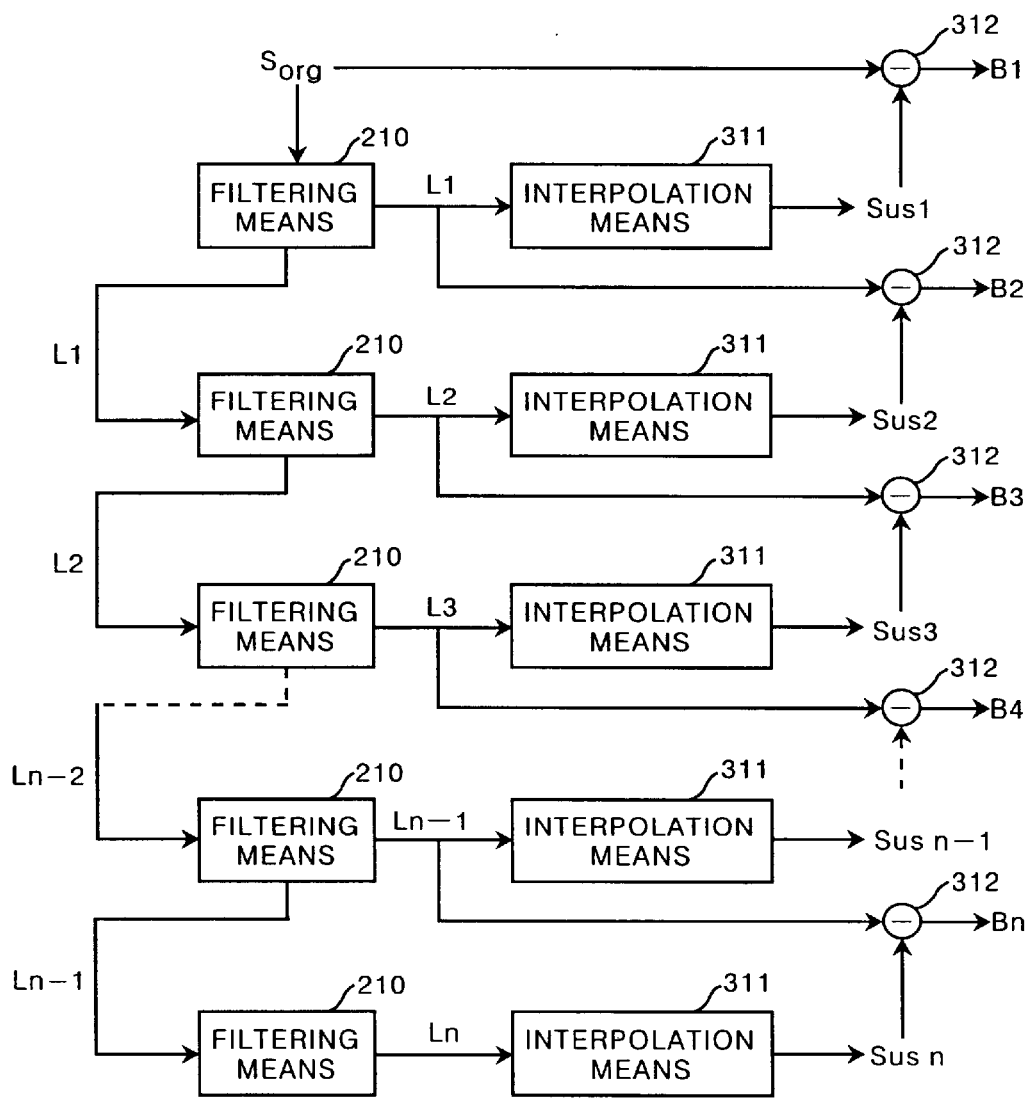
FIG. 62 is a schematic block diagram showing in brief the band-limited image signal making processing employed in the image processing system shown in FIG. 61.

Making the band-limited image signals will be first described, hereinbelow. FIG. 62 is a schematic block diagram showing in brief the band-limited image signal making processing employed in the image processing system shown in FIG. 61. In this particular embodiment, the band-limited image signals are made by the method of Laplacian pyramid disclosed, for instance, in Japanese Unexamined Patent Publication Nos. 5(1993)-244508 and 6(1994)-96200. As shown in FIG. 62, the band-limited image signal making means 302 comprises first to n-th filtering means 310. The first filtering means 310 carries out a filtering processing on the original image signal $S_{org}$ in x- and y-directions (main scanning direction and sub-scanning direction, see FIG. 22) and makes a low resolution image signal $L_1$ which is lower than the original image signal $S_{org}$ in resolution. The second filtering means 310 carries out a similar filtering processing on the low resolution image signal $L_1$ thus obtained and makes a low resolution image signal $L_2$ which is lower than the low resolution image signal $L_1$ in resolution, and the third filtering means 310 carries out a similar filtering processing on the low resolution image signal $L_2$ thus obtained and makes a low resolution image signal $L_3$ which is lower than the low resolution image signal $L_2$ in resolution. In this manner, the n-th filtering means 310 carries out a similar filtering processing on the low resolution image signal $L_{n-1}$ and makes a low resolution image signal $L_n$ which is lower than the low resolution image signal $L_{n-1}$ in resolution. Thus low resolution image signals $L_k$ ($\underline{k}$ stands for 1 to $\underline{n}$) are obtained. The band-limited image signal making means 302 further comprises first to n-th interpolation means 311. The interpolation means 311 carries out an interpolation processing on the low resolution image signals $L_1$ to $L_n$ obtained at the respective stages of filtering to double the number of the picture elements thereof, and makes a plurality of unsharp image signals $S_{us}k$ ($S_{us}1$ to $S_{us}n$) which are different in sharpness. Then the differences between the k-th low resolution image signal $L_k$ and the (k−1)-th unsharp image signal $S_{us}k$ which are the same in the number of the picture elements and between the first unsharp image signal $S_{us}1$ and the original image signal $S_{org}$ which are the same in the number of the picture elements are calculated by respective subtracters 312. The differences are taken as band-limited image signals $B_k$ ($\underline{k}$ stands for 1 to $\underline{n}$).

In this particular embodiment, filters which substantially correspond to one-dimensional Gaussian distribution are used in the filtering processing. That is, coefficients of the filters are determined according the following formula (5) which relates to a Gaussian signal.

$$f(t) = e^{-\frac{t^2}{2\sigma^2}} \tag{5}$$

This is because the Gaussian signal is good in localization in both a real space and a frequency space. For example, the 5×1 one-dimensional filter is as shown in FIG. 4 when $\sigma=1$ in formula (5).

The filtering is carried out on the original image signal $S_{org}$ or the low resolution image signal $L_k$ every second picture element as shown in FIG. 5. When such filtering is carried out in both x- and y-directions, the number of picture elements in obtained low resolution image signal $L_k$ is reduced to ¼ of the preceding image signal (e.g., the original image signal $S_{org}$ in the case of the low resolution image signal $L_1$, and the low resolution image signal $L_1$ in the case of the low resolution image signal $L_2$). That is, the number of picture elements in each of the low resolution image signals $L_k$ (k stands for 1 to n) is ½$^{2k}$ of the original image signal $S_{org}$.

The interpolation processing to be carried out on the low resolution image signals $L_k$ thus obtained will be described, hereinbelow. Though various methods of interpolation such as B-spline can be employed, a Gaussian signal is also employed in the interpolation in this particular embodiment since low-pass filters based on Gaussian signals are employed in the filtering processing. Specifically, an approximation, $\sigma=2^{k-1}$, is employed in the following formula (6).

$$I(t) = 2 \cdot \sigma \cdot e^{-\frac{t^2}{2\sigma^2}} \tag{6}$$

For example, when interpolating the low resolution image signal $L_1$, $\sigma=1$ since k=1. In this case, a one-dimensional filter of 5×1 such as shown in FIG. 6 is employed in the interpolation. In this interpolation, a picture element of 0 in value is interpolated every second picture element in the low resolution image signal $L_1$, whereby the low resolution image signal $L_1$ is enlarged to have the same number of picture elements as the original image, and the interpolated low resolution image signal $L_1$ is subjected to a filtering processing using the one-dimensional filter shown in FIG. 6.

This interpolation/enlargement processing is carried out on all the low resolution image signals $L_k$. When interpolating a low resolution image signal $L_k$, a filter which is $3 \times 2^k - 1$ in length is prepared according to formula (6) and picture elements of 0 in value are interpolated between each pair of adjacent picture elements, whereby the low resolution image signal $L_k$ is enlarged to have the same number of picture elements as the one-class higher low resolution image signal $L_{k-1}$. Then the interpolated low resolution image signal $L_k$ is subjected to a filtering processing using the filter which is $3 \times 2^k - 1$ in length. Thus unsharp image signals $S_{us}k$ are obtained.

Then band-limited image signals $B_k$ (k=1 to n) are obtained by subtracting each of the unsharp image signals $S_{us}k$ is subtracted from the low resolution image signal $L_{k-1}$ having the same number of picture elements as shown by the following formula (7).

$$\begin{aligned} B_1 &= S_{org} - S_{us}1 \\ B_2 &= L_1 - S_{us}2 \\ B_3 &= L_2 - S_{us}3 \\ &\vdots \\ B_k &= L_{k-1} - S_{us}k \end{aligned} \tag{7}$$

Specifically, as shown in FIG. 3, when five low resolution image signals $L_1$ to $L_5$ are obtained, interpolation processing is carried out on the lowest resolution image signal $L_5$ and an unsharp image signal $S_{us}5$ having the same number of picture elements as the low resolution image signal $L_4$ is made. Then a band-limited image signal $B_5$ is obtained by subtracting the unsharp image signal $S_{us}5$ from the low resolution image signal $L_4$. Similarly, band-limited image signals $B_4$ to $B_1$ are obtained by operations $L_3 - S_{us}4$, $L_2 - S_{us}3$, $L_1 - S_{us}2$ and $S_{org} - S_{us}1$. The lowest resolution image signal $L_5$ represents low frequency information obtained by contracting the original image, and is not used in the following operation.

Figure 63:
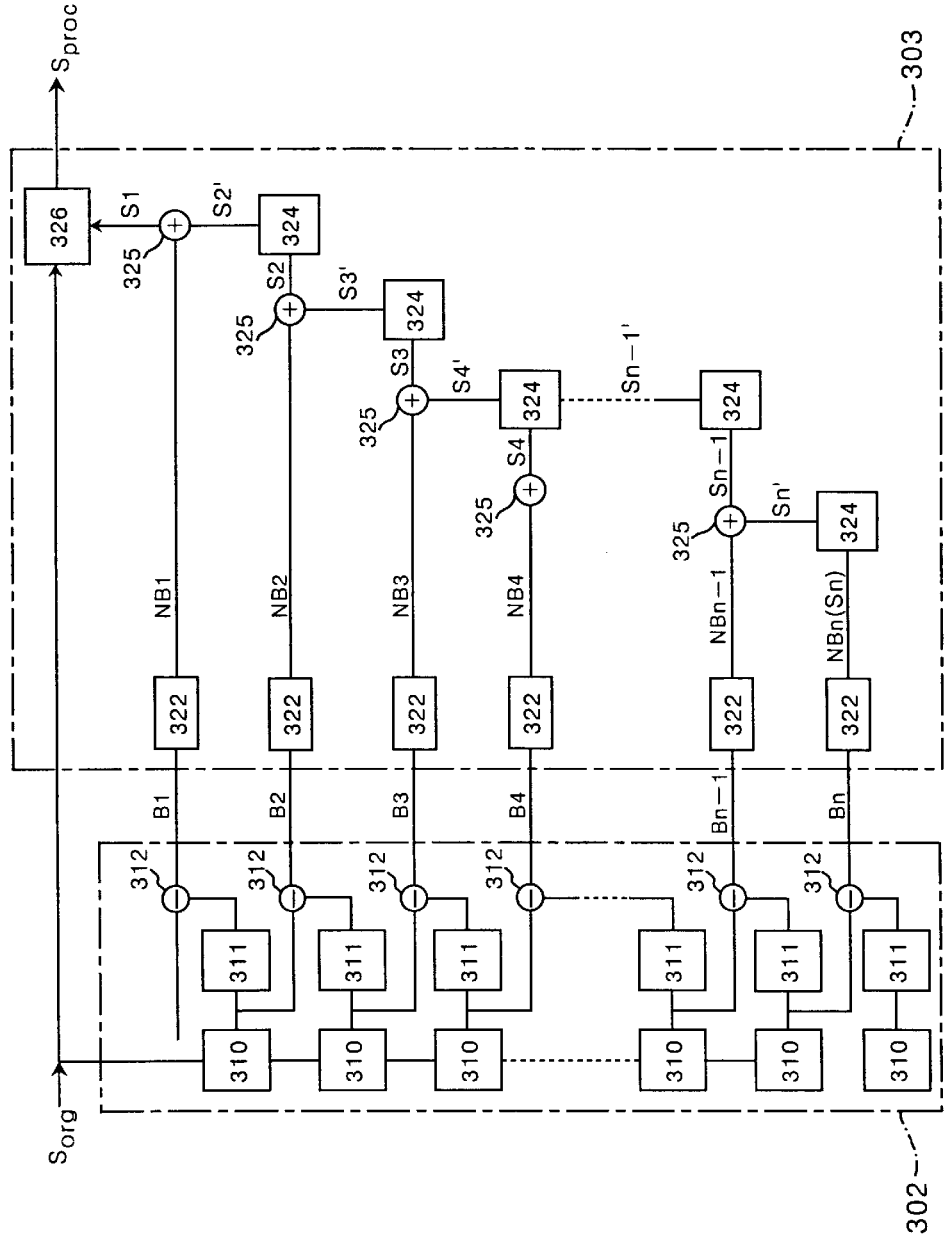
FIG. 63 is a schematic block diagram showing the arrangement of the processing means and the band-limited image signal making means of the seventh embodiment.

The processing to be carried out by the use of the band-limited image signals $B_k$ thus obtained will be described, hereinbelow. FIG. 63 shows the structure of the processing means 303 together with the band-limited image signal making means 302. As shown in FIG. 63, the noise components are separated from the band-limited image signals $B_k$ (k=1 to n) by noise separation means 322, and noise band-limited image signals $NB_k$ are obtained. The noise separation processing by the noise separation means 322 will be described, hereinbelow.

Figure 64:
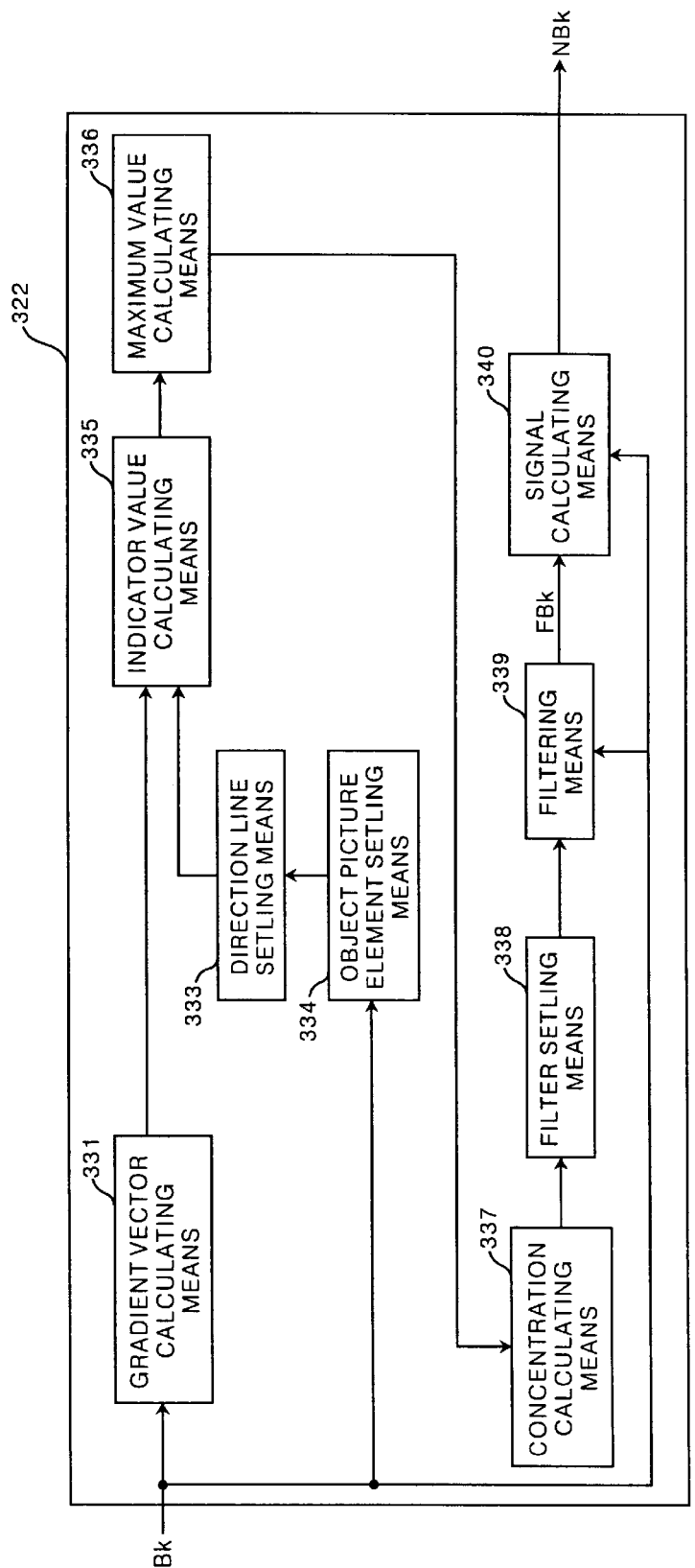
FIG. 64 is schematic diagram showing the arrangement of the noise separation means in the seventh embodiment.

FIG. 64 shows the structure of the noise separation means 322. The noise separation means 322 separates the noise component from the band-limited image signals $B_k$ by a processing using an iris filter, and comprises a gradient vector calculating means 331 which calculates a density gradient vector for each of the picture elements of the band-limited image signals $B_k$ on the basis of the band-limited image signals $B_k$, an object picture element setting means 334 which sets each of the picture elements of the band-limited image signals $B_k$ as an object picture element in sequence, a direction line setting means 333 which sets a plurality of (e.g., 32) radial lines at predetermined angular intervals (e.g., at intervals of 11.25°) about each object picture element set by the object picture element setting means 334 (see FIG. 27), an indicator value calculating means 335 which calculates, for each of the picture elements which are in a predetermined range from the object picture element and on each of the direction lines, an indicator value $\cos \theta_{il}$ based on an angle $\theta_{il}$ between the direction line and the gradient vector of the picture element ($\theta_{il}$ representing the angle between the i-th direction line and the gradient vector of the picture element which is the l-th picture element on the i-th direction line as numbered from the object picture element), a maximum value calculating means 336 which calculates, according to the following formula (12), averages Ci(n) of the indicator values $\cos \theta_{il}$ for the picture elements on each direction line in the range between a start point (the object picture element) and a terminal point which is changed in said predetermined range, and extracts the maximum $Ci_{max}$ (the following formula (13)) of the averages Ci(n), and a concentration calculating means 337 which takes the average of the maximums $Ci_{max}$ for the 32 direction lines ($\Sigma Ci_{max}/32$) and calculates the concentration C of the gradient vectors (the following formula (14)) for each object picture element.

$$Ci(n) = \sum^{n} \{(\cos\theta_{il})/n\} \quad (12)$$

$$Ci_{max} = \max Ci(n) \quad (13)$$

$$C = (1/32)\sum^{32} Ci_{max} \quad (14)$$

The noise separation means 322 further comprises a filter setting means 338 which sets coefficients of a spatial filter so that weight on an object picture element is increased as the concentration C increases (the probability that the object picture element is on an edge of the image is increased) and is reduced as the concentration C reduces (the probability that the object picture element is on an edge of the image is reduced), a filtering means 339 which carries out a filtering processing on the band-limited image signals $B_k$ by use of the spatial filter whose coefficients of filter is set by the filter setting means 338 and obtains filtered band-limited image signals $FB_k$, and a signal calculating means 340 which calculates the noise band-limited image signals $NB_k$ by subtracting the filtered band-limited image signals $FB_k$ from the band-limited image signals $B_k$.

The iris filter is described in detail, for instance, in "Detection of shadow of mass in DR image (Iris filter)", Obata et al., Journal of Academy of Electronic Information and Communication, D-II, Vol.J75-D-II, No.3, pp663 to 670, March 1992) and "Iris filter and analysis of properties thereof", Obata et al., Papers of Academy of Measurement and Automatic Control, 1998 Vol. 34, No.4, pp326 to 332. The iris filtering processing has been studied as an effective technique for detecting the shadow of mass which is a particular form of breast cancer, and the iris filter employed in the filtering processing calculates gradients of an image signal as gradient vectors and outputs the concentration of the gradient vectors. In the iris filtering processing, the shadow of mass is detected on the basis of the concentration of the gradient vectors. In this particular embodiment, the degree at which each picture element is positioned on a segment such as an edge is obtained on the basis of the concentration of the gradient vectors for each of the band-limited image signals $B_k$ calculated by the iris filtering processing.

The gradient vector calculating means 331 obtains the orientation of the density gradient vector according to the following formula (15) by the use of values of the picture elements positioned along the outer periphery of a mask shown in FIG. 28. Though the mask shown in FIG. 28 is 5 pixels×5 pixels in size, a mask of any size may be employed.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (15)$$

The number of the direction lines to be set by the direction line setting means 333 need not be limited to 32. However, when it is excessively large, load on operation becomes too heavy and when it is too small, the edge components cannot be accurately detected. From the viewpoint of convenience of operation, it is preferred that the direction lines be at regular angular intervals.

The value of the concentration C calculated by the concentration calculating means 337 becomes large when the orientations of the gradient vectors are focused on the object picture element.

In the filter setting means 338, the coefficients of filter of the spatial filter for carrying out a smoothing processing according to the value of the concentration C are set. That is, the probability that the object picture element is on an edge of the image is increased as the concentration C increases, and the probability that the object picture element is on a portion other an edge of the image is increased as the concentration C reduces. Accordingly, the coefficients of the spatial filter are set so that weight on an object picture element is increased as the concentration C increases.

Specifically, edge components and other components are separated by carrying out binary-coding in which picture elements having a concentration C higher than a predetermined threshold value is given a value of 1 and picture elements having a concentration C not higher than the predetermined threshold value is given a value of 0. When a base spatial filter F0 is a smoothing filter of 3×3 and the coefficients of filter of the base spatial filter F0 are as shown in FIG. 29A, the coefficients of filter of the spatial filter F1 for filtering the band-limited image signals $B_k$ are set by weighting the coefficients of the base spatial filter F0 according to the binary-coded concentrations C. For example, when a given object picture element is on an edge component and the binary-coded concentrations C of the picture elements in the 3×3 range about the object picture element are as shown in FIG. 29B, the coefficients of filter of the spatial filter F1 are set as shown in FIG. 29C. To the contrast, when a given object picture element is on a portion other than an edge component and the binary-coded concentrations C of the picture elements in the 3×3 range about the object picture element are as shown in FIG. 29D, the coefficients of filter of the spatial filter F1 are set as shown in FIG. 29E. Accordingly, when the band-limited image signals $B_k$ are smoothened by the spatial filter F1, the edge components are smoothened in directions where the edge components exist and the edge components are not made unsharp. The components other than the edge components are given a value of 0.

The filtering means 339 carries out a filtering processing on the band-limited image signals $B_k$ by use of the spatial filter F1 set by the filter setting means 338 and obtains filtered band-limited image signals $FB_k$. Though the band-limited image signals $B_k$ are smoothened by the filtering processing, the edge components are smoothened in directions where the edge components exist. Accordingly, only the smoothened edge components remain in the filtered band-limited image signals $FB_k$.

The signal calculating means 340 calculates the noise band-limited image signals $NB_k$ by subtracting the filtered band-limited image signals $FB_k$ from the band-limited image signals $B_k$. Since the filtered band-limited image signals $FB_k$ have been smoothened, the noise band-limited image signals $NB_k$ represent the noise component in the band-limited image signals $B_k$. Since the filtered band-limited image signals $FB_k$ have been smoothened in the direction in which the edge components exist, the noise component includes also noise on the edges.

The band-limited image signals $B_k$ input into the noise separation means 322 are first input into the gradient vector calculating means 331, the object picture element setting means 334 the filtering means 339 and the signal calculating means 340. The gradient vector calculating means 331 obtains the orientations e of the density gradient vector for all the picture elements by the use of values of the picture elements positioned along the outer periphery of a 5×5 mask. The orientations θ of the density gradient vector obtained are input into the indicator value calculating means 335.

The object picture element setting means 334 sets each of all the picture elements of the band-limited image signals $B_k$ as an object picture element in sequence and inputs the object picture element set into the direction line setting means 333. The direction line setting means 333 sets a plurality of (e.g., 32) radial lines at predetermined angular intervals (e.g., at intervals of 11.25°) about the object picture element. The direction lines set are input into the indicator value calculating means 335.

The indicator value setting means 335 superposes the 32 directions lines input from the direction line setting means 333 on the picture elements input from the gradient vector calculating means 331 which are defined with their orientations θ of the density gradient vector and are two-dimensionally arranged as in the band-limited image signals $B_k$, and extracts the picture elements on each of the direction lines.

The indicator value setting means 335 calculates an indicator value $\cos \theta_{il}$ based on an angle il between the direction line and the gradient vector of the picture element ($\theta_{il}$ representing the angle between the i-th direction line and the gradient vector of the picture element which is the l-th picture element on the i-th direction line as numbered from the object picture element) for each picture element on each direction line.

The indicator values $\cos \theta_{il}$ for the picture elements on each of the direction lines are input into the maximum value calculating means 336. The maximum value calculating means 336 calculates averages Ci(n) of the indicator values $\cos \theta_{il}$ for the picture elements on each direction line in the range between a start point (the object picture element) and a terminal point which is changed in said predetermined range, and extracts the maximum $Ci_{max}$ of the averages Ci(n).

The maximums $Ci_{max}$ of the averages Ci(n) thus obtained for the respective direction lines are input into the concentration calculating means 337. The concentration calculating means 337 takes the average of the maximums $Ci_{max}$ for the 32 direction lines and calculates the concentration C of the gradient vectors for each object picture element. The concentration C of the gradient vectors are input into the filter setting means 338.

Repeating these steps while changing the object picture element in sequence and the concentrations C of the gradient vectors for all the picture elements are input into the filter setting means 338.

The filter setting means 338 sets a spatial filter F1 in which weight on an object picture element is increased as the concentration C increases, and the filtering means 339 carries out a filtering processing on the band-limited image signals $B_k$ by use of the spatial filter set by the filter setting means 338 and obtains filtered band-limited image signals $FB_k$. The filtering means 339 inputs the filtered band-limited image signals $FB_k$ into the signal calculating means 340.

The signal calculating means 340 calculates the noise band-limited image signals $NB_k$ by subtracting the filtered band-limited image signals $FB_k$ from the band-limited image signals $B_k$.

The noise band-limited image signal $NB_n$ which is the lowest in the resolution in the noise band-limited image signals $NB_k$ is taken as a noise signal $S_n$ and the noise signal $S_1$ is subjected to an interpolation processing to have the same number of picture elements as the one-class higher noise band-limited image signal $NB_{n-1}$ by the interpolation means 324, whereby an enlarged noise signal $S_n'$ is obtained. Thereafter the enlarged noise signal $S_n'$ is added to the noise band-limited image signal $NB_{n-1}$ by an adder 325 and another noise signal $S_{n-1}$ is obtained. Then the noise signal $S_{n-1}$ is interpolated and enlarged, and another enlarged noise signal $S_{n-1}'$ is obtained and the enlarged noise signal $S_{n-1}'$ is added to the noise band-limited image signal $NB_{n-2}$, whereby a noise signal $S_{n-2}$ is obtained. By repeating these steps, a highest resolution noise signal $S_1$ is obtained.

Figure 65:
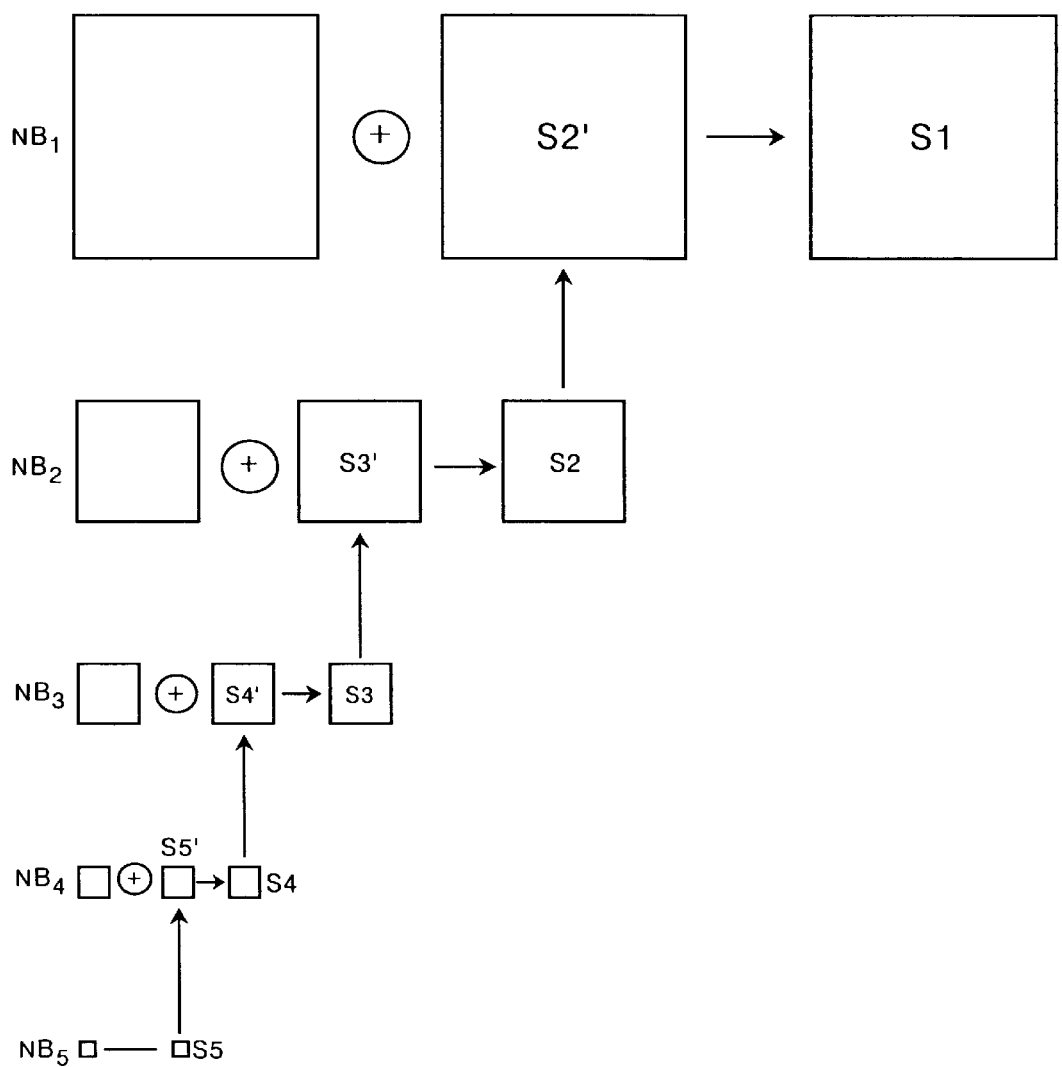
FIG. 65 is a view graphically showing the band-limited image signal making processing in the seventh embodiment.

Specifically, as shown in FIG. 65, when five classes of noise band-limited image signals $NB_1$ to $NB_5$ are obtained, the noise band-limited image signal $NB_5$ which is the lowest in the resolution is taken as a noise signal $S_5$ and the noise signal $S_5$ is subjected to an interpolation processing to have the same number of picture elements as the one-class higher noise band-limited image signals $NB_4$, whereby an enlarged noise signal $S_5'$ is obtained. Thereafter the enlarged noise signal $S_5'$ is added to the noise band-limited image signals $NB_4$ and another noise signal $S_4$ is obtained. In this manner, noise signals $S_3$ and $S_2$ are obtained and a highest resolution noise signal $S_1$ is finally obtained.

When the highest resolution noise signal $S_1$ is obtained, an operator 326 (noise removing means) multiplies the noise signal S1 by a coefficient of enhancement $\alpha(S_{org})$ which is a parameter representing the degree of removing the noise component and is determined according to the original image signal $S_{org}$. Then the product $S_1'$ of the noise signal $S_1$ and the coefficient of enhancement $\alpha(S_{org})$ is subtracted from the original image signal $S_{org}$, whereby a processed image signal $S_{proc}$ is obtained as represented by the following formula (25).

$$S_{proc} = S_{org} - S_1' = S_{org} - \alpha(S_{org}) \cdot S_1 \qquad (25)$$

wherein $S_{proc}$ is a processed image signal free from noise, $S_{org}$ is an original image signal, and $\alpha(S_{org})$ is a coefficient of enhancement determined on the basis of the original image signal.

By providing a memory means for storing the original image signal $S_{org}$ and the noise signal $S_1$ and a parameter setting means for setting the coefficient of enhancement $\alpha(S_{org})$ to the operator 325, the noise component of the original image signal $S_{org}$ may be removed, when the set value of the coefficient $\alpha(S_{org})$ is changed, by multiplying the noise signal $S_1$ read out from the memory means by the changed coefficient $\alpha(S_{org})$ and subtracting the product $S_1'$ from the original image signal $S_{org}$ read out from the memory means.

Figure 66:
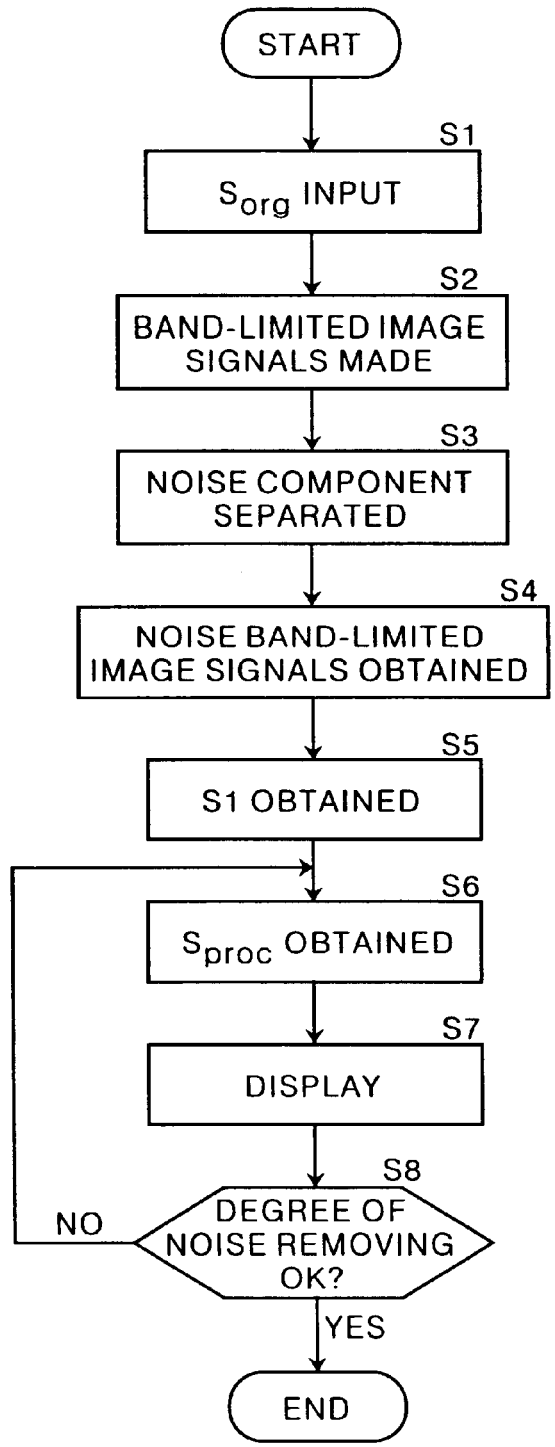
FIG. 66 is a flow chart for illustrating operation of the image processing system of the seventh embodiment.

Operation of the image processing system 301 of this embodiment will be described with reference to the flow chart shown in FIG. 66. An original image signal $S_{org}$ is first input into the image processing system 301, for instance, from an image read-out apparatus. (step S1) The original image signal $S_{org}$ is input into the band-limited image signal making means 302 and band-limited image signals $B_k$ representing the frequency response characteristics for the respective frequency bands are made. (step S2) The noise component of the band-limited image signals $B_k$ is separated and the noise band-limited image signals $NB_k$ are obtained. (steps S3 and S4) Then obtaining a noise signal $S_k$ by interpolation of a noise band-limited signal $NB_k$, to the one-class higher frequency band and obtaining a noise signal $S_{k-1}$ by addition of the noise signal $S_k$ to the noise band-limited signals $NB_k$ in the same frequency band are repeated until the noise signal $S_1$ in the highest frequency band is obtained. (step S5) Then, a processed image signal $S_{proc}$ is obtained by the use of the noise signal $S_1$ according to the aforesaid formula (25). (step S6) A visible image is displayed on a monitor (not shown) on the basis of the processed image signal $S_{proc}$. (step S7) The operator observes the image, and if it is necessary to change the degree of removing noise, the operator inputs information on the degree by which the degree of removing noise is to be changed into the processing means 303. (step S8) Upon receipt of the information, the processing means 303 redoes steps S8 to S10 after changing the coefficient of enhancement $\alpha(S_{org})$ in the aforesaid formula (25). This is repeated until the degree of removing noise processing becomes proper.

As can be understood from the description above, in the image processing of this embodiment, the level of the noise signal $S_1$ to be subtracted from the original image signal $S_{org}$ can be freely changed by only changing the value of the coefficient of enhancement $\alpha(S_{org})$, and accordingly, the degree of removing noise can be easily changed in a shorter time as compared with the method disclosed in Japanese Unexamined Patent Publication No. 6(1994)-96200, whereby the time required to obtain a processed image signal is shortened and stress on the operator can be lightened.

Though, in the seventh embodiment described above, the band-limited image signals representing the characteristics of the respective frequency bands are obtained from the original image signal $S_{org}$ by a method of Laplacian pyramid, the band-limited image signals may be obtained by a wavelet transformation as disclosed in Japanese Unexamined Patent Publication No. 6(1994)-274615. An image processing system in accordance with an eighth embodiment of the present invention where a wavelet transformation is used will be described, hereinbelow.

Figure 67:
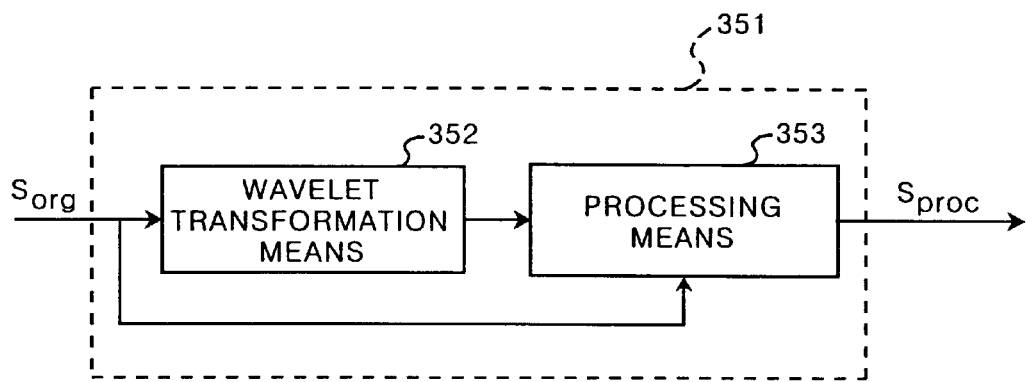
FIG. 67 is a schematic block diagram showing the arrangement of an image processing system in accordance with an eighth embodiment of the present invention, FIG. 68 a schematic block diagram showing the wavelet transformation means in the eighth embodiment.

FIG. 67 is a block diagram showing the image processing system of the eighth embodiment. In FIG. 67, the image processing system 351 in accordance with the eighth embodiment of the present invention comprises a wavelet transformation means 352 which carries out a wavelet transformation on an original image signal $S_{org}$ which is input from an image read-out apparatus or the like and has a predetermined resolution, and a processing means 353 which removes the noise component of the original image signal $S_{org}$ on the basis of the signals obtained by the wavelet transformation and obtains a processed image signal $S_{proc}$.

Figure 68:
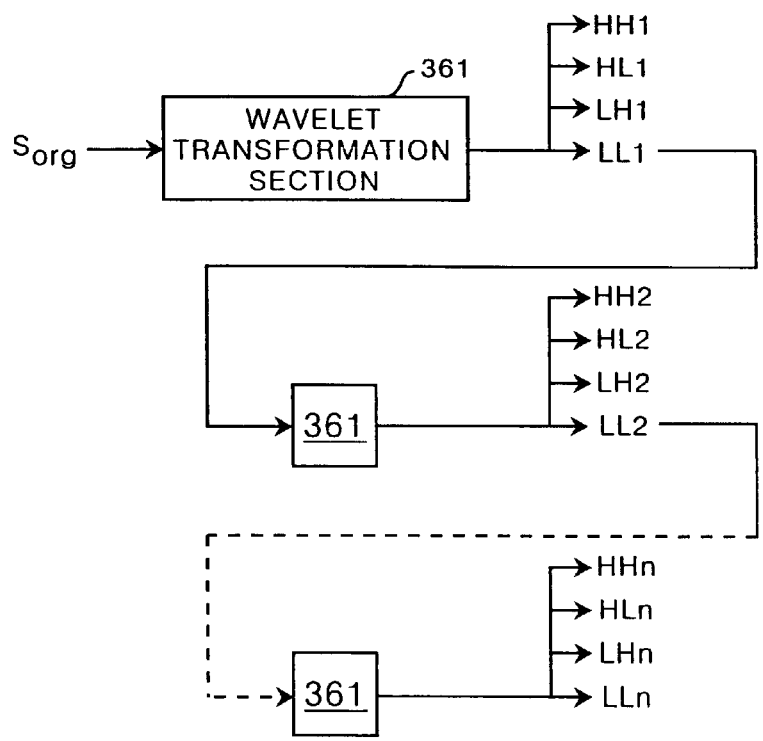

FIG. 68 shows the structure of the wavelet transformation means 352. In this particular embodiment, the wavelet transformation means 352 carries out an orthogonal wavelet transformation where the coefficients of wavelet transformation are orthogonal to each other.

Figure 69:
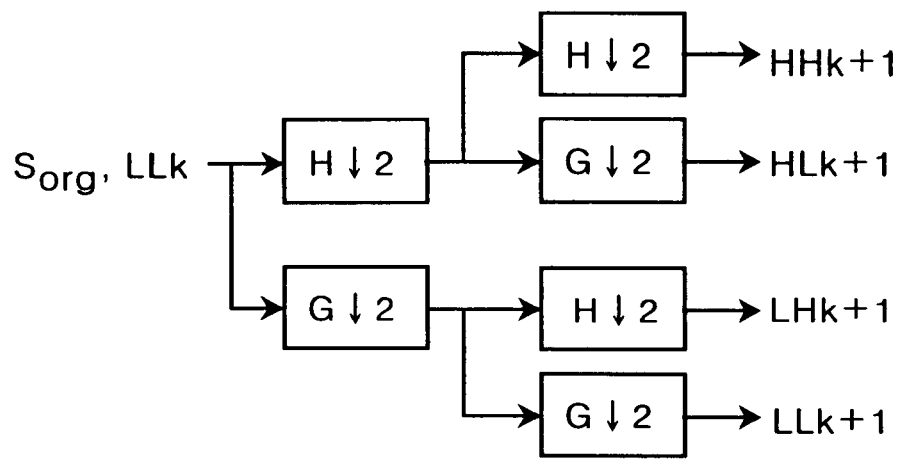
FIG. 69 is a block diagram for illustrating the processing executed by the wavelet transformation section in the eighth embodiment.

As shown in FIG. 68, the original image signal $S_{org}$ is subjected to a wavelet transformation by a wavelet transformation section 361. FIG. 69 is a block diagram showing the wavelet transformation to be carried out by the wavelet transformation section 361. As shown in FIG. 69, a filtering processing is carried out on the original image signal $S_{org}$ (signal $LL_k$) in the main scanning direction by the use of fundamental wavelet functions H and G, and every second picture element is thinned in the main scanning direction (indicated at $\downarrow 2$ in FIG. 69), thereby reducing the number of picture elements in the main scanning direction by half. The function H is a high-pass filter and the function G is a low-pass filter. Then a filtering processing is carried out on each of the thinned signals in the sub-scanning direction by the use of the fundamental wavelet iso functions H and G, and every second picture element is thinned in the sub-scanning direction, thereby reducing the number of picture elements in the sub-scanning direction by half. Thus wavelet transformation coefficient signals $HH_1$, $HL_1$, $LH_1$ and $LL_1$ ($HH_{k+1}$, $HL_{k+1}$, $LH_{k+1}$ and $LL_{k+1}$) are obtained. The signal $LL_1$ represents an image obtained by reducing the original image to ½ in both longitudinal and lateral directions. The signals $HL_1$, $LH_1$ and $HH_1$ respectively represent a longitudinal edge, a lateral edge and an oblique edge in the image reduced to half of the original image in both the longitudinal and lateral directions.

Then the signal $LL_1$ is further subjected to the wavelet transformation by the wavelet transformation section 361 and signals $HH_2$, $HL_2$, $LH_2$ and $LL_2$ are obtained. The signal $LL_2$ represents an image obtained by reducing the original image to ¼ in both the longitudinal and lateral directions. The signals $HL_2$, $LH_2$ and $HH_2$ respectively represent a longitudinal edge, a lateral edge and an oblique edge in the image reduced to quarter of the original image in both the longitudinal and lateral directions.

Then by carrying out the wavelet transformation $\underline{n}$ times on each of the wavelet transformation coefficient signal $LL_k$ in the respective frequency bands, wavelet transformation coefficient signals $HH_1$ to $HH_n$, $HL_1$ to $HL_n$, $LH_1$ to $LH_n$ and $LL_1$ to $LL_n$ are obtained. The wavelet transformation coefficient signals $HH_n$, $HL_n$, $LH_n$ and $LL_n$ obtained by the n-th wavelet transformation are $(½)^n$ of the original image signal $S_{org}$ in the number of picture elements in each of the main scanning direction and the sub-scanning direction. Accordingly, as the value of $\underline{k}$ increases, the frequency band of the wavelet transformation coefficient signal $HH_k$ (k=1 to n) becomes lower and the wavelet transformation coefficient signal represents a lower frequency component of the original image signal. That is, the wavelet transformation coefficient signal $HH_k$ (k=0 to n) represents change in frequency of the original image signal $S_{org}$ in both the main scanning direction and the sub-scanning direction and the frequency represented by the wavelet transformation coefficient signal $HH_k$ becomes lower as the value of k increases. The wavelet transformation coefficient signal $HL_k$ (k=0 to n) represents change in frequency of the original image signal $S_{org}$ in the main scanning direction and the frequency represented by the wavelet transformationcoefficient signal $HL_k$ becomes lower as the value of k increases. Further, the wavelet transformation coefficient signal $LH_k$ (k=0 to n) represents change in frequency of the original image signal $S_{org}$ in the sub-scanning direction and the frequency represented by the wavelet transformation coefficient signal $LH_k$ becomes lower as the value of k increases.

The wavelet transformation coefficient signals for a plurality of frequency bands are shown in FIGS. 15A and 15B. For the purpose of simplicity, only the wavelet transformation coefficient signals obtained by first and second wavelet transformations are shown in FIGS. 15A and 15B. In FIG. 15B, the signal $LL_2$ represents an image obtained by reducing the original image to ¼ in both the main scanning direction and the sub-scanning direction.

In the wavelet transformation coefficient signals $HH_k$, $HL_k$, $LH_k$ and $LL_k$, the signals $HH_k$, $HL_k$ and $LL_k$ represent the edge components in the corresponding frequency band. In other words, these signals represent images having particular frequency bands of the original image (band-limited image characteristics) and mainly represent the contrast of the image in the respective frequency bands. As described above, the wavelet transformation coefficient signal LLk represents a contraction of the original image. In this particular embodiment, the wavelet transformation coefficient signals $HH_k$, $HL_k$ and $LH_k$ are referred to as "the band-limited image signals" and the wavelet transformation coefficient signal LLk are referred to as "the resolution signal". Then "the band-limited image signals" together with "the resolution signal" are referred to as "the wavelet transformation coefficient signals". The lowest resolution signal $LL_n$ is not necessary to obtain the band-limited image signals and accordingly is taken as 0.

Figure 70:
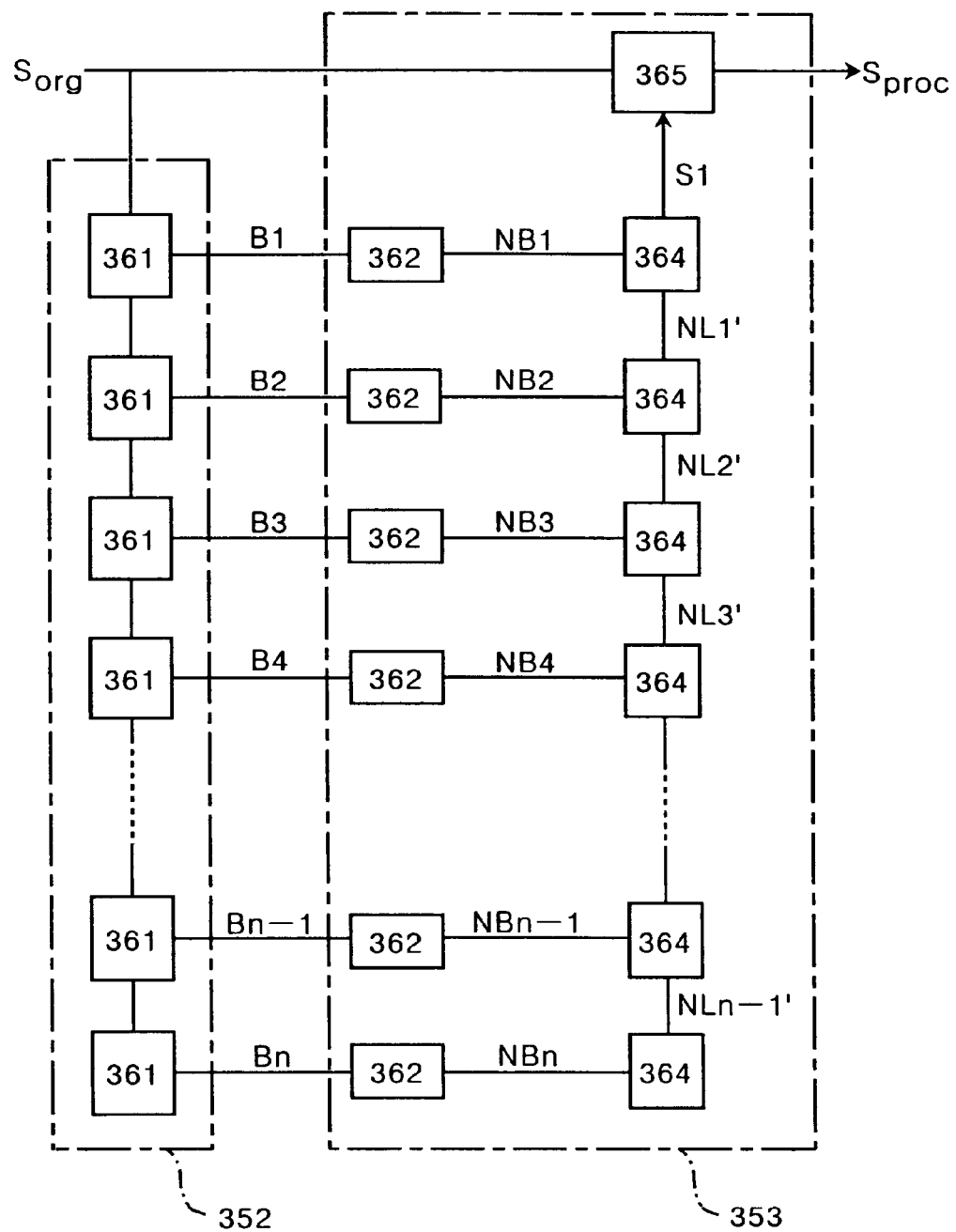
FIG. 70 is a schematic block diagram showing the arrangement of the processing means and the band-limited image signal making means of the eighth embodiment.

The processing means 353 carries out a noise removing processing as the processing means 303 in the seventh embodiment. FIG. 50 shows the structure of the processing means 353 together with the wavelet transformation means 352. As shown in FIG. 70, the band-limited image signals $B_k$ ($HH_k$, $HL_k$ and $LH_k$) obtained by the wavelet transformation means 352 are input into noise separation means 362 provided for the respective frequency bands. The noise separation means 362 is of the same structure as the noise separation means 322 in the seventh embodiment, and noise band-limited image signals $NB_k$ ($NHH_k$, $NHL_k$, $NLH_k$) are obtained in the same manner as in the seventh embodiment. That is, by considering the band-limited image signals $HH_k$, $HL_k$ and $LH_k$ as the band-limited image signals $B_k$ in the seventh embodiment, and carrying out calculation of the concentrations by the iris filter, setting of the spatial filter, filtering processing by the spatial filter, and subtraction of the filtered signals from the band-limited image signals $HH_k$, $HL_k$ and $LH_k$ in the same manner as described above, the noise band-limited image signals $NHH_k$, $NHL_k$ and $NLH_k$ are obtained.

Figure 71:
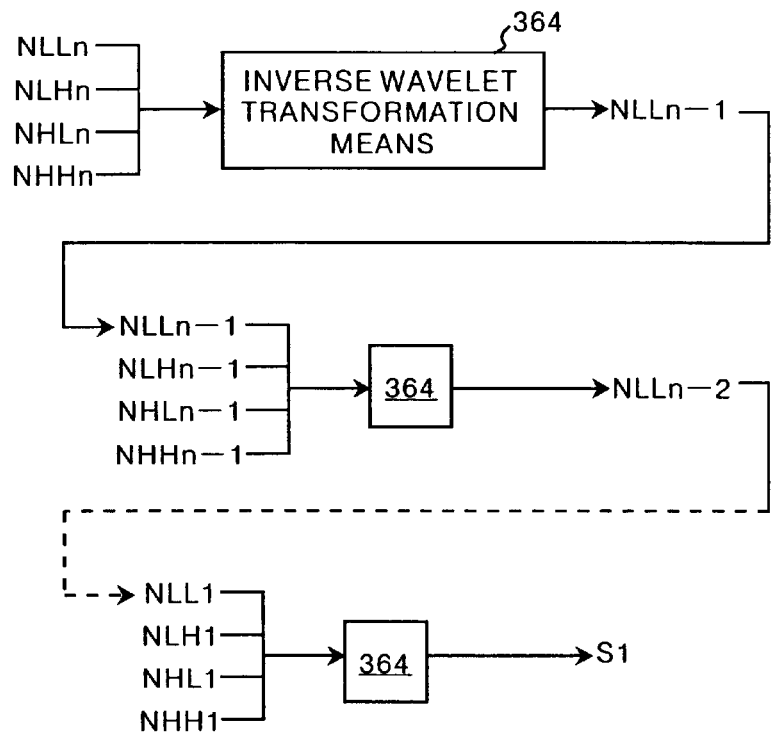
FIG. 71 is a view for illustrating the inverse wavelet transformation to be carried out in the eighth embodiment.

Then an inverse wavelet transformation is carried out on the obtained noise band-limited signals $NB_k$ ($NHH_k$, $NHL_k$ and $NLH_k$) by inverse wavelet transformation means 364. FIG. 71 is a view for illustrating the inverse wavelet transformation to be carried out by the inverse wavelet transformation means 364. As shown in FIG. 71, the inverse wavelet transformation means 364 carries out an inverse wavelet transformation on the noise band-limited signals $NHH_k$, $NHL_k$ and $NLH_k$ in the lowest frequency band ($LL_n$32 0) and a processed signal $NLL_{n-1}$ is obtained.

Figure 72:
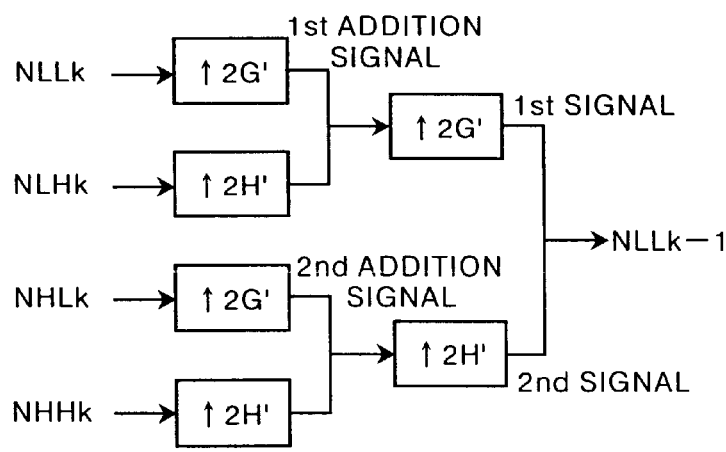
FIG. 72 is a block diagram showing the processing executed by the inverse wavelet transformation means in the eighth embodiment.

FIG. 72 shows the processing executed by the inverse wavelet transformation means 364. As shown in FIG. 72, the noise band-limited signal $NLL_n$ ($NLL_k$, $NLL_n$=0 when k=n) and the noise band-limited signal $NLH_n$($NLH_k$) are subjected to a processing for enlarging each space between picture elements by one picture element (indicated at ↑2 in FIG. 72) in the sub-scanning direction and the processed signals are further subjected to a filtering processing by the use of inverse wavelet transformation functions G' and H', which are inverse to the aforesaid functions G and H, and the signals obtained are added up to obtain a first addition signal. Then the first addition signal is subjected to a processing for enlarging each space between picture elements by one picture element in the main scanning direction and the processed signal is further subjected to a filtering processing by the use of inverse wavelet transformation functions G', whereby a first signal is obtained. On the other hand, the noise band-limited signal $NHL_n$ ($NHL_k$) and the noise band-limited image signal $NHH_n$ ($NHH_k$) are subjected to a processing for enlarging each space between picture elements by one picture element in the sub-scanning direction and the processed signals are further subjected to a filtering processing by the use of the inverse wavelet transformation functions G' and H' and the signals obtained are added up to obtain a second addition signal. Then the second addition signal is subjected to a processing for enlarging each space between picture elements by one picture element in the main scanning direction and the processed signal is further subjected to a filtering processing by the use of inverse wavelet transformation functions H', where by a second signal is obtained. Then a noise band-limited signal $NLL_{n-1}$ ($NLL_k$-1) is obtained by adding the first signal to the second signal. Since the wavelet transformation coefficient signal $NLL_n$ at the lowest resolution is 0, the noise band-limited signal $NLL_{n-1}$ represents the band-limited image characteristic of the original image signal $S_{org}$.

Thereafter the inverse wavelet transformation is carried out by the inverse wavelet transformation means 364 on the noise band-limited signals $NHH_{n-1}$, $NHL_{n-1}$, $NLH_{n-1}$ and $NLL_{n-1}$ in the same manner and a noise band-limited signals $NLL_{n-2}$ is obtained. By repeating these steps, noise band-limited signals $NHH_1$, $NHL_1$ and $NLL_1$ in the highest frequency band are obtained. Further by carrying out the inverse wavelet transformation on the noise band-limited signals $NHH_1$, $NHL_1$ and $NLL_1$, a noise signal $S_1$ is obtained.

As in the seventh embodiment, operation represented by the aforesaid formula (25) is carried out by an operator 365 on the basis of the noise signal $S_1$ and a processed image signal $S_{proc}$ is obtained.

Figure 73:
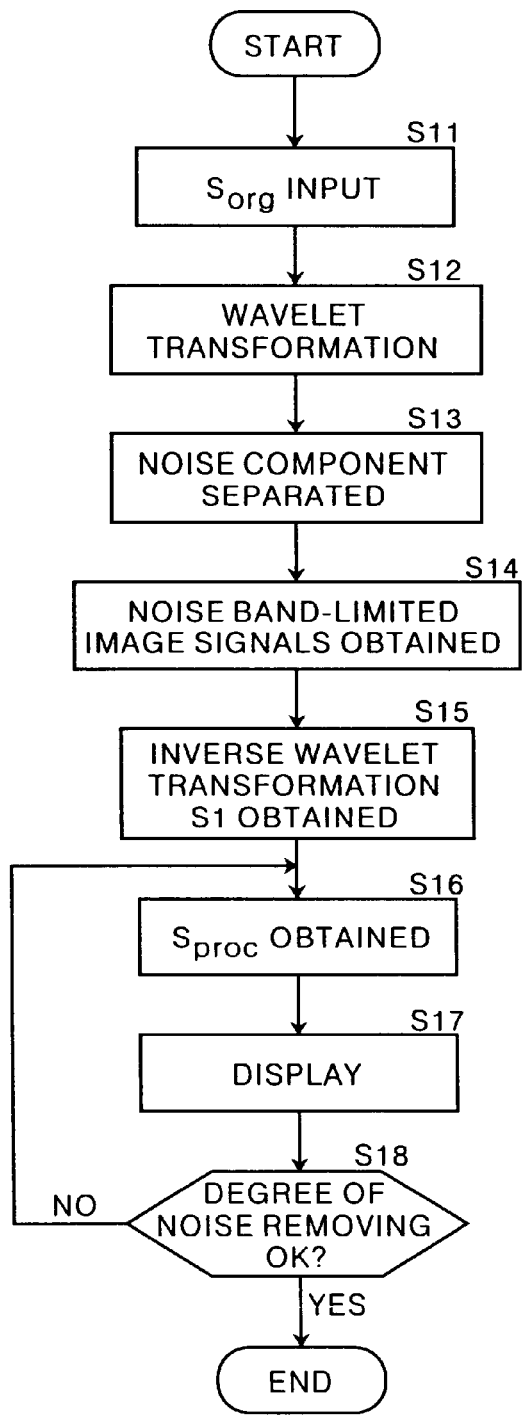
FIG. 73 is a flow chart for illustrating operation of the image processing system of the eighth embodiment.

Operation of the image processing system 351 of the eighth embodiment will be described with reference to the flow chart shown in FIG. 73. An original image signal $S_{org}$ is first input into the image processing system 351, for instance, from an image read-out apparatus. (step S11) The original image signal $S_{org}$ is input into the wavelet transformation means 352 and wavelet transformation coefficient signals $B_k$ for the respective frequency bands are made. (step S12) The noise component of the wavelet transformation coefficient signals $B_k$ is separated and the noise band-limited image signals $NB_k$ are obtained. (steps S13 and S14) The noise signal $S_1$ so btained by the inverse wavelet transformation of the noise band-limited image signals $NB_k$ (step S15) Then, a processed image signal $S_{proc}$ is obtained by use of the noise signal $S_1$ according to the aforesaid formula (25). (step S16) A visible image is displayed on a monitor (not shown) on the basis of the processed image signal $S_{proc}$. (step S17) The operator observes the image, and if it is necessary to change the degree of removing noise, the operator inputs information on the degree by which the degree of removing noise is to be changed into the processing means 353. (step S18) Upon receipt of the information, the processing means redoes steps S16 to S18 after changing the coefficient of enhancement $\alpha(S_{org})$ in the aforesaid formula (25). This is repeated until the degree of the degree of removing noise processing becomes proper.

As can be understood from the description above, in the image processing of this embodiment, the level of the noise signal $S_1$ to be subtracted from the original image signal $S_{org}$ can be freely changed by only changing the value of the coefficient of enhancement $\alpha(S_{org})$, and accordingly, the degree of removing noise can be easily changed.

Further, though, in the embodiments described above, the noise signals are obtained from the band-limited image signals $B_k$ by the use of an iris filter, they may be obtained by other various methods. For example, local dispersion of the band-limited image signals $B_k$ in a mask of a predetermined size is obtained and picture elements which are small in the local dispersion are considered to be noise. Then the noise signals may be obtained by separating the noise component from the band-limited image signals $B_k$. Further the noise signal may be obtained on the basis of picture element vectors calculated for picture elements of the image represented by the band-limited image signal $B_k$. An image processing system in accordance with a ninth embodiment of the present invention where the picture element vectors are used will be described, hereinbelow.

Figure 74:
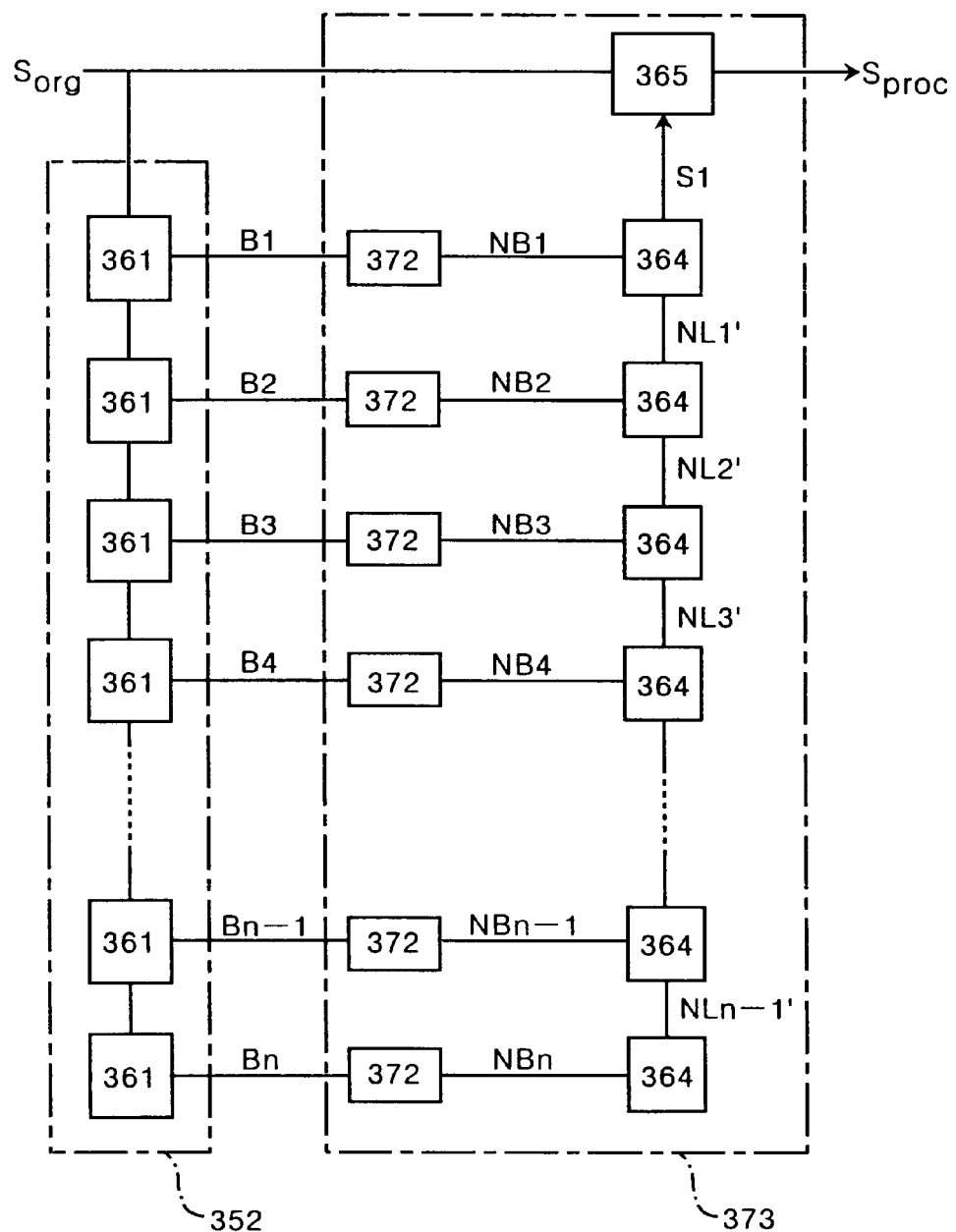
FIG. 74 is a schematic block diagram showing the arrangement of the processing means and the band-limited image signal making means of the seventh embodiment employed in an image processing system in accordance with a ninth embodiment of the present invention.

As shown in FIG. 74, the image processing system of this embodiment differs from that of the eighth embodiment in that a processing means 373 provided with a noise separation means 372 is provided in place of the processing means 353 provided with the noise separation means 362. The processing means 373 carries out the noise removing processing as the processing means 353 in the eighth embodiment, and band-limited image signals $B_k$ ($HH_k$, $HL_k$ and $LH_k$) are input into the noise separation means 372.

Figure 75:
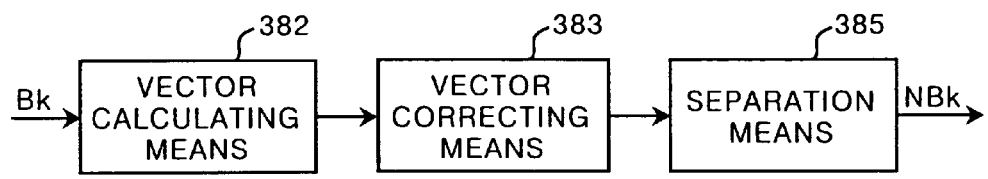
FIG. 75 is schematic diagram showing the arrangement of the noise separation means in the ninth embodiment.

FIG. 75 shows the arrangement of the noise separation means 372. The noise separation means 372 calculates the picture element vector for each of the picture elements of band-limited images represented by the band-limited image signals $B_k$ and separates noise band-limited image signals $NB_k$ (noise components) on the basis of the picture element vectors, and comprises a picture element vector calculating means 382 which calculates picture element vector for each picture element from the band-limited image signals $B_k$ obtained by the wavelet transformation means 361, a picture element vector correcting means 383 which corrects the picture element vectors calculated by the picture element vector calculating means 382, and a separation means 385 which separates the noise component $B_k$ on the basis of the corrected picture element vectors.

Figure 76:
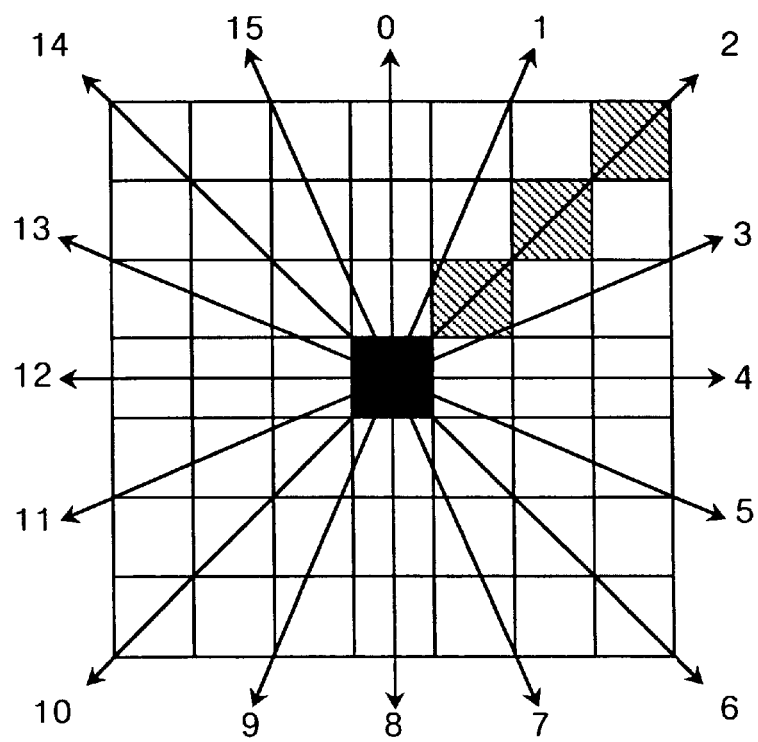
FIGS. 76 and 77 are views for illustrating the calculation of picture element vector.
Figures 77, 78A, 78B:
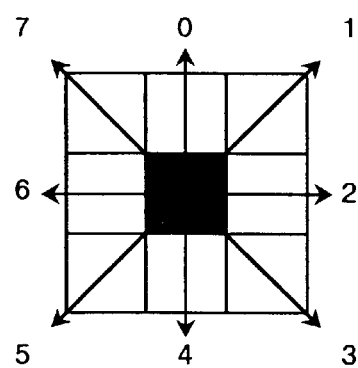
FIGS. 78A and 78B are views showing examples of picture element vectors around the object picture element.

The picture element vector calculating means 382 calculates the picture element vector in the following manner. The picture element vectors are calculated for all the picture elements of the images represented by all the band-limited image signals $B_k$ (wavelet transformation coefficient signals). As shown in FIG. 76, each picture element is set as an object picture element (a black square in FIG. 76) and a region of 7 picture elements ×7 picture elements is set with the object picture element located at the center of the region. Then, for instance, sixteen (0 to 15) directions starting from the object picture element are set and the average of the values of the picture elements arranged in each direction in the region (e.g., hatched picture elements in the direction of 2) is calculated. Thereafter the direction in which the difference between the value of the object picture element and the average of the values of the picture elements arranged in the direction in the region is minimized is determined. A region of 3 picture elements×3 picture elements may be set and eight (0 to 7) directions starting from the object picture element may be set as shown in FIG. 77. In this case, the direction in which the difference between the values of the object picture element and the picture element adjacent to the object picture element is minimized is determined. The difference between the value of the object picture element and the average of the values of the picture elements arranged in one direction in the region (when only one picture element exists in the direction in the region, the value of the picture element) will be referred to as "the picture element difference", hereinbelow. The direction determined in this manner is a direction in which the gradient of density is minimum and which is directed in a equi-signal line or in a normal of the signal gradient. Then a vector having the direction and the length which is equal to the reciprocal of the picture element difference is obtained as the picture element vector for the object picture element. In this case, the picture element vector becomes longer as the density difference in the direction of the equi-signal line is smaller. If the picture element difference is 0, the length of the picture element vector becomes infinite. Accordingly, it is preferred that an upper limit be set to the length of the picture element vector (e.g., 255 in the case of 8 bits).

The direction in which the picture element difference is maximized is the direction of the signal gradient, and the picture element vector may be obtained in this direction. In this case, the picture element difference as it is may be taken as the length of the picture element vector. In this particular embodiment, the picture element vector has a direction directed in a equi-signal line and a length equal to the reciprocal of the picture element difference.

Figure 59:
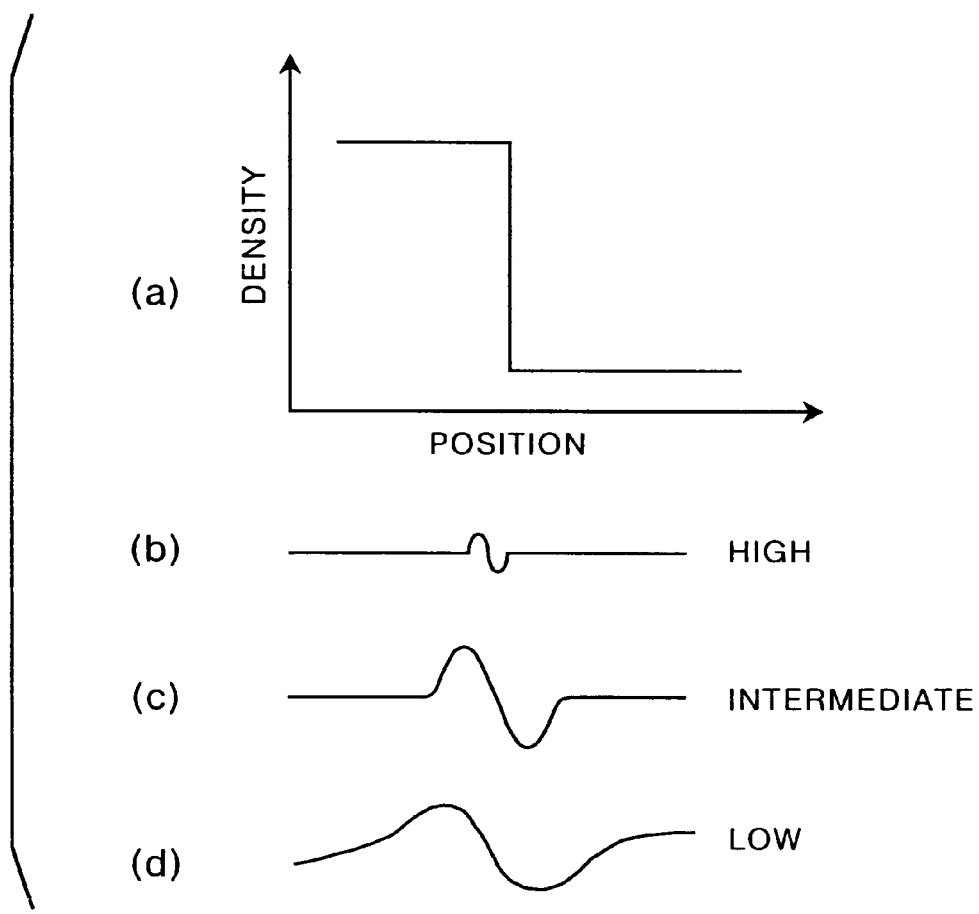
FIG. 59 is a view showing examples of wavelet transformation coefficient signals for a part free from noise.

In the picture element vector correcting means 383, the calculated picture element vector is corrected in the following manner. When the band-limited image signals $B_k$ are obtained by wavelet transformation of the original image signal, band-limited image signals in higher frequency bands hold detailed edge information, those in intermediate frequency bands hold intermediate edge information and those in lower frequency bands hold rough edge information. Generally energy of an image is reduced as the frequency band becomes higher whereas energy of noise does not depend upon the frequency band. Accordingly, the S/N ratio becomes higher as the frequency band becomes lower. In a part of the original image free from noise (e.g., as indicated at (a) in FIG. 59), the band-limited image signal in any frequency band has a value only at an edge portion as indicated at (b) to (d) in FIG. 59. Accordingly, when the dispersion of picture elements in the predetermined region including a given object picture element in an image represented by a relatively high frequency band-limited image signal is small, the given object picture element may be considered to be in a flat portion without referring to the picture element vector of the corresponding picture element in an image represented by a lower frequency band-limited image signal.

Figure 60:
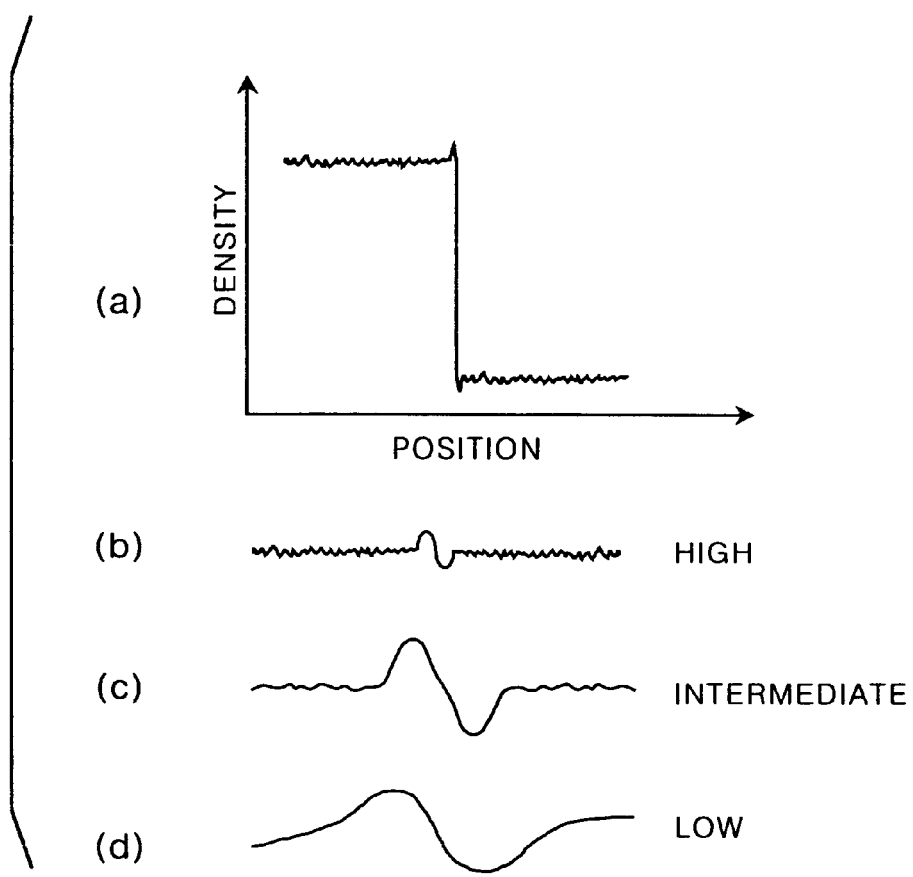
FIG. 60 is a view showing examples of wavelet transformation coefficient signals for a part including noise.

To the contrast, in a part of the original image including noise (e.g., as indicated at (a) in FIG. 60), directions of the picture element vectors are disturbed by the noise and the dispersion becomes larger in images represented by high frequency band-limited image signals as indicated at (b) in FIG. 60, whereas influence of the noise becomes weaker and the dispersion becomes smaller as the frequency band becomes lower as indicated at (c) and (d) in FIG. 60. Accordingly, when the dispersion of picture elements in the predetermined region including a given object picture element in an image represented by a relatively high frequency band-limited image signal is large, it is difficult to accurately determine where the given object picture element is in a flat portion or an edge portion without referring to the picture element vector of the corresponding picture element in an image represented by a lower frequency band band-limited image signal.

Accordingly, the picture element vector correcting means 383 obtains the dispersion of the values of picture elements in a region (e.g., 3 picture elements×3 picture elements) including a given object picture element at the center thereof in an image represented by a band-limited image signal. When the dispersion in the region is smaller than those in other regions of the same image, the picture element vector correcting means 383 considers the region to be a flat portion and does not correct the picture element vector for the object picture element. To the contrast, when the dispersion in the region is larger than those in other regions of the same image, it is impossible to determine whether the region is a flat portion or an edge portion, the picture element vector correcting means 383 corrects the picture element vector calculated for the given object picture element to conform to the picture element vector calculated for the corresponding picture element in an image represented by a lower frequency band-limited image signal. Whether the given picture element is in an edge portion or in a flat portion can be more precisely determined according to the corrected picture element vector.

In place of the dispersion, the difference between the value of the given picture element and picture elements near the given picture element which is used in calculating the picture element vector for the given picture element may be employed. The difference may be the sum of the differences between the given picture element and a plurality of (e.g., eight) picture elements near the given picture element or the average of the differences.

The separation means 385 separates the noise component in the following manner. The separation means 385 labels the picture elements of the images represented by the band-limited image signals $B_k$ on the basis of the corrected picture element vectors corrected by the picture element vector correcting means 383. That is, the separation means 385 labels picture elements whose corrected picture element vectors are relatively short as picture elements which are in a flat portion and include the noise component.

Though a picture element which is short in the picture element vector may be generally considered to be in a flat portion, i.e., to be noise, there still remains a possibility that the picture element is in a small edge portion in the image. Accordingly, it is preferred that, in the case where the picture element vector of a given picture element is short, the separation means 385 labels the given picture element as a picture element in an edge portion when the picture element vector of the given picture element is in the same direction as the picture element vectors of the picture elements near the given picture element as shown in FIG. 78A (figures in FIGS. 78A and 78B represent direction shown in FIG. 77), and as a noise component when the picture element vector of the given picture element is in the different direction from the picture element vectors of the picture elements near the given picture element as shown in FIG. 78B.

A smoothing processing is carried out on the picture elements determined to be in the noise component to reduce the values of the picture elements. Since being for changing the value of the picture element itself, that is, for changing a local contrast of the band-limited images in the respective frequency band, this processing is carried out on only the band-limited image signals which represent the contrast of the images in the respective frequency bands and processed band-limited image signals $B_k'$ ($HH_k'$, $HL_k'$ and $LH_k'$) are obtained. Then by subtracting the processed band-limited image signals $B_k'$ from the corresponding band-limited image signals $B_k$, noise band-limited image signals $NB_k$ ($NHH_k$, $NHL_k$ and $NLH_k$) are separated as the noise components. That is, $NB_k = B_k - B_k'$.

Thereafter, by repeating the inverse wavelet transformation on the noise band-limited image signals $NB_k$ by the inverse wavelet transformation means 364 as in the eighth embodiment and the noise signal $S_1$ is obtained.

As in the seventh embodiment, operation represented by the aforesaid formula (25) is carried out by an operator 365 on the basis of the noise signal $S_1$ and a processed image signal $S_{proc}$ is obtained.

Figure 79:
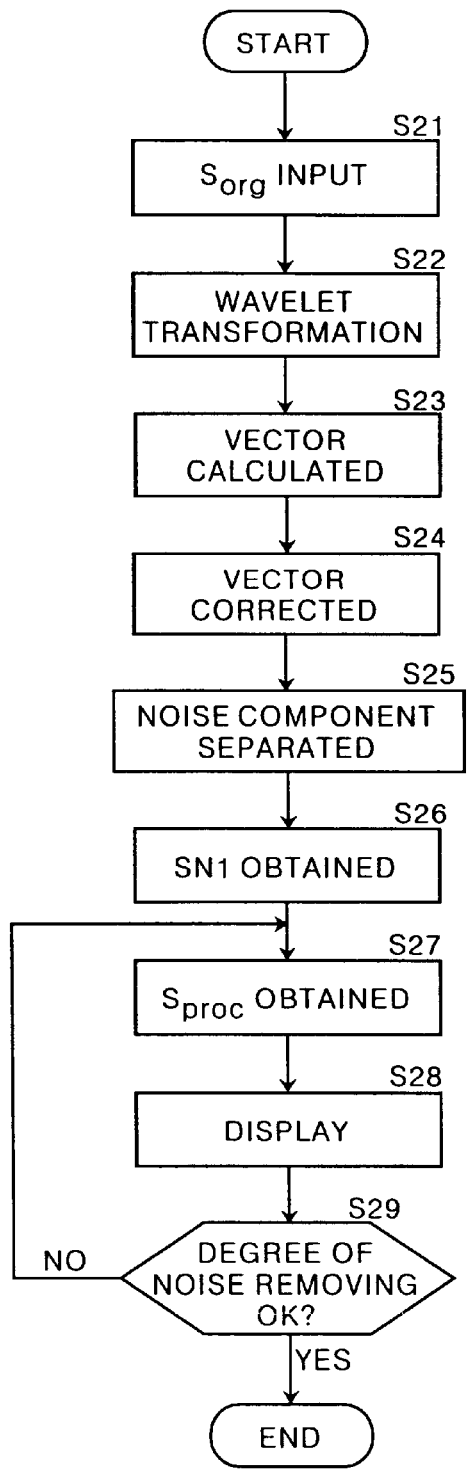
FIG. 79 is a flow chart for illustrating operation of the image processing system of the ninth embodiment.

Operation of the image processing system of this embodiment will be described with reference to the flow chart shown in FIG. 79. An original image signal $S_{org}$ is first input into the image processing system 351, for instance, from an image read-out apparatus. (step S21) The original image signal $S_{org}$ is input into the wavelet transformation means 352 and wavelet transformation coefficient signals for the respective frequency bands are made. (step S22) Then the picture element vectors are obtained on the basis of the wavelet transformation coefficient signals by the picture element vector calculating means 382, and the calculated picture element vectors are corrected by the picture element vector correcting means 383, whereby corrected picture element vectors are obtained. (steps S23 and S24)

The noise component of the band-limited image signals $B_k$ is separated on the basis of the corrected picture element vectors by the separation means 385 and the noise band-limited image signals $NB_k$ are obtained. (step S25) Then inverse wavelet transformation is carried out on the noise band-limited image signals $NB_k$ by the inverse wavelet transformation means 364 until the noise signal $S_1$ in the highest frequency band is obtained. (step S26) Then, a processed image signal $S_{proc}$ is obtained by the use of the noise signal $S_1$ according to the aforesaid formula (25). (step S27) A visible image is displayed on a monitor (not shown) on the basis of the processed image signal $S_{proc}$. (step S28) The operator observes the image, and if it is necessary to change the degree of removing noise, the operator inputs information on the degree by which the degree of removing noise is to be changed into the processing means 373. (step S29) Upon receipt of the information, the processing means 373 redoes steps S27 to S29 after changing the coefficient of enhancement $\alpha(S_{org})$ in the aforesaid formula (25). This is repeated until the degree of removing noise processing becomes proper.

As can be understood from the description above, in the image processing of this embodiment, the level of the noise signal $S_1$ to be subtracted from the original image signal $S_{org}$ can be freely changed by only changing the value of the coefficient of enhancement $\alpha(S_{org})$ in the aforesaid formula (25), and accordingly, the degree of removing noise can be easily changed.

Since the processed signals $HH_k'$, $HL_k'$, $LH_k'$ and $LL_n'$ have been reduced with noise, the finally obtained processed image signal $S_{proc}$ is also less in noise. Accordingly, a high quality image with noise suppressed can be reproduced on the basis of the processed image signal $S_{proc}$.

An image processing system in accordance with a tenth embodiment of the present invention will be described, hereinbelow.

Figure 80:
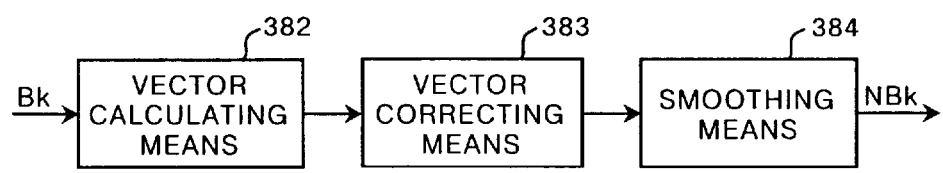
FIG. 80 is schematic diagram showing the arrangement of the noise separation means employed in the image processing system in accordance with a tenth embodiment of the present invention.

The image processing system of this embodiment is substantially the same as the image processing system of the ninth embodiment except that the noise separation means differs from that of the ninth embodiment. FIG. 80 shows the arrangement of the noise separation means in this embodiment. As shown in FIG. 80, the noise separation means of this embodiment differs from that of the ninth embodiment in that a smoothing means 384 is provided in place of the separation means 385. Since the wavelet transformation means 361, the picture element vector calculating means 382, the picture element vector correcting means 383 and the inverse wavelet transformation means 364 are the same as those in the ninth embodiment, they will be not described in detail here.

Figures 81A, 81B:
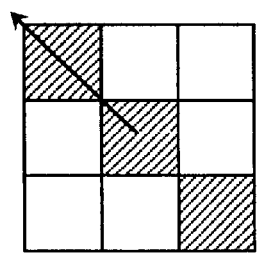
FIGS. 81A and 81B are views for illustrating an example of the smoothing processing carried out in the tenth embodiment.

The smoothing means 384 carries out a smoothing processing on the wavelet transformation coefficient signals on the basis of the corrected picture element vectors and obtains smoothed signals in the following manner. The smoothing processing is carried out on the band-limited image signals $HH_k$, $HL_k$ and $LH_k$ in each frequency band. FIGS. 81A and 81B are for illustrating the smoothing processing to be carried out by the smoothing means 384. When the picture elements in a 3 picture elements×3 picture elements region with an object picture element located at the center thereof have the values shown in FIG. 81A, the corrected picture element vector for the object picture element is as shown in FIG. 81B. A filtering processing is carried out by a smoothing filter on the object picture element, the picture element in the direction of the picture element vector and the picture element in the direction opposite to the direction of the picture element vector (hatched picture elements in FIG. 81B). As the smoothing filter, any filter may be used so long it has a directivity. For example, an average filter such as shown in FIG. 82A or a smoothing filter such as shown in FIG. 82B may beused. When theaverage filter shown in FIG. 82A is used, the values of the picture elements shown in FIG. 81A are smoothed as shown in FIG. 83A and the value of the object picture element becomes 101. When the smoothing filter shown in FIG. 82B is used, the values of the picture elements shown in FIG. 81A are smoothed as shown in FIG. 83B and the value of the object picture element becomes 141. When a smoothing processing is carried out in this manner, noise in the edge portion can be made less conspicuous. Further when the smoothing processing is carried out on a flat portion, noise in the flat portion can be made less conspicuous. The smoothed band-limited image signals (wavelet transformation coefficient signals) will be referred to as "the smoothed signals (smoothed band-limited image signals)".

Though the picture element in the direction of the picture element vector and the picture element in the direction opposite to the direction of the picture element vector are used in the embodiment described above, only the picture element in the direction of the picture element vector may be used. In this case, the object picture element shown in FIG. 81A is smoothed to have a value of 99 (=(101+98)/2).

Figure 84:
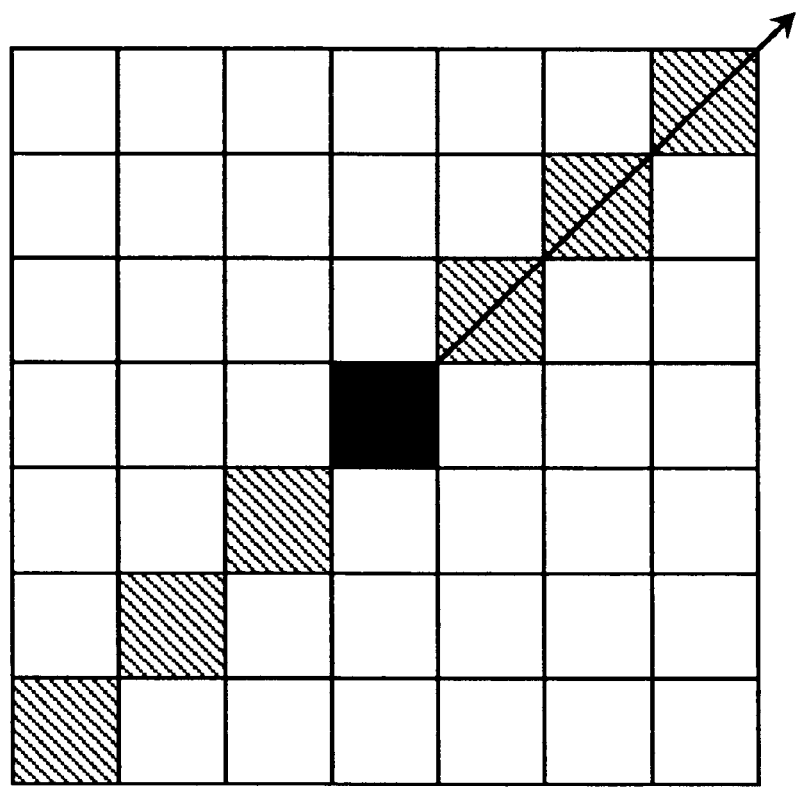
FIG. 84 is a view for illustrating another example of the smoothing processing carried out in the tenth embodiment.

In the case where the picture element vector for the object picture element has been obtained on the basis of 48 picture elements around the object picture element and the direction of picture element vector is as shown in FIG. 84, the smoothing processing is carried out on the object picture element, the picture element in the direction of the picture element vector and the picture element in the direction opposite to the direction of the picture element vector (hatched picture elements in FIG. 84). Specifically, the average of values of the object picture element and the six hatched picture elements is taken as the value of the object picture element.

Then the smoothed signals are subtracted from the respective band-limited image signals and noise band-limited image signals $NHH_k$, $NHL_k$ and $NLH_k$ ($NB_k=B_k-B_k'$) are separated.

Thereafter, by repeating the inverse wavelet transformation on the noise band-limited image signals $NB_k$ by the inverse wavelet transformation means 364 as in the eighth embodiment and the noise signal S1 is obtained.

As in the seventh embodiment, operation represented by the aforesaid formula (25) is carried out by an operator 365 on the basis of the noise signal $S_1$ and a processed image signal $S_{proc}$ is obtained.

Operation of the image processing system of this embodiment will be described with reference to the flow chart shown in FIG. 85. The original image signal $S_{org}$ is input into the wavelet transformation means 352 and wavelet transformation coefficient signals for the respective frequency bands are made. (step S31) Then the picture element vectors are obtained on the basis of the wavelet transformation coefficient signals by the picture element vector calculating means 382, and the calculated picture element vectors are corrected by the picture element vector correcting means 383, whereby corrected picture element vectors are obtained. (steps S32 and S33)

The smoothing processing is carried out by the smoothing means 384 on the wavelet transformation coefficient signals on the basis of the corrected picture element vectors and the smoothed signals are obtained. (step S34) Then the noise components are separated on the basis of the smoothed signals and the noise band-limited image signals $NB_k$ are obtained, and the noise signal $S_1$ in the highest frequency band is obtained. (step S35) Thereafter steps S27 to S29 shown in FIG. 79 are executed.

When noise is included in the original image, the edge component in the image also includes noise. When the noise component is removed on the basis of the picture element vectors and the edge component is enhanced, the noise in the edge component is also enhanced. In this embodiment, since the smoothing processing is carried out on the basis of the direction of the (corrected) picture element vectors, the noise component in the edge can be extracted without losing the edge component and the noise in the flat portion can be also extracted. Accordingly, the noise on the edge can be made less conspicuous and also the noise on the flat portion can be made less conspicuous.

Further when the noise signal is obtained by separating the noise component and the edge component of the smoothed band-limited image signal from each other on the basis of the lengths of the picture element vectors, carrying out a noise smoothing processing and/or an edge enhancing processing on the smoothed band-limited image signal to obtain a processed band-limited image signal, and obtaining the noise signal contained in the band-limited image signal before the noise smoothing processing by the use of the processed band-limited image signal, the edge can be enhanced without making the noise on the edge more conspicuous and the noise in the flat portion can be more suppressed, whereby the image can be reproduced in a higher quality.

Though, in the seventh to tenth embodiments, the coefficient of enhancement by which the noise signal $S_1$ is multiplied in the aforesaid formula (25) is a function of the original image signal $S_{org}$, the coefficient of enhancement need not be a function of the original image signal $S_{org}$, but may be, for instance, a constant.

Further, though, in the ninth and tenth embodiments, the direction in which the picture element difference is minimized is determined as the direction of the picture element vector, the direction in which the picture element difference is second minimum may be also obtained as the second picture element vector. In the case where the picture element vector is obtained in the direction of signal gradient, the direction in which the picture element difference is second maximum may be also obtained as the second picture element vector. For example, when the edge component is bent as shown in FIG. 86A, two picture element vectors are obtained as shown in FIG. 86B. By carrying out the smoothing processing by use of both the picture element vectors in the smoothing means 384, the edge component can be more precisely smoothed while reserving the directivity thereof.

Though a relatively large edge in an image remains even in an image in a low frequency band, noise becomes smaller as the frequency band becomes lower. Accordingly, when the direction of a picture element vector for a given picture element in a band-limited image in a given frequency band is equalized to the direction of the picture element vector for the corresponding picture element in a band-limited image in a lower frequency band, the picture element vector comes to more represent an edge component when the given picture element is in an edge component and comes to more represent the noise component when the given picture element is in a noise component since the picture element vectors are more random in directions and are smaller in the lengths as the frequency band becomes lower. Accordingly, in the ninth and tenth embodiments, by carrying out a correction, in the picture element vector correcting means 383, for equalizing the direction of a picture element vector for a given picture element in a band-limited image in a given frequency band to the direction of the picture element vector for the corresponding picture element in a band-limited image in a lower frequency band in place of the aforesaid processing based on the dispersions, whether the picture element is in the edge portion or the noise can be determined more accurately. Especially in the ninth embodiment, the separation means 385 comes to be able to more accurately separate the noise component from the edge component.

Further, though, in the ninth and tenth embodiments, the corrected picture element vectors are used, the picture element vectors as calculated by the picture element vector calculating means 382 may be used.

There has been proposed a method of obtaining a radiation image of soft tissue and/or a radiation image of bones from an object consisting of soft tissue and bones such as the chest of a human body. In this method, the object is exposed to a plurality of radiations which are different in energy level and a plurality of radiation images are obtained. The radiation images are read out and a plurality of radiation image signals are obtained. A soft tissue radiation image whose major component is the soft tissue of the object and/or a bone radiation image whose major component is the bones of the object are obtained by carrying out an energy subtraction processing on the radiation image signals. In order to suppress the noise components of the soft tissue radiation and the bone radiation image, there has been proposed, for instance, in Japanese Unexamined Patent Publication No. 5(1993)-236351, an energy subtraction image forming method comprising the steps of carrying out a first processing of carrying out a smoothing processing on the bone image signal, thereby obtaining a first smoothed image signal, and obtaining a soft tissue image signal by subtracting the first smoothed image signal from the original image signal; carrying out a second processing of carrying out a smoothing processing on the soft tissue image signal, thereby obtaining a second smoothed image signal, and obtaining a bone image signal removed with noise by subtracting the second smoothed image signal from the original image signal; and repeating the first and second processings. The processing in accordance with the tenth aspect of the present invention may be applied to obtain the smoothed image in the energy subtraction image forming method. When the processing in accordance with the tenth aspect of the present invention is applied to obtain the smoothed image, only the noise component can be suppressed with the edge component made more conspicuous, whereby a high quality soft tissue image or bone image can be obtained.

Though, in the eighth to tenth embodiments, the aforesaid processing based on the picture element vectors is carried out on the signals obtained by carrying out a wavelet transformation on the original image signal, the processing may be carried out also on band-limited image signals obtained by carrying out other multi-resolution transformations such as Laplacian pyramid decomposition on the original image signal $S_{org}$.

In addition, all of the contents of the Japanese Patent Application Nos. 11(1999)-163670, 11(1999)-163671, 11(1999)-363766, 11(1999)-271674, and 11(1999)-279172 are incorporated into this specification by reference.

What is claimed is:

1. An image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining a signal representing information on a high frequency component of the original image signal from the band-limited image signals on the basis of a predetermined transformation function, carrying out said image processing on the original image signal on the basis of the signal representing information on a high frequency component of the original image signal, and in which the band-limited image signals are obtained by carrying out multi-resolution transformation on the original image signal, and the signal representing information on a high frequency component of the original image signal is obtained by obtaining transformed band-limited image signals by transforming the band-limited image signals by use of a predetermined transformation function and carrying out inverse multi-resolution transformation on the transformed band-limited image signals.

2. An image processing method as defined in claim 1 in which each of the images represented by the band-limited image signals has picture elements in a number according to the corresponding frequency band.

3. An image processing method as defined in claim 1 in which the signal representing information on a high frequency component of the original image signal has the same number of picture elements as the original image signal.

4. An image processing method as defined in claim 1 in which the multi-resolution transformation is Laplacian pyramid decomposition or wavelet transformation.

5. An image processing method as defined in claim 1 in which the signal representing information on a high frequency component of the original image signal is obtained from the band-limited image signals but that in the lowest frequency band.

6. An image processing method as defined in claim 1 in which the predetermined transformation function is a non-linear function.

7. An image processing method as defined in claim 1 in which the image processing is a frequency enhancement processing.

8. An image processing method as defined in claim 1 in which the image processing is a dynamic range compression processing.

9. An image processing system as defined in claim 1 in which the image processing is a dynamic range compression processing.

10. An image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a high frequency component obtaining means which obtains a signal representing information on a high frequency component of the original image signal from the band-limited image signals on the basis of a predetermined transformation function, an image processing means which carries out said image processing on the original image signal on the basis of the signal representing information on a high frequency component of the original image signal, and in which the band-limited image signal making means makes band-limited image signals by carrying out multi-resolution transformation on the original image signal, and the high frequency component obtaining means obtains a signal representing information on a high frequency component of the original image signal by obtaining transformed band-limited image signals by transforming the band-limited image signals by use of a predetermined transformation function and carrying out inverse multi-resolution transformation on the transformed band-limited image signals.

11. An image processing system as defined in claim 10 in which the band-limited image signal making means makes the band-limited image signals so that each of the images represented by the band-limited image signals has picture elements in a number according to the corresponding frequency band.

12. An image processing system as defined in claim 10 in which the high frequency component obtaining means obtains a signal representing information on a high frequency component of the original image signal which has the same number of picture elements as the original image signal.

13. An image processing system as defined in claim 10 in which the multi-resolution transformation is Laplacian pyramid decomposition or wavelet transformation.

14. An image processing system as defined in claim 10 in which the high frequency component obtaining means obtains the signal representing information on a high frequency component of the original image signal from the band-limited image signals but that in the lowest frequency band.

15. An image processing system as defined in claim 10 in which the predetermined transformation function is a non-linear function.

16. An image processing system as defined in claim 10 in which the image processing is a frequency enhancement processing.

17. A computer-readable recording medium loaded with program for causing a computer to perform an image processing method for obtaining a processed image signal from an original image signal representing an original image by carrying out on the original image signal an image processing based on a signal representing information on a high frequency component of the original image signal, the program comprising the steps of making band-limited image signals from the original image signal, obtaining a signal representing information on a high frequency component of the original image signal from the band-limited image signals on the basis of a predetermined transformation function, carrying out said image processing on the original image signal on the basis of the signal representing information on a high frequency component of the original image signal, and, in which the step of making the band-limited image signals is a step in which the band-limited image signals are obtained by carrying out multi-resolution transformation on the original image signal, and the step of obtaining the signal representing information on a high frequency component of the original image signal is a step in which the signal representing information on a high frequency component of the original image signal is obtained by obtaining transformed band-limited image signals by transforming the band-limited image signals by use of a predetermined transformation function and carrying out inverse multi-resolution transformation on the transformed band-limited image signals.

18. A computer-readable recording medium as defined in claim 17 in which the band-limited image signals are made so that each of the images represented by the band-limited image signals has picture elements in a number according to the corresponding frequency band.

19. A computer-readable recording medium as defined in claim 17 in which the signal representing information on a high frequency component of the original image signal is made to have the same number of picture elements as the original image signal.

20. A computer-readable recording medium as defined in claim 17 in which the multi-resolution transformation is Laplacian pyramid decomposition or wavelet transformation.

21. A computer-readable recording medium as defined in claim 17 in which the step of obtaining the signal representing information on a high frequency component of the original image signal is a step in which the signal representing information on a high frequency component of the original image signal is obtained from the band-limited image signals but that in the lowest frequency band.

22. A computer-readable recording medium as defined in claim 17 in which the predetermined transformation function is a nonlinear function.

23. A computer-readable recording medium as defined in claim 17 in which the image processing is a frequency enhancement processing.

24. A computer-readable recording medium as defined in claim 17 in which the image processing is a dynamic range compression processing.

25. An image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining noiseless band-limited image signals by removing a noise component from the band-limited image signals, obtaining a signal representing information on a high frequency component of the original image signal from the noiseless band-limited image signals on the basis of a predetermined transformation function, carrying out said image processing on the original image signal on the basis of the signal representing information on a high frequency component of the original image signal, and in which the band-limited image signals are obtained by carrying out multi-resolution transformation on the original image signal, and the signal representing information on a high frequency component of the original image signal is obtained by obtaining transformed noiseless band-limited image signals by transforming the noiseless band-limited image signals by use of a predetermined transformation function and carrying out inverse multi-resolution transformation on the transformed noiseless band-limited image signals.

26. An image processing method as defined in claim 25 in which each of the images represented by the band-limited image signals has picture elements in a number according to the corresponding frequency band.

27. An image processing method as defined in claim 25 in which the signal representing information on a high frequency component of the original image signal has the same number of picture elements as the original image signal.

28. An image processing method as defined in claim 25 in which the multi-resolution transformation is Laplacian pyramid decomposition or wavelet transformation.

29. An image processing method as defined in claim 25 in which the signal representing information on a high frequency component of the original image signal is obtained from the noiseless band-limited image signals obtained from the band-limited image signals other than that in the lowest frequency band.

30. An image processing method as defined in claim 25 in which the predetermined transformation function is a nonlinear function.

31. An image processing method as defined in claim 25 in which the image processing is a frequency enhancement processing.

32. An image processing method as defined in claim 25 in which the image processing is a dynamic range compression processing.

33. An image processing method as defined in claim 25 in which the noise component is removed from the band-limited image signals by filtering processing by an iris filter.

34. An image processing system as defined in claim 25 in which the noiseless band-limited image signal obtaining means removes the noise component from the band-limited image signals by filtering processing by an iris filter.

35. An image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a noiseless band-limited image signal obtaining means which obtains noiseless band-limited image signals by removing a noise component from the band-limited image signals, a high frequency component obtaining means which obtains a signal representing information on a high frequency component of the original image signal from the noiseless band-limited image signals on the basis of a predetermined transformation function, an image processing means which carries out said image processing on the original image signal on the basis of the signal representing information on a high frequency component of the original image signal, and the band-limited image signal making means makes band-limited image signals by carrying out multi-resolution transformation on the original image signal, and the high frequency component obtaining means obtains a signal representing information on a high frequency component of the original image signal by obtaining transformed noiseless band-limited image signals by transforming the noiseless band-limited image signals by use of a predetermined transformation function and carrying out inverse multi-resolution transformation on the transformed noiseless band-limited image signals.

36. An image processing system as defined in claim 35 in which the band-limited image signal making means makes the band-limited image signals so that each of the images represented by the band-limited image signals has picture elements in a number according to the corresponding frequency band.

37. An image processing system as defined in claim 36 in which the high frequency component obtaining means obtains a signal representing information on a high frequency component of the original image signal which has the same number of picture elements as the original image signal.

38. An image processing system as defined in claim 35 in which the multi-resolution transformation is Laplacian pyramid decomposition or wavelet transformation.

39. An image processing system as defined in claim 35 in which the high frequency component signal obtaining means obtains the signal representing information on a high frequency component of the original image signal from the noiseless band-limited image signals obtained from the band-limited image signals other than that in the lowest frequency band.

40. An image processing system as defined in claim 35 in which the predetermined transformation function is a nonlinear function.

41. An image processing system as defined in claim 35 in which the image processing is a frequency enhancement processing.

42. An image processing system as defined in claim 35 in which the image processing-is a dynamic range compression processing.

43. A computer-readable recording medium loaded with program for causing a computer to perform an image processing method for obtaining a processed image signal from an original image signal representing an original image by carrying out on the original image signal an image processing based on a signal representing information on a high frequency component of the original image signal, the program comprising the steps of making band-limited image signals from the original image signal, obtaining noiseless band-limited image signals by removing a noise component from the band-limited image signals, obtaining a signal representing information on a high frequency component of the original image signal from the noiseless band-limited image signals on the basis of a predetermined transformation function, carrying out said image processing on the original image signal on the basis of the signal representing information on a high frequency component of the original image signal, and in which the step of making the band-limited image signals is a step in which the band-limited image signals are obtained by carrying out multi-resolution transformation on the original image signal, and the step of obtaining the signal representing information on a high frequency component of the original image signal is a step in which the signal representing information on a high frequency component of the original image signal is obtained by obtaining transformed noiseless band-limited image signals by transforming the noiseless band-limited image signals by use of a predetermined transformation function and carrying out inverse multi-resolution transformation on the transformed noiseless band-limited image signals.

44. A computer-readable recording medium as defined in claim 43 in which the band-limited image signals are made so that each of the images represented by the band-limited image signals has picture elements in a number according to the corresponding frequency band.

45. A computer-readable recording medium as defined in claim 43 in which the signal representing information on a high frequency component of the original image signal is made to have the same number of picture elements as the original image signal.

46. A computer-readable recording medium as defined in claim 43 in which the multi-resolution transformation is Laplacian pyramid decomposition or wavelet transformation.

47. A computer-readable recording medium as defined in claim 43 in which the step of obtaining the signal representing information on a high frequency component of the original image signal is a step in which the signal representing information on a high frequency component of the original image signal is obtained from the noiseless band-limited image signals obtained from the band-limited image signals other than that in the lowest frequency band.

48. A computer-readable recording medium as defined in claim 43 in which the predetermined transformation function is a nonlinear function.

49. A computer-readable recording medium as defined in claim 43 in which the image processing is a frequency enhancement processing.

50. A computer-readable recording medium as defined in claim 43 in which the image processing is a dynamic range compression processing.

51. A computer-readable recording medium as defined in claim 43 in which the step of obtaining the noiseless band-limited image signals is a step in which the noise component is removed from the band-limited image signals by filtering processing by an iris filter.

52. An image processing method for obtaining a processed image signal from an original image signal representing an original image by carrying out on the original image signal an image processing based on a signal representing information on a high frequency component of the original image signal, the method comprising the steps of making band-limited image signals from the original image signal, obtaining a noise signal having the same number of picture element as the original image on the basis of the band-limited image signals, obtaining a signal representing information on a high frequency component of the original image signal from the band-limited image signals on the basis of a predetermined transformation function, removing a noise component from and carrying out the image processing on the original image signal on the basis of the noise signal and the signal representing information on a high frequency component of the original image signal, in which the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise band-limited image signals, the signal representing information on a high frequency component of the original image signal is obtained by obtaining transformed band-limited image signals by transforming the band-limited image signals by use of said predetermined transformation function and carrying out inverse multi-resolution transformation on the transformed band-limited image signals.

53. An image processing method as defined in claim 52 in which each of the images represented by the band-limited image signals has picture elements in a number according to the corresponding frequency band.

54. An image processing method as defined in claim 52 in which the signal representing information on a high frequency component of the original image signal has the same number of picture elements as the original image signal.

55. An image processing method as defined in claim 52 in which the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise band-limited image signals, and the signal representing information on a high frequency component of the original image signal is obtained by obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signals.

56. An image processing method as defined in claim 52 in which the multi-resolution transformation is Laplacian pyramid decomposition or wavelet transformation.

57. An image processing method as defined in claim 52 in which the noise signal and the signal representing information on a high frequency component of the original image signal are obtained from the band-limited image signals but that in the lowest frequency band.

58. An image processing method as defined in claim 52 in which the predetermined transformation function is a non-linear function.

59. An image processing method as defined in claim 52 in which the image processing is a frequency enhancement processing.

60. An image processing method as defined in claim 52 in which the image processing is a dynamic range compression processing.

61. An image processing method as defined in claim 52 in which the noise signal is obtained on the basis of a filtering processing by an iris filter.

62. An image processing method for obtaining a processed image signal image signal representing an original image by carrying out on the original image signal an image processing based on a signal representing information on a high frequency component of the original image signal, the method comprising the steps of making band-limited image signals from the original image signal, obtaining a noise signal having the same number of picture element as the original image on the basis of the band-limited image signals, obtaining a signal representing information on a high frequency component of the original image signal from the band-limited image signals on the basis of a predetermined transformation function, removing a noise component from and carrying out the image processing on the original image signal on the basis of the noise signal and the signal representing information on a high frequency component of the original image signal, wherein the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise-band-limited image signals, and the signal representing information on a high frequency component of the original image signal is obtained by obtaining transformed noise band-limited image signals by transforming the noise band-limited image signals by use of the predetermined transformation function, obtaining a transformed noise signal by carrying out inverse multi-resolution transformation on the transformed noise band-limited image signals, obtaining transformed band-limited image signals by transforming the band-limited image signals by use of the predetermined transformation function, obtaining a transformed image signal by carrying out inverse multi-resolution transformation on the transformed band-limited image signals, and subtracting the transformed noise signal from the transformed image signals.

63. An image processing method as defined in claim 62 in which each of the images represented by the band-limited image signals has picture elements in a number according to the corresponding frequency band.

64. An image processing method as defined in claim 62 in which the signal representing information on a high frequency component of the original image signal has the same number of picture elements as the original image signal.

65. An image processing method as defined in claim 62 in which the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise band-limited image signals, and the signal representing information on a high frequency component of the original image signal is obtained by obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signals.

66. An image processing method as defined in claim 62 in which the noise signal and the signal representing information on a high frequency component of the original image signal are obtained from the band-limited image signals but that in the lowest frequency band.

67. An image processing method as defined in claim 62 in which the predetermined transformation function is a non-linear function.

68. An image processing method as defined in claim 62 in which the image processing is a frequency enhancement processing.

69. An image processing method as defined in claim 62 in which the image processing is dynamic range compression processing.

70. An image processing method as defined in claim 62 in which the noise signal is obtained on the basis of a filtering processing by an iris filter.

71. An image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a noise signal obtaining means which obtains a noise signal having the same number of picture element as the original image on the basis of the band-limited image signals, a high frequency component obtaining means which obtains a signal representing information on a high frequency component of the original image signal from the band-limited image signals on the basis of a predetermined transformation function, an image processing means which removes a noise component from and carries out said image processing on the original image signal on the basis of the noise signal and the signal representing information on a high frequency component of the original image signal in which the band-limited image signal making means makes the band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, the high frequency component obtaining means obtains the signal representing information on a high frequency component of the original image signal by obtaining transformed band-limited image signals by transforming the band-limited image signals by use of said predetermined transformation function and carrying out inverse multi-resolution transformation on the transformed band-limited image signals.

72. An image processing system as defined in claim 71 in which the band-limited image signal making means makes the band-limited image signals so that each of the images represented by the band-limited image signals has picture elements in a number according to the corresponding frequency band.

73. An image processing system as defined in claim 71 in which the high frequency component obtaining means obtains a signal representing information on a high frequency component of the original image signal which has the same number of picture elements as the original image signal.

74. An image processing system as defined in claim 71 in which the band-limited image signal making means makes band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, and the high frequency component obtaining means obtains the signal representing information on a high frequency component of the original image signal by obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signal.

75. An image processing system as defined in claim 71 in which the multi-resolution transformation is Laplacian pyramid decomposition or wavelet transformation.

76. An image processing system as defined in claim 71 in which the noise signal obtaining means and the high frequency component signal obtaining means obtain the noise signal and the signal representing information on a high frequency component of the original image signal from the noiseless band-limited image signals obtained from the band-limited image signals other than that in the lowest frequency band.

77. An image processing system as defined in claim 71 in which the predetermined transformation function is a non-linear function.

78. An image processing system as defined in claim 71 in which the image processing is a frequency enhancement processing.

79. An image processing system as defined in claim 71 in which the image processing is a dynamic range compression processing.

80. An image processing system as defined in claim 71 in which the noise signal obtaining means obtains the noise signal on the basis of a filtering processing by an iris filter.

81. An image processing system for obtaining a processed image signal from an original image signal representing an original image by carrying out on the original image signal an image processing based on a signal representing information on a high frequency component of the original image signal, the system comprising a band-limited image signal making means which makes band-limited image signals from the original image signal, a noise signal obtaining means which obtains a noise signal having the same number of picture element as the original image on the basis of the band-limited image signals, a high frequency component obtaining means which obtains a signal representing information on a high frequency component of the original image signal from the band-limited image signals on the basis of a predetermined transformation function, an image processing means which removes a noise component from and carries out said image processing on the original image signal on the basis of the noise signal and the signal representing information on a high frequency component of the original image signal, the band-limited image signal making means makes band-limited image signals by carrying out multi-resolution transformation on the original image signal, the noise signal obtaining means obtains the noise signal by separating noise components from the band-limited image signals to obtain noise band-limited image signals and carrying out inverse multi-resolution transformation on the noise band-limited image signals, and the high frequency component obtaining means obtains the signal representing information on a high frequency component of the original image signal by obtaining transformed noise band-limited image signals by transforming the noise band-limited image signals by use of the predetermined transformation function, obtaining a transformed noise signal by carrying out inverse multi-resolution transformation on the transformed noise band-limited image signals, obtaining transformed band-limited image signals by transforming the band-limited image signals by use of the predetermined transformation function, obtaining a transformed image signal by carrying out inverse multi-resolution transformation on the transformed band-limited image signals, and subtracting the transformed noise signal from the transformed image signal.

82. An image processing system as defined in claim 81 in which the band-limited image signal making means makes the band-limited image signals so that each of the images represented by the band-limited image signals has picture elements in a number according to the corresponding frequency band.

83. An image processing system as defined in claim 81 in which the high frequency component obtaining means obtains a signal representing information on a high frequency component of the original image signal which has the same number of picture elements as the original image signal.

84. An image processing system as defined in claim 81 in which
the band-limited image signal making means makes band-limited image signals by carrying out multi-resolution transformation on the original image signal,
the noise signal obtaining means obtains the noise signal by separating noise components from the band-limited image signals to obtain noise band-limited image signals and carrying out inverse multi-resolution transformation on the noise band-limited image signals, and
the high frequency component obtaining means obtains the signal representing information on a high frequency component of the original image signal by
obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signal.

85. An image processing system as defined in claim 81 in which the noise signal obtaining means and the high frequency component signal obtaining means obtain the noise signal and the signal representing information on a high frequency component of the original image signal from the noiseless band-limited image signals obtained from the band-limited image signals other than that in the lowest frequency band.

86. An image processing system as defined in claim 81 in which the predetermined transformation function is a nonlinear function.

87. An image processing system as defined in claim 81 in which the image processing is a frequency enhancement processing.

88. An image processing system as defined in claim 81 in which the image processing is a dynamic range compression processing.

89. An image processing system as defined in claim 71 in which the noise signal obtaining means obtains the noise signal on the basis of a filtering processing by an iris filter.

90. A computer-readable recording medium loaded with program for causing a computer to perform an image processing method for obtaining a processed image signal from an original image signal representing an original image by carrying out on the original image signal an image processing based on a signal representing information on a high frequency component of the original image signal, the program comprising the steps of
making band-limited image signals from the original image signal,
obtaining a noise signal having the same number of picture element as the original image on the basis of the band-limited image signals,
obtaining a signal representing information on a high frequency component of the original image signal from the band-limited image signals on the basis of a predetermined transformation function,
removing a noise component from and carrying out the image processing on the original image signal on the basis of the noise signal and the signal representing information on a high frequency component of the original image signal,
in which the band-limited image signals are obtained by carrying out multi-resolution transformation on the original image signal,
the noise signal is obtained by separating noise components from the band-limited image signals to obtain noise band-limited image signals and carrying out inverse multi-resolution transformation on the noise band-limited image signals,
the signal representing information on a high frequency component of the original image signal is obtained by obtaining transformed band-limited image signals by transforming the band-limited image signals by use of said predetermined transformation function and carrying out inverse multi-resolution transformation on the transformed band-limited image signals,
obtaining a transformed noise signal by carrying out inverse multi-resolution transformation on the transformed noise band-limited image signals,
obtaining transformed band-limited image signals by transforming the band-limited image signals by use of the predetermined transformation function,
obtaining a transformed image signal by carrying out inverse multi-resolution transformation on the transformed band-limited image signals.

91. A computer-readable recording medium as defined in claim 90 in which each of the images represented by the band-limited image signals is made to have picture elements in a number according to the corresponding frequency band.

92. A computer-readable recording medium as defined in claim 90 in which the signal representing information on a high frequency component of the original image signal is obtained to have the same number of picture elements as the original image signal.

93. A computer-readable recording medium as defined in claim 90 in which
the band-limited image signals are obtained by carrying out multi-resolution transformation on the original image signal,
the noise signal is obtained by separating noise components from the band-limited image signals to obtain noise band-limited image signals and carrying out inverse multi-resolution transformation on the noise band-limited image signals, and
the signal representing information on a high frequency component of the original image signal is obtained by
obtaining noiseless band-limited image signals by removing noise components from the band-limited image signals,
obtaining transformed noiseless band-limited image signals by transforming the noiseless band-limited image signals by use of said predetermined transformation function, and
carrying out inverse multi-resolution transformation on the transformed noiseless band-limited image signals.

94. A computer-readable recording medium as defined in claim 90 in which the multi-resolution transformation is Laplacian pyramid decomposition or wavelet transformation.

95. A computer-readable recording medium as defined in claim 90 in which the noise signal and the signal representing information on a high frequency component of the original image signal are obtained from the band-limited image signals but that in the lowest frequency band.

96. A computer-readable recording medium as defined in claim 90 in which the predetermined transformation function is a nonlinear function.

97. A computer-readable recording medium as defined in claim 90 in which the image processing is a frequency enhancement processing.

98. A computer-readable recording medium as defined in claim 90 in which the image processing is a dynamic range compression processing.

99. A computer-readable recording medium as defined in claim 90 in which the noise signal is obtained on the basis of a filtering processing by an iris filter.

100. A computer-readable recording medium loaded with program for causing a computer to perform an image processing method for obtaining a processed image signal from an original image signal representing an original image by carrying out on the original image signal an image processing based on a signal representing information on a high frequency component of the original image signal, the program comprising the steps of making band-limited image signals from the original image signal, obtaining a noise signal having the same number of picture element as the original image on the basis of the band-limited image signals, obtaining a signal representing information on a high frequency component of the original image signal from the band-limited image signals on the basis of a predetermined transformation function, removing a noise component from and carrying out the image processing on the original image signal on the basis of the noise signal and the signal representing information on a high frequency component of the original image signal, in which the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise band-limited image signals, the signal representing information on a high frequency component of the original image signal is obtained by obtaining transformed band-limited image signals by transforming the band-limited image signals by use of said predetermined transformation function and carrying out inverse multi-resolution transformation on the transformed band-limited image signals, obtaining a transformed noise signal by carrying out inverse multi-resolution transformation on the transformed noise band-limited image signals, obtaining transformed band-limited image signals by transforming the band-limited image signals by use of the predetermined transformation function, obtaining a transformed image signal by carrying out inverse multi-resolution transformation on the transformed band-limited image signals, and subtracting the transformed noise signal from the transformed image signal.

101. A computer-readable recording medium as defined in claim 100 in which each of the images represented by the band-limited image signals is made to have picture elements in a number according to the corresponding frequency band.

102. A computer-readable recording medium as defined in claim 100 in which the signal representing information on a high frequency component of the original image signal is obtained to have the same number of picture elements as the original image signal.

103. A computer-readable recording medium as defined in claim 100 in which the band-limited image signals are obtained by carrying out multi-resolution transformation on the original image signal, the noise signal is obtained by separating noise components from the band-limited image signals to obtain noise band-limited image signals and carrying out inverse multi-resolution transformation on the noise band-limited image signals, and the signal representing information on a high frequency component of the original image signal is obtained by obtaining noiseless band-limited image signals by removing noise components from the band-limited image signals, obtaining transformed noiseless band-limited image signals by transforming the noiseless band-limited image signals by use of said predetermined transformation function, and carrying out inverse multi-resolution transformation on the transformed noiseless band-limited image signals.

104. A computer-readable recording medium as defined in claim 100 in which the noise signal and the signal representing information on a high frequency component of the original image signal are obtained from the band-limited image signals but that in the lowest frequency band.

105. A computer-readable recording medium as defined in claim 100 in which the predetermined transformation function is a nonlinear function.

106. A computer-readable recording medium as defined in claim 100 in which the image processing is a frequency enhancement processing.

107. A computer-readable recording medium as defined in claim 100 in which the image processing is a dynamic range compression processing.

108. A computer-readable recording medium as defined in claim 100 in which the noise signal is obtained on the basis of a filtering processing by an iris filter.

109. An image processing method for obtaining a processed image signal from an original image signal representing an original image by carrying out a noise removing processing on the original image signal, the method comprising the steps of making at least one band-limited image signal from the original image signal, obtaining a noise signal having the same number of picture element as the original image on the basis of the band-limited image signal, removing a noise component from the original image signal on the basis of the noise signal, in which a plurality of band-limited image signals are obtained by carrying out multi-resolution transformation on the original image signal, and the noise signal is obtained by separating noise components from the band-limited image signals to obtain noise band-limited image signals and carrying out inverse multi-resolution transformation on the noise band-limited image signals.

110. An image processing method as defined in claim 109 in which the multi-resolution transformation is Laplacian pyramid decomposition or wavelet transformation.

111. An image processing method as defined in claim 109 in which the noise signal is obtained by filtering processing by an iris filter.

112. An image processing method as defined in claim 109 in which a picture element vector is calculated for each of picture elements of band-limited image signals represented by the band-limited image signals, and the noise signal is obtained on the basis of picture element vectors calculated.

113. An image processing method as defined in claim 112 in which the noise signal is obtained on the basis of also the picture element vectors of picture elements near each picture element.

114. An image processing method as defined in claim 112 in which a picture element vector calculated for a given picture element of an image represented by a band-limited image signal in a given frequency band is corrected on the basis of the picture element vector of the corresponding picture element of an image represented by a band-limited image signal in a frequency band lower than the given frequency band, and said noise signal is obtained on the basis of the corrected picture element vector.

115. An image processing method as defined in claim 112 in which whether a picture element vector calculated for a given picture element of an image represented by a band-limited image signal in a given frequency band is to be corrected is determined on the basis of dispersion of the band-limited image signal in a predetermined region including the given picture element, and when it is determined that the picture element vector calculated for the given picture element is to be corrected, the picture element vector is corrected on the basis of the picture element vector of the corresponding picture element of an image represented by a band-limited image signal in a frequency band lower than the given frequency band, and said noise signal is obtained on the basis of the corrected picture element vector.

116. An image processing method as defined in claim 112 in which the noise signal is obtained on the basis of a smoothed band-limited image signal obtained by smoothing the band-limited image signal on the basis of the picture element vectors.

117. An image processing method as defined in claim 116 in which a picture element vector calculated for a given picture element of an image represented by a band-limited image signal in a given frequency band is corrected on the basis of the picture element vector of the corresponding picture element of an image represented by a band-limited image signal in a frequency band lower than the given frequency band, and the smoothed band-limited image signal is obtained by smoothing the band-limited image signal on the basis of the corrected picture element vectors.

118. An image processing method as defined in claim 116 in which whether a picture element vector calculated for a given picture element of an image represented by a band-limited image signal in a given frequency band is to be corrected is determined on the basis of dispersion of the band-limited image signal in a predetermined region including the given picture element, and when it is determined that the picture element vector calculated for the given picture element is to be corrected, the picture element vector is corrected on the basis of the picture element vector of the corresponding picture element of an image represented by a band-limited image signal in a frequency band lower than the given frequency band, and the smoothed band-limited image signal is obtained by smoothing the band-limited image signal on the basis of the corrected picture element vectors.

119. A computer-readable recording medium as defined in claim 116 in which whether a picture element vector calculated for a given picture element of an image represented by a band-limited image signal in a given frequency band is to be corrected is determined on the basis of dispersion of the band-limited image signal in a predetermined region including the given picture element, and when it is determined that the picture element vector calculated for the given picture element is to be corrected, the picture element vector is corrected on the basis of the picture element vector of the corresponding picture element of an image represented by a band-limited image signal in a frequency band lower than the given frequency band, and the smoothed band-limited image signal is obtained by smoothing the band-limited image signal on the basis of the corrected picture element vectors.

120. An image processing method as defined in claim 109 in which the original image signal and the noise signal are stored and the noise component of the original image signal is removed, when the set value of a parameter representing the degree of removing the noise component is changed, on the basis of the stored original signal and noise signal and the changed value of the parameter.

121. An image processing system for obtaining a processed image signal from an original image signal representing an original image by carrying out a noise removing processing on the original image signal, the system comprising, a band-limited image signal making means which makes at least one band-limited image signal from the original image signal, a noise signal obtaining means which obtains a noise signal having the same number of picture element as the original image on the basis of the band-limited image signal, a noise removing means which removes a noise component from the original image signal on the basis of the noise signal, in which said band-limited image signal making means obtains a plurality of band-limited image signals by carrying out multi-resolution transformation on the original image signal, and said noise signal obtaining means obtains the noise signal by separating noise components from the band-limited image signals to obtain noise band-limited image signals and carrying out inverse multi-resolution transformation on the noise band-limited image signals.

122. An image processing system as defined in claim 121 in which the multi-resolution transformation is Laplacian pyramid decomposition or wavelet transformation.

123. An image processing system as defined in claim 121 in which said noise signal obtaining means obtains the noise signal by filtering processing,by an iris filter.

124. An image processing system as defined in claim 121 in which said noise signal obtaining means is provided with a picture element vector calculating means which calculates a picture element vector for each of picture elements of band-limited image signals represented by the band-limited image signals, and the noise signal obtaining means obtains the noise signal on the basis of picture element vectors calculated.

125. An image processing system as defined in claim 124 in which said noise signal obtaining means obtains the noise signal on the basis of also the picture element vectors of picture elements near each picture element.

126. An image processing system as defined in claim 124 in which said noise signal obtaining means is further provided with a correcting means which corrects a picture element vector calculated for a given picture element of an image represented by a band-limited image signal in a given frequency band on the basis of the picture element vector of the corresponding picture element of an image represented by a band-limited image signal in a frequency band lower than the given frequency band, and the noise signal obtaining means obtains the noise signal on the basis of the corrected picture element vector.

127. An image processing system as defined in claim 124 in which said noise signal obtaining means is further provided with a determination means which determines whether a picture element vector calculated for a given picture element of an image represented by a band-limited image signal in a given frequency band is to be corrected on the basis of dispersion of the band-limited image signal in a predetermined region including the given picture element, and a correcting means which, when it is determined by the determination means that the picture element vector calculated for the given picture element is to be corrected, corrects the picture element vector on the basis of the picture element vector of the corresponding picture element of an image represented by a band-limited image signal in a frequency band lower than the given frequency band, and said noise signal obtaining means obtains the noise signal on the basis of the corrected picture element vector.

128. An image processing system as defined in claim 124 in which said noise signal obtaining means is further provided with a smoothing means which obtains a smoothed band-limited image signal by smoothing the band-limited image signal on the basis of the picture element vectors, and the noise signal obtaining means obtains the noise signal on the basis of the smoothed band-limited image signal.

129. An image processing system as defined in claim 128 in which said noise signal obtaining means is further provided with a correcting means which corrects a picture element vector calculated for a given picture element of an image represented by, a band-limited image signal in a given frequency band on the basis of the picture element vector of the corresponding picture element of an image represented by a band-limited image signal in a frequency band lower than the given frequency band, and the smoothing means obtains the smoothed band-limited image signal by smoothing the band-limited image signal on the basis of the corrected picture element vectors.

130. An image processing system as defined in claim 128 in which said noise signal obtaining means is further provided with a determination means which determines whether a picture element vector calculated for a given picture element of an image represented by a band-limited image signal in a given frequency band is to be corrected on the basis of dispersion of the band-limited image signal in a predetermined region including the given picture element, and a correcting means which, when it is determined by the determination means that the picture element vector calculated for the given picture element is to be corrected, corrects the picture element vector on the basis of the picture element vector of the corresponding picture element of an image represented by a band-limited image signal in a frequency band lower than the given frequency band, and the smoothing means obtains the smoothed band-limited image signal by smoothing the band-limited image signal on the basis of the corrected picture element vectors.

131. An image processing system as defined in claim 121 which further comprises a first memory means which stores the original image signal, a second memory means which stores the noise signal obtained by the noise signal obtaining means, and a parameter setting means which sets the value of a parameter representing the degree of removing the noise component to the noise removing means, and in which the noise removing means reads out the original image signal and the noise signal from the first and second memory means and removes the noise component of the original image signal, when the set value of the parameter representing the degree of removing the noise component is changed, on the basis of the stored original signal and noise signal and the changed value of the parameter.

132. A computer-readable recording medium loaded with program for causing a computer to perform an image processing method for obtaining a processed image signal from an original image signal representing an original image by carrying out a noise removing processing on the original image signal, the program comprising the steps of making at least one band-limited image signal from the original image signal, obtaining a noise signal having the same number of picture element as the original image on the basis of the band-limited image signal, removing a noise component from the original image signal on the basis of the noise signal, in which a plurality of band-limited image signals are obtained by carrying out multi-resolution transformation on the original image signal, and the noise signal is obtained by separating noise components from the band-limited image signals to obtain noise band-limited image signals and carrying out inverse multi-resolution transformation on the noise band-limited image signals.

133. A computer-readable recording medium as defined in claim 132 in which the multi-resolution transformation is Laplacian pyramid decomposition or wavelet transformation.

134. A computer-readable recording medium as defined in claim 132 in which the noise signal is obtained by filtering processing by an iris filter.

135. A computer-readable recording medium as defined in claim 132 in which a picture element vector is calculated for each of picture elements of band-limited image signals represented by the band-limited image signals, and the noise signal is obtained on the basis of picture element vectors calculated.

136. A computer-readable recording medium as defined in claim 135 in which the noise signal is obtained on the basis of also the picture element vectors of picture elements near each picture element.

137. A computer-readable recording medium as defined in claim 135 in which a picture element vector calculated for a given picture element of an image represented by a band-limited image signal in a given frequency band is corrected on the basis of the picture element vector of the corresponding picture element of an image represented by a band-limited image signal in a frequency band lower than the given frequency band, and said noise signal is obtained on the basis of the corrected picture element vector.

138. A computer-readable recording medium as defined in claim 135 in which whether a picture element vector calculated for a given picture element of an image represented by a band-limited image signal in a given frequency band is to be corrected is determined on the basis of dispersion of the band-limited image signal in a predetermined region including the given picture element, and when it is determined that the picture element vector calculated for the given picture element is to be corrected, the picture element vector is corrected on the basis of the picture element vector of the corresponding picture element of an image represented by a band-limited image signal in a frequency band lower than the given frequency band, and said noise signal is obtained on the basis of the corrected picture element vector.

139. A computer-readable recording medium as defined in claim 135 in which the noise signal is obtained on the basis of a smoothed band-limited image signal obtained by smoothing the band-limited image signal on the basis of the picture element vectors.

140. A computer-readable recording medium as defined in claim 139 in which a picture element vector calculated for a given picture element of an image represented by a band-limited image signal in a given frequency band is corrected on the basis of the picture element vector of the corresponding picture element of an image represented by a band-limited image signal in a frequency band lower than the given frequency band, and the smoothed band-limited image signal is obtained by smoothing the band-limited image signal on the basis of the corrected picture element vectors.

141. A computer-readable recording medium as defined in claim 132 in which the original image signal and the noise signal are stored and the noise component of the original image signal is removed, when the set value of a parameter representing the degree of removing the noise component is changed, on the basis of the stored original signal and noise signal and the changed value of the parameter.

\* \* \* \* \*